United States Patent
Vu et al.

(10) Patent No.: US 7,807,296 B2
(45) Date of Patent: Oct. 5, 2010

(54) COPPER-MANGANESE MIXED OXIDE CATHODE MATERIAL FOR USE IN ALKALINE CELLS HAVING HIGH CAPACITY

(75) Inventors: Viet H. Vu, Verona, WI (US); Ernest Ndzebet, Madison, WI (US); Akshaya Kumar, Middleton, WI (US); Deborah Gilbert, Fitchburg, WI (US); William C. Bushong, Madison, WI (US); Karthik Ramaswami, Middleton, WI (US); Juergen Scherer, New-Ulm (DE)

(73) Assignee: Roval, Inc., Madison, WI (US)

( * ) Notice: Subject to any disclaimer, the term of this patent is extended or adjusted under 35 U.S.C. 154(b) by 38 days.

(21) Appl. No.: 11/843,930

(22) Filed: Aug. 23, 2007

(65) Prior Publication Data

US 2008/0090138 A1    Apr. 17, 2008

Related U.S. Application Data

(60) Provisional application No. 60/839,492, filed on Aug. 23, 2006.

(51) Int. Cl.
*H01M 4/50* (2010.01)
*H01M 4/00* (2010.01)
*H01M 2/14* (2010.01)

(52) U.S. Cl. .................. 429/224; 429/220; 429/129
(58) Field of Classification Search .................. None
See application file for complete search history.

(56) References Cited

U.S. PATENT DOCUMENTS 5,154,731 A    10/1992    Winger 5,846,673 A *  12/1998   Saidi et al. .................. 429/199
6,040,088 A     3/2000    Bennett et al.

(Continued)

FOREIGN PATENT DOCUMENTS

WO    WO 2005015662 A2 *   2/2005

(Continued)

OTHER PUBLICATIONS

Broemme, A. D. D. and Barbers, V. A. M., "Preparation and properties of copper and manganese containing mixed oxides", Solid State Ionics, vol. 16, Jun. 1985, pp. 171-177.*

(Continued)

*Primary Examiner*—Dah-Wei D Yuan
*Assistant Examiner*—Edu E Enin-Okut
(74) *Attorney, Agent, or Firm*—Armstrong Teasdale LLP

(57) ABSTRACT

The present invention relates to a copper-manganese mixed oxide cathode material, which is suitable for use in a cathode of an electrochemical cell, and which has the formula $Mn_xCu_yO_z \cdot nH_2O$, wherein the oxidation state of Cu is between about +1 and about +3, the oxidation state of Mn is between about +2 and about +7, x is equal to about 3-y, y is less than about 3, z is calculated or experimentally determined, using means known in the art, based on the values of x and y, as well as the oxidation states of Mn and Cu, and $nH_2O$ represents the surface and structural water present in the mixed oxide material. The present invention further relates to an electrochemical cell comprising the noted cathode material.

30 Claims, 52 Drawing Sheets

U.S. PATENT DOCUMENTS

| | | |
|---|---|---|
| 2004/0229116 A1 | 11/2004 | Malinski et al. |
| 2005/0074674 A1 | 4/2005 | Boone et al. |
| 2005/0079415 A1 | 4/2005 | Boone et al. |
| 2005/0084755 A1 | 4/2005 | Boone et al. |
| 2005/0271941 A1 | 12/2005 | Bushong et al. |
| 2006/0183019 A1 | 8/2006 | Davidson et al. |
| 2006/0183020 A1 | 8/2006 | Davidson et al. |
| 2006/0257728 A1 | 11/2006 | Mortensen et al. |

FOREIGN PATENT DOCUMENTS

| | | | |
|---|---|---|---|
| WO | WO 2005015664 A2 | * | 2/2005 |
| WO | WO 2005124898 A1 | * | 12/2005 |

OTHER PUBLICATIONS

Jarrige, J. and Mexmain, J., "Propiriétés du magganite de cuivre Cu1,5Mn1,5O4", Bull. Soc. Chim. Fr. (1980), 9-10,I363.*

G.V. Sokol'skii et al., "Effects of Electrochemical Doping of Manganese Dioxide with Copper and Lithium on the Physicochemical Properties", Powder Metallurgy and Metal Ceramics, vol. 45, Nos. 3-4, 158-162 (2006).*

I. Spassova and D. Mehanddjiev, "Effect of Thermal Treatment on the Activity of Mixed Copper Manganese Oxide", React. Kinet. Catal. Lett., vol. 58, No. 1, 57-63 (1996).*

I. Spassova and D. Mehanddjiev, "Mechanism of NO Conversion over a Coprecipitated CuO-MnOx Spinel-Like Catalyst", React. Kinet. Catal. Lett., vol. 69, No. 2, 231-237 (1996).*

D. Mehandjiev et al., "Activity in CO Oxidation of Manganese Dioxide for Batteries", React. Kinet. Catal. Lett., vol. 44, No. 2, 337-343 (1991).*

Wang, W., et al., Homo-and Hetero-Metallic Manganese Citrate Complexes: Syntheses, Crystal Structures Magnetic Properties, Polyhedron (2005), 24(13), 1656.

Greedan, J.E. et al, Structure and Magnetism in λ-MnO2, Geometric Frustration in a Defect Spinel, Chem Mater. (1998) 10(10), 3058.

Greenwood, N. N., et al., Chemistry of the Elements, 2nd Edition, Butterworth-Heinemann, Oxford 1997, §24.3.4, pp. 1057.

Gummow, et al., Improved Capacity Retention in Rechargeable 4 V Lithium/Lithium-Manganese Oxide (Spinel) Cells, Solid State Ionics (1994), 69, 59.

Inagaki, M., et al. Formation of Defect Spinel Phase in CdSnO3, Z. Anorg. Allg. Chem. (1987), 546(3), 199.

Jarrige, J., et al., Proprietes du Manganite De Cuivre Cu1.5Mn1.5O4, Bull.Soc.Chim.Fr. (1980), 9-10,I363.

Klewicki, J.K., et al.., Kinetic Behavior of Mn(III) Complexes of Pyrophosphate, EDTA, and Citrate, Environ.Sci. Technol. (1998), 32(19), 2916.

Kondrashev, Y.D., The Crystal Structure and Composition of Crednerite, CuMnO2, Kristallografiya (1958), 3, 696.

LeRoux, H., A Mossbauer Study of Paramagnetic and Magnetic Components in an Uncalcined Iron Manganese Powder, J. Physis.: Condens. Matter (1990), 2, 3391.

Masquelier, et al., Chemical and Magnetic Characterization of Spinel Materials in the LiMn2O4-Li2Mn4O9-Li4Mn5O12System, J. Solid State Chem (1996), 123(2), 255.

Matzapetakis, M., et al., Manganese Citrate Chemistry: Syntheses, Spectroscopic Studies, and Structural Characterizations of Novel Mononuclear, Water-Soluble Manganese Citrate Complexes, Inorg. Chem. (2000), 29(18), 4044.

Vandenberghe, et al, Neutron Diffraction Study of th eCation Ordering in Cu1.5Mn1.5O4 and CuMg0.5Mn1.5O4, Acta Crystallogr., Sec. B (1976), 32, 2796-2798.

* cited by examiner

DELRIN PLATE    DELRIN BLOCK

- - - - 70/30 CuO/EMD-CELLS 548-549, 551, BUILD 36 (30%)
- - - - - 60/40 CuO/EMD-CELLS 552,554-555, BUILD 36 (40%)
- - - 80/20 CuO/EMD-CELLS 544-547, BUILD 36 (20%)
——— 100% CuO-CELLS #407-408 BUILD 26
——— 100% EMD

——— JET-MILLED CuO 5mA BASELINE
- - - - - 1:1 M CuS:CuO
- - - 0.8:1 M CuS:CuO
——— 0.6:1 M CuS:CuO

—— 100% JET-MILLED CuO 5mA BASELINE
------ NANOSCALE CuO 5mA BASELINE

—— 1:1 JET-MILLED CuO:CuS SMALL PARTICLE SIZE, FRESH
------ 1:1 JET-MILLED CuO:CuS LARGE PARTICLE SIZE, FRESH
— — — 1:1 CuO:1M CuS, AS RECEIVED

— 100% JET-MILLED CuO
----- 80/20 JET-MILLED CuO/EMD "BLENDED" CATHODE
— — — 80/20 JET-MILLED CuO/EMD LAYERED CATHODE

— 75% JET-MILLED CuO + 25% EMD
------ 64% JET-MILLED CuO +10% PRECIPITATED CuO + 1%Ag20 + 25% EMD (COMBO 2)
— — — 50% JET-MILLED CuO +24% PRECIPITATED CuO + 1%Ag20 + 25% EMD (COMBO 1)
—— 64% PRECIPITATED CuO=1% Ag20 + 35% EMD (COMBO 4)

COMPLETED SIDE SEAL ULTRASONICALLY WELDED

— CELL 592
----- CELL 593

——— 611 1:1M CuO/CuS NO PVA
----- 618 1:1M CuO/CuS W/PVA

COPPER-MANGANESE MIXED OXIDE CATHODE MATERIAL FOR USE IN ALKALINE CELLS HAVING HIGH CAPACITY

RELATED APPLICATIONS

This application claims priority from U.S. Provisional Patent Application No. 60/839,492 (filed Aug. 23, 2006), the entire contents of which is incorporated herein by reference. Additionally, this application incorporates by reference the entire contents of the following related applications, for all relevant purposes: U.S. patent application Ser. No. 11/058,665 (filed Feb. 15, 2005); U.S. patent application Ser. No. 11/058,678 (filed Feb. 15, 2005); U.S. patent application Ser. No. 11/055,508 (filed Feb. 8, 2005), which claims the benefit of U.S. Provisional Patent Application No. 60/577,292 (filed Jun. 4, 2004) and is a continuation-in-part of U.S. patent application Ser. No. 10/914,958 (filed Aug. 9, 2004); U.S. patent application Ser. No. 10/914,911 (filed Aug. 9, 2004); and, U.S. patent application Ser. No. 10/914,934 (filed Aug. 9, 2004), which all in turn claim priority from U.S. Provisional Patent Application No. 60/577,292 (filed Jun. 4, 2004), U.S. Provisional Patent Application No. 60/493,695 (filed Aug. 8, 2003), and U.S. Provisional Patent Application No. 60/528,414 (filed Dec. 10, 2003).

GOVERNMENT INTERESTS

The U.S. Government has a paid-up license in this invention and the right in limited circumstances to require the patent owner to license others on reasonable terms as provided for by the terms of Contract No. 2004H121020000.

FIELD OF THE INVENTION

The present invention relates to a copper-manganese mixed oxide cathode material, which is suitable for use in a cathode of an electrochemical cell, and which has the formula $Mn_xCu_yO_z \cdot nH_2O$, wherein the oxidation state of Cu is between +1 and +3, the oxidation state of Mn is between +2 and +7, x is 3−y, y is less than 3, z is calculated or experimentally determined, using means known in the art, based on the values of x and y, as well as the oxidation states of Mn and Cu, and $nH_2O$ represents the surface and structural water present in this mixed oxide cathode material. The present invention further relates to an electrochemical cell comprising an anode, a cathode, and a separator disposed between the anode and cathode, and an electrolyte in fluid communication with the anode, the cathode and the separator, wherein the cathode comprises the noted cathode material. The present invention still further relates to an active cathode material containing a copper-manganese mixed oxide that comprises a defect spinel-type structure, as further detailed herein, for use as a cathode component of an alkaline electrochemical cell.

BACKGROUND OF THE INVENTION

Electrochemical cells, commonly known as "batteries," are used to power a wide variety of devices used in everyday life. For example, devices such as radios, toys, cameras, flashlights and hearing aids all ordinarily rely on one or more electrochemical cells to operate. Generally, the terms "battery" or "electrochemical cell" are used to describe the connection of one or more electric cells together to convert chemical energy into electrical energy.

Electrochemical cells may be configured as elongate cylindrical cells, such as standard AA-, AAA-, C- and D-sized batteries, which are commonly used in flashlights, portable radios, and toys. Electrochemical cells may also be configured as flat cells, such as prismatic cells and button cells, which are commonly used in watches, hearing aids, and in cordless and cellular telephones.

Conventional primary alkaline electrochemical cells include a negative electrode (anode), a positive electrode (cathode), an electrolyte, a separator, a sealing assembly, a positive current collector, and a negative current collector. These components are typically housed in a battery container, which also functions as the positive current collector, having an open end. The most commonly used cathode of conventional alkaline electrochemical cells comprises manganese dioxide and a conducting carbonaceous material, such as, for example, synthetic graphite, natural graphite, expanded graphite, and mixtures thereof, together with a polymeric binder and other additives. Alkaline electrochemical cells may also comprise other cathode active materials such as NiO, NiOOH, oxides of copper, or mixtures thereof. For example, copper-manganese mixed oxides are excellent candidates for use as cathode active materials in alkaline batteries, either on their own or physically blended with other cathode active materials like manganese dioxide, copper oxide, nickel oxyhydroxide, silver oxides, etc. Synthesis of copper-manganese mixed oxides has previously been disclosed using a variety of processes (see, e.g., U.S. patent application Ser. No. 11/058,665, filed Feb. 15, 2005 and No. 11/354,729, filed Feb. 15, 2006, both of which are incorporated herein by reference).

For utility as active cathode materials in batteries, it is advantageous to use mixed metal oxides with the highest stable oxidation state possible, that provides the mixed oxide cathode having the highest useful discharge voltage and high discharge capacities. To-date, however, how such materials can be synthesized has not been readily apparent, since the starting materials and the process conditions used can significantly impact the resulting oxidation states in the final mixed metal oxide materials containing metal ions at their highest practical oxidation states (for example, copper at the +2 state or higher and manganese the +4 state or higher).

Once prepared, in some alkaline electrochemical cells, the cathode mixture is compressed into one or more annular rings and stacked in the battery container. Alternatively, the mixture may be extruded directly into the battery container.

The anode of conventional alkaline electrochemical cells comprises zinc or zinc alloy particles of various dimensions and shapes along with gelling agents, such as carboxymethylcellulose (CMC), and other additives, such as surfactants. Electrical connection to the anode is achieved by inserting an elongate metal rod, commonly referred to as a negative current collector, pin, or nail, placed in electrical contact with the gelled anode active material. The negative current collector may be made of brass or other suitable metal and extends through a resilient and electrically non-conductive sealing assembly that closes the open end of the battery container, sealing the electrochemical cell components within. The top end of the negative current collector protrudes above the sealing assembly for physical and electrical connection to an electrically conductive negative terminal plate, while the primary length of the negative current collector is inserted into the anode active material within the cell.

In the conventional alkaline electrochemical cell, the cathode is typically formed against the interior surface of the battery container, while the anode is generally centrally disposed in a cavity formed in the center of the cathode. The converse is also possible, where the anode surrounds an inner core of cathode material. To reduce internal resistance and enhance high current discharge, the interior surface of the container is generally coated with a conducting agent, typically comprising carbon. A tubular separator is located between the cathode and the anode. The separator typically extends from the bottom of the battery container to a terminal end extending slightly outward from between the anode and cathode, particularly prior to the cell being closed. The fundamental purpose of the separator is to separate the cathode and anode portions of the alkaline electrochemical cell and prevent an internal short circuit that would compromise the performance or shelf life of the cell. The separator is commonly a multi-layered, permeable, non-woven fibrous material wetted with an alkaline electrolyte. The separator maintains a physical dielectric separation between the anode and cathode, but still allows for the transport of ions and electrolyte between the electrode materials. The separator also acts as a wicking medium for the alkaline electrolyte solution, typically potassium hydroxide or sodium hydroxide, which promotes ionic or electrolytic transport and conductivity. If the anode and cathode come into physical contact with each other in any way, an active chemical reaction occurs, resulting in an internal electrical short circuit or other reduction in the useful electrochemical capacity of the electrochemical cell.

Conventional separators generally comprise non-woven materials that require multiple overlapping layers to prevent unwanted electrical conduction between the cathode and the anode caused by particulate transport or dendrite shorting. Where a single layer of such a separator material is used, openings that are commonly present in the material permit the presence or formation of undesirable conductive paths between the cathode and the anode. Alternatively, the use of multiple or thicker layers of separator material typically increases the volume necessary in the electrochemical cell for accommodating the separator (inactive) component, leaving less room for the active electrochemical materials, and thus potentially reducing the potential life of the cell. The thicker separator materials also tend to increase the amount of ionic resistance between the anode and the cathode, limiting the high rate discharge performance of the electrochemical cell.

Upon closing the cell, the sealing assembly is compressed against the terminal end of the separator, often causing the terminal end of the separator to fold slightly, flare, or even to fold over upon itself, so that the terminal portion of the separator is in contact with the sealing assembly in such a manner as to inhibit the electrode materials from being carried over the terminal end of the separator between the cathode and the anode compartments. Generally, the sealing assembly is formed of a material which is inert to the alkaline electrolyte contained in the cell and the overall environment of the cell itself. The sealing assembly must also be flexible and be able to maintain a proper seal during extended periods of use or storage. Materials such as nylon, polypropylene, ethylene-tetrafluoroethylene copolymer and high density polyethylene are known in the art as suitable sealing assembly materials. While these sealing assemblies help keep the can (electrically connected to the cathode) and the top (electrically connected to the anode) from contacting each other, electrical shorting and loss of battery life may still occur due to the transport of anode or cathode particles over the tope of the separator, resulting from separation of the separator from the sealing assembly during manufacturing, distribution, handling, or use.

As a result of the deficiencies in the thicker separator materials in conventional cells, various thin film and membrane separator materials have been developed. These separator materials function in a similar manner to the thicker separator materials. However, effectively incorporating such materials in cylindrical batteries while maintaining the reliability from shorting is a challenge as compressing these thin film and membrane separator materials against the sealing assembly in the same manner as the conventional thick separators may fail to completely prevent contact between the cathode and the anode during manufacturing, distribution, transportation, handling, or use. Hence it is desirable to develop novel design approaches to produce a robust cell with adequate shorting resistance.

SUMMARY OF THE INVENTION

Briefly, therefore, the present invention is directed to a copper-manganese mixed oxide cathode material, which is suitable for use in a cathode of an electrochemical cell. The cathode material has the formula $Mn_xCu_yO_z.nH_2O$, wherein the oxidation state of Cu is between about +1 and about +3, the oxidation state of Mn is between about +2 and about +7, x equal to about 3−y, y is less than about 3, z is calculated or experimentally determined, using means known in the art, based on the values of x and y, as well as the oxidation states of Mn and Cu, and $nH_2O$ represents the surface and structural water present in the cathode material.

The present invention is further directed to a cathode material, which is suitable for use in a cathode of an electrochemical cell. The cathode material contains a copper-manganese mixed oxide, said oxide comprising a defect spinel-type structure.

The present invention is still further directed to one or more of the above described cathode materials, wherein said material does not have the formula $Mn_{1.5}Cu_{1.5}O_{4.0}$ The present invention is still further directed to an electrochemical cell comprising an anode, a cathode, and a separator disposed between the anode and cathode, and an electrolyte in fluid communication with the anode, the cathode and the separator, wherein the cathode comprises one of the above-noted cathode materials.

Optionally, said separator comprises a seal such that substantially all fluid communication between the anode and the cathode occurs through the separator.

Optionally, the separator of the above-noted electrochemical cell may comprise about 1 to less than 3 wraps of a free-standing polymer film, said film having a dry thickness of less than about 250 microns.

Alternatively, or additionally, the separator of one of the above-noted electrochemical cells may comprise particles of a clay additive, or a metal sulfide additive.

Alternatively, or additionally, the separator of one of the above-noted electrochemical cells may comprise a first layer facing the anode, a second layer facing the cathode, and a middle layer disposed between the first and second layers, wherein the middle layer comprises particles of a clay additive, or alternatively a metal sulfide additive.

The present invention is still further directed to one or more of the above-referenced electrochemical cells, wherein the separator comprises a first layer facing the anode, a second layer facing the cathode, and a middle layer disposed between the first and second layers, wherein the middle layer comprises particles of a metal sulfide additive, and the second layer comprises particles of a clay additive.

The present invention is still further directed to one or more of the above-referenced electrochemical cells, wherein said separator has a water osmosis rate of at least $1 \times 10^{-6}$ moles-cm/cm$^2$/hr.

The present invention is still further directed to one or more of the above-referenced electrochemical cells, wherein the separator is capable of excluding at least about 50% of an anode fouling species, present in the electrolyte and formed at said cathode, from passing through the separator and contacting the anode.

The present invention is still further directed to a copper-manganese mixed oxide material, where the discharge capacity at 1.1V vs. a zinc wire reference electrode in a half-cell discharge test at 5 mA is at least about 50 mAh/gm, or at least about 100 mAh/gm, or at least about 150 mAh/gm, or even at least about 200 mAh/gm (as further detailed elsewhere herein).

The present invention is still further directed to a method of preparing one or all of the above-noted copper-manganese mixed oxide cathode materials.

BRIEF DESCRIPTION OF THE DRAWINGS

Corresponding reference characters indicate corresponding parts throughout the several views of the drawings.

DETAILED DESCRIPTION OF THE INVENTION

Figure 1:
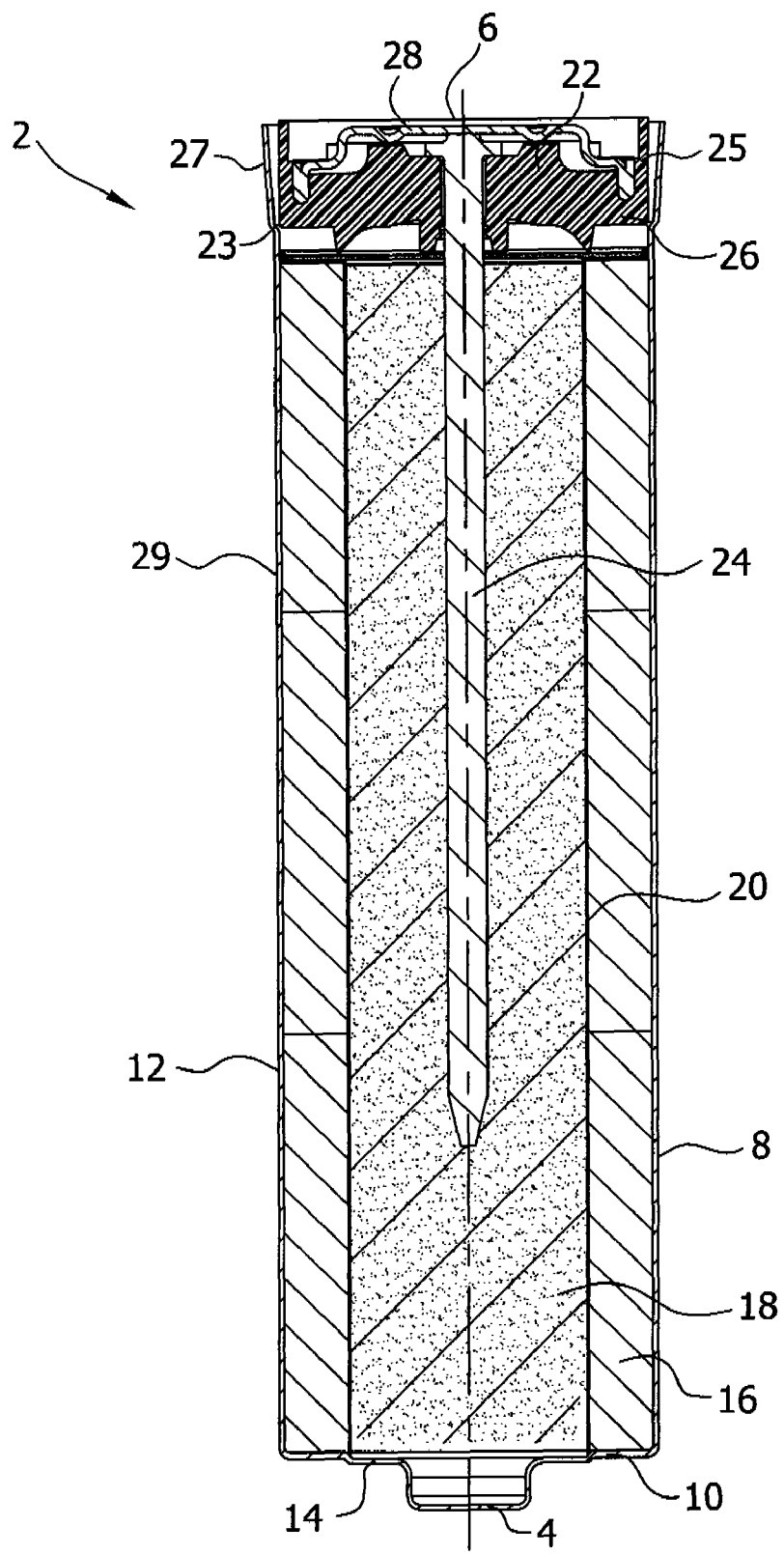
FIG. 1 shows a cross section of an electrochemical cell in an open configuration including a cathode, an anode, and a sealing assembly.

The present invention is generally directed, in part, to a copper-manganese mixed oxide, and to a method for the synthesis thereof. More specifically, the present invention is directed to a copper-manganese mixed oxide cathode material, which is suitable for use in a cathode of an electrochemical cell. The cathode material has the formula $Mn_xCu_yO_z$.$nH_2O$, wherein the oxidation state of Cu is between +1 and +3, the oxidation state of Mn is between +2 and +7, x is 3−y, y is less than 3, z is calculated or experimentally determined, using means known in the art, based on the values of x and y, as well as the oxidation states of Mn and Cu, and $nH_2O$ represents the surface and structural water present in the mixed oxide cathode material. The present invention is further directed to a cathode material that contains a copper-manganese mixed oxide, said oxide comprising a defect spinel-type structure (as further detailed elsewhere herein).

Without being held to any particular theory, these oxides are believed to be advantageous because they have superior voltage characteristics, as compared for example to previously disclosed mixed oxides. For example, the copper-manganese mixed oxides of the present invention may have discharge capacity above 1.1V in a half-cell discharge test (as detailed elsewhere herein), which is significantly improved over previously disclosed copper-manganese mixed oxides. Although a variety of methods generally known in the art may be used to synthesize the mixed metal oxides of the present invention, the present invention is additionally directed to synthesis processes, as disclosed herein, which use a chelating agent (for example, a citrate) to create an environment that allows or facilitates the formation of copper-manganese mixed oxides with high oxidation states of copper and manganese. These processes therefore result in a high discharge voltage, when the prepared mixed metal oxides are used in a cathode in an alkaline electrochemical cell.

The present invention is still further directed to an electrochemical cell comprising an anode, a cathode, and a separator disposed between the anode and cathode, and an electrolyte in fluid communication with the anode, the cathode and the separator, wherein the cathode comprises one of the above-noted cathode materials. In this regard it is to be noted that the service life of an electrochemical cell using these cathode materials may be tuned, depending on the target application and the device current drain or power requirements. For example, for some applications (e.g., low drain devices, like MP3 players, remote controls, etc.), long service life at a relatively low voltage (e.g., 0.95 V or 1 V) is adequate, while for other applications (e.g., digital cameras and other high power devices), discharge capacity (i.e., service life) at a higher voltage is more important, sometimes at the expense of capacity at low voltage. Hence, mixed oxide cathode active materials with various compositions, as well as mixtures of cathode active materials, are envisioned, which may be tuned to a particular need. The example cathode materials disclosed in the present application are directed toward higher discharge voltage at the expense of some discharge capacity. It is to be noted that the copper-manganese mixed oxide materials may be blended with a commercially available cathode active material such as manganese dioxide, nickel oxide or nickel oxyhydroxide, etc., in various ratios in order to produce a blended cathode which has a combination of voltage and discharge capacity characteristics.

It is to be further noted that, in one particular embodiment, the copper-manganese mixed oxide materials of the present invention are part of an electrochemical cell, the discharge capacity thereof at 1.1V vs. a zinc wire reference electrode in a half-cell discharge test at 5 mA being at least about 50 mAh/gm, or at least about 100 mAh/gm, or at least about 150 mAh/gm, or at least about 200 mAh/gm (as further detailed elsewhere herein).

In these or other embodiments disclosed herein, it is to be still further noted that the separator may be impregnated with a clay and/or a metal sulfide additive which is effective for, among other things, increasing the tortuous path through the separator, and better trapping and reacting with anode fouling species present in the cell. Among these or still other embodiments is included an electrochemical cell which comprises, among other things, a self-supporting or free-standing thin film separator, as further detailed herein below. Among these or still other embodiments is included an electrochemical cell which comprises, among other things, a separator comprising a first portion and a second portion, the first portion being disposed generally between the cathode and the anode and the second portion extending longitudinally outward of the cathode and the anode, and further comprises an adhesive material covering at least a part of the second portion of the separator, the adhesive material being capable of minimizing physical and/or chemical transport over the second portion of the separator. It has been found that the adhesive materials as described herein are able to withstand the highly alkaline environment of the cell without substantial degradation and form a reliable mechanical bond with the separator and reduce the chemical interaction between the cathode and the anode.

Specific components and embodiments of the present invention are described in further detail below. As used herein, the term "physical transport" refers to the movement of liquid and/or particles from one area of an electrochemical cell to another area of an electrochemical cell. As used herein, the term "chemical transport" refers to the movement of liquid and/or dissolved chemical species through a material, such as an adhesive material or a separator material, from one area of an electrochemical cell to another area of an electrochemical cell. In the presence of anode-fouling soluble species in the cathode, the use of a separator comprising an appropriate barrier material is highly desirable. An appropriate material would be capable of effectively limiting the transport of the soluble species to the anode. Furthermore, it would need to be configured such that substantially all fluid communication between the anode and the cathode occurs through the material. To minimize dissolved species from being transported over the top of the separator, the adhesive material is preferably also capable of effectively limiting transport of such chemical species over it or through it.

I. General Electrochemical Cell Structure

Figure 2A:
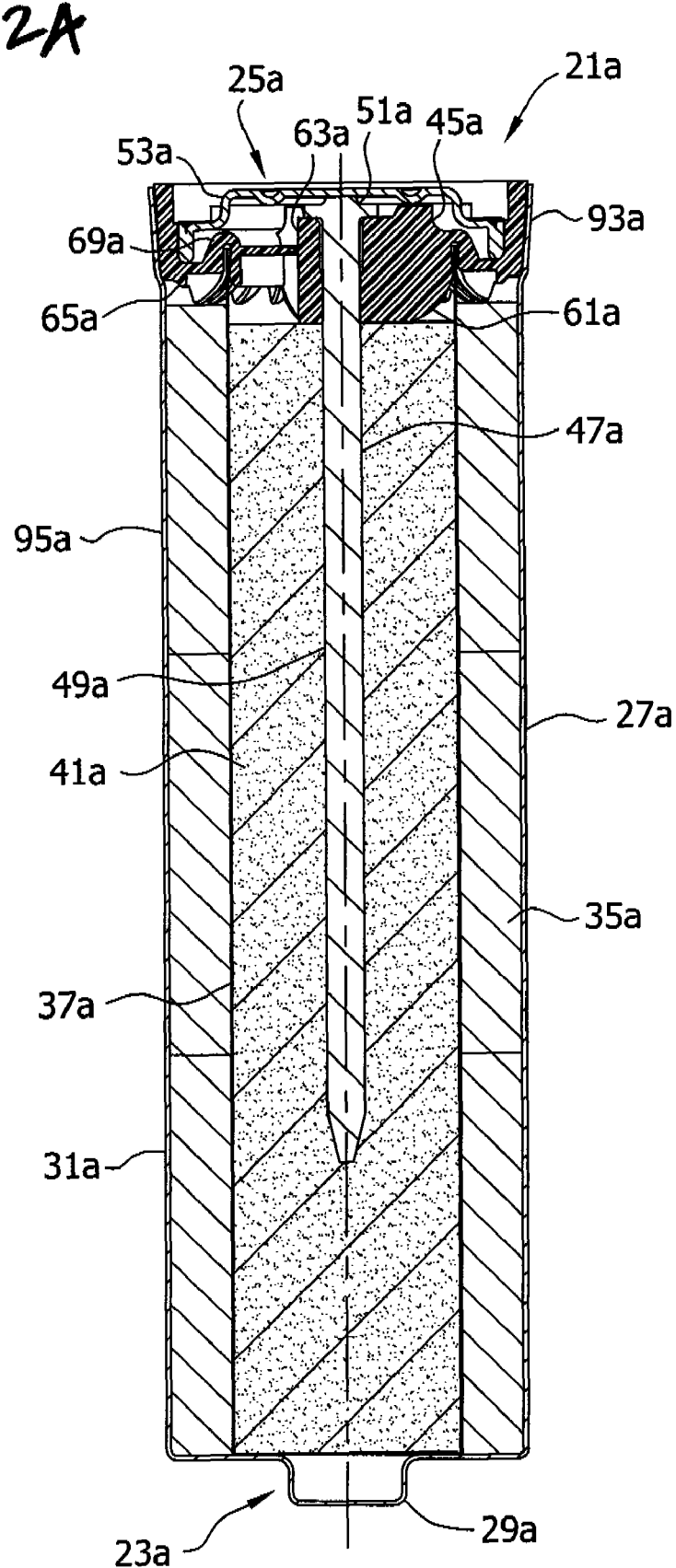
FIG. 2A shows a cross-section of an electrochemical cell having a sealing assembly according to one embodiment of the present invention, with a container of the electrochemical cell shown in an open configuration to facilitate assembly of the cell.

Referring now to the drawings, and in particular to FIGS. 1 and 2A, a conventional electrochemical cell having a sealing assembly constructed in accordance with one embodiment of the present invention is shown in the form of a AA-size cylindrical cell battery and is generally indicated at 2 and 21*a*. It is contemplated, however, that the electrochemical cell of the present invention has application to other sized batteries (e.g., A-, AAA-, C- and D-), as well as to non-cylindrical cells, such as flat cells (prismatic cells and button cells) and rounded flat cells (e.g., having a racetrack cross-section). The cylindrical cell configuration shown in FIG. 1 has a positive terminal 14, a negative terminal 6, and a positive current collector in the form of an electrically conductive cylindrical container 8. In the illustrated embodiment, a single piece formed container 8 may be of drawn steel having a closed bottom formed by an end wall 10 and a cylindrical side wall 12 formed as one piece with the end wall 10. The positive terminal 14 is thus defined by the end wall 10 of the metal container 8 in the illustrated embodiment. In alternative embodiments the end wall may be flat and have a positive terminal plate (not shown) attached thereto as by welding to define the positive terminal 14 without departing from the scope of this invention. The opposite end of the container 8 is generally open. As used herein the term "side wall" refers not only to a wall like the illustrated cylindrical wall 2 having a single, continuous curve, but also to side walls (not shown) having other shapes including those formed from multiple flat wall sections.

The term "longitudinal", as used herein, refers to the general direction extending from one end of the container 8 to the other, regardless of whether the greatest dimension of the container is in the longitudinal direction. The terms "lateral," "transverse" and "radial" refer to a general direction extending perpendicular to the longitudinal direction so as to extend through the side wall 12 of the container 8. In particular, where the term radial is used herein in reference to annular or circular shaped elements, it is understood that the terms lateral and transverse may be substituted for the radial components that are other than annular or circular.

Also, throughout the various drawings the electrochemical cells are illustrated in a generally vertical orientation, with the positive terminal at the bottom and the negative terminal at the top. It is to be understood that the use of terms herein such as top, bottom, upper and lower, are in reference to positions along the longitudinal direction of the cell 2 (e.g., of the container 8), while the use of terms such as inner and outer are in reference to positions along the transverse or radial direction.

Contained in the container is a cathode 16 comprised of one or more annular rings formed of a suitable cathode material which defines an open center along the longitudinal direction of the container. The cathode 16 suitably has an outer diameter that is slightly greater than the inner diameter of the container side wall 12 to provide a tight fit upon insertion of the cathode into the container 8. A coating, suitably carbon, may be applied to the inner surface of the container side wall 12 to enhance electrical contact between the cathode 16 and the container 8. One example of a particularly suitable cathode 16 comprises an oxide of copper and is disclosed in co-assigned U.S. patent application Ser. No. 10/914,934, the entire disclosure of which is incorporated herein by reference. It is understood, however, that the cathode 16 may be constructed of manganese dioxide or other suitable cathode materials without departing from the scope of the invention.

The cathode 16 may include an oxide, for example an oxide of copper (or copper (II) oxide), or a mixed oxide compound that comprises copper and at least one other metal, where the other metal(s) has a reducible oxidation state and can function as a cathode active material. Cathode active materials of this type, that are useful in zinc alkaline cells for example, typically may have discharge voltages comparable to the voltage achieved during the reduction of the manganese oxide, $Mn_3O_4$ phase, created during the reduction of $MnO_2$. Such a cathode can comprise a physical mixture of the oxide of copper and a manganese oxide, or a chemically synthesized complex oxide of the two or more elements.

A cell constructed in accordance with certain aspects of the invention may also include a separator material that enables the cell to achieve improved performance (relative to conventional cells) in high drain applications, as exemplified in a 1 Amp continuous discharge test. The invention can also relate to other components of the cathode, the anode, the separator, and the electrolyte, wherein these components may be combined as desired to produce a cell having improved discharge voltage and service life characteristics in accordance with the invention. Other aspects of the cell of the invention not specifically described herein may be conventional.

The present invention also relates to methods for making and using a cathode, an anode, an electrolyte, a separator/barrier, a separator/barrier seal, and/or an alkaline electrochemical cell, as further detailed elsewhere herein.

II. Cathode

A. Materials and Designs

Focusing first on the cathode, it has been recognized that copper oxide is known as a high capacity (e.g., about 337 mA/g for 1 electron reduction and 674 mAh/gm for a 2-electron reduction) cathode material with the potential to significantly increase service life compared to present day commercially available alkaline cells. The term "copper oxide" is intended to refer to cupric oxide, where the copper has an oxidation state of substantially +2. Under optimal conditions, it discharges in two steps, first producing $Cu_2O$, followed by reduction of $Cu_2O$ to produce Cu metal. However, several issues typically reduce the likelihood that one of ordinary skill in the art would include copper oxide as cathode material for conventional Zn gelled anode alkaline cells. One issue arises as a result of the operating voltage of the copper oxide being too low for applications requiring open circuit voltages above 1.1V or closed circuit voltage above 1.0V at reasonable current drains. As set forth herein below, in various embodiments an increase in at least a portion of the operating voltage of a cell containing a mixture that includes an oxide of copper may be achieved.

Another issue is the current carrying capability of typical commercially available copper oxides, also referred to in the art as "rate capability". Much of this is related to the fact that the kinetics, surface area and surface activity of the available materials are inadequate to sustain high current drains without excessive voltage drop. As set forth herein below, in various embodiments the synthesis of cathode materials with high discharge capacity, as well as high rate capability, may be achieved.

Another issue is the solubility of copper from the copper-containing cathode in alkaline electrolytes. In particular, the soluble species from these materials can be detrimental to the storage and discharge of the gelled zinc anode of alkaline cells if allowed to migrate past the separator to the anode. In accordance with the present invention, various approaches may be used to mitigate and/or manage this problem, and provide batteries with improved service life and shelf life. It is to be noted that similar issues arise with silver, nickel, iodate, bismuth and/or sulfur-containing cathode materials.

In order to evaluate new materials, material combinations and to screen potential improvements to the cathode active materials, a quick and reliable test method prior to testing in a complete electrochemical cell is very beneficial. Materials that show promise may be evaluated in a complete electrochemical cell, thereby significantly accelerating the development without expending the significant sources necessary to evaluate all possible materials in an optimized electrochemical cell. A half-cell test in a specially designed fixture is described below.

B. Half-Cell Test

An electrochemical system comprises an anodic and a cathodic electrode. Each of these electrodes has associated with it a characteristic half-reaction. For example, in an alkaline battery under certain discharge conditions, the anode half reaction involves the oxidation of the zinc anode to produce $Zn(OH)_2$ and may be represented by the following half-reaction:

$$Zn+2OH^-\rightarrow ZnO+H_2O+2e^-$$

Similarly, the cathode half-reaction involves the reduction of the manganese dioxide to produce MnOOH:

$$2MnO_2+2H_2O+2e^-\rightarrow 2MnOOH+2OH^-$$

The two half-reactions, combined, result in a cell reaction as represented below:

$$Zn+2MnO_2+H_2O\rightarrow ZnO+2MnOOH$$

The voltage behavior of the half-reactions (also referred to as half-cell reactions) can be monitored or investigated by the use of stable reference electrodes, as described in "Electrochemical Methods" (Allen J. Bard & Larry R. Faulkner, John Wiley & Sons).

In the development of new electrode materials, in the improvement of existing materials, or to better understand the interaction of an electrode material with new electrolytes or additives, one skilled in the art typically utilizes an electrochemical half-cell where the electrode in question is investigated versus a reference electrode, in a manner where interference from the other electrode half-reaction is absent or minimized. The development of cathode materials described herein was comprehensively supported by the use of a special half-cell constructed so as to quickly and easily facilitate evaluation of newly developed materials, comparison and screening of various materials, and the evaluation of the discharge characteristics of the materials or their combinations to determine their suitability for use in the electrochemical cells of this invention.

A representative sample of the cathode material in question is first intimately blended with a conducting agent in a mortar and pestle for at least 5 minutes such that the cathode comprises 80% active material and 20% graphite. The graphite also functions as the binder to hold the structure together, so no polymeric binder is necessary for this test. The graphite used was KS4 synthetic graphite obtained from Timcal America (Westlake, Ohio 44145). While other graphites could be used, KS 4, by virtue of its small particle size, provides an excellent conducting matrix to evaluate cathode active materials of various particle size ranges. An excess of conducting agent is typically used, so as to minimize the effects of inadequate electronic conductivity in the electrode matrix. One skilled in the art would recognize that it is important to ensure that the active material is adequately distributed in the carbon matrix in order to achieve the true characteristics of the material. A portion of the electrode/graphite mix (0.4 g), containing 0.32 g of active material, is then made into a flat pellet with cylindrical sides, in a pellet press at a pressure of 8000 pounds. The inner diameter of the pellet die is 1.07 cm.

Figure 3A:
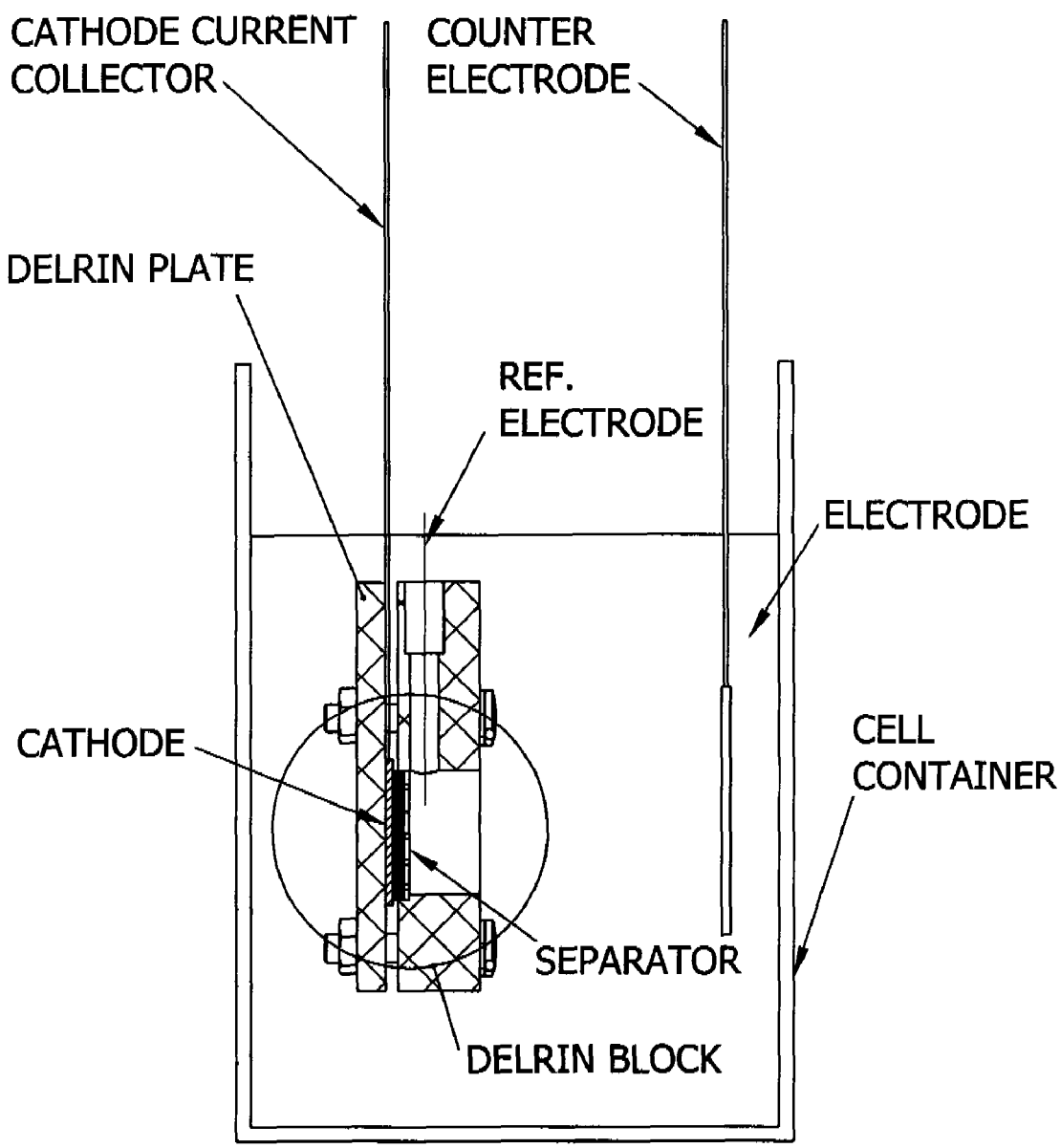
FIG. 3A shows a schematic illustration of a half-cell fixture used to determine the discharge capacity of a cathode constructed in accordance with principles of the present invention.
Figure 3B:
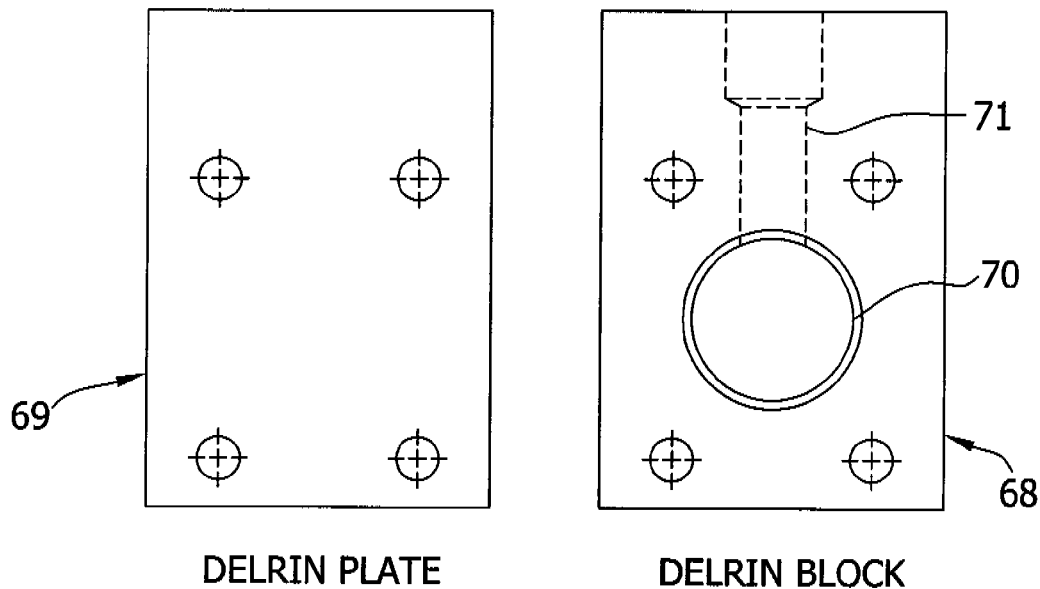
FIG. 3B shows a schematic illustration of the block and plate illustrated in FIG. 3A.
Figure 3C:
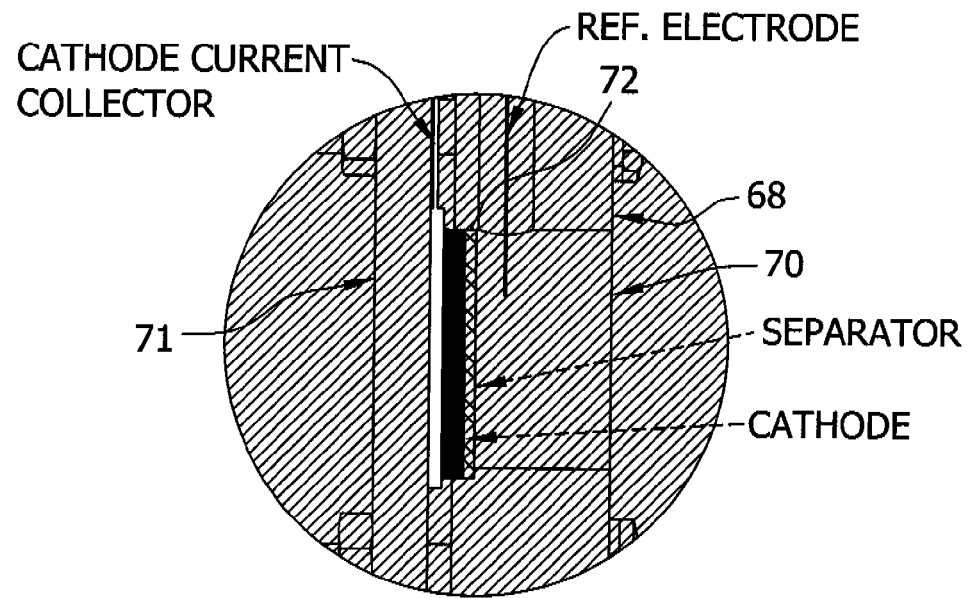
FIG. 3C shows a more detailed schematic illustration of the block illustrated in FIG. 3B.

The compressed, free-standing pellet is then placed into an electrochemical half-cell fixture against a Ni expanded metal current collector. A schematic of the electrochemical cell fixture is shown in FIG. 3A, where the fixture is machined out of an alkali resistant polymer like Delrin™. Other polymers, like PTFE or nylon, may also be used. The fixture comprises two pieces, a block 68 and plate 69, each with 4 throughholes. Once the cathode current collector, cathode pellet and a separator disk are in position in the block, the plate is secured against the block using 4 Delrin screws and nuts, compressing the separator, cathode and current collector into place. The block and plate each have four matching throughholes for the screws, as well as one circular central opening 70 for electrolyte access to the cathode. A schematic of the block and plate are shown in FIG. 3B. The central opening 70 in the Delrin block contains a step 72 shown in the front view in FIG. 3C.

To assemble the cell, a circular disk cut out of a non-woven separator material, e.g. F3T23 (obtained from Kuraray Corp., Japan) with a dry thickness of about 75 microns and comprising cellulose and PVA fibers, is first placed in the slot in the block. The cathode pellet, slightly thicker than the thickness of the slot, is next placed on the separator disk. The Ni expanded metal cathode current collector is next placed on the cathode surface so as to cover the entire surface. The plate is next placed on the current collector and screwed tightly into place, so as to compress the entire current collector, cathode/separator combination. The block additionally contains a reference electrode opening 71 extending along an axis perpendicular to the central opening 70, that terminates in the central circular opening, and which is located such that the reference electrode tip terminates at the surface of the separator, so as to minimize the ohmic voltage drop in the half-cell. Any standard reference electrode like Hg/HgO or a zinc wire reference may be used. Initial work was reported against a Hg/HgO reference electrode, although for convenience and reproducibility, recent work has utilized a Zn wire reference electrode, of which a fresh new wire is used for each experiment. It should be noted that for the purposes of the half-cell test, all voltages are reported versus a zinc wire reference electrode. Once the block and plate portion of the fixture is assembled, the counter electrode, made of gold plated Ni mesh, is placed against the surface of the block and flush against the central opening such that it faces the separator with the cathode pellet under it. This entire assembly is next turned on its side 90° and immersed in a container containing 29% KOH electrolyte.

In the half-cell test of a sample cathode pellet, a constant current of 5, 10, or 30 mA is applied using a power supply Galvanostat or a testing system like one made by Arbin Instruments (College Station, Tex.). Since the cathode pellet always has the same superficial surface area and the same mass, the current density/unit area and per unit mass always remains the same, from one experiment to another. Typically, a low current like 5 mA (15.625 mA/g active) is used to determine the gravimetric discharge capacity of a cathode material in mAh/gm of active material. A high current like 30 mA (93.75 mA/g) is used to determine the rate capability of the material. Such a high current density is used to screen out poor materials, which would not perform well in a battery under high drain, limited electrolyte conditions. In a material with poor rate capability, the discharge voltage drops or shows a sloping profile when the discharge current is increased from 5 mA to 30 mA. To a fixed end point voltage, if the delivered capacity is significantly reduced, it indicates that the material has poor rate capability and has a low efficiency of discharge at high currents. On the other hand, a material with good rate capability will show a much lower voltage drop upon increasing current. It will also show higher discharge efficiency to the same fixed end point voltage. One skilled in the art would recognize that the rate capability of a material is a function of the active surface area of the material which is, among other things, to some extent dictated by the particle size. The ambient temperature during the test is an important parameter that can influence the results, particularly at high currents. As such, the experiments are performed in a room or environment where the temperature is controlled to about 20° C., +/−about 2° C.

Various physical and chemical approaches are detailed herein below, to raise at least a portion of the operating discharge voltage of a cell that comprises an oxide of a metal, and in particular an oxide of copper, in the cathode compared to the voltage level of CuO alone, while maintaining a high discharge capacity substantially similar to that of CuO. Without intending to be limited to a particular theory, it is believed that thermodynamic and kinetic considerations support the disclosed approaches.

C. Cathode Operating Voltage

Three general approaches are disclosed herein, to raise the operating voltage of the cathode relative to commercially available copper oxide. Within each of these general approaches, several examples and methods are disclosed. Limitations of some of these approaches, problems associated with them, and means to alleviate the problems are also disclosed.

The first general approach involves supplementing the CuO with at least one additional cathode active material that has an operating voltage higher than CuO, for example manganese dioxide (EMD, CMD, NMD), NiO, NiOOH, Cu(OH)$_2$, cobalt oxide, PbO$_2$, AgO, Ag$_2$O, AgCuO$_2$, CuMnO$_2$, $Cu_{2-x}Mn_xO_2$ (where x<2), $Cu_{3-x}Mn_xO_4$ (where x<3), $Cu_2Ag_2O_4$, and $Cu_2Ag_2O_3$. The combination of CuO with the additive(s) therefore will also have at least a portion of the operating voltage higher than that of CuO alone as determined in the half-cell test.

In the second general approach, the discharge voltage of the cathode can be increased by supplementing the CuO with at least one additive having a discharge voltage that is lower than the discharge voltage of CuO versus a reference electrode. This approach provides a cathode having CuO mixed or combined in various ways with at least one additional material such that the Gibbs Free Energy of the overall reaction with zinc is increased as a result of displacement reactions between (for example) CuO and the additional material like copper sulfide (CuS). When a suitable additive is combined with CuO, however, the combination has a higher discharge voltage than either the additive or the CuO alone. The open circuit voltages and the discharge voltages of the CuO, the additive, and the combination of the CuO and the additive can, of course, be determined experimentally by one of ordinary skill in the art. Alternatively, it has been recognized that a suitable additive can be selected by screening multiple candidate materials without experimentation by first estimating the change in the Gibbs Free Energy of a combination versus zinc, and hence the open circuit voltage of the reduction reaction utilizing the Gibbs Free Energy equation. In particular, a suitable additive can be identified when the change in the Gibbs Free Energy of the reduction reaction of the combination versus zinc is higher with respect to the change in the Gibbs Free Energy of the reduction reaction of either individual component versus zinc. Of course, alternatives to a zinc anode could be substituted for batteries having a different anode, as would be appreciated by one having ordinary skill in the art. The open circuit voltage being a thermodynamic characteristic, a high value may not always produce a high operating voltage due to kinetic considerations; however, a high open circuit voltage is indicative of possible suitable additive candidates. Once a candidate material is selected based on calculating the change in the Gibbs Free Energy, one skilled in the art would recognize that simple experimentation may be performed to establish the discharge voltage of its combination. This aspect is discussed below with reference to a CuO/CuS mixture.

The third general approach is to increase at least a portion of the discharge voltage of a cathode comprising copper oxide includes compounding or complexing a plurality of components to synthesize new cathode active materials and mixtures that, in general, comprise copper and at least one other metal or non-metal. Using copper and manganese as examples, several variants of this approach are disclosed. In one version, copper oxide is deposited on the surface of manganese dioxide. In a second version, manganese dioxide is deposited on the surface of copper oxide. Both of these are targeted toward reducing or minimizing the abrupt transition and voltage dip that occurs by simple blending of the two components as described in the first approach. In a third version, new cathode active materials comprising Cu and Mn are synthesized. In a fourth version, a mixture of components is synthesized, to leverage the desirable properties of manganese oxide and copper oxide with the added improvement of increasing the rate capability of the component comprising the oxide of copper.

Copper and manganese are described here in detail, but the general approach disclosed here applies to any combination of materials. For example, one may desire to combine the voltage characteristics of $MnO_2$, NiOOH and CuO. Physical blending of these three materials will produce distinct voltage transitions and possibly voltage dips that would limit their practical utility in a battery. By utilizing the concepts taught in this invention, mixed compounds of, for example, Mn/Cu, Mn/Ni, Ni/Cu or Mn/Ni/Cu may be synthesized to produce the "bridge" compounds that provide the smooth voltage transitions when the discharge reaction switches from that of the higher voltage material to that of the next lower voltage material in the mix. It is to be recognized that a "smooth" voltage transition is typically only necessary if the distinct "steps" cause the voltage of the battery to prematurely fall below the acceptable cut-off voltage of a device, as determined from simulated tests that are well known to those of ordinary skill in the art. Such simulated tests are developed by ANSI, the American National Standards Institute, and accepted by the battery industry. In another similar manner, in the case of Cu/Ag oxides, this invention can provide a cathode active material that is synthesized as a mixture that comprises silver oxide, copper oxide, and a copper/silver mixed oxide where the mixed oxide phase represents only a small fraction of the mixture, while the CuO phase represents a significantly large proportion. This can have significant cost-saving implications.

Use of these materials, even by simply blending them, may also be effective at reducing or minimizing the voltage dip that occurs when they are not used. In a related embodiment, a variant of the fourth version involves blending such a synthesized mixture with known cathode active materials like manganese dioxide, NiO, NiOOH, silver oxides, etc., to provide a combined cathode active material that has the desirable discharge characteristics.

It is further recognized that various combinations of the described general approaches may be used to provide a cathode and a cell with the desired characteristics.

(i) First Approach

In the first approach, chemical components having the desirable physical characteristics (e.g., particle size, surface area, etc.) for use in a cathode can be physically mixed to homogeneity using standard processing methods known to those having ordinary skill in the art. In use, such a physical cathode mixture transitions from the discharge behavior of the higher oxide to that of the oxide of copper. Supplementary metal oxide additives to the oxide of copper can be chosen from the group of generally known positive electrode materials that independently provide higher operating voltages versus zinc in the initial portion of discharge than does the oxide of copper. Suitable examples of positive electrode materials can include, but are not limited to, $MnO_2$ (EMD, CMD, NMD, and mixtures thereof), NiO, NiOOH, $Cu(OH)_2$, cobalt oxide, $PbO_2$, AgO, $Ag_2O$, $Ag_2Cu_2O_3$, $CuAgO_2$, $CuMnO_2$, Cu $Mn_2O_4$, $Cu_2MnO_4$, $Cu_{3-x}Mn_xO_3$, $Cu_{1-x}Mn_xO_2$, $Cu_{2-x}Mn_xO_2$ (where x<2), $Cu_{3-x}Mn_xO_4$ (where x<3), $Cu_2Ag_2O_4$ and suitable combinations thereof.

Manganese is used as an example herein, since it is currently the most widely used cathode active material. Manganese oxide is therefore used in combination with copper oxide to increase at least the initial portion of the discharge curve of a cathode comprising copper oxide while maintaining the longer service life provided by copper oxide. Similar methods can be utilized with other elements, such as Ni, Co, Pb, Ag, etc., to enhance the voltage in the initial portion of the discharge curve as desired. Generally, the higher the oxidation state of an active material, the higher the discharge voltage.

Figure 4:
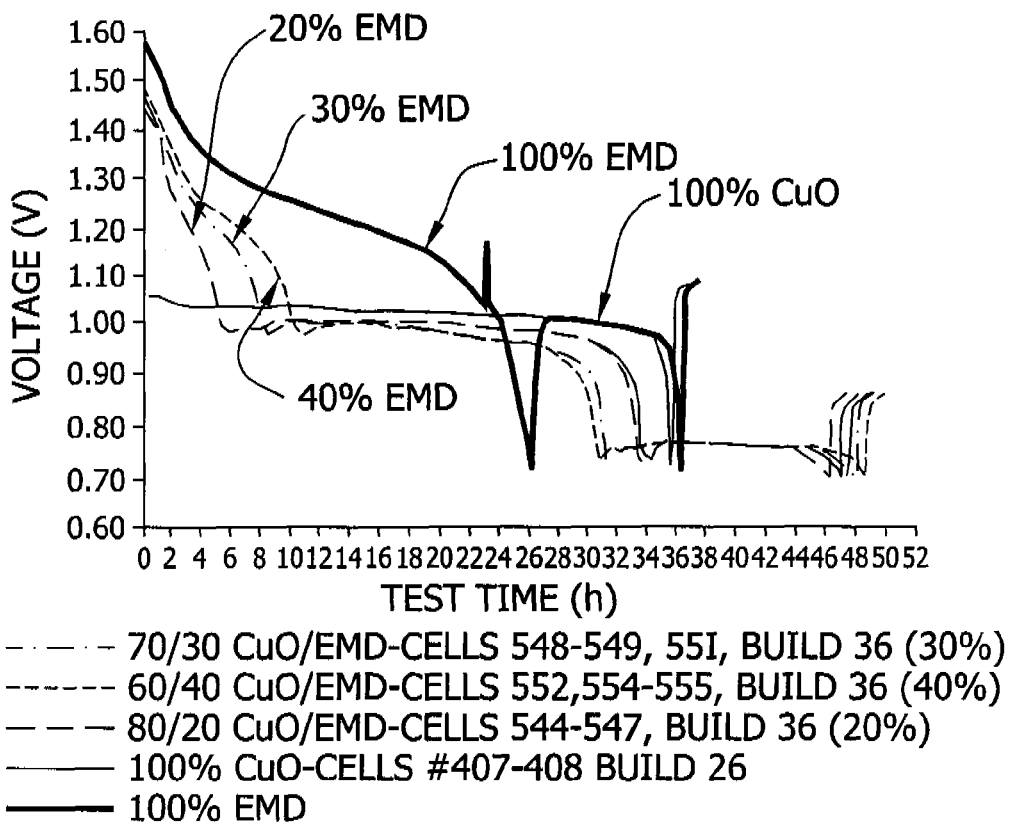
FIG. 4 shows a graph representing the physical/mechanical mixing behavior of EMD/CuO and CuO alone versus Zinc in 357-size button cells under conditions using jet-milled CuO, 34-2 electrolyte, and a 5 mA discharge.

By way of example, a cathode having an appropriate quantity of EMD $MnO_2$ (e.g., 5-60%), which has an initially high operating voltage but a rather sloping discharge curve, can be mixed with CuO to yield a mixed cathode that exhibits the higher initial operating voltage of the $MnO_2$ with an extended service life more characteristic of the CuO electrode at ~1V. The MnO₂ discharges first, followed by the CuO, with a relatively sharp transition between them. It is envisioned that by adding MnO₂ to about 20%, one can obtain almost the same discharge capacity as CuO (and significantly higher than MnO₂ by itself), with the advantage of the higher operating voltage of the manganese oxide for the first 6 hours of the discharge as shown in FIG. 4, which depicts an increase in operating voltage when EMD is physically mixed in various ratios with CuO in a button cell. For reference, the EMD behavior is also shown, with about 25 hrs delivered to 0.8V. This example demonstrates the potential of a simple, mixed cathode material that can deliver at least 50% higher capacity than EMD itself. The two components can be provided at a wide range of ratios, to meet the desired discharge characteristics. Compounds with other elements, like Ni, Co, Ag, Pb, etc., can similarly be used.

As can be seen in the following written half-cell reactions, the discharge mechanisms of MnO₂ and CuO are very different.

$$MnO_2 + H_2O + 1e^- \rightarrow MnOOH + OH^-$$

Here, the MnO₂ reduction reaction consumes one mole of water per mole of MnO₂. In contrast, for CuO, the reaction consumes half a mole of water per mole of CuO, as illustrated below.

$$2CuO + H_2O \rightarrow Cu_2O + 2OH^-$$

In a standard Zn/MnO₂ cell, the MnO₂ has a density of 4.5 g/cc, consumes 1 mole of water per mole of MnO₂, incorporating protons into its structure to yield MnOOH (a poor electronic conductor and a material of lower density). The need for water for the cathode reaction limits the amount of active material (e.g., zinc and MnO₂) that can be used in the cell, resulting in relatively low volumetric energy density. The cathode also has a sloping discharge curve with little useful capacity below 1 V at intermediate and high current drains. On the other hand, copper oxide (CuO), which has a density of approximately 6.3 g/cc, consumes only half a mole of water per mole of CuO discharged for the first electron (with little volume expansion), has a very flat discharge curve, and provides high volumetric energy density in a cell.

The need for water in the overall reaction of Zn/MnO₂ cells typically limits the cell designer's flexibility in optimizing the performance of the cell in the available volume by balancing amounts of the various components. While not being bound by a particular theory, it has been determined that a cell comprising oxides of copper requires less water than a cell where the cathode is manganese dioxide alone. Therefore, a cell comprising manganese dioxide and oxides of copper would also require less water than an equivalent manganese dioxide cell. In theory, the molar ratio of water to MnO₂ in an alkaline manganese dioxide need not be more than about 1, for a 1 electron discharge. Typical ratios used in commercial cells are about 1.3/1 to about 1.35/1, in order to compensate for inefficiencies with regard to water transport within the cell at intermediate and high drains and also allowing for a portion of the second electron discharge at low drains. It is undesirable to include more water in the cell than necessary, since this restricts the amount of active materials that can be accommodated into the fixed internal volume of a cell. One skilled in the art would recognize that the cathode discharge efficiency of manganese dioxide increases with increasing water/MnO₂ molar ratio, as can be seen from half-cell discharge under flooded electrolyte conditions, which shows significantly superior performance compared to a practical battery with the same electrodes, where there is only a limited amount of electrolyte (and water) available.

By utilizing the mixture of cathode materials, including an oxide of copper (which has less need for water) as well as the combination of the mixtures with manganese dioxide, as described herein, it has been discovered that it is possible to take advantage of the higher discharge efficiency of MnO₂ by providing in the cell, a water/MnO₂ molar ratio that significantly exceeds the state of the art designs of commercially available Zn/MnO₂ cells. This results in a significant improvement in the discharge efficiency of the MnO₂ portion of the cathode in the inventive electrochemical cells, resulting in superior overall service life as compared to conventional cells. Not by way of limitation but by way of example, it is to be noted that it is possible to design cells containing mixtures of the herein disclosed oxides of copper with manganese dioxide (for example EMD, CMD, NMD) and usefully design the cell to have a water/MnO₂ molar ratio greater than 1.3:1, 1.35:1, 1.4:1, 1.5:1, 1.6:1, 2:1, 5:1, 10:1, and, alternatively, 15:1. One skilled in the art would understand that the determination of the above ratios depends on the purity of the MnO₂, which may vary depending on the source of the manganese dioxide (i.e., EMD, CMD or NMD, as well as the manufacturing method). The water/MnO₂ molar ratio is determined in the following manner: a) the total number moles of water in the cell is determined including all sources of water, for example, the anode, the cathode, the pre-wet electrolyte, etc.; and, b) the total number of moles of MnO₂ is calculated based on the mass of manganese dioxide in the cathode, its molecular weight of 86.94 and it's purity in the manganese dioxide source (for example, the purity of MnO₂ is typically about 90% to about 92%).

In a cathode containing a physical mixture of the two, it appears that the performance of the CuO portion of the cathode deteriorates as MnO₂ content increases, presumably for the following reasons. While not being bound by a particular theory, in such a cathode, the CuO discharge reaction takes over after the MnO₂, substantially discharging its first electron. However, insufficient electrolyte is available to the CuO for efficient reaction, presumably creating a mass transfer polarization and a voltage drop. Additionally, the electrolyte concentration is also higher as a result of the MnO₂ discharge product OH⁻, which is unfavorable to the copper oxide reduction. The MnO₂ volume expansion during discharge may separate the CuO particles from themselves and from the conducting material (e.g., synthetic or expanded graphite) that is usually provided in the cathode. This increases the ohmic resistance in the cathode, resulting in a further loss in voltage.

When a cell undergoes continuous discharge, this voltage loss often appears in the form of a dip in the discharge voltage curve in the region where the cathode transitions from discharging mostly the MnO₂ component of the cathode to discharging mostly the CuO component. Additionally, the anode is already partially discharged when the CuO discharge commences, contributing anode polarization to the cell voltage as well. The presumed net effect of these processes is that the CuO material operates at a lower voltage than it otherwise would, resulting in a lower than desirable battery voltage, as shown in FIG. 4. Additionally, at higher current drains, the transition dip, if it occurs, can prematurely push the battery voltage below the end-point cut-off voltage of the test or the device, significantly reducing the usefulness of the battery. In accordance with certain details set forth herein, this dip may be sufficiently removed to ensure that the battery does not prematurely reach the end-point voltage in a device. This is enabled by the appropriate selection of a third component in the mixture, such that the third component contains at least a first element from the first component and a second element from the second component. An electrochemical cell made from this mixture then possesses a continuous discharge curve wherein the cathode active material displays a continuous discharge curve having a slope that is less than positive.

In accordance with certain details set forth herein (i.e., $CuO \geq 40\%$ by weight of cathode active material), it is to be noted that mitigation of the detrimental effects of dissimilar discharge behaviors is sought, by optionally providing in the cell a plurality of cathode active materials in separate layers or pellets (or in separate layers that can comprise mixtures of oxides), such that the operating voltage of a cell having a zinc anode and a cathode of the invention is higher than that of a Zn/CuO cell.

Additionally, a cathode is set forth herein having an active material comprising more than one component, such that the discharge voltage of the resulting cathode is higher in at least a portion of the discharge compared to the voltage of CuO. Suitably, the discharge voltage of the battery incorporating a cathode material with an additive, with the additive having either 1) a higher discharge voltage than the first cathode active material, or 2) a lower discharge voltage than the first cathode active material but, when combined with the first cathode active material, produces a combination having a discharge voltage higher than the first cathode active material, produces a discharge voltage greater than 1.05 V for at least an initial 5% of the cell discharge period (meaning the first 5% of a total length of time that the cell is discharged continuously until the operating voltage is reduced to a level of 0.8V) at a current density of at least 5 mA/g. Accordingly, a cathode constructed as set forth herein may achieve a higher discharge voltage than prior art cells, including copper oxide cathode active materials, whose discharge voltages were not sufficiently high to operate modern devices. It should be appreciated that such a cathode is not restricted to the case of the additive being physically blended with the oxide of copper. It should be further appreciate that such a cathode may be constructed in accordance with other methods described elsewhere herein.

(ii) Second Approach

In the second general approach, supplementary additives can also be chosen for combining, from elements or compounds that have a lower discharge voltage than CuO, but which, in combination with CuO, produce a higher discharge voltage than either constituent alone. When the reaction kinetics are suitably rapid, the discharge voltage of these couples also follows the same trend as the open circuit voltage. Examples of such materials may include, but are not limited to, elemental sulfur, selenium, tellurium, sulfides, selenides, tellurides, and iodates such as CuS, $Ag_2S$, ZnS, $B_2S_3$, SnS, FeS, $Fe_2S_3$, CoS, NiS, CuSe, CuTe, $CuAgS$, $CuAg_3S$, and suitable compounds and mixtures thereof. For example, it is believed for the case of a CuO/CuS combination, that the discharge voltage is unexpectedly higher as a result of a displacement reaction between CuO and CuS (i.e., CuS having a discharge voltage lower than CuO). Thus, while pure CuS by itself has a lower discharge voltage versus zinc (0.7V versus Zn), the combination of CuS with CuO discharges at a higher voltage than either material by itself. Shown below are theoretical open circuit voltages for relevant reactions to help illustrate the CuO/CuS system:

Copper Oxide Reduction Reaction: (Reaction 1)

$$2CuO+2e+H_2O \rightarrow Cu_2O+2OH^- \Delta G=-50.2 \text{ K cal}$$

Theoretical Open Circuit Voltage (OCV): 1.089V versus Zn

Copper Sulfide Reduction Reaction: (Reaction 2)

$$2CuS+2e+H_2O \rightarrow Cu_2S+HS^-+OH^- \Delta G=-32.6 \text{ K cal}$$

Theoretical OCV: 0.708 versus Zn

Copper Oxide/Copper Sulfide Mixture Reduction Reaction: (Reaction 3)

$$CuO+CuS+2e+H_2O \rightarrow Cu_2S+2OH^- \Delta G=-54.6 \text{ K cal}$$

Theoretical OCV: 1.183 V versus Zn

To determine the change in Free Energies and Open Circuit Voltages above, the anode reaction used was:

$$Zn+2OH^- \rightarrow ZnO+H_2O+2e^-$$

The experimental OCV values obtained were found to reflect the theoretical values quite well. It has also been determined that the reaction kinetics are sufficiently rapid, resulting in the discharge voltage of a CuO/CuS combination being higher than the discharge voltage of CuO or CuS alone versus zinc. The change in the Gibbs Free Energies were calculated from the free energies of formation of reactants and products, available in "The oxidation states of the elements and their potentials in aqueous solutions" (Second Edition, Wendell M. Latimer, Prentice Hall, Inc, 1952), the disclosure of which is incorporated by reference to the extent that it discusses the free energies of formation of reactants and products of the type described herein. The open circuit voltages were calculated utilizing the formula $\Delta G=-nFE$, where Delta G refers to the free energy change of a reaction, n refers to the number of electrons involved in the reaction, F is the Faraday constant (96500 coulombs/mole) and E is the voltage in V, as one skilled in the art would readily recognize.

Figure 5:
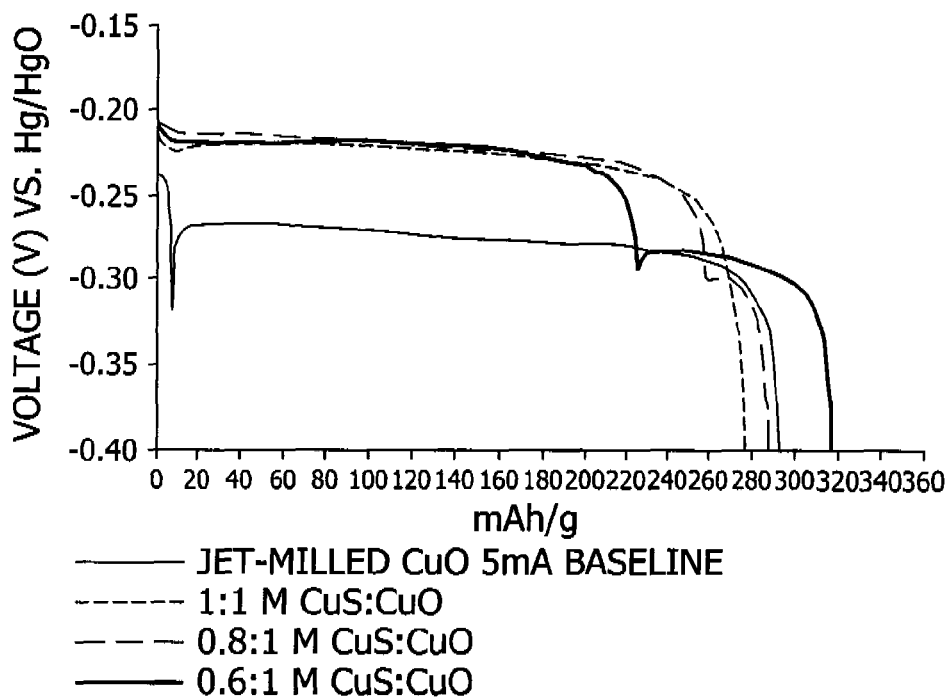
FIG. 5 is a graph plotting the discharge behavior of pure CuO and various CuO/CuS mixtures in a half-cell versus a Hg/HgO reference electrode.

It is believed that the ratio of CuO to CuS dictates the discharge voltage profile. For example, an excess of CuO in a CuO/CuS mixture will cause the reaction to proceed in two steps, where reaction 3 proceeds first at about 1.18V, until the CuS is consumed, followed by reaction 1 at approximately 1.09V versus zinc. Since the copper oxide/copper sulfide mixture reduction reaction consumes equi-molar amounts of CuO and CuS, use of a mixture containing a 1:1 molar ratio of CuO and CuS provides a discharge profile at approximately 1.1V for the entire capacity, without a lower discharge plateau as is observed when CuO is in excess as described above. A 1:1 molar ratio represents a 45/55 weight ratio of CuO/CuS for the mixture. FIG. 5 shows the discharge behavior of pure CuO and cathode mixtures comprising various molar ratios of CuO/CuS in a half-cell versus Hg/HgO reference electrode. It is noteworthy that the operating voltage is significantly higher than pure CuO alone. Cathode materials are provided herein having a flatter voltage profile than, for example, $MnO_2$, and more similar to that of CuO.

Various versions of the cathode material set forth herein encompass a molar ratio within the range of 0.5:1 and 1:1.5 CuO/CuS, and one-tenth increments of CuO between 0.5:1 and 1.5:1, with a suitable molar ratio of approximately 1:1.

Table 1 shows the theoretical capacity to −0.9V versus Hg/HgO reference electrode that can be obtained from cathodes containing various CuO/CuS molar ratio blends.

TABLE 1

| Cathode Mix CuS:CuO Molar Ratio | Theoretical Capacity at 5 mA to −0.3 V vs. Hg/HgO Ref mAh/gm |
|---|---|
| 1:1 | 306 |
| 0.9:1 | 292 |

TABLE 1-continued

| Cathode Mix CuS:CuO Molar Ratio | Theoretical Capacity at 5 mA to −0.3 V vs. Hg/HgO Ref mAh/gm |
|---|---|
| 0.8:1 | 275 |
| 0.6:1 | 235 |

For a cylindrical cell (e.g., AAA, AA, C and D) for which annular cylindrical cathodes are formed ex-situ or in-situ, it has been discovered that the unique characteristics of the CuS material can be leveraged to allow tablet densities hitherto not seen in commercial alkaline batteries. The cathodes in present day commercial alkaline batteries have densities of about 3.2 g/cc of cathode volume. With appropriate choice (e.g. about 97%) of CuO, CuS, conducting carbon (e.g., about 3% or KS4 and/or expanded graphite) and processing conditions (e.g., using a standard hydraulic or pelleting press), cathode densities of about 3.5 g/cc up to about 4.5 g/cc of cathode volume can be achieved. A skilled artisan will appreciate that variants of these concentrations can also produce the stated cathode densities. This allows significantly more active material to be packed into a cell, to provide batteries with longer service lives than previously known. For example, AA cells with delivered capacities up to 4 Ah may be produced, which are significantly improved over present day commercial alkaline batteries having deliverable capacities of about 2.5-2.8 Ah.

Figure 6:
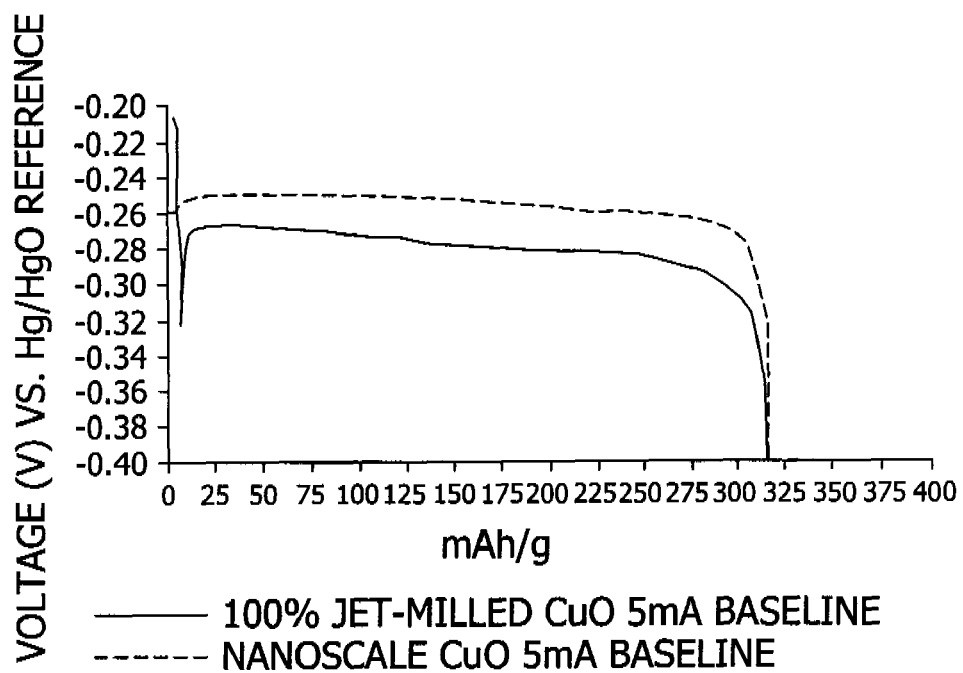
FIG. 6 is a graph illustrating the effect of using higher surface area CuO on its discharge voltage.

It is also recognized that jet-milling of commercially available CuO to reduce particle size and increase surface area results in a higher operating voltage. The surface area plays an important role in the reaction kinetics and hence the operating voltage of the battery. It is further recognized that an applied current to a cathode creates a stress that is distributed among the entire surface area of the cathode. Accordingly, cathodes having a greater surface area perform better than those having smaller surface areas as illustrated in FIG. 6.

In addition to mechanical attrition and air-jet milling, the surface area of the CuO can also be increased by modifying the process conditions during synthesis of the CuO, particularly if using a solution process. Jet milling of as-received commercial CuO (from Sigma/Aldrich, located in St. Louis, Mo.) is shown to more than double the Brinier, Emmett & Teller (BET) surface area from ~1.27 $m^2/g$ to ~5.57 $m^2/g$. Solution synthesized CuO can be obtained, where surface areas are significantly higher, thereby providing electrodes with lower polarization. A commonly known method to determine surface areas of powders is the BET method, which uses the principle of gas adsorption of the surface of the particles to estimate the surface area. A commercially available Tristar 3000 Gas Adsorption Analyzer and Smart prep Degasser manufactured by Micromeretics Corp. (located in Norcross, Ga.) were used for the analysis. In the analysis, 1 gram samples were used, after degassing for 2 hours. The results are illustrated in Table 2.

TABLE 2

|  | Mean Particle Size, micrometer (um) | Particle Size Range Um | BET Surface Area, $m^2/g$ |
|---|---|---|---|
| CuO & Source |  |  |  |
| As Recd. from Aldrich 99+% | 9.6 | 1-25 | 1.3 |
| ACS grade, <5 micron |  |  |  |
| Jet milled Aldrich | 1.9 | 0.7-3.5 | 5.6 |
| Jiangsu Taixing (China) | 4.5 | 0.2-60 | 10.5 |
| Nano (NanoScale Corp.) | 22.3 | 1.0-60 | 39.6 |
| CuS & Source |  |  |  |
| Alfa Aesar, 99.8% (metals basis), −200 mesh powder | 24 | 0.1-100 | 1.2 |

Chemically synthesized agglomerates of a nano-CuO may also be used for the cathode. Such materials can be obtained from NanoScale Materials, Inc. (1310 Research Park Drive, Manhattan, Kans., 66502 USA). The particle size of the material may be within a range whose lower end is between, and includes, 0.1 microns and 10 microns, and whose upper end is between, and includes, 50 microns and 150 microns. Additionally, the CuO may have a surface area within a range whose lower end is between, and includes, 0.5 $m^2/g$, 1 $m^2/g$, and 5 $m^2/g$, and whose upper end is between, and includes, 20 $m^2/g$, 30 $m^2/g$, 60 $m^2/g$, 70 $m^2/g$, and 100 $m^2/g$.

The particle size, particle size distribution (PSD) and Brinier, Emmett, and Teller (BET) surface area of the CuS are believed to play an important role in achieving the desired cathode packing density and integrity, as well as discharge voltage characteristics. The relative PSD's of the CuO and CuS are also believed to be important considerations in making blends, as would be appreciated by one of skill in the art.

Figure 7:
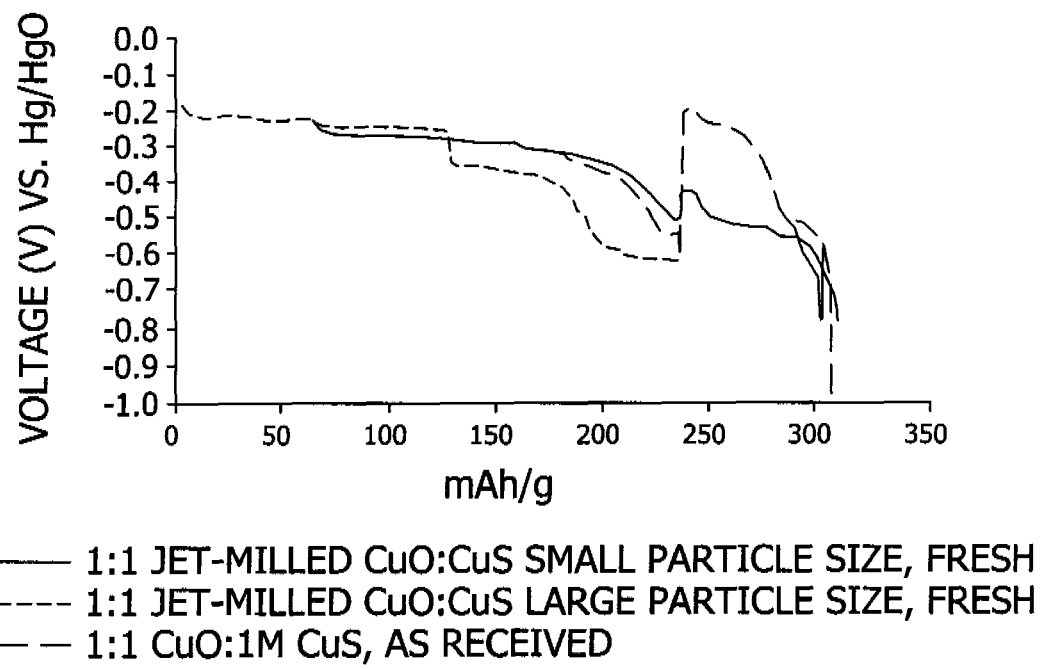
FIG. 7 is a graph illustrating the effect of CuS particle size on the rate capability of a jet-milled CuO/CuS cathode in a flooded half-cell where the current is progressively stepped between 5 mA and 35 mA.
Figure 8:
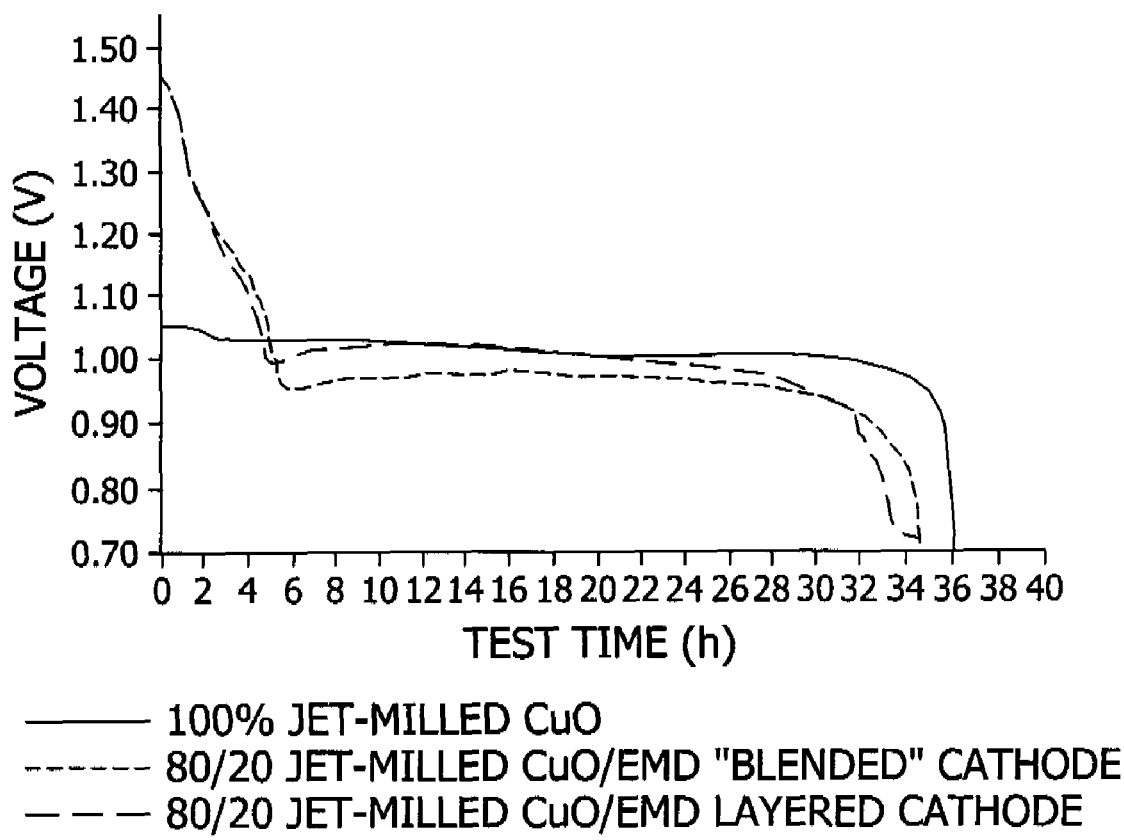
FIG. 8 shows a graph representing the discharge behavior of a layered cathode containing (EMD) $MnO_2$+CuO under conditions using jet-milled CuO, 66% BIP Sieved anode, with 34-2 electrolyte and 25-0 pre-wet electrolyte, and a 5 mA discharge.

FIG. 7 shows the effect of CuS particle size on the rate capability of a jet-milled CuO/CuS cathode in a flooded half-cell where the current is progressively stepped between 5 mA and 35 mA. At 20 mA and higher currents, the electrode comprising CuS of particle size smaller than 25 micrometers shows a significantly lower polarization (higher voltage) than a cathode comprising CuS particles greater than 25 micrometers in diameter. Since a smaller particle size contributes a higher surface area than larger particles of the same mass, this result indicates that a higher surface area CuS provides superior current carrying capability (rate capability) in a cathode comprising CuO/CuS.

The particle size and particle size distributions were measured using a Coulter Series LS230 Laser Diffraction Particle Size Analyzer with a small-volume module (Beckman-Coulter Corporation, Miami, Fla. 33196). One skilled in the art would recognize that the physical characteristics of all the materials comprising a cathode need to be optimized to achieve the desirable physical robustness, conductive matrix, pore size and porosity distribution to deliver optimum discharge characteristics in a battery. Copper oxide as well as the copper containing multi-component synthesized mixtures disclosed herein have a lower electronic conductivity than a material such as manganese dioxide (EMD, CMD, NMD). In the design of the electrode for an electrochemical cell, conductive additives like graphite are typically added. It has been discovered that for an effective, adequately conductive electrode, it is very important to match the particle size of the graphite to that of the active material. This is particularly important when a commercial material like EMD, which has a mean particle size ranging from about 15 to 40 microns (depending on source/manufacturer), is blended with the synthesized multi-component mixtures disclosed herein. The particle size of the conductive carbon must be carefully matched such that both the manganese dioxide and the multi-component mixture have the adequate conductive matrix surrounding them. Conductive additives having a small particle size, such as carbon black (for example, Vulcan XC-72R Acetylene Black obtained from Cabot Corp, located in Chicago, Ill.), can be used in combination with graphite. Accordingly, the conductive additive may have a mean particle size similar to the mean particle size of the active material.

Increasing the surface area of the active material is beneficial to the electrode structure and performance. It is believed that increasing the surface areas to as high as 50 or 100 $m^2/g$ will provide the desired benefits in an electrochemical cell. The surface area can be increased by a number of conventional methods such as for example, air-jet milling. One skilled in the art will also recognize that surface area can also be increased by appropriate control of the synthesis conditions during manufacture.

The particle size of CuS may be within a range whose lower end is between, and includes, 0.1 microns and 10 microns, and whose upper end is between, and includes, 50 microns and 150 microns. The CuS may also have a surface area within a range whose lower end is between, and includes, 0.5 $m^2/g$, 1 $m^2/g$, and 5 $m^2/g$, and whose upper end is between, and includes, 20 $m^2/g$, 30 $m^2/g$, 60 $m^2/g$, 70 $m^2/g$, and 100 $m^2/g$.

As noted elsewhere herein, one problem with copper or silver containing materials in the cathode is the solubility of the materials in alkaline electrolytes (such as KOH) and the migration of these species toward the zinc anode, where they can foul and interfere with the anode's reactions and lead to passivation, self-discharge or other undesirable situations that, depending on the conditions, depress the anode voltage or cell voltage. Hence, it is desirable to block, tie-up or slowdown this process of species generation and migration in order to produce a practical battery with reasonable shelf life. Various aspects of this invention teach the use of special separator materials as well as methods to practice the preparation and sealing of the separator seams, in order to allow one to utilize the high operating voltage and still produce a battery with reasonable shelf life.

Various versions of the present invention recognize the good lubricating properties and high conductivity of CuS in practice. Use of CuS in a mixture therefore allows the reduction or elimination of conducting carbons in the cathode and provides an additional 5-7 wt % room for active material, thereby further increasing cell capacity. In a related aspect, the conductive and lubricating properties of CuS may be utilized to replace the conductive carbon coating currently used on the internal can surfaces in alkaline batteries.

The initial voltage of this combination of CuO/CuS may be further increased by the presence of other higher voltage cathode active materials such as $MnO_2$, NiO, NiOOH, $CuAg_2O_4$ and the like. Unfortunately, if the individual material characteristics are not properly matched, then any mismatch before, during or after discharge causes the performance of the later discharging material to be inferior to its normal discharge behavior, as was shown in FIG. 4. This is particularly the case if the first discharging material has a significant volume or density change upon discharge, consumes water or electrolyte, or produces a discharge product that has poor electronic conductivity. When this happens, the second discharging material no longer has ideal conditions for its discharge, hence the overall behavior of the cell is compromised, negating the benefit of mixing the two materials.

While this has been demonstrated in the example of FIG. 4, it is further exemplified in a situation where soluble sulfur species or sulfides are present in the mix with $MnO_2$, and where the sulfur species appear to interfere with the proton intercalation of the $MnO_2$, thereby significantly reducing the operating voltage of the $MnO_2$ portion. It is believed that if the $MnO_2$ is separated from the mixture of CuO and CuS, or the sulfur species are prevented from contacting the $MnO_2$, this detrimental effect would be minimized. Therefore, to prevent the reduction of the operating voltage due to any of the foregoing reasons (physical and/or chemical), a method is provided whereby the different active materials are not mixed together. Rather, the individual active materials that possess a mismatch are kept in separate layers or pellets whereby one material only minimally affects the behavior of the second discharging material.

Each layer or pellet comprises either a distinct cathode active material or a physical mixture of the materials suitable for use in combination with the invention. It is specifically contemplated that where separate cathode layers or pellets are provided, at least one layer or pellet can comprise a physical mixture of copper oxide with another additive (e.g., a metal oxide or sulfide) while another layer or pellet can comprise a mixed compound. Likewise, a layer or pellet can comprise a physical mixture of a mixed oxide compound with an additive (e.g., another metal oxide or sulfide).

The concept is shown in FIG. 7 for the case of CuO and $MnO_2$. In particular, a homogeneous physical mixture of EMD and CuO is shown where, after the initial EMD discharge and transition, the CuO discharge occurs at a significantly lower voltage than the pure CuO discharge that is also shown. The use of a layered cathode, where the EMD and CuO are in separate layers on top of each other as in FIG. 9, significantly mitigates the problem caused by interaction between the EMD and CuO.

Figure 9:
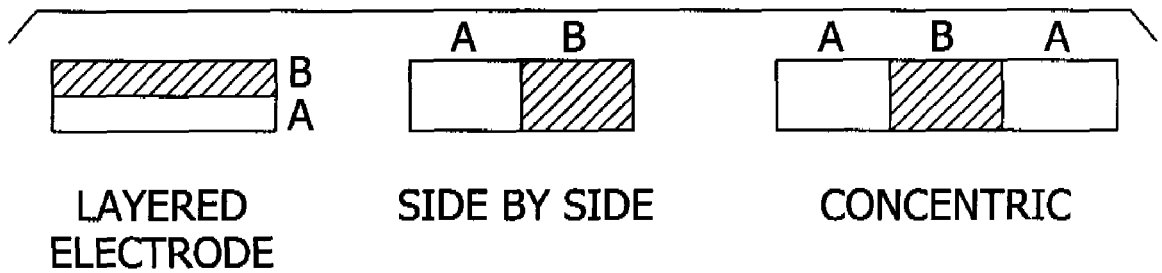
FIG. 9 illustrates three examples of electrode configurations for flat cathodes of button cells.
Figure 10:
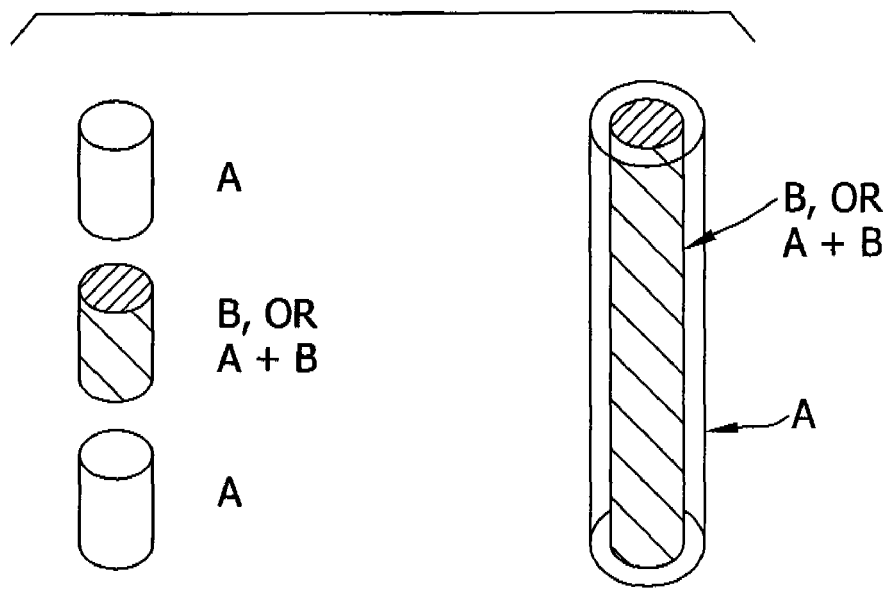
FIG. 10 illustrates two examples of cylindrical electrode configurations.

In a button cell battery where the cathode is in a disk form, the active materials can be in layers one over the other, or as concentric circles (discs) one within the other as shown in FIG. 9. The active materials can also be in the form of semi-circular segments placed beside one another.

For a prolate cylindrical battery configuration, which uses a cylindrical cathode in a can or container, either pressed externally and inserted, or fabricated in-situ in the can or container, the same concept can be used to keep the materials separated as shown in FIG. 9. The materials are in contact, but are not mixed or blended together.

It is recognized that a mixture of CuO and CuS in a cathode can raise the operating voltage of the cathode in alkaline solution compared to a cathode including CuO alone. However, it has been discovered that a mixture of CuO and CuS can react when stored in an alkaline solution, and produce soluble sulfur species that, if allowed to migrate unheeded to the anode, can adversely affect the performance of the zinc anode. For purposes herein those species that adversely impact the performance of a zinc anode are referred to as anode-fouling species. Examples of anode-fouling species are well known to those skilled in the art and include various Cu, Ag, S, Fe, Ni, Bi, and Sb species.

In these situations, it is desirable to further provide an additive that reduces the ability of the species to foul the anode. The additive can be included in the anode, the cathode, the electrolyte or, as further described elsewhere herein, the separator, and operate at the location where anode-fouling species would be generated, at the separator where the fouling species would migrate through the separator, or after anode-fouling species migrate through the separator from the cathode towards the anode but prior to the fouling species interacting with and fouling the anode. The additive can operate either by binding to the species or chemically interacting (e.g. by oxidation, reduction complexing, coordinating, etc.) with the species to form a non-anode-fouling product having a reduced solubility. Furthermore, the additive can reduce the effect of anode-fouling soluble species by modulating the local hydroxide ion concentration within the electrode.

In this regard, although not being bound by a particular theory, it is recognized that precipitation is a vehicle for removing soluble species from solution. The solubilities of species are represented by their $K_{sp}$ value. It has been determined that low solubility products of the product of the reaction between the additive and the anode-fouling soluble species are beneficial. One such beneficial solubility product has been found to have a $K_{sp}$ value less than or equal to $2 \times 10^{-25}$. It will thus be appreciated that the additive can mitigate anode-fouling either by effectively limiting migration from the cathode to the anode, and/or reacting with the copper or silver species to form an innocuous product or a less fouling product.

It is also recognized that suitable additives include, but are not limited to, bismuth oxide ($Bi_2O_3$), bismuth hydroxide ($Bi(OH)_3$), zinc sulfide (ZnS) and zinc oxide (ZnO). Example 9 below, for instance, describes the effect of a ZnO additive in a CuO/CuS cathode. Each of these chemicals, when added to a copper-containing cathode, have been found to reduce the ability of the species to foul the anode, either by reacting with the species or by effectively limiting the species from migrating through the separator to the anode. One skilled in the art will recognize that additives performing a similar function can also be targeted toward anode fouling soluble copper species. Complexing agents like EDTA (ethylene diamine tetra-acetic acid), ethanol amines, oxalic or citric acid, etc., interact with metal ions in solution.

(iii) Third Approach

As already pointed out, $MnO_2$ has some very desirable properties, particularly its high voltage, high rate capability and low cost. Copper oxide by itself has excellent gravimetric capacity and material density, flat discharge voltage profile, but low rate capability and relatively low discharge voltage. Accordingly, materials that combine the very attractive features of each material are desirable, the materials having a reasonably high voltage, high rate capability and much longer delivered service life in a battery, without the sharp discontinuity in voltage transition that is observed with physical blends of these two apparently incompatible materials, as shown in FIG. 4. It is believed that synthesizing a mixed oxide material that contains both manganese and copper can provide a "bridge" that makes the two materials more compatible, with a voltage profile that is substantially free from a significant "dip" even at high discharge rates. It has been discovered that chemical synthesis under some specific conditions can provide such materials. Hence, a higher operating voltage than pure CuO, and a smoother and more continuous transition than in the preceding method, can be obtained by solution phase chemical compounding or synthesis using soluble cationic elements to produce mixed oxide compounds or complexes existing in one or more phases. Suitable elements can include, but are not limited to, Mn, Ni, Co, Fe, Sn, V, Mo, Pb, or Ag, or combinations thereof. Such mixed oxide compounds may also be produced via solid state reactions at appropriate temperatures, as one skilled in the art will readily appreciate.

As is readily recognized by one skilled in the art, present commercially available alkaline electrochemical cells which utilize $MnO_2$ as the major constituent of the cathode can have trace levels of copper present as a result of assorted impurities in the sourced materials. These trace levels of impurities are now recognized as insufficient and therefore ineffective at providing measurable performance advantages to the cell discharge. Accordingly, the copper content of the cathode is desirably greater than about 0.5% by weight of the mixture.

(a) Copper-Based Mixed Oxides—$M_xCu_yO_z$

The general formula of a copper based mixed oxide material suitable for use in the present invention, $M_xCu_yO_z$, where M is any suitable element, as noted, while x is less than 20 (alternatively $1 \leq x \leq 5$), y is less than 20 (alternatively $1 \leq y \leq 5$), and z is less than 100 (alternatively $1 \leq z \leq 20$). Compounds having $A_wM_xCu_yO_z$ as general formula (where w is <20 and A can be, for example, Li, Na, K, Rb, Cs, Ca, Mg, Sr, Ni and Ba) can also be designed for use as cathode active materials. Whereas it is anticipated that materials across the range of formulations such as $M_xCu_yO_z$ can have varying degrees of advantages with regard to cell performance, it is anticipated that such mixed metal oxides of the tenorite type of crystal structure and the spinel type of crystal structure can have particular advantages due to their structural type and its similarity to other species in the cathode. Tenorite and spinel type structures are well known to one having ordinary skill in the art.

Another mixed metal oxide suitable for use in the present invention is $M_xCu_yO_z$, wherein x=3−y and z=4, where y is positive and y<3. Yet another mixed metal oxide suitable for use in the present invention is $M_xCu_yO_z$, wherein x=2−y and z=2, where y is positive and y<2. In one particularly preferred embodiment, M is manganese, x is 1.5, y is 1.5, and z is 4.0.

(b) Copper-Manganese Mixed Oxides—$Mn_xCu_yO_z \cdot nH_2O$

One particular aspect of the present invention is the an active cathode material, which suitable for use in an alkaline electrochemical cell, and which comprises a copper-manganese mixed oxide that is generally represented by the chemical formula $Mn_xCu_yO_z \cdot nH_2O$, wherein: the oxidation state of copper ranges from between about +1 and about +3; the oxidation state of manganese ranges from between about +2 and about +7; y is less than about 3; x is equal to about 3−y; z is calculated or experimentally established (using means known in the art) based on x, y and the oxidation states of the individual metal ions; and, $nH_2O$ represents the stoichiometric ratio of water in the structure, or the surface and structural water present in the mixed oxide cathode material. Exemplary formulations for this copper-manganese mixed oxide include those wherein: the oxidation state of copper is between about +1 and about +3, or between about +1 and about +2; and/or the oxidation state of manganese is between about +2 and about +4, or between about +3 and about +4; and/or the value of x is about 0.01 and about 2.99, or between about 0.5 and about 2.5, or between about 1 and about 2, or between about 1.2 and about 1.8, or between about 1.4 and about 1.6; and/or the value of y is between about 0.01 and about 2.99, or between about 0.5 and about 2.5, or between about 1 and about 2, or between about 1.2 and about 1.8, or between about 1.4 and about 1.6; and/or the value of z is between about 2.25 and about 7.5, or between about 2.25 and about 5.25, or between about 2.25 and about 4.5; and/or n is between about 0.1 and about 10, or between about 0.5 and about 9, or between about 1 and about 8.

Accordingly, in some embodiments, exemplary copper-manganese mixed oxide formulations include: Cu having an oxidation state between about +1 and about +3 and Mn having an oxidation state between about +2 and about +4; Cu having an oxidation state between about +1 and about +2 and Mn having an oxidation state between about +2 and about +4; Cu having an oxidation state between about +1 and about +2 and Mn having an oxidation state between about +3 and about +4;

Cu having an oxidation state between about +1 and about +2 and Mn having an oxidation state of about +4; Cu having an oxidation state of about +2 and Mn having an oxidation state between about +3 and about +4; Cu having an oxidation state of about +2 and Mn having an oxidation state of about +4. Additionally, in one or more of the exemplary embodiments, and particularly in an embodiment having the formula below:

$$Cu_{1.5}Mn_{1.5}O_z \cdot nH_2O$$

y may have a value between about 0.01 and about 2.99, or about 1 and about 2, or about 1.2 and about 1.8, or about 1.4 and about 1.6, while z may have a value between about 2.25 and about 7.5, between about 2.25 and about 5.25, or between about 2.25 and about 4.5, and n may have a value between about 0.1 and about 10, or about 0.5 and about 9, or about 1 and about 8.

It is to be noted that, in a particular embodiment, any of the various compositions detailed or encompassed by the above ranges and or formulations do not include the formula $Mn_{1.5}Cu_{1.5}O_{4.0}$. For example, in a particular embodiment of one or more of the formulations encompassed by the details provided above, (i) z may be less than 4.0, z for example being between about 2.25 and less than 4.0, or alternatively (ii) z may be greater than 4.0, z for example between greater than 4.0 and less than about 7.5.

It is to be further noted that, for the Cu and Mn oxidation state ranges described herein and in examples where a copper-manganese oxide material has the empirical formula, $Mn_xCu_yO_z \cdot nH_2O$, the value of z may be determined as illustrated in Table 3, below (wherein, for example, z has values ranging between 1.5 and 10.5). More specifically, Table 3 illustrates the calculation of values for z, based on various values for x and y, and oxidation states of Cu and Mn.

reduction of the cathodic copper-manganese oxides in alkaline solution through the loss of oxygen from the structure.

A number of mixed transition metal oxides with spinel structures have been synthesized and studied for understanding their electronic structure and fundamental properties. (See, e.g., Blasse, G., *Crystal Chemistry and Magnetic Properties of Mixed Metal Oxides with Spinel Structure*, Thesis, University of Leiden, April 1964.) The transition metal oxides with spinel structures have found applications ranging from magnetic media, to energy storage batteries, to catalysis.

It is understood by one skilled in the art that, by way of definition, a cubic $A[B_2]X_4$ spinel (lattice parameter $a_0$) contains eight formula units and has its close-packed array of anions X, located at the 32e positions of the space group Fd$\bar{3}$m ($O_h^7$). The B cations occupy half of the octahedral sites designated as 16d, and A cations occupy one-eighth of the tetrahedral sites designated as 8a. The empty 16c octahedral sites form an interconnected three dimensional array of edge-shared sites identical to the 16d array, but shifted by $a_0/2$, $a_0/2$, $a_0/2$. Each 16c site shares edges with six other 16c sites forming intersecting chains <110>; it also shares common faces with two 8a tetrahedral sites on opposite sides along axes <111>. The 8a and 16c sites form a three-dimensional tunnel in the spinel structure.

For several applications (see, e.g., Gummow, R. W., De Kock, A., Thackeray, M. M., *Improved Capacity Retention in Rechargeable 4 V Lithium/Lithium-Manganese Oxide (Spinel) Cells*, Solid State Ionics (1994), 69, 59; and, Masquelier, C., Tabuchi, M., Ado, K., Kanno, R., Kobayashi, Y., Maki, Y., Nakamura, O., Goodenough, J. B., *Chemical and Magnetic Characterization of Spinel Materials in the $LiMn_2O_4$—$Li_2Mn_4O_9$—$Li_4Mn_5O_{12}$ System*, J. Solid State Chem. (1996), 123(2), 255), a slight non-stoichiometry in the

TABLE 3

(Examples of z calculated from x, y and oxidation states of manganese (i) and copper (j) for $Mn_xCu_yO_z \cdot nH_2O$, wherein y = 3 − x, and z = (i * x + j * y)/2.)

| Range of oxidation states for Mn (i) | Range of oxidation states for Cu (j) | Calculated range for z | x = 0.01<br>y = 2.99<br>y/x = 299 | x = 0.75<br>y = 2.25<br>y/x = 3 | x = 1<br>y = 2<br>y/x = 2 | x = 1.5<br>y = 1.5<br>y/x = 1 | x = 2<br>y = 1<br>y/x = 0.5 | x = 2.99<br>y = 0.01<br>y/x~0.003 |
|---|---|---|---|---|---|---|---|---|
| +2 to +7 | +1 to +3 | 1.5 < z < 10.5 | z = 1.505 to 4.52 | z = 1.875 to 6 | z = 2 to 6.5 | z = 2.25 to 7.5 | z = 2.5 to 8.5 | z = 2.995 to 10.48 |
| +2 to +4 | +1 to +3 | 1.5 < z < 6 | z = 1.505 to 4.505 | z = 1.875 to 4.875 | z = 2 to 5 | z = 2.25 to 5.25 | z = 2.5 to 5.5 | z = 2.995 to 5.995 |
| +2 to +4 | +1 to +2 | 1.5 < z < 6 | z = 1.505 to 3.01 | z = 1.875 to 3.75 | z = 2 to 4 | z = 2.25 to 4.5 | z = 2.5 to 5 | z = 2.995 to 5.99 |
| +3 to +4 | +1 to +2 | 1.5 < z < 6 | z = 1.51 to 3.01 | z = 2.25 to 3.75 | z = 2.5 to 4 | z = 3 to 4.5 | z = 3.5 to 5 | z = 4.49 to 5.99 |
| +4 | +1 to +2 | 1.5 < z < 6 | z = 1.515 to 3.01 | z = 2.625 to 3.75 | z = 3 to 4 | z = 3.75 to 4.5 | z = 4.5 to 5 | z = 5.985 to 5.99 |
| +3 to +4 | +2 | 3 < z < 6 | z = 3.005 to 3.01 | z = 3.375 to 3.75 | z = 3.5 to 4 | z = 3.75 to 4.5 | z = 4 to 5 | z = 4.495 to 5.99 |
| +4 | +2 | 3 < z < 6 | z = 3.01 | z = 3.75 | z = 4 | z = 4.5 | z = 5 | z = 5.99 |

In this or yet another aspect of the present invention, the active cathode material may contain a copper-manganese mixed oxide, which is suitable for use in an alkaline electrochemical cell, and which comprises or is in the form of a defect spinel-type structure. In this regard it is to be noted that the present invention utilizes the structure of the mixed copper-manganese oxide to efficiently access the electrochemical potential of the oxidized metals. This is done by synthesizing the copper-manganese oxides in a defect spinel structure. Such a structure allows for rapid and efficient formula or the presence of defects in the structure is preferred. The non-stoichiometric, defect structures are common to compounds containing transition metal elements such as Mn, Co, Ni and Cu, due to the relative structural stability, provided mainly by bonding of the mixed d-orbitals of the different oxidation states of these elements at ambient conditions.

A stoichiometric oxide with spine structure has the general formula $A_{tet}[B_2]_{oct}O_4$, where A and B are metal atoms at tetrahedral and octahedral sites, respectively, and the theoretical total metal to oxygen ratio is 0.75 (i.e., 3 divided by 4). In defect spinel, vacancies at the tetrahedral and octahedral sites give rise to a generalized formula $(A_{1-t}\square_t)_{tet}[B_{2-o}\square_o]_{oct}O_4$, where the metal to oxygen ratio is less than 0.75. In an equivalent fashion, this formula can be represented by extra oxygen as in the formula $A_{tet}[B_2]_{oct}O_{4+\delta}$ ($0 \leq \delta \leq 0.5$). Some examples of defect oxide spinels are γ-$Fe_2O_3$ (see, e.g., Le Roux, H., *A Mössbauer Study of Paramagnetic and Magnetic Components in an Uncalcined Iron Manganese Powder*, J. Phys.: Condens. Matter (1990), 2, 3391), γ-$FeMnO_3$ (see, Id.), $Li_2Mn_4O_9$ (see, e.g., Masquelier, C., Tabuchi, M., Ado, K., Kanno, R., Kobayashi, Y., Maki, Y., Nakamura, O., Goodenough, J. B., *Chemical and Magnetic Characterization of Spinel Materials in the $LiMn_2O_4$—$Li_2Mn_4O_9$—$Li_4Mn_5O_{12}$ System*, J. Solid State Chem. (1996), 123(2), 255), γ-$MnO_2$ (see, e.g. Greedan, J. E., Raju, N. P., Wills, A. S., Morin, C., Shaw, S. M., Reimers, J. N., *Structure and Magnetism in λ-$MnO_2$. Geometric Frustration in a Defect Spinel*, Chem. Mater. (1998), 10(10), 3058), and $CdSnO_3$ (see, e.g., Inagaki, M., Yamashita, Y., *Formation of Defect Spinel Phase in $CdSnO_3$*, Z. Anorg. Allg. Chem. (1987), 546(3), 199).

In this regard it is to be noted that the structure and the chemical composition of the copper manganese oxide materials discussed herein were obtained with powder X-ray diffraction, as well as by elemental analysis of copper, manganese and the active, available oxygen.

It is to be further noted that, for purposes of this disclosure, available oxygen (AO) is defined as the amount of oxygen available after reducing the oxide present to the lowest stable, oxygen containing state in an acidic environment. By way of example, the calculation of the molar ratio of AO to total metal (AO/M) is shown in the following:

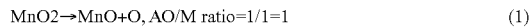

$MnO_2 \rightarrow MnO + O$, AO/M ratio=1/1=1 (1)

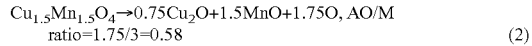

$Cu_{1.5}Mn_{1.5}O_4 \rightarrow 0.75Cu_2O + 1.5MnO + 1.75O$, AO/M ratio=1.75/3=0.58 (2)

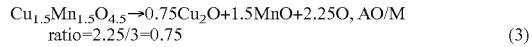

$Cu_{1.5}Mn_{1.5}O_{4.5} \rightarrow 0.75Cu_2O + 1.5MnO + 2.25O$, AO/M ratio=2.25/3=0.75 (3)

As shown above the AO/M ratio for a stoichiometric spine with a Cu:Mn ratio of 1:1, with formula $Cu^{1+}[Cu^{2+}_{0.5}Mn^{4+}_{1.5}]O_4$ (as disclosed by, for example, Jarrige, J., Mexain, J., *Propriétés du Manganite de Cuivre $Cu_{1.5}Mn_{1.5}O_4$*, Bull. Soc. Chim. Fr. (1980), 9-10, 1363) yields an AO/M ratio of 0.58 (see, Id.). The defect spinel $Cu_{1.5}Mn_{1.5}O_4$, in which all the Cu is formally $Cu^{2+}$ and all Mn is formally $Mn^{4+}$ can be represented by $(Cu_{0.89}\square_{0.11})_{tet}[Cu_{0.44}Mn_{1.34}\square_{0.22}]_{oct}O_4$ where $\square$ represents cationic vacancies in the tetrahedral and octahedral sites. This yields an AO/M ratio of 0.75.

Figure 64:
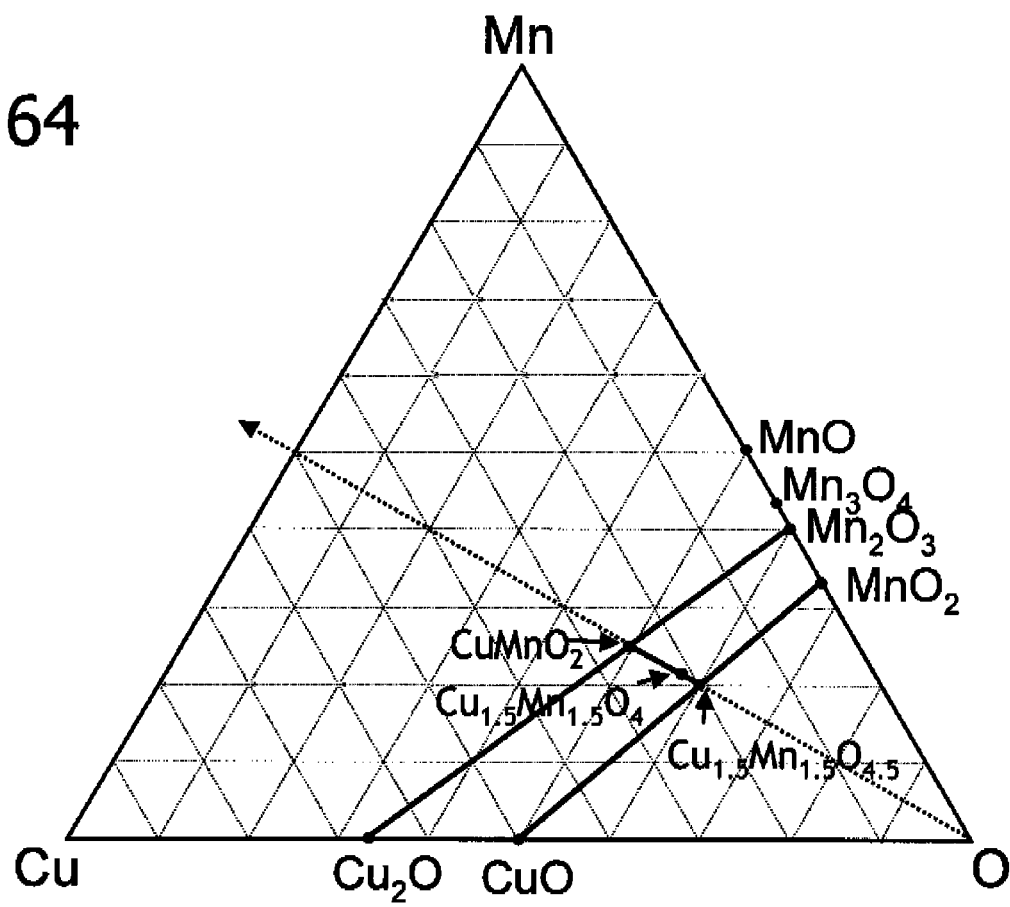
FIG. 64 is a phase diagram of the Cu—Mn—O system.
Figure 65:
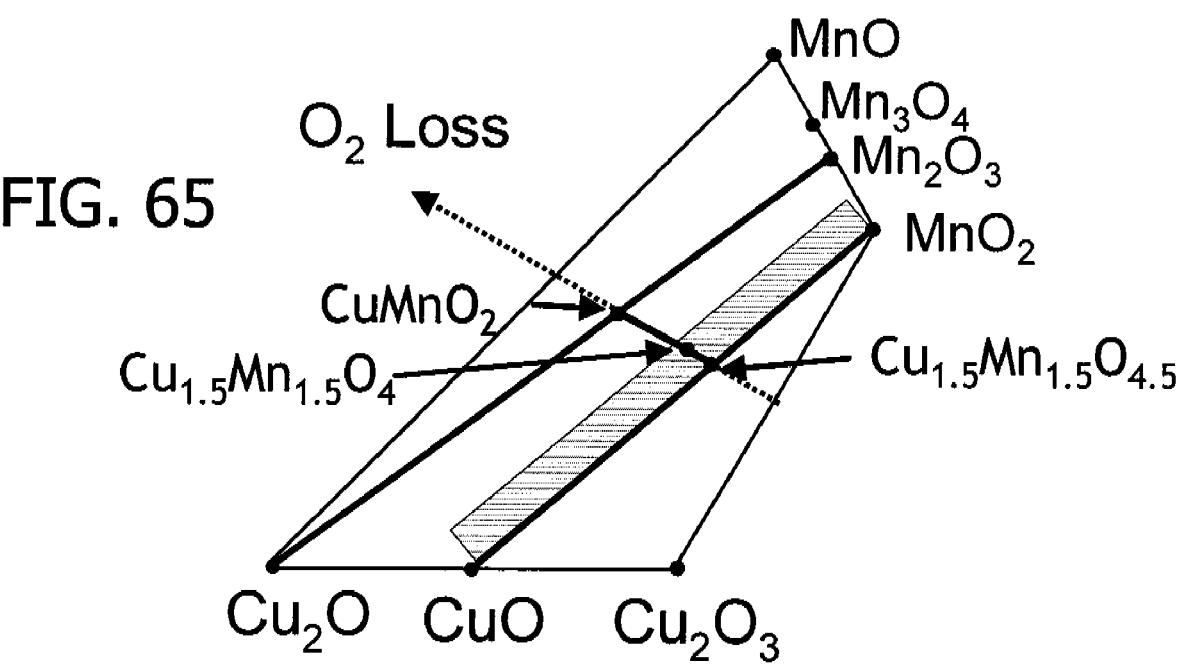
FIG. 65 is an expanded view of a region of interest of the Cu—Mn—O phase diagram of FIG. 64.

A Cu—Mn—O phase diagram is represented in FIG. 64. A portion of interest in FIG. 64 is further expanded as FIG. 65. For samples with a Cu to Mn ratio of about 1, the addition of oxygen to the compound results in an oxygen-rich defect spinel, while removal of oxygen results in oxygen-deficient defect spinels as well as reduced phases such as $CuMnO_2$. Using this diagram for stoichiometric reference, the advantage of utilizing a defect type spinel of copper-manganese oxide as a cathodic material can be readily seen. The reduction process for these materials can be understood to be the removal of oxygen from the structure indicated by the arrow labeled $O_2$ loss in FIG. 65. The common coordination environments maintained within the defect spinel structures as they are reduced makes these materials particularly useful as cathode materials in alkaline cells (see FIG. 65).

(iv) Processes for Preparation (a) Mixed Oxides Generally

One example of a process for preparing a mixed oxide cathode active material involves chemically reducing a mixed solution of salts together with a complexing agent and a reducing agent (e.g., sodium tetra-borohydride ($NaBH_4$), sodium formate, formic acid, formaldehyde, fumaric acid or hydrazine) to produce a compound containing the metals. A complex compound of the form $AM_xCu_y$ can also be prepared upon addition of a third metal salt as a precursor in this reduction step. The resulting product can be oxidized under acidic conditions with an oxidizing agent (e.g., hydrogen peroxide, potassium permanganate, potassium persulfate or potassium chlorate) to form a copper based mixed oxide of the general formula $A_wM_xCu_yO_z$.

For instance, Cu/Mn compounds prepared in this manner were confirmed by X-ray diffraction (XRD) analysis to be a mixed copper manganese oxide compound of a new phase. Although no ASTM card corresponds to this oxide, its diffraction pattern is similar to that of $Cu_2Mn_3O_8$. Other compounds such as of $Cu_2Mn_2O_5$ alone or in combination with CuO are also detected when the pH of hydrogen peroxide is made more acidic during the oxidation process. Oxidation conditions can substantially affect the crystalline structure and performance of the copper based mixed oxide. In addition to the mixed oxide phase, the product of the synthesis also contains other phases including manganese oxides and copper oxides. As is known to one skilled in the art, low/medium temperature solution based synthesis methods as discussed here tend to produce significant amounts of amorphous materials, which are difficult to characterize by X-ray diffraction analysis.

It is also envisioned that oxidation of the Cu/Mn compounds can be carried out in, for example, an alkaline solution or a solution having a neutral pH. Organic or inorganic acid (or base) can be used to adjust the pH of the oxidation solution. Also, the compounds can be first heat treated prior to chemical oxidation. Furthermore, copper mixed oxide compounds can be heat-treated prior to being mixed with conducting material to form the cathode.

The compounds can also be prepared by known mechanical alloying methods using a high-energy ball mill or by direct high-temperature melting in a furnace. It is further envisioned that $M_xCu_yO_z$ or $A_wM_xCu_yO_z$ copper based mixed oxide materials can alternatively be made by co-precipitating a mixture of metal salt solution followed by heating the precipitate under appropriate conditions.

Figure 11:
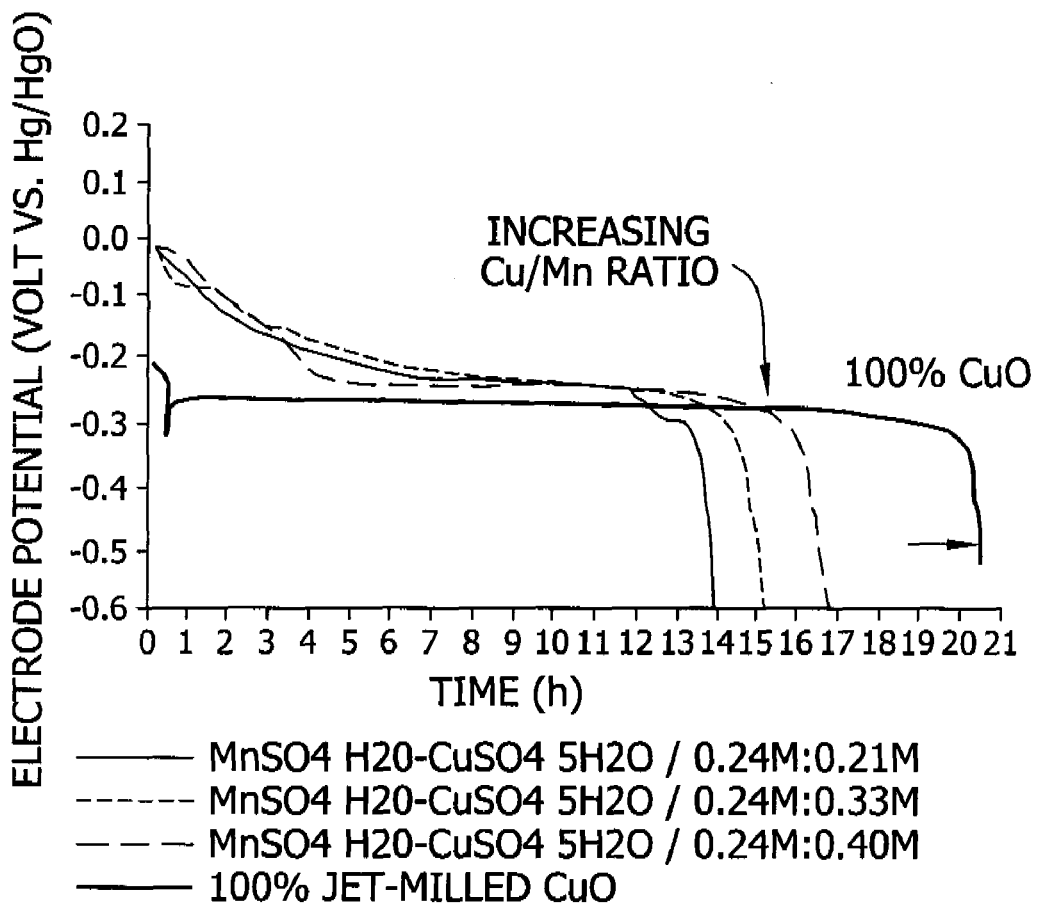
FIG. 11 shows a graph representing the effect of increasing proportions of copper in chemically synthesized Cu/Man mixed oxides in Cathode Material versus Pure CuO under conditions using 5 mA continuous discharge, 28-2 electrolyte, in a flooded half-cell.

FIG. 11 shows the behavior of such mixed oxide materials, as well as the effect of increasing Cu content in the synthesis of the cathode material in a flooded electrolyte half-cell. As previously described, new cathode materials are usually tested in flooded half-cell fixtures where complications from other processes are eliminated in order to focus only on the cathode. In such a fixture, there is an excess of electrolyte and the anode is a large surface area inert electrode like Ni gauze. The voltages are recorded versus a reference electrode which for an alkaline system comprises a Hg/HgO reference as known to those skilled in the art. As seen in FIG. 11, the presence of Mn increases the initial discharge voltage, and as the proportion of Cu in the material increases, the discharge capacity also increases, with minimal detrimental effect on the initial high voltage. Thus, by tuning the composition, desired discharge characteristics, including high initial voltage and long service life, can be obtained.

Figure 12:
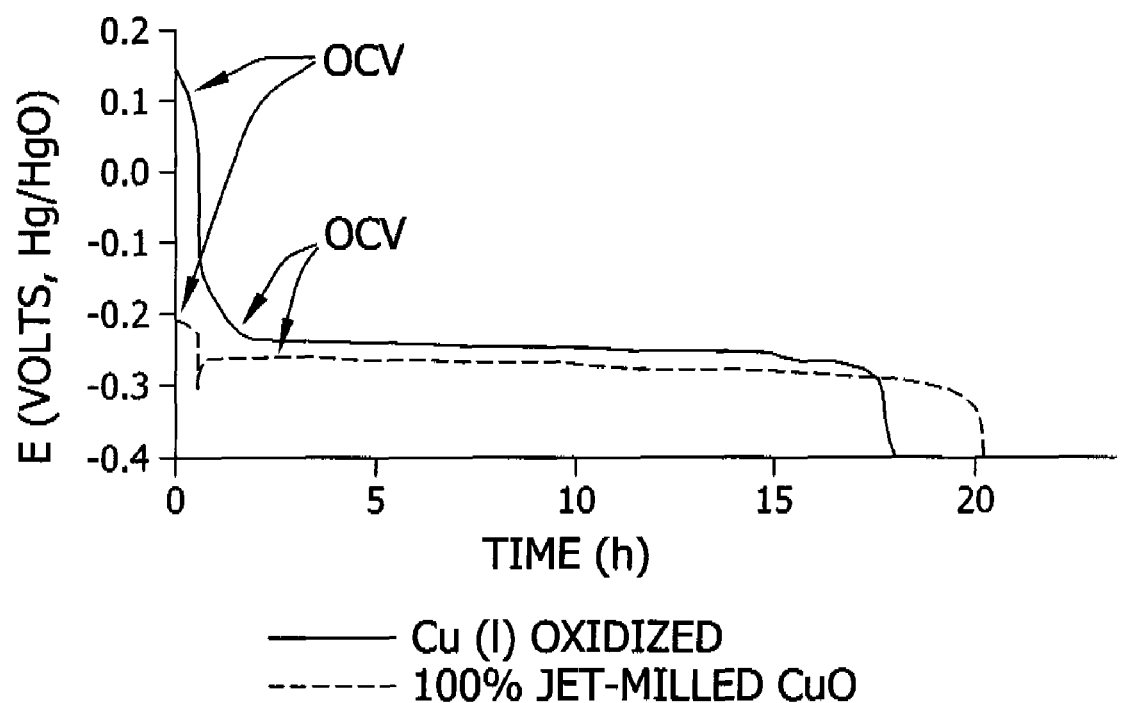
FIG. 12 shows a graph representing the performance of chemically synthesized CuO+$MnO_2$ cathodes under conditions using 5 mA discharge in a flooded half-cell.

Another process for preparing a mixed metal oxide comprises oxidizing a soluble first metal salt such as copper (I or II) salt (e.g., copper acetate) by potassium permanganate in alkali solution. The first metal is oxidized to a higher oxidation state while the Mn in the permanganate is reduced. FIG. 12 compares performance of a Cu/Mn cathode prepared in this manner to a CuO cathode and demonstrates that a desired initial voltage higher than CuO can be attained. FIG. 12 also shows that about 90% of the discharge capacity of the CuO is maintained in the active cathode. It is envisioned that these properties can be tailored by adjusting the relative ratio of Cu and Mn in the synthesis. Additionally, the flat portion of the discharge curve shows at least about 30 mV higher average voltage than CuO material obtained commercially. The surface activity and surface area of the active material play a role in performance here as well. It is believed that the morphology and surface area of the deposited material are also favorable for higher voltage discharge.

It is to be understood that several general synthesis approaches may be utilized to obtain a cathode active mixture comprising copper-manganese mixed oxide materials using different precursors, mixing and reaction conditions, all with the common goal of obtaining a material which has a combination of the desirable properties of $MnO_2$ and CuO. Low temperature solid state synthesis or co-precipitation may be used. If the copper in the precursor has an oxidation state of 1, then chemical oxidants or thermal oxidation may be utilized to obtain the end product where the copper oxidation state is at least substantially +2.

Figure 13:
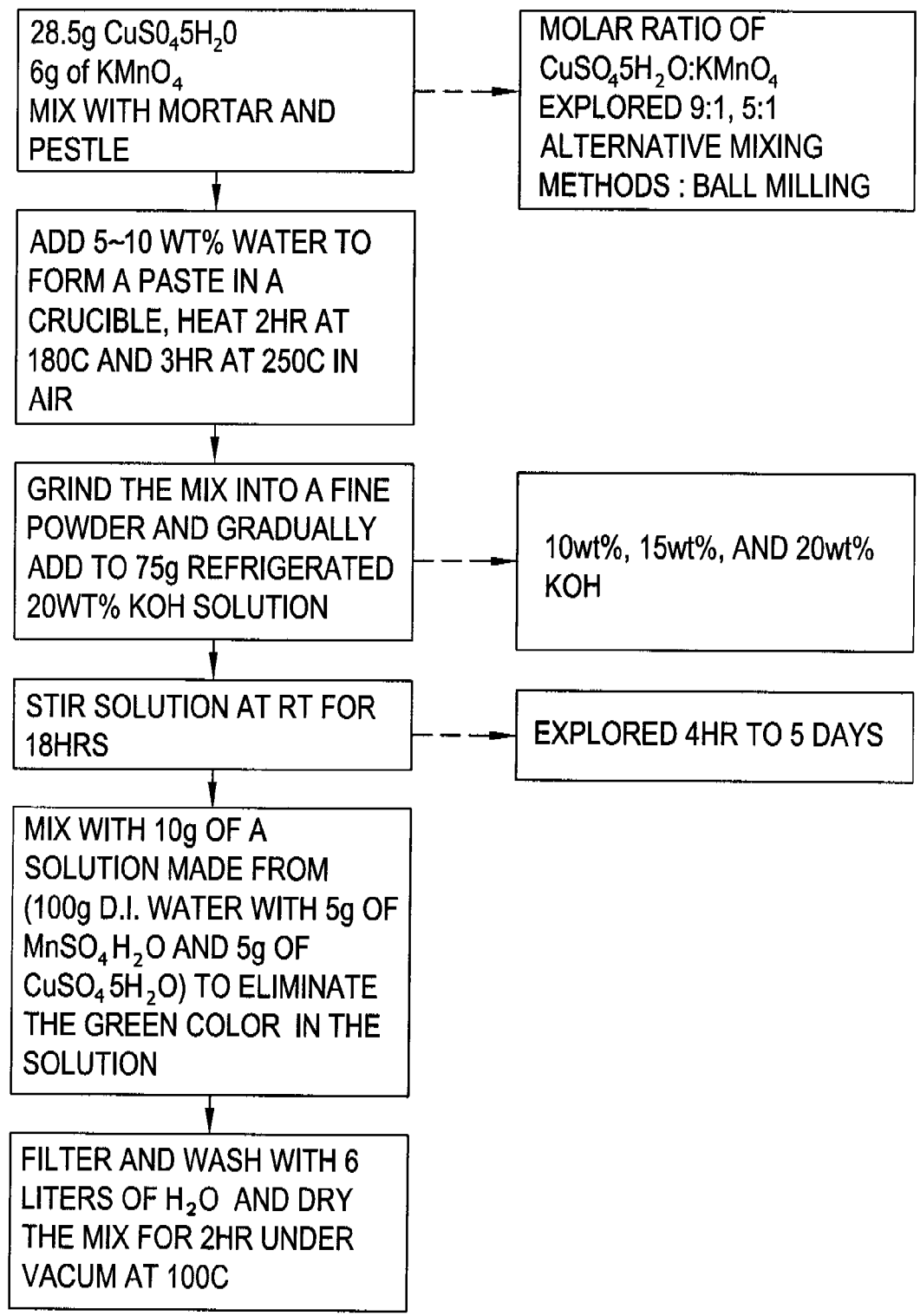
FIG. 13 shows a flowchart representing a process for synthesizing a mixed metal oxide.
Figure 14:
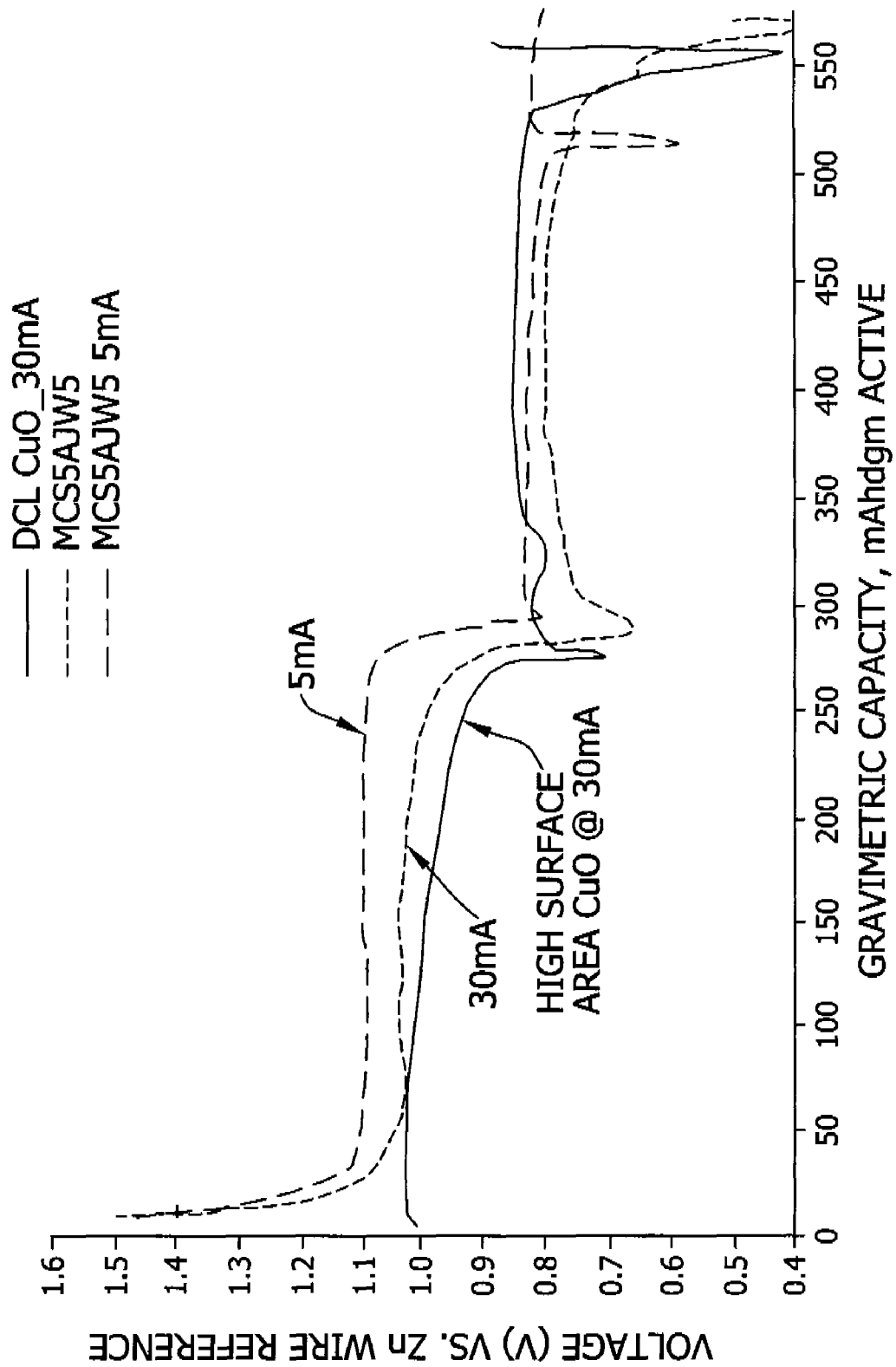
FIG. 14 is a graph illustrating a half-cell discharge of a cathode mixture including a mixed metal oxide.

One process for synthesizing a mixed metal oxide (illustrated in FIG. 13) involves low temperature a solid-state reaction between $CuSO_4$ and $KMnO_4$, which are mixed in one example using a 3:1 molar ratio, dried and heated to 250° C. in air. The material is then finely ground and reacted in 20% KOH solution. The material produced is a mixture that shows the discharge behavior of $MnO_2$, CuO and a mixed "bridge" phase. Several variants of this synthesis process involving molar ratios of 9:1 and/or 5:1, different heating conditions (time, temperature, etc.), KOH solution concentration ranging between 10 and 25%, etc., produce a material with excellent capacity and rate capability. FIG. 14 shows the half-cell discharge behavior at 5 mA and 30 mA. The material produced here referred to as MCS5A, generally comprises a manganese oxide phase showing the high initial voltage, a mixed phase representing the transition (or bridge phase) and a CuO type phase that has significantly higher rate capability and operating voltage than commercially available CuO. The mean particle size and particle distribution of this mixture was determined using a Coulter LS series particle size analyzer. It is known to one skilled in the art that modifications to the synthesis conditions can produce particle size ranges as desired.

The synthesized mixture may have a mean particle size within a range defined at its lower end by approximately 0.5 micron, and alternatively 1 micron, 3, 5, 10, and 20 microns, and defined at its upper end by 50 microns. The synthesized mixture may alternatively have a mean particle size less than 30 microns, or a mean particle size between 2-10 microns. The particle size distribution typically ranges from about 0.1 micron to about 200 microns based on volume fraction measurement, using the method described elsewhere herein.

Figure 15:
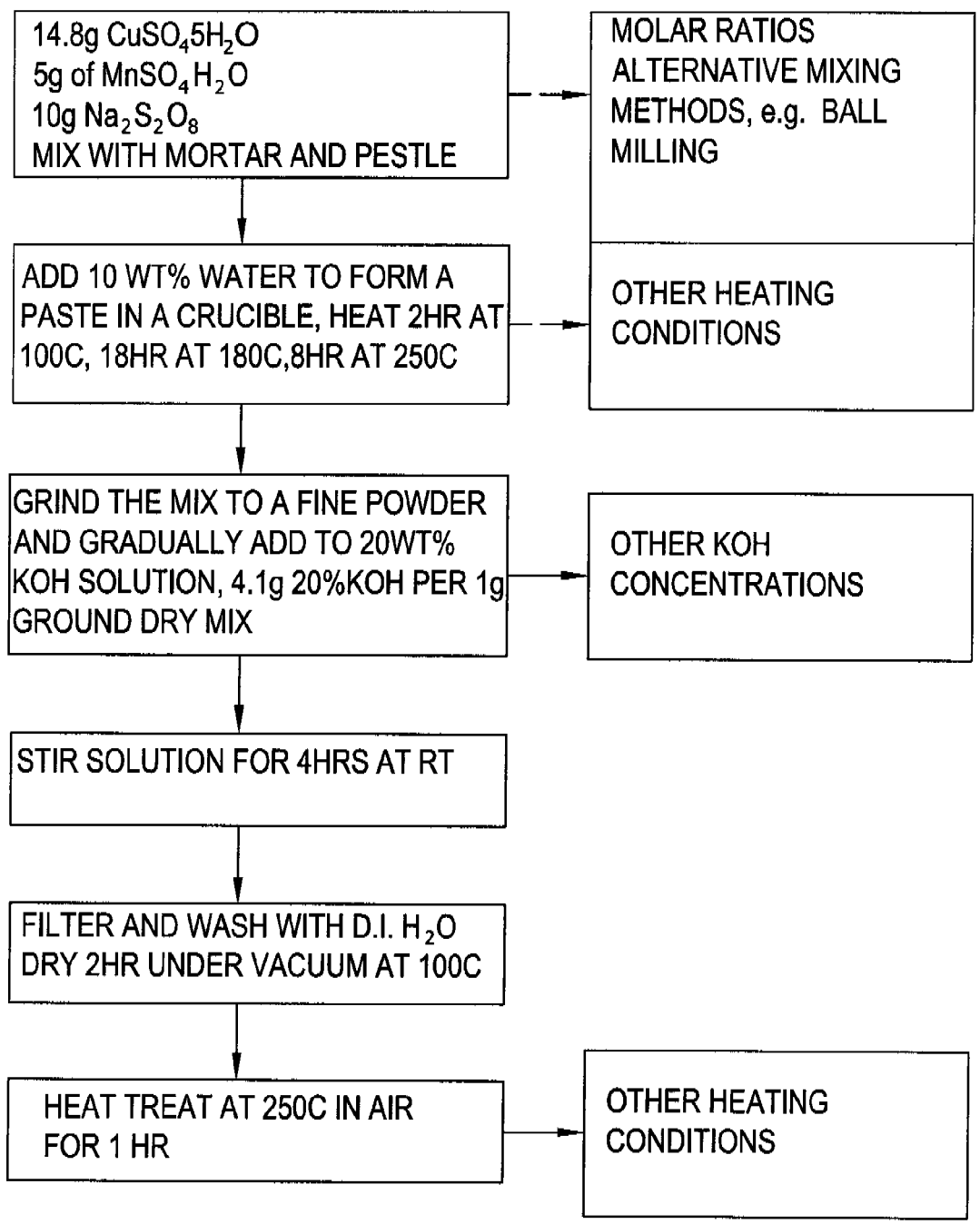
FIG. 15 shows a flowchart representing an alternative process for synthesizing a mixed metal oxide.

A variant of the above solid state synthesis involves the use of copper sulfate ($CuSO_4.5H_2O$) and manganous sulfate ($MnSO_4.H_2O$) with sodium thiosulfate as oxidizer instead of potassium permanganate. This flow chart is shown in FIG. 15 and the material is designated as NMC. Once again, other molar ratios as well as synthesis conditions may be utilized. The discharge Table 3 shows the performance characteristics.

The particle sizes, size distribution and shape allow the material to be compacted very efficiently. In a blend with EMD manganese dioxide, the material again packs very efficiently. As such, cathode densities in a range whose lower end is defined by approximately 3.0 g/cc, 3.1 g/cc, 3.2 g/cc, 3.4 g/cc, 3.6 g/cc cathode volume, and whose upper end is defined by 3.8 g/cc, 4.0 g/cc, and 4.2 g/cc cathode volume, are readily obtained. This also allows significantly more active material to be packed into a cell, including anode gel, to provide batteries with longer service life than previously known. For example, AA cells with delivered capacities greater than about 3.5 Ah may be produced.

It is to be noted that an anode capacity to cell volume ratio greater than about 0.5 Ah/cc may be achieved by utilizing the materials and the cathode densities achievable herein. Additionally, an anode capacity to cell volume ratio greater than about 0.55 Ah/cc, or greater than about 0.6 Ah/cc, or greater than about 0.9 Ah/cc, may also be achieved.

Figure 16:
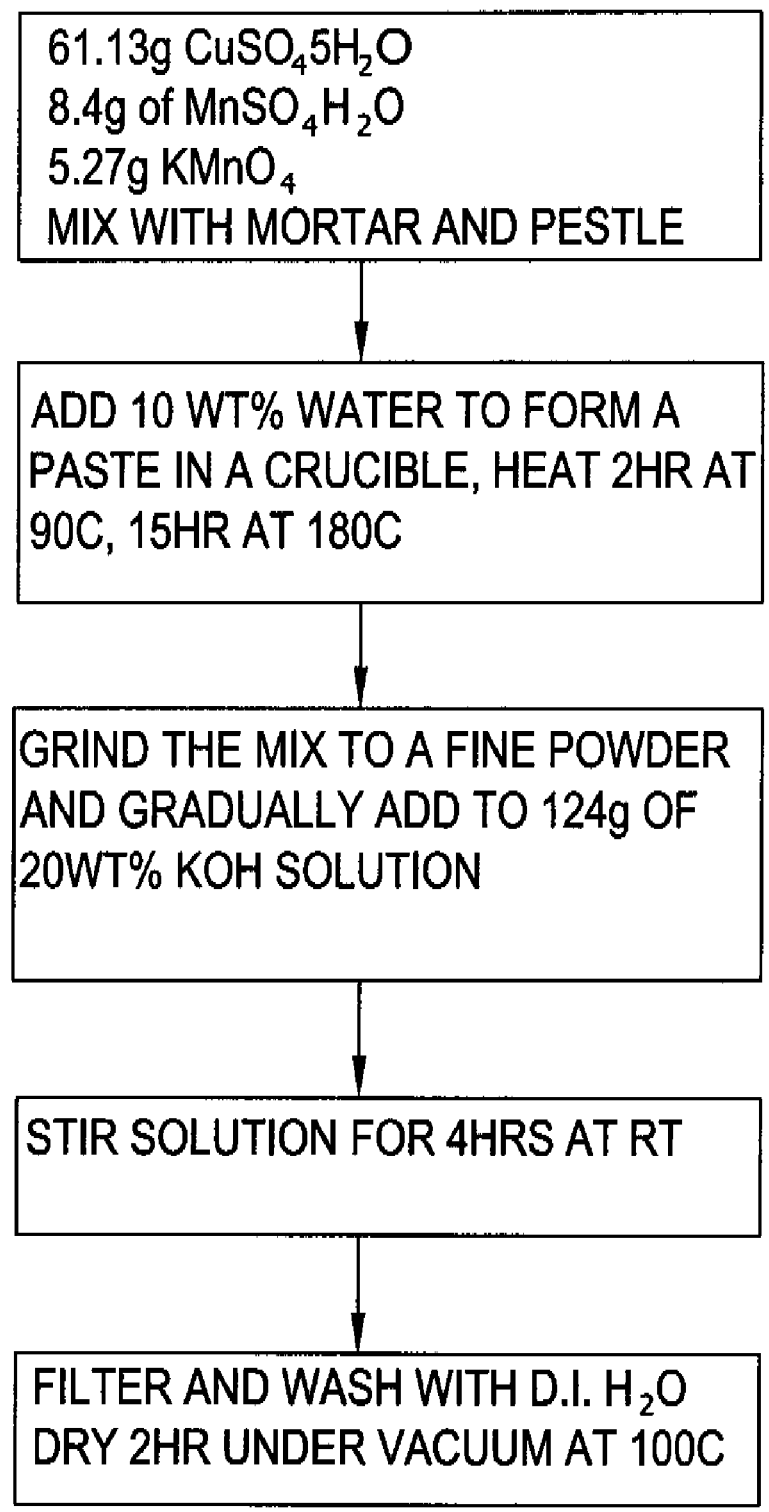
FIG. 16 shows a flowchart representing another alternative process for synthesizing a mixed metal oxide.

A further variant of the above process is shown in FIG. 16, where $CuSO_4.5H_2O$ and $MnSO_4.H_2O$ are mixed with $KMnO_4$ and heated to produce an active cathode mixture designated as the CMK process.

Figure 17:
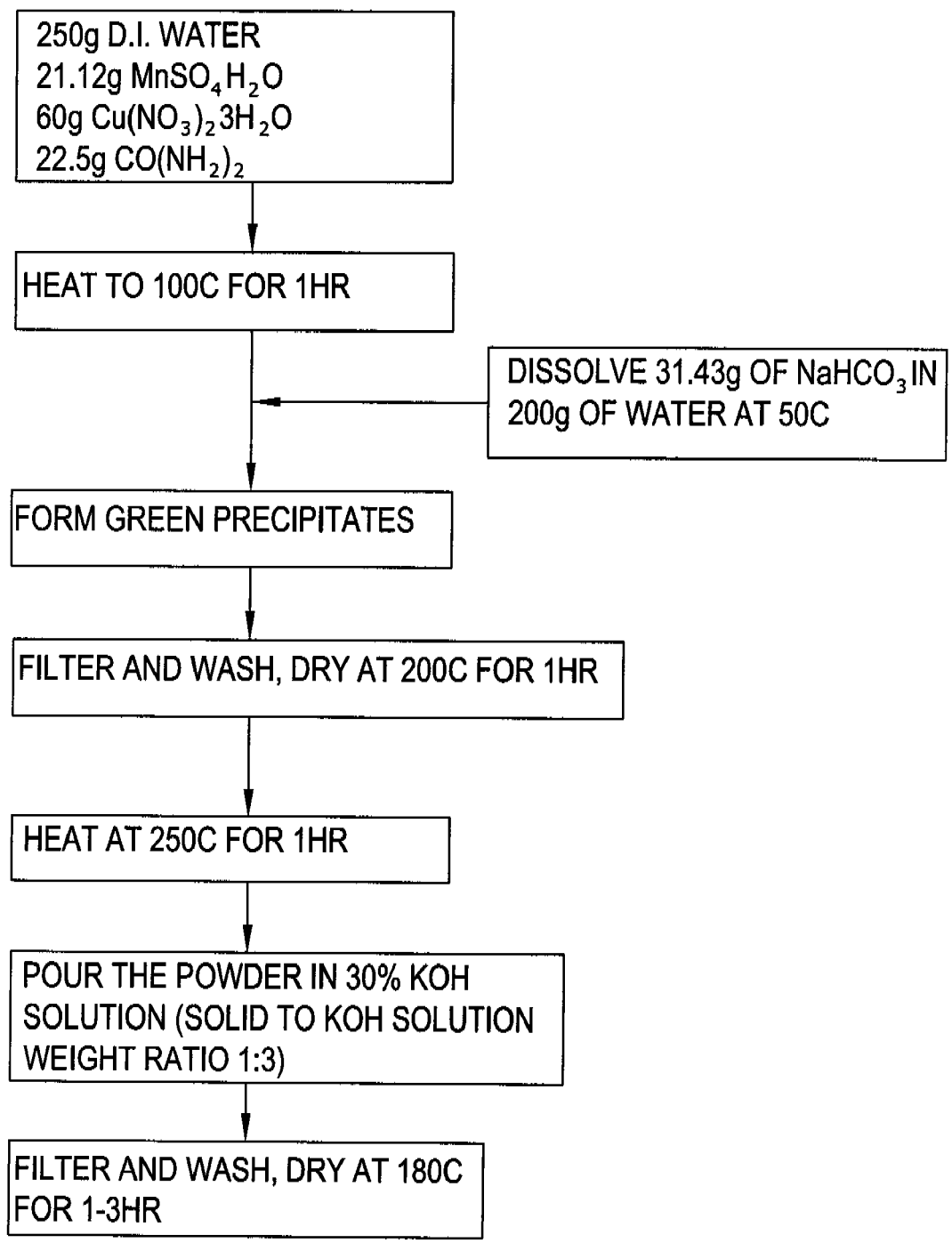
FIG. 17 shows a flowchart representing yet another alternative process for synthesizing a mixed metal oxide.

A urea based co-precipitation process is followed by thermal oxidation as shown in FIG. 17. The material is designated as CuMnZ10B.

Another process can be used to synthesize a higher voltage cathode material containing copper. Specifically, Cu in the +3 state is synthesized in a silver compound using $AgNO_3$ and $Cu(NO_3)_2.3H_2O$, and the mixed solution is oxidized using $K_2S_2O_8$ in the presence of KOH. Such an oxide in KOH would, however, generate anode-fouling copper and silver species. The present invention therefore provides a separator system that overcomes this difficulty and yields a viable battery having an acceptable shelf life, as is described in more detail elsewhere herein.

Figure 18:
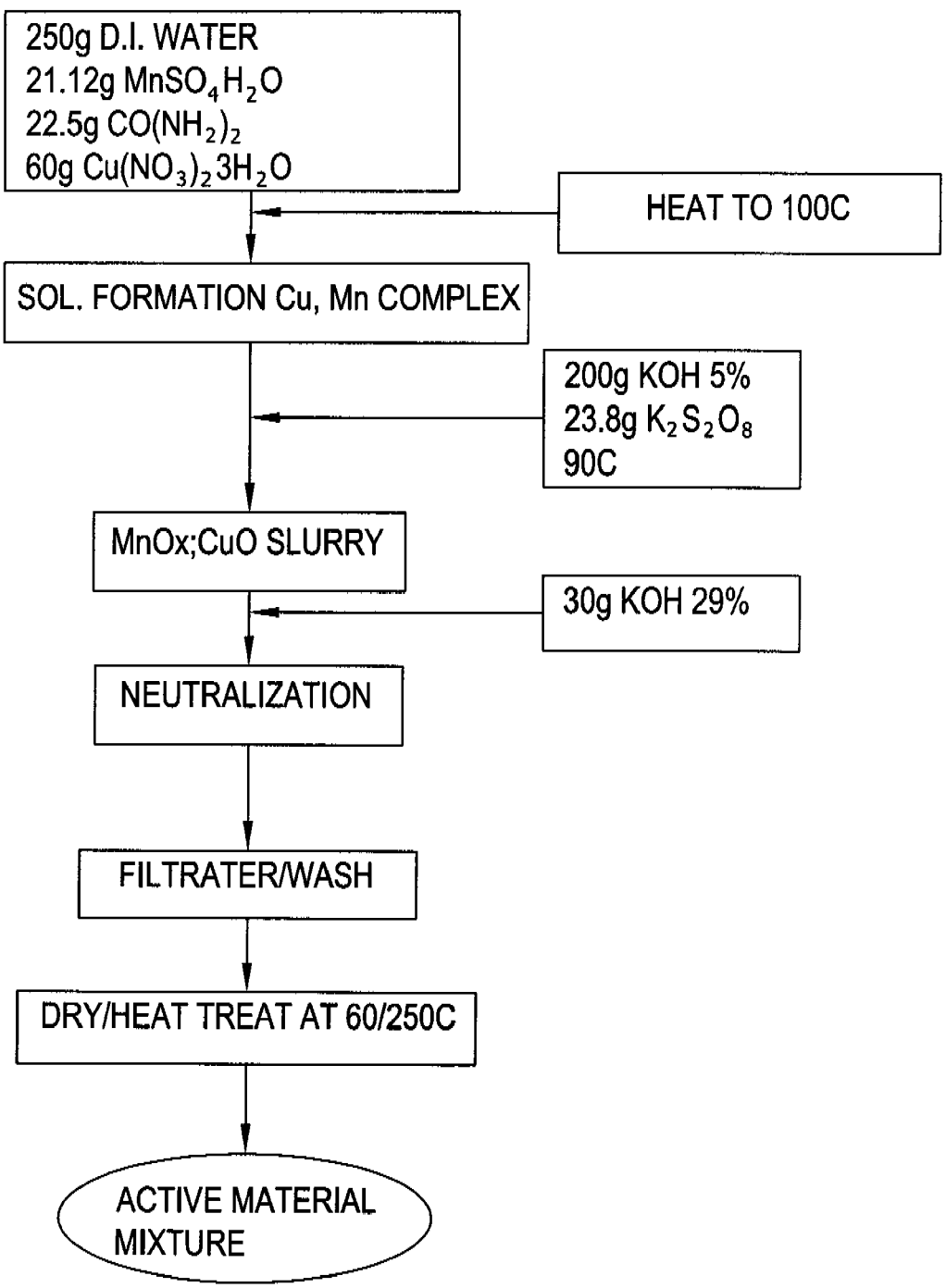
FIG. 18 shows a flowchart representing a process for synthesizing a mixed metal oxide in accordance with still another alternative embodiment.

Still another process designated as a co-precipitation/gelation method involves the formation of a sol as shown schematically in FIG. 18. The active cathode mixture comprising copper and manganese was prepared by the coprecipitation/gelation method from a solution containing copper (II) nitrate trihydrate (1M), manganese (II) nitrate monohydrate (0.5M) and urea (1.5M). The mixed solution was heated to 100° C. and then kept at this temperature until a pH of about 1 was achieved. Prior to gel formation, a hot mixture of an aqueous solution of KOH (10%) and 0.5M $K_2S_2O_8$ was added drop wise until the sol reached a pH of 11. The resulting precipitate was separated by filtration and thoroughly washed with de-ionized water and then oven dried at 60° C. for about 15 hours. Finally, the mixed oxide cake was ground into smaller particles and heat treated in air at 250° C. for 2 hours. The material showed excellent voltage, rate capability and discharge capacity, as indicated in Table 3. The BET surface area of the material from such a process was determined to be about 100 $m^2$/g.

Table 4 summarizes the discharge capacities of the multi-component active cathode samples produced as disclosed herein, and evaluated using the half-cell test described herein.

TABLE 4

Half Cell Test Results of Various Samples Evaluated

| Synthesis ID | Process | Capacity @ 5 mA to 1.0 V mAh/gm | Capacity @ 30 mA to 1 V mAh/gm | Capacity @ 30 mA to 0.9 V mAh/gm |
|---|---|---|---|---|
| MCS5A | Low Temp SS synthesis, $KMnO_4$ oxidizer | 283 | 240 | 274 |
| NMC | Low Temp SS synthesis $Na_2S_2O_8$ oxidizer | 242 | 203 | 243 |
| CMK | Low Temp SS synthesis $KMnO_4$ oxidizer | 302 | 230 | 276 |

TABLE 4-continued

Half Cell Test Results of Various Samples Evaluated

| Synthesis ID | Process | Capacity @ 5 mA to 1.0 V mAh/gm | Capacity @ 30 mA to 1 V mAh/gm | Capacity @ 30 mA to 0.9 V mAh/gm |
|---|---|---|---|---|
| CuMnZ10B | Urea based co-precipitation w/ thermal oxidation | 275 | 235 | 264 |
| ECuMnO10 | Urea based co-precipitation/ gelation method | — | 215 | 273 |

(b) Copper-Manganese Mixed Oxides—$Mn_xCu_yO_z \cdot nH_2O$

It is to be understood that several general synthesis approaches may be utilized to obtain an active cathode material comprising a copper-manganese mixed oxide, as described herein above, using different starting materials, different ratios of starting materials, different mixing rates, different mixing methods, and different reaction conditions. The following, by way of general example, is a description of different redox-precipitation processes in the presence of chelating agents that may be used to prepare these oxides.

Figure 66:
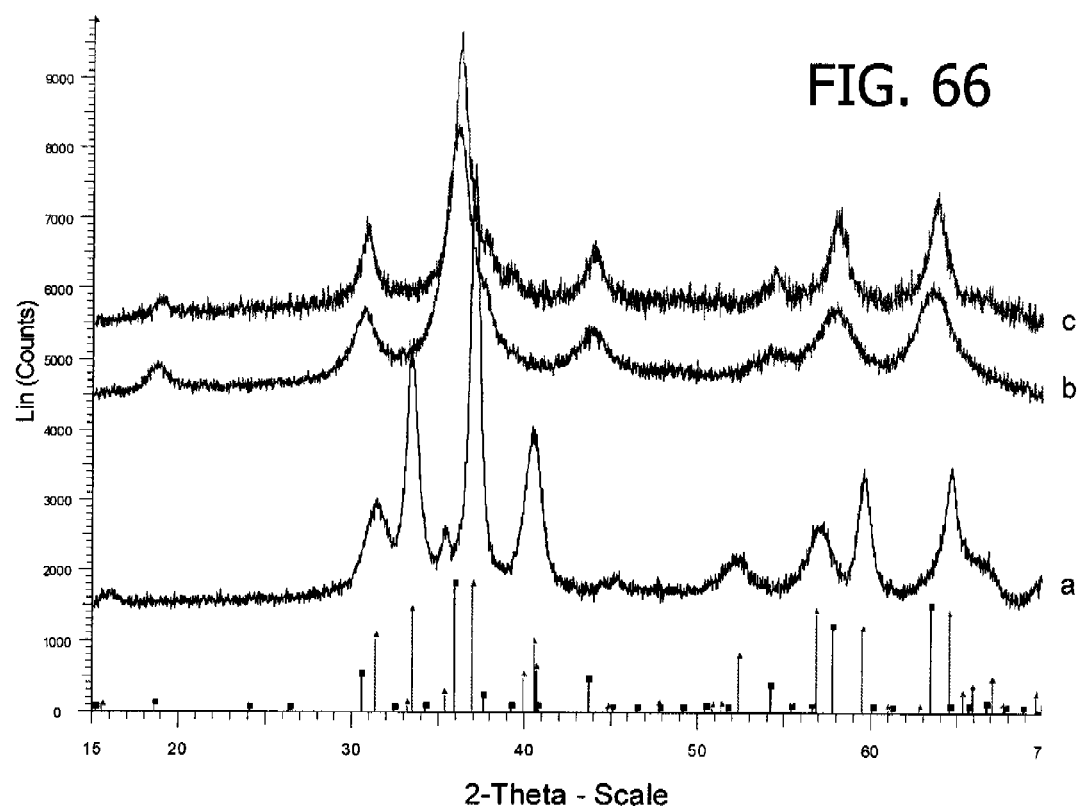
FIG. 66 is a Powder XRD of Process A samples (as further detailed elsewhere herein) compared to the reported patterns for $CuMnO_2$ (crednerite) (see, e.g., ICDD 01-075-1010 (calculated from ICSD using POWD-12++ 1997), Kondrashev, Y. D.; *The Crystal Structure and Composition of Crednerite, $CuMnO_2$*, Kristallografiya (1958), 3, 696) and $Cu_{1.5}Mn_{1.5}O_4$ (see, e.g., CDD 01-070-0260 (calculated from ICSD using POWD-12++ 1997), Salmon, R.; Parent, C.; le Flem, G.; Vlasse, M.; *Neutron Diffraction Study of the Cation Ordering in $Cu_{1.5}Mn_{1.5}O_4$ and $CuMg_{0.5}Mn_{1.5}O_4$*, Acta Crystallogr., Sec. B (1976), 32, 2796); a—60° C. dried intermediate, b—250° C. 1 hour, c—400° C. 2 hours.

In Process A, which is further exemplified in Example 16 below, the copper manganese oxide (with a Cu:Mn molar ratio of about 1:1) is prepared by chemical activation/oxidation of a heated (e.g., about 250° C. in air) Cu—Mn citrate-sulfate precursor in aqueous solution by addition of KOH solution in the presence of oxidants, potassium persulfate ($K_2S_2O_8$) and dissolved oxygen ($O_2$), followed by drying at temperatures between about 60 to 100° C. This is followed by heating in air at temperatures between about 250 to 450° C. The dried intermediate, prior to the final heating, is identified by powder X-ray diffraction (XRD) to be $CuMnO_2$ (crednerite) (see FIG. 66, line a). When this intermediate is heated at or above about 250° C., it converts to spinel as seen in the powder XRD pattern (FIG. 66). The XRD patterns after heating at about 250° C. and 400° C. are very similar, suggesting that no phase changes occur in this temperature range. Thermogravimetric analysis of the samples is consistent with air oxidation of the 60° C. dried intermediate (crednerite) to spinel, showing a weight gain when the intermediate is heated in air above about 200° C. A material heated for about 2 hours at about 250° C. yields an AO/M ratio of about 0.60. A material heated for about 2 hours at about 400° C. yields an AO/M ratio of about 0.65. This non-stoichiometry in the material, with a higher amount of oxygen than in a stoichiometric spinel, is attributed to the presence of cation vacancies at 8a and/or 16d sites in the spinel structure, space group Fd$\bar{3}$m.

Figure 67:
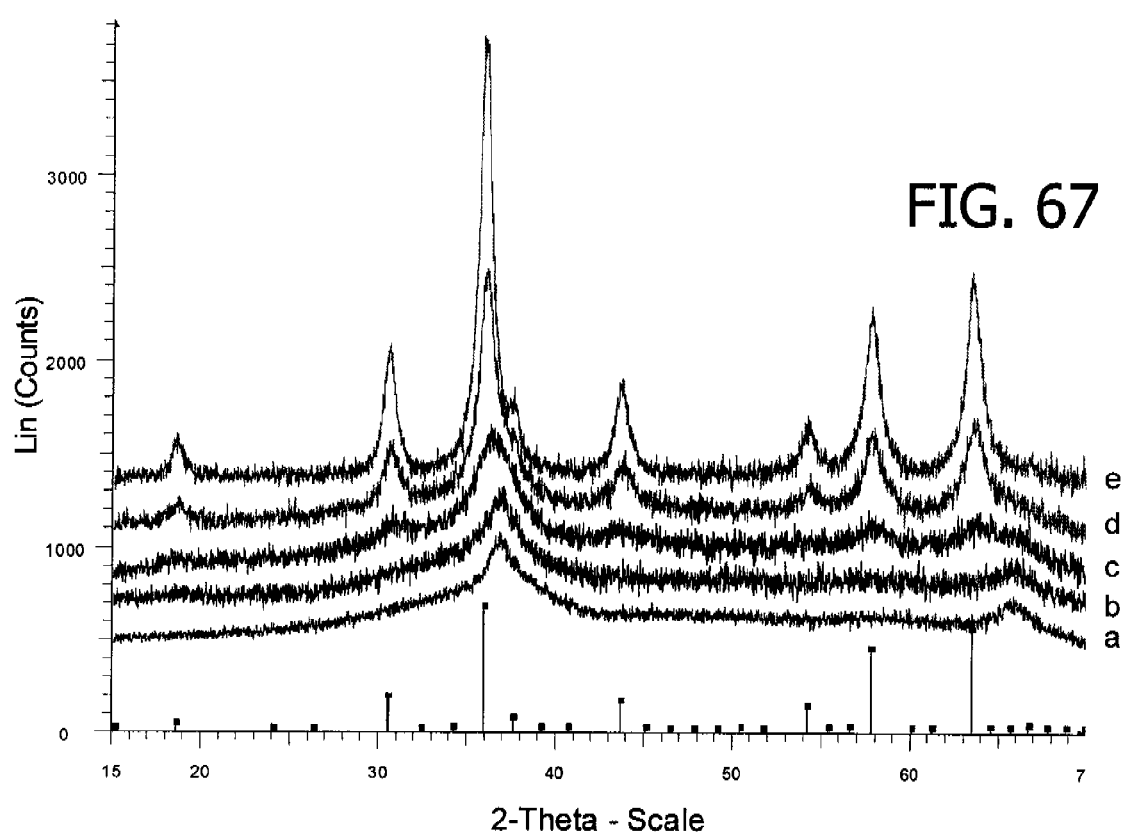
FIG. 67 is a Powder XRD of Process B samples (as further detailed elsewhere herein) heated at temperatures above 250° C. (a—250° C. for 1 hour, b—330° C. for 8 hours, c—400° C. for 2 hours, d—400° C. for 8 hours, e—450° C. for 2 hours) compared to the reported pattern for $Cu_{1.5}Mn_{1.5}O_4$ (see, e.g., CDD 01-070-0260 (calculated from ICSD using POWD-12++ 1997), Salmon, R.; Parent, C.; le Flem, G.; Vlasse, M.; *Neutron Diffraction Study of the Cation Ordering in $Cu_{1.5}Mn_{1.5}O_4$ and $CuMg_{0.5}Mn_{1.5}O_4$*, Acta Crystallogr., Sec. B (1976), 32, 2796).

With an alternate Process B, which is further exemplified in Example 17 below, the copper manganese oxide (with Cu:Mn molar ratio of about 1:1) is prepared by chemical activation through oxidation of a dried (about 15 hours at about 60° C.) Cu—Mn citrate-sulfate precursor in solution by addition of KOH solution in the presence of oxidants, potassium persulfate ($K_2S_2O_8$) and dissolved oxygen ($O_2$), followed by drying at temperatures between about 60 and 100° C., subsequently followed by heating in air at temperatures between about 200 and 450° C. for times ranging from 1 to 8 hours. Chemical analyses of the final products after heating between about 200 to 450° C. yields AO/M ratios between about 0.65 and 0.75, indicating non-stoichiometry and cationic vacancies at 8a and/or 16d sites in the spinel structure, space group Fd$\bar{3}$m. In the powder XRD pattern, all the spinel peaks are not evolved, possibly due to lack of long range ordering and/or nanocrystallinity associated with these samples (see FIG. 67). As it is known to one of ordinary skill in the art, low or medium temperature solution-based preparation methods often produce significant amounts of materials lacking long-range order, which are difficult to characterize by powder XRD analysis. Most of the characteristic X-ray diffraction peaks for crystalline spinel phase are only observed when the dried precipitate is heated in air at about 400° C. or higher temperatures. DSC analysis of the 60° C. dried intermediate heated up to about 400° C. is consistent with gradual loss of water and oxygen; the heat flow signal does not show an exothermic or endothermic peak characteristic of a distinct structural transformation between about 250° C. and 400° C. This supports the XRD interpretation that changes in the powder XRD may simply be due to development of long range order in an amorphous and/or nanocrystalline spinel phase.

It is believed that in the example Process A, crystalline $CuMnO_2$, which is formed as an intermediate, is converted to crystalline spinel (with a fair amount of long range order)—$Mn_xCu_yO_{4+\delta} \cdot nH_2O$ (where y<3, x=3−y, x/y is about 1, and $0 \leq \delta \leq 0.5$)—by incorporation of oxygen from air during the final heating of the dried intermediate at elevated temperatures. In the example Process B, the $Mn^{2+}$ ions in the solution are oxidized to $Mn^{4+}$ and coprecipitated out of solution with $Cu^{2+}$. The copper manganese mixed oxide with the general formula $Mn_xCu_yO_{4+\delta} \cdot nH_2O$ (where y<3, x=3−y, x/y is about 1, and $0 \leq \delta \leq 0.5$) and the defect spinel structure that is characterized by cation vacancies in 8a and/or 16d sites in the spinel structure, space group Fd$\bar{3}$m, are believed to be formed during this oxidation and co-precipitation process. The material however, does not exhibit sufficient long range order to show a pattern characteristic of crystalline spinel in powder XRD measurements. Long range order can however, be established by heating the dried intermediate in air or oxygen at temperatures in the range of from about 400 to 450° C. This shows that even small variations in the process can change the formation mechanism of the said copper-manganese mixed oxides.

Citrate, the anion of the hydroxyl tricarboxylic citric acid ($C_6H_8O_7$) is able to form chelate complexes with various metals. Several Mn(II) and Mn(III)-citrate complexes are described in the literature. (See, e.g., Klewicki, J. K.; Morgan J. J.; *Kinetic Behavior of Mn(III) Complexes of Pyrophosphate, EDTA, and Citrate*, Environ. Sci. Technol. (1998), 32(19), 2916; Matzapetakis, M.; Karligiano, N.; Bino, A.; Dakanali, M.; Raptopoulou, C. P.; Tangoulis, V.; Terzis, A.; Giapintzakis, J.; Salifoglou, A.; *Manganese Citrate Chemistry: Syntheses, Spectroscopic Studies, and Structural Characterizations of Novel Mononuclear, Water-Soluble Manganese Citrate Complexes*, Inorg. Chem. (2000), 39(18), 4044; and, Wang, W.; Zhang, X.; Chen, F.; Ma, C.; Chen, C.; Liu, Q.; Liao, D.; Li, L., *Homo-and Hetero-Metallic Manganese Citrate Complexes: Syntheses, Crystal Structures and Magnetic Properties*, Polyhedron (2005), 24(13), 1656). It is recognized that the presence of citrate as a chelating anion plays an important role in the oxidation of Mn(II) and facilitates the formation of the desired defect spinel phase by the redox-precipitation process. In the preparation of mixed oxide compounds described here, it is believed that both Cu and Mn ions become immobilized in the citrate network, facilitating their oxidation in subsequent steps of chemical activation or thermal treatment. This is deduced from the comparison of example Process A, which leads to a lower-oxidation state $CuMnO_2$ intermediate after chemical oxidation of the heated precursor (250° C.), and example Process B, which leads to a higher oxidation state defect spinel intermediate after chemical oxidation of the dried precursor (60° C.) and precipitation. It is believed that heating of the precursor in Process A leads to thermal decomposition of the citrate, since heating of model manganese and copper citrate salts led to the formation of $Mn_3O_4$ (onset at about 240° C.) and a mixture of $Cu/Cu_2O/CuO$ (onset at about 220° C.), respectively, suggesting that lower oxidation states can result by decomposition of the citrate. Hence, the more beneficial effects of citrate in the oxidation-precipitation process are expected in Process B. While not intending to be bound by any particular theory, a review of literature suggests that the influence of citrate might be related to (i) kinetic stabilization of the thermodynamically unstable Mn(III) in an aqueous solution, which retards disproportionation into Mn(II) and Mn(IV) (see, e.g., Klewicki, J. K.; Morgan J. J.; *Kinetic Behavior of Mn(III) Complexes of Pyrophosphate, EDTA, and Citrate*, Environ. Sci. Technol. (1998), 32(19), 2916; and, Greenwood, N. N.; Earnshaw, A.; *Chemistry of the Elements,* 2nd edition, Butterworth-Heinemann, Oxford 1997, §24.3.4, pp. 1057) and/or (ii) accelerating Mn(II) oxidation by $O_2$ (see, e.g., Klewicki, J. K.; Morgan J. J.; *Kinetic Behavior of Mn(III) Complexes of Pyrophosphate, EDTA, and Citrate*, Environ. Sci. Technol. (1998), 32(19), 2916). It is envisioned that other inorganic or organic complexing agents may have similar effects and may also promote formation of the spinel intermediate. Examples of those may include, but are not limited to, pyrophosphate, acetylacetonate, ethylenediaminetetraacetate, lactate, maleate, and tartrate. Other organic polyfunctional acids possessing at least one hydroxyl and one carboxylic group, such as maleic, tartaric, glycolic or lactic acid, may also be used to form the precursor in presence of metal salts.

As is known to one of ordinary skill in the art, several factors—including the preparation process, composition, constitution and thermal treatment—can substantially influence the structure, degree of order (e.g., defect density, crystallinity, etc.), chemical behavior and the electrochemical performance of the resulting copper manganese mixed oxide. Hence, it is also envisioned that the oxidation of the starting materials and the precipitation of the mixed oxide can also be carried out with different oxidizing agents (including, but not limited to, hydrogen peroxide, $H_2O_2$, ozone, $O_3$, and potassium permanganate, $KMnO_4$) and under different conditions (including, but not limited to, reactant concentration, time, temperature, pH, nature and concentration of chelating agents present, etc.). Furthermore, different washing and heat-treatment procedures may also be applied to intermediates in the process.

(v) Other Cathode Properties/Details

In view of the foregoing, it is to be noted that a cathode having a discharge capacity greater than about 220 mAh/gm of actives may be prepared, or alternatively greater than about 250 mAh/gm, greater than about 275 mAh/gm, greater than about 300 mAh/gm, or greater than about 320 mAh/gm of actives may be prepared, as determined from the half-cell test described above, performed at 5 mA constant current to 1V versus a zinc reference.

Alternatively, a cathode having a discharge capacity greater than about 180 mAh/gm of actives may be prepared, or greater than about 200 mAh/gm, greater than about 220 mAh/gm, greater than about 250 mAh/gm, greater than about 275 mAh/gm, or greater than about 300 mAh/gm of actives may be prepared, as determined using the half-cell test described above, at 30 mA constant current discharge to 1V versus a Zinc reference.

Additionally, it is to be noted that the synthesized mixture comprising the cathode material may have a BET surface area greater than about 1 $m^2/g$, greater than about 5 $m^2/g$, greater than about 20 $m^2/g$, greater than about 30 $m^2/g$, greater than about 60 $m^2/g$, greater than about 70 $m^2/g$, greater than about 100 $m^2/g$, or even greater than about 150 $m^2/g$.

A suitable cathode active material can be obtained by a combination of physical admixing with chemical synthesis. This combination provides copper oxide on the surface of the manganese oxide to facilitate smooth transitions between the phases and discharge profiles of the individual compounds. Using this combination, it is possible to obtain the voltage profiles shown in FIG. 19. The opposite may also be applicable, whereby $MnO_2$ or other material could be provided on the surface of the CuO.

Figure 19:
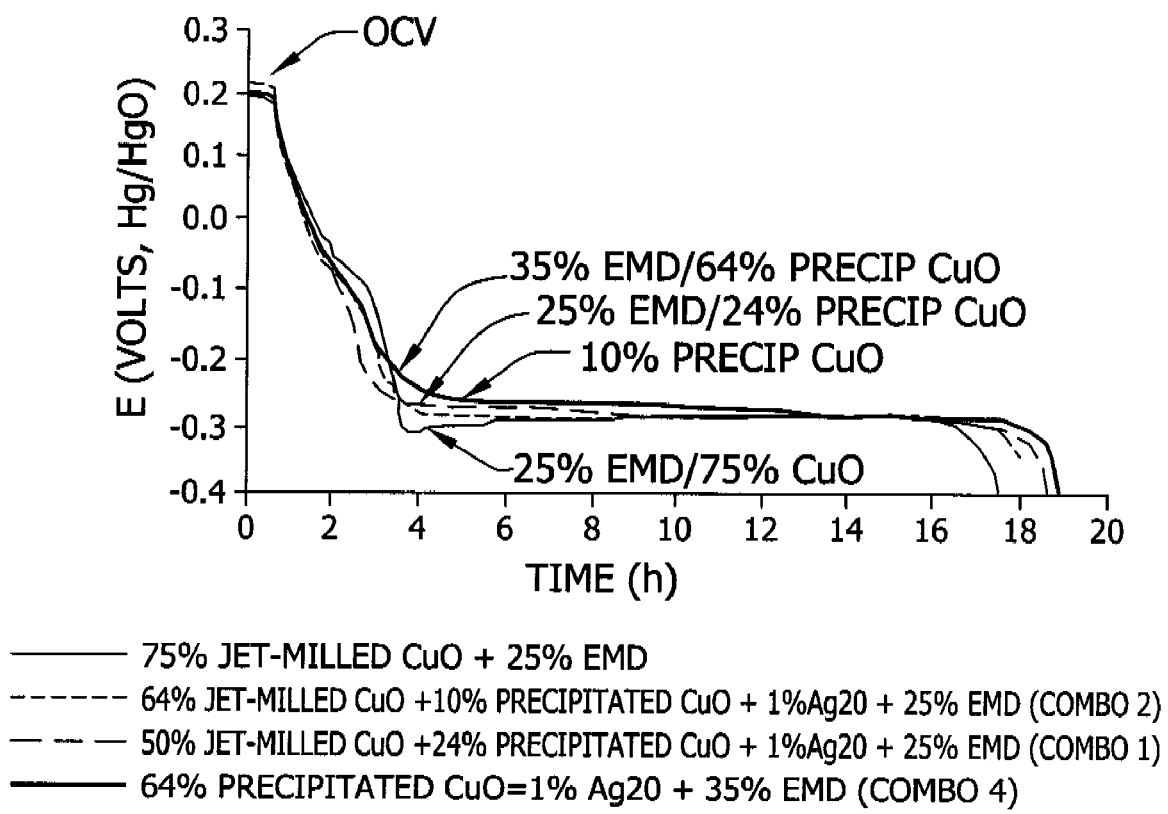
FIG. 19 shows a graph representing the smoothening behavior of EMD/CuO transition by a combination of mechanical mixing and chemical synthesis/precipitation of CuO on to Commercial $MnO_2$ (EMD) under 5 mA discharge conditions.

In such a method, CuO and $Ag_2O$ are precipitated from $CuSO_4$ and $AgNO_3$, respectively in alkali media in the presence of EMD. The cathode material can contain for example, 64% CuO, 35% EMD and approximately 1% $Ag_2O$ added as a conductivity enhancer. The $Ag_2O$ will discharge first, producing highly conducting metallic silver in the cathode. Synthetic, natural or expanded graphites as are well known in the art to provide adequate electronic conductivity and integrity to the cathode. The resulting cathode, shown in FIG. 19, shows significant increase in the initial voltage, while providing discharge capacity significantly greater than the $MnO_2$. The flat portion of the discharge is also approximately 45 mV higher on average, than the voltage of CuO alone. The transition from $MnO_2$ behavior to CuO behavior is also smoother in FIG. 19 than is the transition in FIG. 4. It is advantageous that discharge capacity of the cell is higher than in conventional cells over a range of discharge rates.

The cathode can also be provided with an agent that may reduce anode-fouling soluble species from migrating from the cathode toward the anode by interacting with the soluble species. Agents such as polyvinyl alcohol, activated carbon, natural and synthetic clays and silicates such as Laponite®, etc. have shown an ability to adsorb or block ionic species, and may suitably be introduced into the cathode, anode, separator, or electrolyte.

In light of the foregoing, however, it is understood that the cathode may be constructed of copper oxide, manganese dioxide or any other suitable cathode active materials or combinations thereof without departing from the scope of this invention.

Also contained in the container of FIG. 1 is an anode 18 located on the inner diameter of a separator 20 so that the separator physically separates the anode 18 from the cathode 16. The anode 18 can be formed in any suitable manner, and may suitably comprise a mixture including an anode metal (e.g., zinc) provided as a powder, an aqueous alkaline electrolyte and a gelling agent. Examples of suitable anode 18 formulations are discussed in co-assigned U.S. Pat. No. 6,040,088, the entire disclosure of which is incorporated herein by reference. Additional electrolyte (not shown in the Figures) may be added to the container 8 to partially wet the anode 18, the cathode 16 and the separator 20. Suitable electrolytes include potassium hydroxide and sodium hydroxide in an alkaline battery, but other compositions can be used without departing from the scope of the present invention.

It should thus be appreciated that an electrochemical cell may be prepared which includes an anode, and a cathode comprising a cathode active material. The cathode active material includes a mixture, the mixture including a first component, a second component and a third component. The first component includes a first element, the second component includes a second element, and the third component includes the first element and the second element. A separator is disposed between the anode and the cathode.

The ratio of the above-noted first component to the second component, by weight, may be greater than 1/100, or greater than 1/20, or greater than 1/10, or greater than 1/2, or even greater than 1/1.

Alternatively, the ratio of the above-noted second component to the first component, by weight, may be greater than 1/100, or greater than 1/20, or greater than 1/10, or greater than 1/2, or greater than 1/1.

The mixture may be further combined with at least one of a copper oxide, a manganese oxide, a silver oxide and a nickel oxide to produce an active material combination, wherein the mixture is present in at least about 1% by weight, or alternatively at least about 2% by weight, or alternatively at least about 5% by weight, or alternatively at least about 10% by weight, or alternatively less than about 99% by weight, or alternatively less than about 95% by weight, or alternatively less than about 90% by weight.

It should be appreciated that an electrochemical cell may alternatively be prepared which includes an anode, and a cathode including a cathode active material. The cathode active material includes a mixture of manganese oxide, an oxide of copper, and a component identified by $M_xCu_yO_z$, wherein M is an element capable of producing mixed oxides or compounds or complexes, x is less than 20 (alternatively $1 \leq x \leq 5$), y is less than 20 (alternatively $1 \leq y \leq 5$), and z is less than 100 (alternatively $1 \leq z \leq 20$). A separator is disposed between the anode and the cathode. The mixture is present in at least about 1% by weight of the combination, or alternatively at least about 2% by weight of the combination, or alternatively at least about 5% by weight of the combination, or alternatively at least about 10% by weight of the combination, or alternatively less than about 99% by weight of the combination, or alternatively less than about 95% by weight of the combination, or alternatively less than about 90% by weight of the combination.

III. Anode

As noted above, a high capacity anode-formulation is also provided for use in alkaline cells. As noted, cathodes of conventional alkaline cells, for example cathodes whose cathode active ingredient is $MnO_2$, consume more water by the cathodic reaction than is produced by the anodic reaction (i.e., the reaction of zinc anode and electrolyte). Hence, the total cell reaction, as represented, consumes water as shown below and is thus said to be "water consuming":

$$Zn + MnO_2 + H_2O \rightarrow ZnO + MnOOH$$

The zinc anodes of conventional alkaline cells are thus generally limited to a concentration (loading) of zinc by weight below 70% in the anode because higher zinc loadings will not discharge efficiently, as the anode would not contain sufficient quantities of electrolyte to properly sustain the water consuming reaction in the cathode. Furthermore, high zinc loadings with conventional particle size distributions result in higher mass transfer polarization due to the low porosity of these anodes leading to early anode passivation and premature failure.

The anode provided herein in accordance with this embodiment is usable in an electrochemical cell whose cathode consumes less water than conventional alkaline manganese dioxide cells, and achieves a higher discharge efficiency compared to conventional cells. Because the copper oxide and mixed copper oxide active materials of the cathode are low-water consuming, the amount of electrolyte required in the anode is reduced relative to a conventional zinc manganese dioxide alkaline cell. The low-water consuming reaction advantageously permits an increase in zinc loading in the anode and thereby facilitates a longer cell service life.

It has been determined that a CuO-containing cathode is one example of a cathode that consumes less water than alkaline manganese dioxide cells. A zinc/air battery cathode is an example wherein the reaction does not consume water and the anode operates efficiently at anode zinc loadings of 68% to 76% by weight, relative to the total weight of the anode (including electrolyte), which is significantly higher than in a conventional alkaline manganese cell.

An anode thus constructed in accordance with these determinations or observations can be "drier" than conventional electrochemical cells, meaning that the anode has a higher loading of zinc particles that can be efficiently discharged with reduced electrolyte concentrations, given the following anodic cell reaction:

$$Zn + 4OH^- \rightarrow Zn(OH)_4^{2-} + 2e^-$$

Without being bound to a particular theory, it is believed that in conventional alkaline batteries, the depletion of hydroxide ions can become prominent during medium and high continuous discharge rates (e.g., greater than 250 mA for a size AA cell) and induce depressed cell performance due to anode failure in these cases. Furthermore, when the electrolyte is saturated with zincate ($Zn(OH)_4^{2-}$) produced in the above reaction, the zincate precipitates to form zinc oxide which, in turn, passivates the zinc anode, thereby lowering cell performance. Conventional zinc powders contain particles having a wide distribution of particle sizes ranging from a few microns to about 1000 microns, with most of the particle size distribution ranging between 25 microns and 500 microns. Therefore, in order to achieve proper discharge of such conventional zinc powders, a KOH concentration above 34% is conventionally used and necessary. A potassium hydroxide concentration less than 36% (for example between 25% and 34% potassium hydroxide concentration) is desirable, using principles of the present invention while avoiding premature anode passivation that would occur in a conventional cell.

It has been discovered that a narrow particle size distribution as described in more detail below allows the use of electrolyte concentrations significantly lower than in conventional alkaline batteries. This in turn further favors lower Cu solubility into the electrolyte, better wetting of the cathode surface and assists the discharge efficiency of the cathode.

Specifically, a KOH concentration less than 36% (for example between 25% and 34% KOH concentration) is desirable, using principles set forth herein while avoiding premature anode passivation that would occur in a conventional cell.

It is recognized that the particle size distribution ("PSD") of the zinc plays a role in enhancing the effectiveness of discharge in a low electrolyte concentration anode and/or high zinc loading anode, as is described in more detail below. In particular, several PSD's have been identified that allow the use of the lower electrolyte concentrations while providing the necessary anode porosity for an efficient discharge at high zinc loadings.

It is has been discovered that physical modifications to the anode can also improve cell service life, either alone or in combination with chemical modifications noted above. For example, one can efficiently discharge cells having an advantageously lower concentration of hydroxide ions in the electrolyte than can be used in conventional cells by reducing diffusion resistance for the hydroxide ions. This can be accomplished, for example, by adjusting the zinc particle size distribution to provide in the anode a narrow distribution of similar zinc particle sizes, thereby enhancing porosity (diffusion paths) for the hydroxide ion transport. In addition to improving mass transport in the gelled anode matrix, the particle size distributions set forth herein also provide increased porosity, which allow for less precipitation of ZnO on the zinc particle surface, thereby delaying anode passivation compared to the particle size distributions typically found in conventional cells. This approach is effective for use in the anodes set forth herein and can be used alone or in combination with other improvements disclosed herein.

Similarly, a suitable zinc particle size distribution is one in which at least about 70% of the particles have a standard mesh-sieved particle size within a 100 micron size range and in which the mode of the distribution is between about 100 microns and about 300 microns. It is desirable that 70% of the particles be distributed in a size distribution range even more narrow than 100 microns, for example 50 microns or even 40 microns or less.

A suitable gelled anode as described herein comprises a metal alloy powder (desirably an alloyed zinc powder), a gelling agent and an alkaline electrolyte. One skilled in the art can readily select a suitable zinc powder (alloyed with one or more of In, Bi, Ca, Al, Pb, etc.). As used herein, "zinc" refers to a zinc particle that may include an alloy of zinc as is well known to one skilled in the art. Another aspect of the electrochemical cells described herein is that the anode may contain little or no mercury (e.g., less than about 0.025% by weight). It is noted that known gelling agents other than the desirable sodium polyacrylate gelling agent are suitable for use in various aspects of the present invention. Such gelling agents include carboxymethyl cellulose, crosslinked-type branched polyacrylate acid, natural gum, and the like.

In addition to the foregoing, the anode may also comprise a surfactant such as, for example, an oxazoline-type surfactant, which can be a fatty oxazoline surfactant, as an additive in the alkaline electrochemical cell anode. One example of an alkaline electrochemical cell comprising an anode with an oxazoline surfactant additive is disclosed in co-assigned U.S. patent application Ser. No. 10/020,685, the entire disclosure of which is incorporated herein by reference. A preferred oxazoline surfactant for use in the electrochemical cell of the present invention is ethanol, 2,2'-[(2-heptadecyl-4(5H)-oxazolydine) bis (methyleneoxy-2,1-ethanedyloxy]bis, commercially available as Alkaterge™ T-IV (Angus Chemical, Northbrook, Ill.).

It has been discovered that another factor that controls cell performance relates to the surface area of the anode. Specifically, increasing the active anode electrode surface area provides sufficient active reaction sites needed to keep up with the cathode reaction at high discharge rates. Accordingly, cells are provided having a predetermined amount of zinc particles (which may either be in the form of zinc or a zinc alloy) added to the anode gel. In accordance with one embodiment set forth herein, zinc particles less than about 75 microns (−200 mesh size) may be used; that is, particles that may be used that pass through a 200 mesh screen size are present in the anode in an amount less than about 10% by weight, relative to the total zinc in the anode (including coarse zinc particles), and desirably within the range of 1% and 10%, alternatively between the range of 1% and 8%, or alternatively within the range of 4% and 8%, it being appreciated that smaller particles further increase the effective surface area of the anode. Mesh sizes are stated herein to specify a range of particle sizes. For example, −200 mesh indicates particles smaller than 75 microns, while +200 mesh indicates particles larger than 75 microns. Alternatively, desirable results may also be attained using an amount of zinc fines greater than 10%, while the zinc particles having a diameter between 75 and 105 microns (+75 and −140 mesh size) may be present at anywhere between 1% and 50%, and more suitably between 10% and 40%, by weight of total zinc present in the anode.

It is recognized that multiple ranges of zinc particles having a diameter less than 105 microns (−140 mesh size) including particles between 75 and 105 microns (+200 and −140 mesh size) and zinc fines less than 75 microns (−200 mesh size), may be used to increase cell performance. For instance, the anode may include zinc particles between 75 and 105 micrometers, with the advantages in cell performance being enhanced when the anode gel has an electrolyte (KOH) concentration less than 30%, alternatively between 20% and 30%. When zinc fines have a size between the range of 20 and 75 micrometers (+625 and −200 mesh size), and alternatively between 38 and 75 micrometers (+400 and −200 mesh size), cell performance is particularly enhanced when the KOH concentration is between 30% and 40%, and desirably between 33% and 38%. Yet another suitable range is between 20% and 34%, alternatively, between 25% and 33%, and alternatively, between 25% and 30%. A "low KOH concentration" as used in this disclosure refers to a KOH concentration within or below any of the above-stated ranges.

Although it is known that improved cell performance can result from the use of zinc fines in combination with the low KOH concentrations, one skilled in the art would also recognize the benefits of the use of zinc fines and reduced KOH concentration individually.

While it is particularly desirable to increase the cell operating voltage in CuO containing cells which are generally associated with lower cell potentials, it will be appreciated that the details set forth herein provide for cathodes that contain oxides that comprise copper, but wherein the cathode contains not CuO alone, but CuO in combination with other oxides, sulfides, or mixed copper oxide materials. Additionally, the cathode may be more water consuming in some instances than in others. Accordingly, depending upon the composition of the cathode, one skilled in the art will be able to determine the acceptable modification to the anode that corresponds to the reduced water consumption of such cathodes.

Lower electrolyte concentrations are desirable in the copper or silver containing systems to improve reaction kinetics, reduce copper or silver dissolution (hence migration into the anode), and achieve a high operating voltage. The use of a lower concentration electrolyte (relative to the electrolyte concentration in the anode) to prewet the cathode is believed to result in performance improvements attributed to improved wettability of the cathode. Lower copper or silver ion migration to the zinc reduces self-discharge and gassing at the anode during storage, which results in improved shelf life. Low anode polarization also contributes to achieving the desired close circuit voltage in the cell.

Various versions of the anode described herein result in a number of advancements in the art when compared to conventional anodes usable in a typical $Zn/MnO_2$ alkaline cell. These advancements include:

1. Higher zinc loadings that take advantage of the low-water consuming cathode reaction compared to a conventional $Zn/MnO_2$ alkaline cell. If one were to increase zinc loadings in a conventional alkaline cell, it would typically result in less electrolyte (less water) available for the cathode and thereby inhibit cathode discharge performance. The high water consuming chemistry therefore restricts the overall cell design in conventional cells. In addition, the high capacity and/or density of CuO allows higher capacity cathodes to be packed in less volume than $MnO_2$ cathodes, allowing higher quantities of anode to be placed in the cells, while still maintaining a level of electrolyte required by the cell. This significantly increases the anode capacity to cell volume ratio (Ah/cc) compared to conventional alkaline cells into a range that was not previously known to be attainable. For instance, conventional commercial alkaline cells are restricted to an anode capacity/internal cell volume ratio of ~0.5 Ah/cc based on a zinc capacity of 820 mAh/gm and an $MnO_2$ capacity of 400 mAh/gm based on a 1.33 electron reduction of $MnO_2$. A cell constructed in accordance with various details provided herein achieves an anode capacity/cell internal volume ratio >0.5 Ah/cc, between 0.55 and 0.9 Ah/cc, and further between 0.55 and 0.7 Ah/cc. The PSD, particle shape, and electrolyte concentration of this invention allows high zinc loading anodes to be discharged at a high efficiency. This results in higher cell capacity.

2. The proper choice of zinc powder PSD enables the use of lower electrolyte concentrations without the premature passivation that would otherwise occur with regular powders in conventional alkaline cells. In particular, passivation generally occurs in electrochemical cells when the anodic reaction produces zinc oxide, which covers the remaining zinc in the anode, thereby preventing the KOH from accessing and reacting with the remaining zinc. It is well known that conventional $MnO_2$ alkaline cell anodes having conventional PSD prematurely passivate when lower electrolyte concentrations are used. Conventional anode particle sizes are distributed between 45-500 microns, thus within a broad range of 455 microns, rather than a narrow range of 100 to 150 microns that is envisaged by the present inventors.

Figure 20:
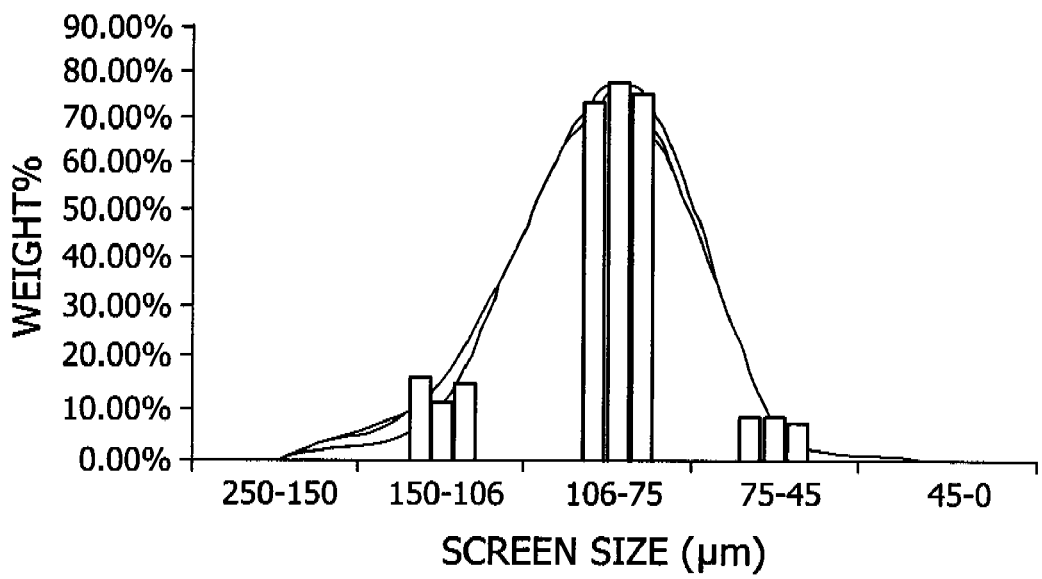
FIG. 20 is a graph plotting the particle size distribution of sieved zinc alloy anode particles.

Alternatively, the zinc PSD's disclosed herein desirably can be distributed within a narrow window of 200 microns and, alternatively, 150 microns, meaning that between and including 90% and 95%, and up to 100%, of the particle sizes, by weight, are within the 150, or 200, micron window, and in particular are tight distributions substantially centered around 100 μm, 175 μm, and 250 μm, and 300 μm (meaning that between and including 90% and 95%, and up to 100% of the zinc particles have particle sizes centered around the specified sizes). One skilled in the art will recognize that mesh sizes corresponding to these particle sizes can be identified using ASTM Designation: B214-99. The PSD's herein increase the zinc anode porosity, thereby reducing passivation. A zinc powder with a tight PSD centered around 100 μm is illustrated, for example, in FIG. 20. Similar distributions centered about 175 μm and 250 μm, as described above, may also be used/achieved. The zinc powder illustrated in FIG. 20 includes additives including bismuth, indium, and lead as will be understood by those having ordinary skill in the art. It is to be noted that the "sieved zinc" referred to in the examples refers to zinc having a particle size distributed as shown in FIG. 20. One skilled in the art would recognize that BIP refers to the alloying additives incorporated by manufacturers, and refers to Bismuth, Indium and Lead in the zinc.

Figure 21:
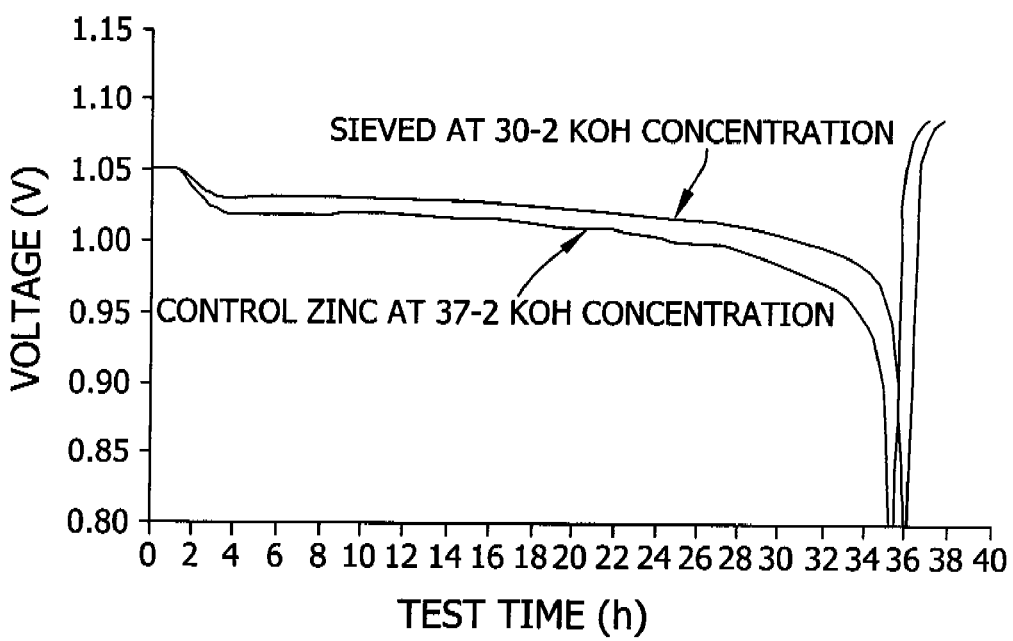
FIG. 21 is a graph plotting cell performance for electrochemical cells containing CuO, wherein a first cell contains sieved zinc at a lower electrolyte concentration, and a second cell contains conventionally distributed zinc and a higher electrolyte concentration.

3. The PSD's when combined with a lower electrolyte concentration typically result in a higher cell operating voltage. In particular, FIG. 21 illustrates cell performance for: 1) a first control cell having a 37% electrolyte concentration (concentration by weight of KOH with respect to the electrolyte mixture) and a 2% zinc oxide concentration in the anode, and a conventionally distributed anode; and, 2) a second cell constructed in accordance with the principles discussed herein having an electrolyte at 30% KOH concentration and 2% zinc oxide concentration by weight in the anode, and an anode distribution as described herein. FIG. 21 thus illustrates the increase in operating voltage when anodes as described herein are used in Zinc-CuO cells. It should be appreciated that the initial zinc oxide concentration in the anode before cell discharge can be between 0.5% and 6% by weight, and that the concentration of zinc oxide is a function of the electrolyte concentration since solubility of ZnO is a function of KOH concentration.

Figure 22:
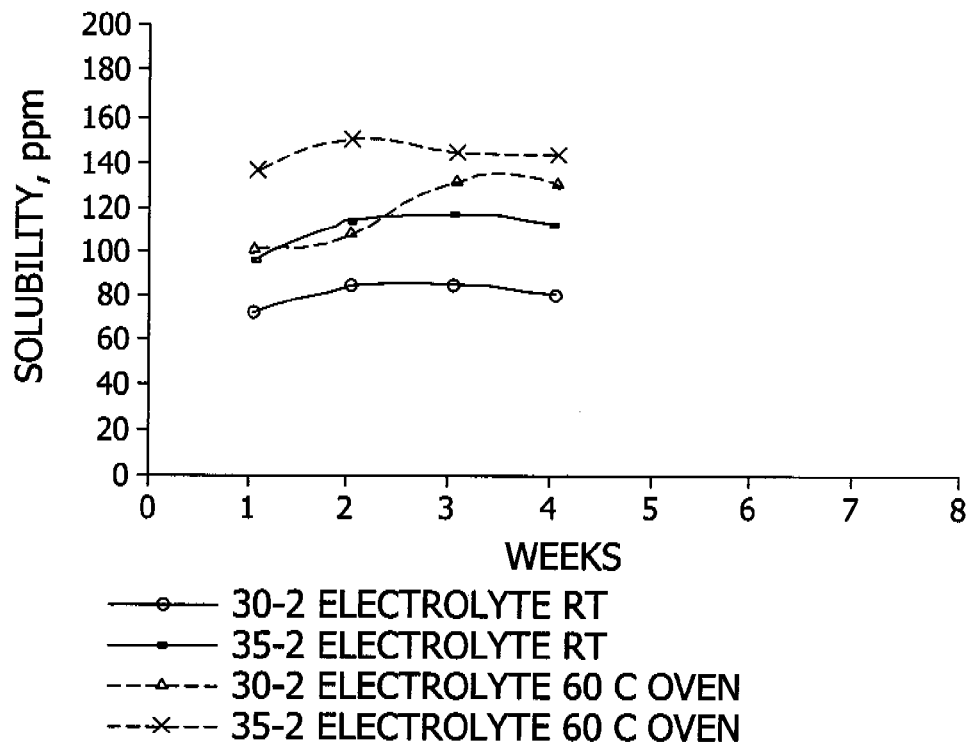
FIG. 22 is a graph plotting the solubility of CuO in KOH electrolyte as a function of electrolyte concentration and storage time.

4. Lower electrolyte concentrations are believed to reduce copper ion solubility, resulting in lower copper ion migration to the anode. Referring now to FIG. 22, electrolytes of concentration 30% KOH and 35% KOH are mixed with CuO at 1) room temperature, and 2) 60° C. In both cases, the solubility of CuO in KOH increased with increasing KOH concentrations. Reduction of the equilibrium KOH concentration in the cell will reduce the dissolution of copper ions in the cathode. Without being limited to a particular theory, the reduction of copper ion dissolution and migration is believed to result in lower self-discharge and gassing at the anode, which is believed to improve battery shelf life.

Figure 23:
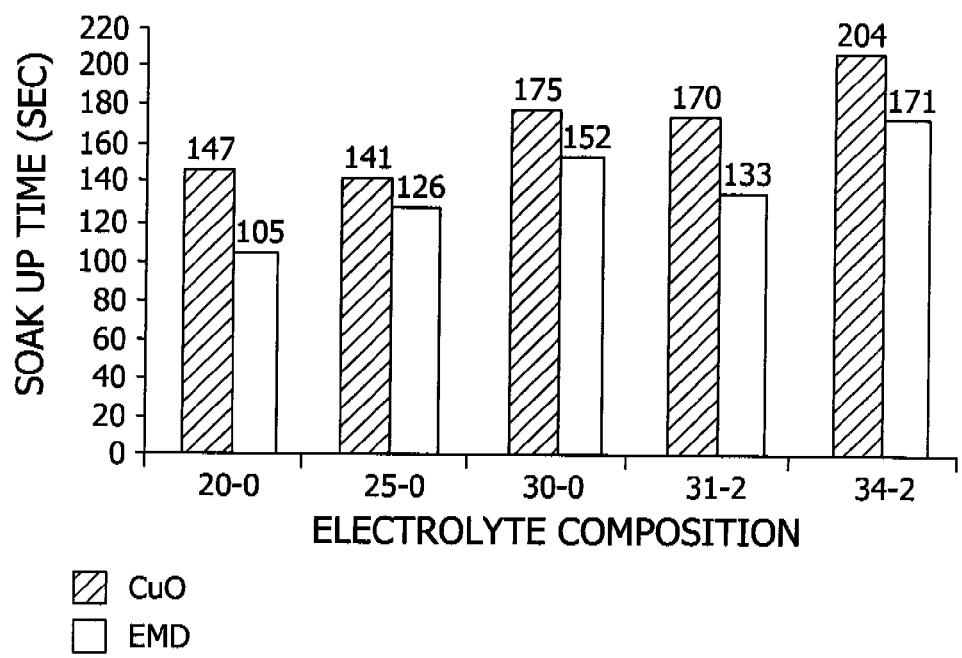
FIG. 23 is a graph plotting the wettability of CuO compared to EMD as a function of electrolyte concentration.

5. Lower electrolyte concentrations also improve the wettability of the cathode comprising copper or silver oxides, which is believed to result in better reaction kinetics. CuO is more hydrophobic than EMD $MnO_2$ as can be seen in FIG. 23 and the use of lower prewet KOH concentration improves the wettability of the cathode and results in improved performance of the inventive electrochemical cells.

IV. Separator

In one embodiment, the present invention is directed to a conventional alkaline electrochemical cell, while in another embodiment it is directed to an electrochemical cell which comprises one or more components that can form an anode fouling species in the cell. Various challenges or difficulties may be associated with one or both of these electrochemical cells. For example, difficulties associated with cells that form anode fouling species (e.g., cells having soluble cathode materials), include 1. Soluble copper or silver species from cathodes tend to diffuse and migrate to the anode side and deposit in the metallic or conductive oxide form and can form an electronically conductive path which can cause bridge shorting, anode gassing, or anode passivation. Bridge shorting occurs when a material such as zinc oxide, copper, or silver deposits on the anode or the separator and penetrates through the separator, forming a conductive bridge between the anode and cathode, thereby shortening the battery life. The shorting can be a high resistance short, causing slow decay of the cell voltage and capacity, or a low resistance short that can potentially generate high currents and hence high local heat generation and compromise safety. As further detailed elsewhere herein, additives or agents, such as clay additives (e.g., Laponite® or Cloisite) or metal sulfide additives, may be incorporated into or on the separator to, for example, increase separator tortuosity and thereby minimize bridge shorting, and/or react with anode fouling species present in the cell and migrating through the separator. Anode passivation can lead to varying degrees of anode-fouling, ranging from an increase of the anode resistance (hence higher internal resistance in the battery) to a complete shutdown of the anode reaction.

Sulfur species can also dissolve from the sulfide additives or other sulfur containing compounds present to form soluble sulfur species in the alkaline electrolytes. These species can further react with each other and with other ions dissolved in the electrolyte, precipitating out either within the separator or at the separator-to-electrode interface, thereby hindering electrolyte transport between the cathode and anode or causing bridge shorting 2. When the cathode contains sulfur, either as a sulfide or as sulfur mixed with a metal oxide, the sulfide and sulfur can react with alkali and alkaline-earth hydroxides to form sulfides, polysulfides, thiosulfates, and sulfites in solution, which are capable of diffusing and/or migrating to the anode side of the cell, thereby passivating the anode and interfering with the discharge reaction as well as shelf life.

3. The above mentioned species can also react with each other and with other ions dissolved in the electrolyte, precipitating out either within the separator or at the separator-to-electrode interface, thereby blocking desirable ionic and electrolytic transport between the cathode and anode.

4. Even when the separator material effectively limits the migration of soluble copper species, silver species, sulfides, polysulfides, thiosulfates, sulfites, iodates, or similar anode-fouling soluble species, it should be appreciated that cylindrical cell separators have seams (in particular along one or more ends and the side of a cylindrical cell separator) that, if not adequately sealed, can provide avenues for these species to still diffuse and migrate into the anode. Conventional cylindrical cell separators, and configurations thereof, cannot adequately limit such soluble species from migrating into the anode compartment, either due to the use of unsealed seams or the use of highly porous separators, or both. A "side seam" is defined herein as a seam located at overlapping ends (or potentially adjacent ends) of a cylindrical separator. A "side seam" may occur along the vertical wall of a cylindrical separator at any line formed by an edge of the separator material. For example, where a wound separator tube is used, a side seam may occur where the tube meets or overlaps upon itself. Where a cross-placed separator tube is used, a side seam may occur where the separator strips meet or overlap themselves or other separator strips (See e.g., FIG. 1 of U.S. Pat. No. 5,154,731, the details of which are incorporated herein by reference). An "end seam" is defined herein as a seam disposed at one of the open ends of a cylindrical cell separator. It should thus be appreciated that the terms "positive end" and "negative end" refers to the ends of the separator that are disposed proximal the positive and negative ends of a cylindrical cell, respectively, after separator installation into the cell. A "peripheral end seam" is defined herein as the outer periphery of a flat and round, square or rectangular separator that is to be sealed when installed into a button or prismatic cell.

Accordingly, as detailed elsewhere herein, it is to be noted that various aspects of the present invention provide separator combinations and configurations that overcome many of the above-mentioned difficulties for electrochemical cells, both conventional alkaline cells as well as alkaline electrochemical cells having or producing a variety of anode-fouling species, such as copper, silver, and sulfur. For example, one version of the present invention includes a sealed separator system for an electrochemical cell that is disposed between a gelled zinc anode of the type described above and a cathode containing soluble species of copper, silver, or both, as described above. It should thus be appreciated that the term "sealed separator system" is used herein to define a structure that physically separates the cell anode from the cathode, enables hydroxyl ions and water to transfer between the anode and cathode, limits transport other than through the material itself by virtue of a seam and bottom seal, and effectively limits the migration through the separator of other soluble species such as copper, silver, nickel, iodate, bismuth and sulfur species from the cathode to the anode. It should be appreciated that the adhesives described herein are equally applicable to electrochemical cells that do not contain a "sealed separator system." The choice of separator material and the need for a "sealed separator system" depends to some extent upon the cathode active material in the cell, and whether or not anode-fouling species are produced. In a conventional alkaline cell using a manganese dioxide cathode where no significant anode fouling species are produced (other than those from minor trace impurities present), a film separator such as one made of polyvinyl alcohol or cellophane alone, in combination with each other, or in combination with a non-woven material may be used without a bottom or side seam seal so long as adequate measures are taken to prevent internal soft shorting by transport of fine particulates along or past the unsealed areas. The use of an adhesive such as described herein will effectively limit the crossover between the anode and cathode compartments over the top of the separator.

A. Separator Materials and Combinations

Many of the challenges or difficulties associated with various electrochemical cells, including 1, 2, and 3 noted above, can be addressed by selecting appropriate separator materials or combinations of materials.

In accordance with various aspects of the present invention, several materials and combinations of materials have been found effective for alkaline cells, including those having a gelled zinc anode and copper, silver and sulfur ions in the cathode. These materials were further evaluated to determine what material property effectively limited the migration of the anode-fouling soluble species.

One version of a suitable separator material has a polymer backbone formed from a straight chain, a branched chain, or variants thereof. Examples of materials having such a backbone that have been found to provide a suitable separator include polyvinyl alcohol (or "PVA"), polymers of PVA, copolymers of PVA, poly(ethylene-co-vinyl alcohol, or "EVOH"), copolymers of polystyrene, blends or co-extrusions of these and like materials with materials such as polyethylene, polypropylene, polystyrene, and variants of the foregoing. Additional suitable separator materials include cellulosic films such as cellophane and variants thereof. However, not all such polymers are suitable, particularly when used in cells where the cathode produces anode fouling soluble species. Rather, suitable polymers retain electrolyte in the separator where, in the separator, the retained electrolytes have a pH value lower than the bulk electrolyte found in the cathode and the anode. The separator-retained electrolyte desirably has a pH value that is 0.5 to 3 pH units lower than the pH of the bulk electrolyte. The extent to which electrolyte is retained in the separator, and the extent to which the pH of the retained electrolyte can vary from that of the bulk electrolyte, can be modulated by polymer side groups provided on the backbone. Alcohol side groups are suitable, ranging from simple hydroxyl groups to more complex side chains that comprise at least one alcohol moiety, including linear, cyclic and branched side chains that can comprise carbon, nitrogen, oxygen, sulfur, silicon, and the like. Other side groups, such as carboxylic acid functional groups, can be provided on the separator to enhance or inhibit electrolyte retention or pH in the separator. The separator is hydrated by the bulk alkaline aqueous electrolyte, as in conventional cells, but the electrolyte retained in the hydrated separator has a characteristic pH lower than that of the bulk electrolyte.

In this regard it is to be noted that, as used herein, "bulk electrolyte" refers to the electrolyte present in the electrochemical cell but not part of or retained by the separator.

In general, it has also been determined that a relatively high physical porosity in the form of open pores that extend through the separator from the anode side of the separator to the cathode side of the separator is undesirable in the separator when anode fouling species are present or generated in the cathode. For instance, cellophanes, PVA, EVOH, $TiO_2$-filled high molecular weight polyethylene (HMWPE) membranes, and the like are anticipated as illustrated and described with reference to Examples 1-3 below. A HMWPE sample is available from Advanced Membrane Systems (located in Billerica, Me.), and is a porous membrane that can be filled with $TiO_2$ to decrease the porosity and increase the tortuosity of the separator pores.

It has also been determined that PVA films or fabrics coated or impregnated with polymers such as PVA, EVA and EVOH (each of which may be cross-linked), herein defined as a "hybrid separator," are effective in limiting the migration of anode-fouling soluble species, as described with reference to Example 6 below, if the porosity is minimized or eliminated.

While a non-woven fabric substrate coated or impregnated with an appropriate polymer like PVA or EVA is effective in limiting Cu, Ag, and S migration to some degree, as further discussed in detail elsewhere herein, it may be desirable to reduce the thickness of the material and also to form a relatively impervious film using such materials. In this regard, a PVA film, for example, may be cast directly from a water-based solution on a substrate from which the dried film can be easily peeled off, to be usable as a free-standing or self-supporting thin film separator, as further discussed in detail elsewhere herein. For example, a 10% PVA solution (Celvol grade 350 PVA from Celanese Ltd., Dallas, Tex.) may be cast on a Mylar substrate/release film at 70° C. Experiments per the prescribed Exclusion Test method, which is detailed elsewhere herein, show that the film possesses desirable barrier properties against migration of copper, silver and sulfur species. Commercially available PVA films have also been evaluated, showing similar trends. One example of a manufacturer of such PVA films is Monosol LLC (located in Portage, Ind.). Several samples from Monosol have been evaluated, some containing processing aids and/or plasticizers. The ionic resistance of the films in concentrated KOH has also been measured, showing that as the ability to effectively limit the migration of anode-fouling species improves, the ionic resistance increases. In general, PVA film samples containing significant amounts of plasticizer are less effective at limiting migration of soluble species while maintaining acceptably low ionic resistance.

It may be appreciated by those skilled in the art that effective limitation of the migration of soluble species can be attained by selecting the polymer properties, including the chemical composition, molecular weight, molecular weight distribution, additives and by appropriate cross-linking. Those skilled in the art will also appreciate that other polymer solutions may also be used to coat or impregnate non-woven or cellophane separators and achieve effects similar to those seen with PVA when used as a separator for electrochemical cells having a zinc anode and a cathode that contains anode-fouling soluble species. Alternatively, polymer solutions can coat the anode or cathode directly, thereby providing a conformal separator. (See, e.g., U.S. Patent Application Publication Nos. 2003/00446086 and 2004/0229116, the entire contents of which are incorporated herein by reference.) It should thus be appreciated that many of the polymer solutions discussed below as forming part of a hybrid separator (e.g., a non-woven fabric separator coated or impregnated with the polymer) can alternatively be applied directly to the inner cathode surface or outer anode surface to provide a conformal separator, or cast on and removed from a substrate for use as a free-standing or self-supporting thin film, that enables hydroxide ion transport while effectively limiting the migration of soluble copper, silver, and sulfur species. A conformal separator can also minimize the need for separate side seam or bottom seal.

Other such polymers that are suitable for use in the present invention include ethyl vinyl acetate (EVA) emulsion (that contains vinyl acetate monomers), vinyl acetate-ethylene copolymers and vinyl acetate polymers that can be coated or impregnated onto a nonwoven separator, to effectively limit the migration of anode-fouling soluble species such as, for example, copper, silver, sulfides, polysulfides, thiosulfates, sulfites, iodates, iodides, phosphates, silicates, or carbonates, as described in Example 7 below. Another suitable polymer is EVOH.

As further detailed elsewhere herein, organic or inorganic materials, such as Laponite, Bentonite or smectite clays, or clay-like materials, can also be incorporated into the polymer solutions to further enhance the performance of the separator (e.g., a polymer coated or a hybrid separator, cast polymer film separators, conformal separators, etc.), by providing structure or enhancing ion transport, ionic conductivity, and absorption or adsorption of anode fouling species, or by increasing tortuosity to slow migration of undesirable species. Materials possessing an electronic surface charge may also be incorporated into the separator in order to repel soluble species of a similar charge from passing therethrough. The performance of a separator having Laponite incorporated into a cross-linked PVA-coated, non-woven F3T23 separator in a 357 size cell is illustrated and described below in Example 8.

It has been discovered that a separator can include a first group (Group I) of separator materials (e.g. cellophane, $TiO_2$ filled HMWPE, etc.) that effectively limits the migration of the anode-fouling soluble copper and silver species in combination with a second group (Group II) of separator materials (e.g. PVA film or PVA coated on or impregnated in a non-woven separator, with or without cross-linking) that effectively limits the migration of the anode-fouling soluble sulfur species. The combination effectively limits soluble copper, Ag and sulfur species. A separator including a combination of Groups I and II is thus effective in minimizing the difficulties 1, 2, and 3 discussed above. Such a separator is tested below (see, e.g., Examples 5 and 6). The two separator materials can be stacked, laminated, or coated in various combinations. For instance, a Group I material can be coated onto an anode-facing or cathode-facing surface of a non-woven separator of Group II (or layers of suitable non-woven separators), or alternatively can be placed between adjacent layers of non-woven separator coated with PVA or a combination of suitable non-woven separators.

It has further been discovered that some materials, such as cellulosic materials (e.g. cellophane), absorb larger amounts of soluble species, like Cu ions, than others. It has further been discovered that other materials, like polyvinyl alcohol, are more efficient at effectively limiting the migration of soluble species. Therefore, in order to effectively limit the amount of material that eventually enters the anode, a combination of such materials may be more appropriate than one of them alone. A separator can therefore include a group (Group III) of separator materials (e.g. cellophane) that effectively absorbs more anode-fouling soluble copper and silver species in combination with another group (Group IV) of separator materials (e.g. PVA film or PVA coated on or impregnated in a non-woven separator, with or without cross-linking) that more effectively limits the migration of the anode-fouling species. The combination effectively limits soluble copper, Ag and other species from reaching the anode. The two separator materials can be stacked, laminated, or coated in various combinations. For instance, a Group III material can be coated onto an anode-facing or cathode-facing surface of a non-woven separator of Group IV (or layers of suitable non-woven separators), or alternatively can be placed between adjacent layers of non-woven separator coated with PVA or a combination of suitable non-woven separators.

It is to be noted that plasticizers or processing aids used in manufacture of films, such as polyvinyl alcohol, may adversely affect the ability of the film to, for example, effectively limit the migration of anode-fouling soluble species when used as a separator in a cell, and, as such, films prepared with substantial quantities of one or more plasticizers may not be preferred in some instances. For example, in some embodiments of the present invention, a film separator may contain less than about 15% plasticizers by weight, or alternatively less than about 10%, or less than about 5% plasticizers by weight. In such embodiments, particularly suitable film separators may contain about 3% plasticizers by weight or less. This restriction may be less stringent in conventional cells, so long as the plasticizers themselves do no dissolve out, migrate and foul the anode.

It is to be further noted that, in one embodiment, a separator particularly suitable for use is a non cold-water soluble, non-crosslinked polyvinyl alcohol film separator comprising less than about 3% plasticizers by weight. Two such suitable polyvinyl alcohol films are M-1000 and M-2000 (Monosol). As appreciated by one skilled in the art, the film separator can be formed as an ex-situ film, and subsequently installed into the cell, in accordance with one aspect of the invention.

Although a separator of the invention can be provided as described, the separator can optionally be coupled with (e.g., laminated or tacked to) a conventional non-woven fabric layer in an otherwise conventional manner.

B. Separator Additives

The performance or utility of a conventional alkaline electrochemical cell, or alternatively an alkaline electrochemical cell comprising one or more components that may form an anode fouling species in the cell, constructed in accordance with the principles of the present invention may be significantly enhanced by providing in the cell an improved barrier-separator system, wherein the separator is impregnated with a structure and/or conductivity enhancing agent or additive. For example, the separator may be impregnated with an agent or additive (e.g., a clay) in order to enhance the tortuous path through the separator, and/or an agent or additive (e.g., a metal sulfide) to react with anode fouling species present in the cell. The use of such additives or agents, alone or in combination, particularly when used in combination with a thin film separator (as detailed elsewhere herein), is believed to be advantageous in, for example, conventional alkaline cells, in order to help prevent zinc dendrite (e.g., Zn/ZnO) formation, as well as shorting associated therewith, while permitting migration of water and hydroxyl ions therethrough. Additionally, the use of such an additive or agent, again particularly when used in combination with a thin film separator, is believed to be advantageous in, for example, alkaline electrochemical cells comprising one or more components capable of forming an anode fouling species in the cell, because such additives may acts to further limit the migration of anode-fouling soluble species from the cathode into the anode compartment, as well as dendrite shorting associated with this, while permitting migration of water and hydroxyl ions therethrough.

In this regard it is to be noted that, with certain cathode materials, such as CuO, CuS, $CuAg_2O_4$ and $Cu_2Ag_2O_3$, it is advantageous to use a separator system that employs a barrier to migration of the soluble species such as Cu, Ag, S, and the like, that are produced (migration reduced by at least about 50%; alternatively at least about 60%; and finally at least about 70% in a test as described herein). As previously noted, such barrier materials may include, for example, PVA (polyvinyl alcohol) films, modified or cross-linked PVA (polyvinyl alcohol) films, EVA, EVOH (ethyl vinyl alcohol), cellulose type films, and laminated or non-laminated combinations or synthetic hybrids of such films. These materials enable a larger variety of oxides, sulfides, and metal complexes to be used as cathode active materials in accordance with aspects of the present invention to produce a battery with improved shelf life.

Suitable additives that may be used in accordance with the present invention include, for example, various clay additives and/or metal sulfides. Clay additives or agents which have shown an ability to adsorb or block ionic species, and which can be incorporated in the separator material (i.e., the separator may be impregnated with the additive or agent), or applied as one or more layer on a surface of the separator include, for example, natural or synthetic clays or silicates. Exemplary natural clays or silicates include Smectite and Bentonite. Smectite refers to a family of non-metallic sodium calcium aluminum silicates, which includes the mineral montmorillonite. An exemplary natural clay is Cloisite™ (which can be obtained from Southern Clay Products, Gonzales, Tex.). Bentonite, which is considered a sub-class of Smectite, is primarily comprised of the mineral montmorillonitrite. Exemplary synthetic clays or silicates include Laponite® (which can also be obtained from Southern Clay Products).

Particularly well suited clay additives include those that will expand and exfoliate during processing to form thin platelets with a high aspect ratio; that is, particularly well suited clay additives include those that form thin plates or sheets, wherein the average thickness of the exfoliated clay particles is substantially less than the average length and/or width thereof. For example, the average thickness of such exfoliated platelets may be less than about 50 nanometers (nm), less than about 25 nm, or even less than about 10 nm, the thickness for example falling within the range of greater than about 1 nm and less than about 50 nm, greater than about 1.5 nm and less than about 25 nm, or greater than about 2 nm and less than about 10 nm. Additionally, or alternatively, particularly well suited clay additives include those exfoliated clays having an average particle size (e.g., average diameter or length or width) of less than about 1000 nm, less than about 750 nm, less than about 500 nm, or less than about 100 nm, the average particle size, for example, being within the range of greater than about 25 nm and less than about 1000 nm, or greater than about 50 nm and less than about 750 nm, or greater than about 100 nm and less than about 500 nm. Additionally, or alternatively, particularly well suited clay additives include those exfoliated clays having an average aspect ratio of at least about 50, about 75, about 100 or more, and/or less than about 1000, about 750 or about 500, the aspect ratio for example being in the range of about 50 to about 1000, about 75 to about 750, or about 100 to about 500. Additionally, or alternatively, particularly well suited clay additives include those exfoliated clays having an average surface area of at least about 50 $m^2/g$, about 75 $m^2/g$, about 100 $m^2/g$ or more, and/or less than about 1000 $m^2/gm$, about 750 $m^2/g$, or about 500 $m^2/g$, the surface area for example being in the range of about 50 $m^2/g$ to about 1000 $m^2/g$, about 75 $m^2/g$ to about 750 $m^2/g$, or about 100 $m^2/g$ to about 500 $m^2/g$.

In this regard it is to be noted that, as used herein, "aspect ratio" of the exfoliated clays refers to the average ratio of the length or width of the clay particles or platelets versus the thickness thereof.

It is to be further noted that the degree and effectiveness of the exfoliation (which is dependent upon the chemistry, the process equipment and conditions used) will dictate the surface area exposed. As such, the as-received (i.e., un-exfoliated) material will have relatively low surface area exposed. More specifically, it is to be noted that some clay materials suitable for use in accordance with the present invention are commercially available in bulk form as agglomerates of smaller particles (e.g., nano-clay particles), the agglomerates for example having an average particle size within the range of greater than about 750 nm or even about 1000 nm (i.e., about 1 micron), and less than about 10 microns, about 5 microns, about 4 microns, about 3 microns or about 2 microns. However, if desired, such agglomerates may be subjected to appropriate processing techniques in order to expand, exfoliate, separate or break apart the agglomerates, and obtain the nano-particles or platelets of which they are comprised. For example, some bulk clay materials may have a layered particle structure that separates or breaks apart (i.e., exfoliates) upon exposure to water, or some other liquid or fluid, during appropriate processing.

In this regard it is to be still further noted that, while substantially complete exfoliation is typically desirable, in order to minimize the concentration of clay that is incorporated or impregnated into the separator, the clay will still be effective, even if only partial exfoliation is achieved.

It is to be still further noted that the nano-particles of the clay additive may be referred to herein as "nano-clays."

It is to be still further noted that, in one particle embodiment, nano-clay particles of Cloisite™ (commercially available from Southern Clay Products) are used to impregnate, and/or coat a surface of, the substrate. The commercial product Cloisite™ Na+ is the sodium salt of the mineral montmorillonitrite and may have an average particle size of about 6 microns. It is a hydrophilic material, and thus exfoliates easily in water with appropriate mixing or shearing equipment to yield platelets having an average thickness of about 1 nm, and an average diameter or maximum length of about 75 to about 150 nm. Several other forms of Cloisite™ are commercially available, with varying grades and/or degrees of hydrophilicity, by virtue of special treatments that the manufacturer may subject them to. Accordingly, it is to be noted that a media other than water may be used to achieve exfoliation.

Among the advantages associated with the use of nano-clays is included, for example, the fact that significantly lower clay concentrations are necessary in order to impart the same degree of tortuosity or mechanical structure and strength, as compared for example to a clay that does not exfoliate and form nano-particles or platelets. This advantage is due, at least in part, to the aspect ratios of the nano-clays, provided the nano-clay is well dispersed and distributed in the polymer matrix. Typically, therefore, nano-clay loadings or concentrations, within the separator, may be less than about 10%, by weight of the dried and impregnated or loaded separator film, and may be less than about 5 weight %, about 3 weight %, about 1 weight %, or less (e.g., about 0.5 weight %, or even about 0.2 weight %), depending upon the properties desired, the concentration or loading falling within the range of, for example, about 0.2 to about 10 weight %, or about 0.5 to about 5 weight %, or about 1 to about 3 weight %.

A metal sulfide additive, such as zinc sulfide, a calcium sulfide, and/or a manganese sulfide, may additionally or alternatively be used to impregnate the separator, such as the thin film separator detailed elsewhere herein. Such additives may be particularly advantageous when used in an electrochemical cell which comprises one or more components that may form an anode fouling species in the cell, because these additives are well suited to chemically bind or trap the anode fouling species that are formed. Without being held to any particular theory, it is believed that metal sulfides, such as zinc sulfide, may chemically bind anode fouling species, such as copper ions or silver ions, to form solid sulfide precipitates of relatively low solubility in the electrolyte, such as CuS, AgS, etc., according to the following possible reactions:

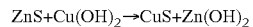

$ZnS+Cu(OH)_2 \rightarrow CuS+Zn(OH)_2$ or

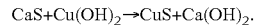

$CaS+Cu(OH)_2 \rightarrow CuS+Ca(OH)_2.$

The particle size of the metal sulfide (e.g., zinc sulfide and/or calcium sulfide) additive may be optimized for a given application and/or separator film composition (e.g., pore size). Typically, however, the particle size will be less than about 10 microns, less than about 1 micron, less than about 500 nm, less than about 250 nm, or even less than about 100 nm, the particle size for example being within the range of from about 10 nm to about 10 microns, from about 25 nm to about 1 micron, about 40 nm to about 500 nm, from about 45 nm to about 250 nm, or from about 50 nm to about 100 nm. Additionally, or alternatively, the metal sulfide particles may have an average surface area of at least about 10 $m^2/gm$, about 50 $m^2/gm$, or about 100 $m^2/gm$, and/or less than about 1000 $m^2/gm$, about 750 $m^2/gm$, or about 500 $m^2/gm$, the surface area for example being in the range of about 10 to about 1000 $m^2/gm$, about 50 to about 750 $m^2/gm$, or about 100 to about 500 $m^2/gm$.

Without being held to any particular theory, it is generally believed that smaller particles are particularly well suited for use in reacting with or capturing the diffusing species. In addition, it is generally believed that smaller particles can be better dispersed and distributed within the polymer matrix, and the efficiency of the reaction between the metal sulfide and the diffusing species will be higher with smaller particles. Similarly, the amount of metal sulfide that is impregnated into, or present in the surface of, a separator film may be optimized for a given application and/or separator film composition. Typically, however, the metal sulfide concentration or loading will be at least about 0.1 $mg/cm^2$ of the surface area of the separator film, and may be at least about 0.5 $mg/cm^2$, about 0.75 $mg/cm^2$, about 1 $mg/cm^2$, about 2 $mg/cm^2$, about 3 $mg/cm^2$, or even about 5 $mg/cm^2$, of the surface area of the separator film. For example, in some embodiments the metal sulfide concentration or loading may be in the range of about 0.1 to about 5 $mg/cm^2$ of the surface area of the separator film, or alternatively about 0.5 to about 3 $mg/cm^2$, or about 0.75 to about 2 $mg/cm^2$.

Figure 37:
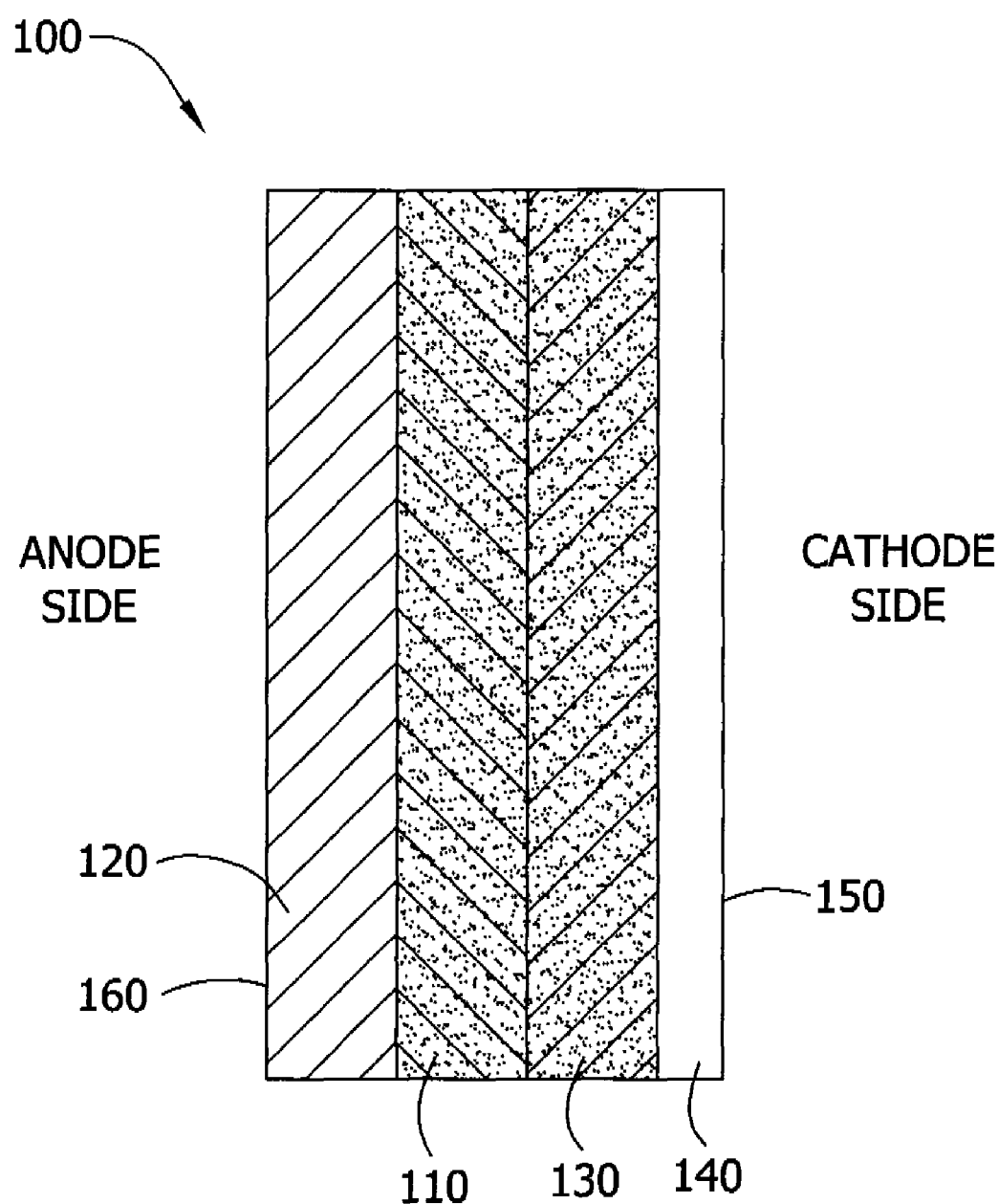
FIG. 37 is a cross-sectional, schematic which illustrates various optional layers (not to scale) of a multi-layered separator structure, wherein one layer optionally comprises a clay additive and another optionally comprises a metal sulfide additive, as further detailed elsewhere herein.

Referring now to FIG. 37, as previously noted, the metal sulfide(s) may be impregnated into a separator film, or alternatively deposited as a layer on a surface of the separator film. The resulting separator film may then be used as-is. Alternatively, however, as illustrated in FIG. 37, the impregnated or coated separator film may then be used in the formation of a multi-layered separator structure 100, the impregnated or coated separator film 110 being placed or sandwiched between a first surface layer or film 120 that will face or contact the anode, and a second surface layer or film 130 that will face or contact the cathode. The first surface layer 120 is present to inhibit or prevent the metal sulfide present in the separator film 110 from coming into contact with the zinc anode. The second surface layer 130, in one particular embodiment, has a composition (e.g., polymer composition), and/or is impregnated or treated with an additive (e.g., a clay additive), as detailed elsewhere herein, in order to ensure that it blocks or excludes a substantial portion (e.g., at least about 50%, 60%, 70% or more, as determined in accordance with the Exclusion test detailed elsewhere herein) of the anode fouling species (e.g., copper ions) prior to contacting the separator film 110.

It is to be noted that each of the first and second layers, 120 and 130 respectively, may or may not have the same composition (e.g., polymeric composition) as the separator film 110, which has been impregnated or layered with the metal sulfide additive. It is to be further noted that, depending upon, for example, the thickness of each the layers or films (i.e., 110, 120 and/or 130), and/or the overall thickness of the multi-layered separator structure 100, and/or the desired application in which resulting layered or sandwiched separator structure is to be used, yet another layer or film 140, which again may or may not have the same composition of one or more of the other layers or films, may be applied as a protective layer on the surface of the second layer 120 (i.e., on the side which faces the cathode), the protective layer 140 being used for example to help prevent damage during handling and/or process (e.g., during formation of a separator tube from the structure).

It is to be noted that the desired or optimum thickness of each individual layer may be the same or different, and may vary, just as the thickness of the final multilayered separator structure 100 (either with or without the protective polymer layer 140) may vary, each of these individual thicknesses, and/or the combined thickness, being, at least in part, a function of the total volume of the final container or can in which the electrochemical cell is to be placed, and/or the desire to maximize performance of the resulting electrochemical cell. Typically, however, the total thickness of the multilayered structure 100, including all layers or films present, will fall within the range of about 0.4 mil to about 10 mil (about 10 to about 250 microns), about 1 mil to about 5 mil (about 25 to about 125 microns), about 1.2 mil to about 3 mil (about 30 to about 75 microns), or about 1.5 mil to about 2 mil (about 40 to about 50 microns).

In one particular embodiment, the composition of each of the individual polymer layers or films 110, 120, 130, and optionally 140, is PVA or modified PVA, as detailed elsewhere herein. In this or another embodiment, all of the layers or films present have the same polymer composition. In one of these embodiments, or yet another embodiment, one or more of the polymer layers or films (e.g., 120 or 130), which have been placed on either side of the separator film 110 with the metal sulfide additive, may have been treated with a clay additive, as detailed elsewhere herein, in order to increase the tortuosity thereof and thus slow or inhibit diffusion of anode fouling species therethrough.

It is to be noted that each of the layers or films (i.e., 110, 120, 130, and optionally 140) may be separate or distinct from the others, or they may be formed into one monolithic composite wherein the layers are cast sequentially on each other, laminated together, or made to adhere to one another by various techniques known in the art (e.g., by use of an adhesive, etc.), or various combinations thereof. Once formed, the resulting separator structure 100 may be made into a cylindrical tube using means known in the art, and/or as detailed elsewhere herein, for use in a cylindrical battery. Alternatively, the resulting structure 100 may be used as-is, in for example a prismatic (e.g., flat) battery. Regardless of the application, it is to be noted that the structure has an outer surface 150 which faces or contacts the cathode and an inner surface 160 which faces or contacts the zinc anode.

With respect to the concentration or load of the metal sulfide in the separator film 110, or the amount of the metal sulfide that is incorporated into the separator film 110, it is to be noted that this will be at least in part a function of the amount of diffusing species (e.g., copper ions) that is to be reacted with or captured. The amount of the diffusing species that is to be reacted with or captured is, in turn, a function of how effective layer 130 is at excluding the diffusing species, thus blocking the species from even reaching the separator film 110.

As noted elsewhere herein, in one particular embodiment, the separator (e.g., a thin film separator, such as a conformal separator, or self-supporting or free-standing film, or alternatively a multi-layered separator structure) is constructed to effectively limit zinc dendrite formation, and/or to effectively limit soluble anode-fouling species from passing therethrough (i.e., excluding at least about 50%, at least about 60%, at least about 70%, at least about 80%, at least about 90%, or more of the soluble anode-fouling species from passing therethrough).

Also as noted elsewhere herein, the cathode may also be provided with an agent that effectively limits anode-fouling soluble species from migrating from the cathode toward the anode by interacting with the soluble species. Agents such as polyvinyl alcohol, activated carbon, natural and synthetic clays and silicates (such as Laponite®, etc.) have shown an ability to adsorb or block ionic species.

C. Thin Film Separators

In one particular embodiment, the present invention is directed generally to a conventional alkaline electrochemical cell, or alternatively to an alkaline electrochemical cell which comprises one or more components that may form an anode fouling species in the cell, which comprises a thin film separator, such as disclosed in U.S. patent application Ser. No. 10/914,934, which is incorporated herein by reference. A particularly suitable thin film separator has as small a cross-sectional thickness as is practical, while retaining manufacturing processability (e.g., flexibility, mechanical stability, integrity at processing temperatures, integrity within the cell, and the like), adequate electrolyte absorption, as well as the other advantageous properties noted herein. Suitable films typically have a single layer, dry thickness (i.e., a thickness prior to being contacted with an electrolyte and after being equilibrated/stored for about 24 to about 48 hours, in an environment where the relative humidity ranges from about 49%, +/−about 6%, and the temperature is about 21° C., +/−about 1° C.) of typically less than about 250 microns, less than about 200 microns, less than about 150 microns, or even less than about 125 microns, the thickness ranging for example from about 5 microns to about 125 microns, from about 10 microns to about 100 microns, or from about 25 microns to about 75 microns. In this regard it is to be noted that, depending on the difference between the pH value of the bulk electrolyte and the pH value of the electrolyte retained in the separator, the thickness of a film separator may be selectively optimized, in one embodiment for example, to effectively limit the migration of anode-fouling soluble species.

As noted elsewhere herein, the thin film separator may, in one specific embodiment, optionally be formed on the surface of the anode or cathode, thereby forming a conformal separator thereon (see, e.g., U.S. Patent Application Publication Nos. 2003/00446086 and 2004/0229116, the entire contents of which are incorporated herein by reference.). Alternatively, however, in one particularly preferred embodiment the separator may be a free-standing, or self-supporting, thin film that may be inserted directly into the cell during cell manufacturing; that is, the separator may be a thin film that is formed ex situ, and/or not formed on the surface of the cathode, and that is sufficiently flexible, mechanically stable, thermally stable, etc., such that it may be inserted into the cell and used without some additional means of support (e.g., without being laminated or by some other means applied or attached to a supporting substrate, such as a non-woven fabric substrate). However, in such embodiments, the free-standing, or self-supporting, thin film separator is preferably used in combination with a gasket, such as the one further detailed herein below (and disclosed in U.S. patent application Ser. No. 11/058,678, filed Feb. 15, 2005 and entitled "Sealing Assembly for Electrochemical Cell", the entire contents of which is incorporated herein by reference). Without being held to any particular theory, it is generally believed that the film separator may soften or become more flexible or flimsy after being in contact with the electrolyte for a period of time. Accordingly, such a film, although free-standing or self-supporting outside the electrochemical cell, may not remain so for an extended period of time in the cell, and therefore may be used on combination with such a gasket.

The thin film may have an average pore size optimized for a particular application or use. Typically, however, the average pore size is less than about 0.5 microns (such as, for example, when a multilayer separator structure, or multiple wraps of a single layer separator, is used), about 0.1 microns, less than about 0.075 microns, less than about 0.05 microns, less than about 0.01 microns, or even less than about 0.001 microns (e.g., about 0.0005 microns, or about 0.0001 microns), the average pore size range being within the range of, for example, about 0.001 microns and about 0.5 microns, or about 0.01 microns and about 0.1 microns. Alternatively, however, the average pore size may be within the range of, for example, about 0.0001 to about 0.0005 microns.

In this regard it is to be noted that, as expressed herein, average pore size is for a dry film, being determined at an ambient relative humidity of about 30% to about 80%, and at a temperature of about 20 to about 30° C. It is also to be noted that, in order to effectively limit migration of dissolved ionic species, the films or membranes must have extremely small "pores", the size of which cannot easily be measured directly using conventional methods. Instead, the pore sizes noted herein are estimates, based on the physical and/or mathematical models that incorporate the dimensions of the migrating ions or molecules, the mechanism of transport and the rate of transport, etc. This is known and understood by one skilled in the art of ultrafiltration, reverse osmosis, etc.

The composition of the thin film separator may vary, depending upon for example the particular properties that are desired for the film (e.g., ionic resistance, water transport, etc., as further detailed elsewhere herein), and/or the particular conditions to which the film is to be subjected (e.g., process or manufacturing conditions, and/or use conditions). In one particular embodiment, however, the film is a PVA film, which may or may not be modified in some way (e.g., copolymerized, and/or partially or fully cross-linked, the degree of crosslinking therein being, for example, at least about 10%, about 25%, about 50%, about 75% or more, based on the total number of potential crosslinking sites therein). Furthermore, the cross-linking may be performed such that only one or other surface is cross-linked, leaving the interior portion substantially un-cross-linked.

In general, the number of wraps of the thin separator film used in the electrochemical cell may be optimized for a given application and/or to achieve a desired performance within the cell. Typically, however, the number of wraps of the thin film separator in the cell will be greater than about 1 and less than about 3, greater than about 1.1 and less than about 2, greater than about 1.2 and less than about 1.8, or greater than about 1.3 and less than about 1.6 (wherein a wrap number of greater than 1 indicates some degree of overlap of the separator is present within the cell). In one particular embodiment, wherein the separator is in the form of a sealed tube (separator sealing being discussed elsewhere herein), the number of wraps is typically greater than about 1 and less than about 1.5 (e.g., about 1.1 or about 1.2). In another particular embodiment, wherein the separator is tacked, or unsealed, in order for example to reduce manufacturing costs, increased overlap may be desirable, the number of wraps for example typically being greater than about 1.5 and less than about 2 (e.g., about 1.6 or about 1.8). It should be noted that the number of "wraps" for a wound separator configuration indicates the number of windings of the composite separator, which may itself be multi-layer or single layer. For example, in a cross-placed separator, the number of "wraps" would be the average number of layers of the composite separator, which may itself be multi-layer or single layer, between the anode and cathode resulting from the cross-placing process. In a flat cell, including a button cell, the number of "wraps" would generally be the number of layers of the composite separator, which may itself be a multi-layer or single layer. Typically, in the case of a flat cell, the number of "wraps" will usually be an integer, that is, 1, 2, or 3, etc., as no overlapping areas are usually present.

In this regard it is to be noted that, as used herein, the number of "wraps" for a wound separator configuration generally indicates the number of windings of the composite separator, which may itself be multi-layer or single layer. For a cross-placed separator, the number of "wraps" generally indicates the average number of layers of the composite separator, which may itself be multi-layer or single layer, between the anode and cathode resulting from the cross-placing process. For a flat cell, including a button cell, the number of "wraps" generally indicates the number of layers of the composite separator, which may itself be a multi-layer or single layer. In the case of a flat cell, the number of "wraps" will typically be an integer (e.g., 1, 2, 3, etc.), as no overlapping areas are usually present.

Without being held to any particular theory, it is generally believed that the thin film separator detailed herein is advantageous because it occupies or consumes less volume, as compared to a thicker separator, which utilizes for example a non-woven fabric substrate for support, within the container or can of the electrochemical cell. As a result, an increased quantity of the actives may be placed in the container or can, thus increasing capacity and service life of the electrochemical cell. It is also believed that the thin film separator detailed herein acts to improve shorting resistance, given that a film with small pore size provides internal shorting resistance that would otherwise not be possible with a single layer of conventional, non-woven separators, which have a "pore" size of greater than about 1 microns. Rapid, preferential water transport through the films described herein is a key factor in providing superior high rate performance as described elsewhere. Accordingly, in at least some embodiments, the separator will be as thin as possible, in order to maximize the rate of discharge (i.e., achieve as high a current as possible).

In this regard it is to be noted that, with the non-woven materials, it is difficult to define a pore size, since the material comprises fibers randomly stuck or matted together. Furthermore, some manufacturers use a thin cellophane layer laminated to a non-woven fabric, either cross-placed or in multiple winds. The cellophane deteriorates in the electrolyte with aging, and requires the structural integrity provided by the non-woven. In contrast, the thin film detailed herein possesses adequate stability and integrity to be usable as a free-standing or self-supporting film, for use for example in combination with a gasket, described elsewhere herein.

It is to be noted that rapid water transport, or osmotic transport, may act to enable or provide a high discharge rate. Accordingly, the thin film separator may have a water osmosis rate as detailed elsewhere herein (e.g., a rate of at least about $1 \times 10^{-6}$ moles-cm/cm$^2$/hr, about $1 \times 10^{-5}$ moles-cm/cm$^2$/hr, about $5 \times 10^{-5}$ moles-cm/cm$^2$/hr, or more.)

It is to be further noted that the thin film separator may not swell as much as conventional separators (e.g., separators having a non-woven fabric substrate for support), upon absorption of an electrolyte. Typically, however, upon contact with an electrolyte, the thickness of the thin film separator may increase, or swell, by greater than about 0% and less than about 100%, less than about 75%, less than about 50%, or less than about 25%, as compared to the initial or dry thickness of the thin film separator. For example, in one particular embodiment, the thickness of thin film separator, upon contact with an electrolyte, swells or increases by about 0.1% to about 15%, by about 0.2% to about 10%, by about 0.5% to about 5%, or by about 1% and less than about 2%. Additionally, or alternatively, it is also to be noted that the length and width dimensions (also defined as machine direction and transverse direction, with respect to the orientation during manufacture of the film) of the film also change with absorption of electrolyte. The length and width dimensions, for example, may increase by less than about 15%, less than by about 10%, less than by about 5%, or less than about 2% each.

It is to be still further noted that, in one particular embodiment, the thin film separator of the present invention is used in a conventional alkaline cell, either with or without some means by which to increase the tortuous path therethrough (e.g., with or without (i) impregnation with an additive, such as a clay additive (as further detailed elsewhere herein), and/or (ii) application of one or more layers of an additive, such as a clay additive, to a surface of the separator (as further detailed elsewhere herein)). In an alternative embodiment, the thin film separator of the present invention is used on an alkaline electrochemical cell which comprises one or more components that may form an anode fouling species in the cell, the separator being (i) impregnated with an additive, such as a clay or a metal sulfide additive (as further detailed elsewhere herein), and/or (ii) having one or more layers of an additive, such as a clay or a metal sulfide additive, applied to a surface thereof (as further detailed elsewhere herein).

D. Separator Properties (i) Air Permeability

One measure of the suitability of a separator to effectively limit the migration of anode-fouling soluble species is the air permeability of the separator. Air permeability can be measured in Gurley seconds, as appreciated by one having ordinary skill in the art. Because the Gurley test measures the length of time necessary to pass a predetermined volume of air through a separator, a longer time measurement is an indication of low air permeability. A separator having a Gurley Air Permeability of 500 Gurley seconds or higher has been found suitable for use in an electrochemical cell described above, while overcoming difficulties 1, 2, and 3. The Gurley measurement was taken using Model No. 4150N, commercially available from Gurley Precision Instruments (located in Troy, N.Y.), at a pressure drop of 12.2 inches of water to displace 10 cc air through a 1 sq. inch area. The higher the Gurley number, the better. One having ordinary skill in the art will now recognize that a film separator having a relatively high Gurley air permeability will have few, if any, open pores.

It is to be appreciated that air permeability is not necessarily an accurate indicator of the permeability of the separator when wet with electrolyte containing the anode-fouling soluble species. Hence, a more direct measure of the suitability of a separator to effectively limit the migration of the anode-fouling soluble species is to use the results of a direct measurement analysis such as the Exclusion Test described below.

The separator is also compatible with known variations and improvements in cathode, anode and electrolyte structure and chemistry, but finds particular advantage for cells having a cathode that contains one or more cathode active materials comprising at least one of a primary oxide or sulfide of a metal, a binary oxide or sulfide of a metal, a ternary oxide or sulfide of a metal or a quaternary oxide or sulfide of a metal, where the metal is selected from manganese, copper, nickel, iron and silver, that can dissolve to form one or more anode-fouling soluble species, including but not limited to ionic metallic species and sulfur species, that can disadvantageously migrate from the cathode to the anode in the bulk electrolyte fluid in fluid communication with both the cathode and the anode. As used herein, "binary," "ternary," and "quaternary" refer to containing two, three or four of a particular species. Materials finding utility as cathode active materials include but are not limited to manganese dioxide, copper sulfide, copper oxide, copper hydroxide, nickel oxyhydroxide, silver oxides, copper iodate, nickel iodate, copper fluoride, copper chloride, copper bromide, copper iodide, copper silver oxides and copper manganese oxides, and combinations thereof. Combinations of cathode active materials can be provided in a cathode as mixtures or as separate entities.

(ii) Exclusion Value

In varying aspects of the invention, routes of fluid communication between the cathode and the anode, including the separator seams, are sealed to minimize or eliminate fluid communication (e.g., of bulk electrolyte) except through the separator material, at least one layer of which is provided. Moreover, substantially all anode-fouling species in the bulk electrolyte are desirably retained on the cathode side of the separator and do not migrate to the anode. The separator is thus associated with an "Exclusion Value" that refers to a percentage of soluble species that is prevented from migrating from the cathode through the separator to the anode. "Substantially all" is intended to indicate that the separator has an Exclusion Value of at least about 50%; alternatively at least about 60%; alternatively at least about 70%, alternatively at least about 80%, alternatively at least about 85%; alternatively at least about 90%; alternatively at least about 95%; alternatively at least about 97%; and finally alternatively at least about 99%, per the test method developed and described herein.

It will be appreciated, however, that to the extent the anode active material of a cell tolerates the soluble species, the cell can tolerate some migration through the separator of anode-fouling soluble species. Generally, therefore, a suitable separator effectively limits the migration of anode-fouling soluble species if the separator passes less of the species than the anode active material can tolerate without becoming fouled. Substantially lower amounts of the soluble species are desired, however.

Also, a substantial portion of the electrolyte retained in the separator, for instance at least about 50%, may be associated with (typically, non-covalently associated with) the polymer backbone or its side groups. A suitable measure of such an association is obtained by analyzing the separator material to determine the temperature at which water retained in the separator melts after freezing. Whereas free water retained in, but not physically associated with, the polymer melts at about 0° C., a lower melting temperature indicates an association with the polymer and, accordingly, a desirable separator. A suitable method for determining the temperature at which separator-retained water transitions to the liquid phase employs a simple differential scanning calorimetric (DSC) test. A suitably sized sample of the separator material is swollen in water for one hour then immersed in liquid nitrogen until frozen. The frozen sample is melted at a rate of 2° C. per minute in a low temperature DSC apparatus (commercially available from TA Instruments (Newark, Del.)) and the melting temperature is observed at temperatures in the range of at least as low as about 30° C. to about 20° C. (see FIG. 35, and the related discussion in Example 10).

(iii) Osmotic Transport

Figure 24:
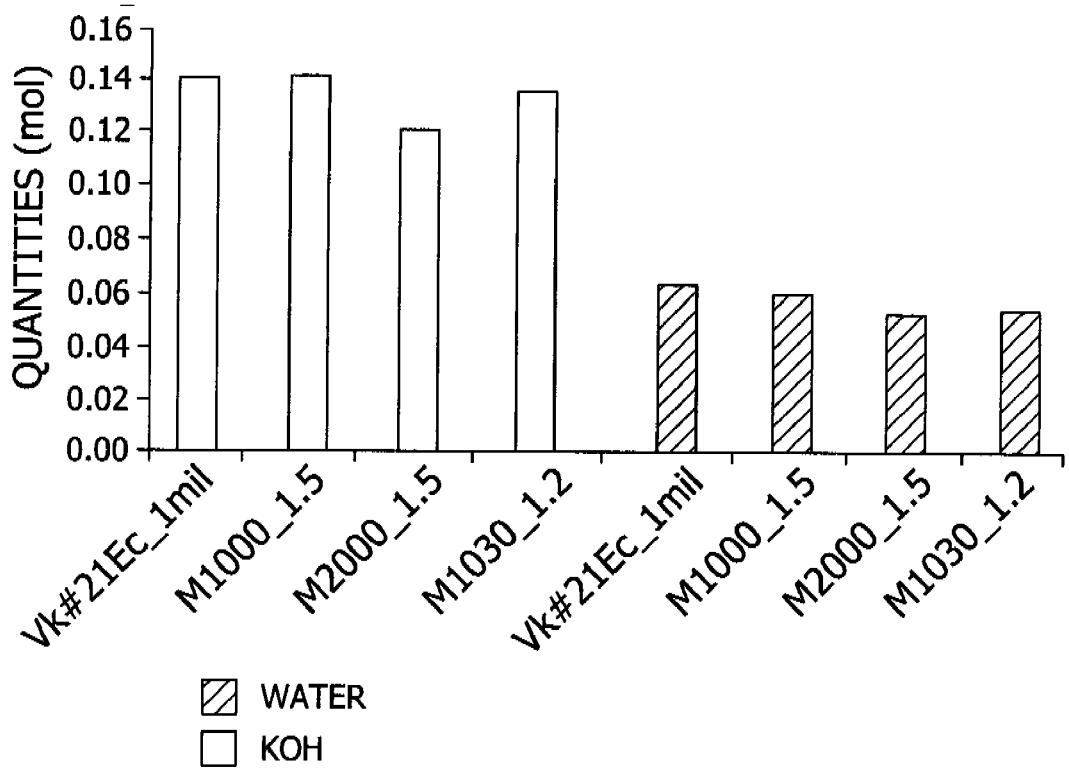
FIG. 24 is a graph plotting KOH and water transport in 4 hours through various separator materials.

A suitable separator material in an electrochemical cell also desirably transports water preferentially over hydroxide ions, and hydroxide ions over soluble species. FIG. 24 depicts the relative amounts of water and KOH transported through various candidate films and shows the relative ability with which water and KOH are transported across the films. This is an indication of "osmotic" transport. When such materials are used as separators in electrochemical cells, this property of the films can be advantageously leveraged to benefit the discharge behavior of a cell by accelerating the rebalancing of the OH$^-$ and H$_2$O concentrations in the electrolyte as the cell discharges. This is described in detail elsewhere herein, in reference to FIG. 28.

Osmotic Transport Test:

Water and KOH transport through films and membranes are performed using a glass fixture similar in construction to the one described to measure copper and sulfur species transport through films in the Exclusion Test. The film in question is placed between Side A and Side B and sealed with an "O" ring such that fluid communication between the two sides occurs only through the film. The tubes in this case are graduated in steps of 0.1 ml, such that the volume changes on each side may be monitored. After assembling the fixture, 14 ml of 45% KOH is placed in side A and 14 ml of 4.5% KOH solution in side B. Prior to assembly, the separators are equilibrated with 29% KOH for 12 hrs so as to minimize "wet-up" time.

The liquid level on the side containing 45% KOH rises, while the level on the other side falls. This is because osmotic transport causes the water to be transported through the film at a faster rate than the OH$^-$ ions. The preferential water transport to the side containing 45% KOH causes the liquid level to increase. The rate of volume change is monitored, and after 4 hours the solutions on both sides were sampled to analytically determine KOH concentration. The volume change on the 45% KOH side can be measured as a function of time for various films evaluated. The rate of water transport can then be calculated. The exposed cross-sectional surface area of the separators in this test is 1.4 cm$^2$. Determination of the concentration of liquid on each side provides an estimate of the average molar rate of transport through the film. The calculations are based on the total moles of water transported in a 4 hour period in the Osmotic Transport Test as shown in FIG. 24. Based on this calculation method, the moles of water or OH – ions transported in a 4 hour period can be estimated to determine the rate. The flux of the species transported depends upon the cross-sectional area of the film, as well as on the thickness of the material. The thicker the film, the less the transport. Similarly, the larger the cross-sectional surface area, the more the flux. In order to incorporate both these parameters, the transport rate here is reported as moles-cm/hr/cm$^2$, or simply moles/hr/cm.

Figure 28:
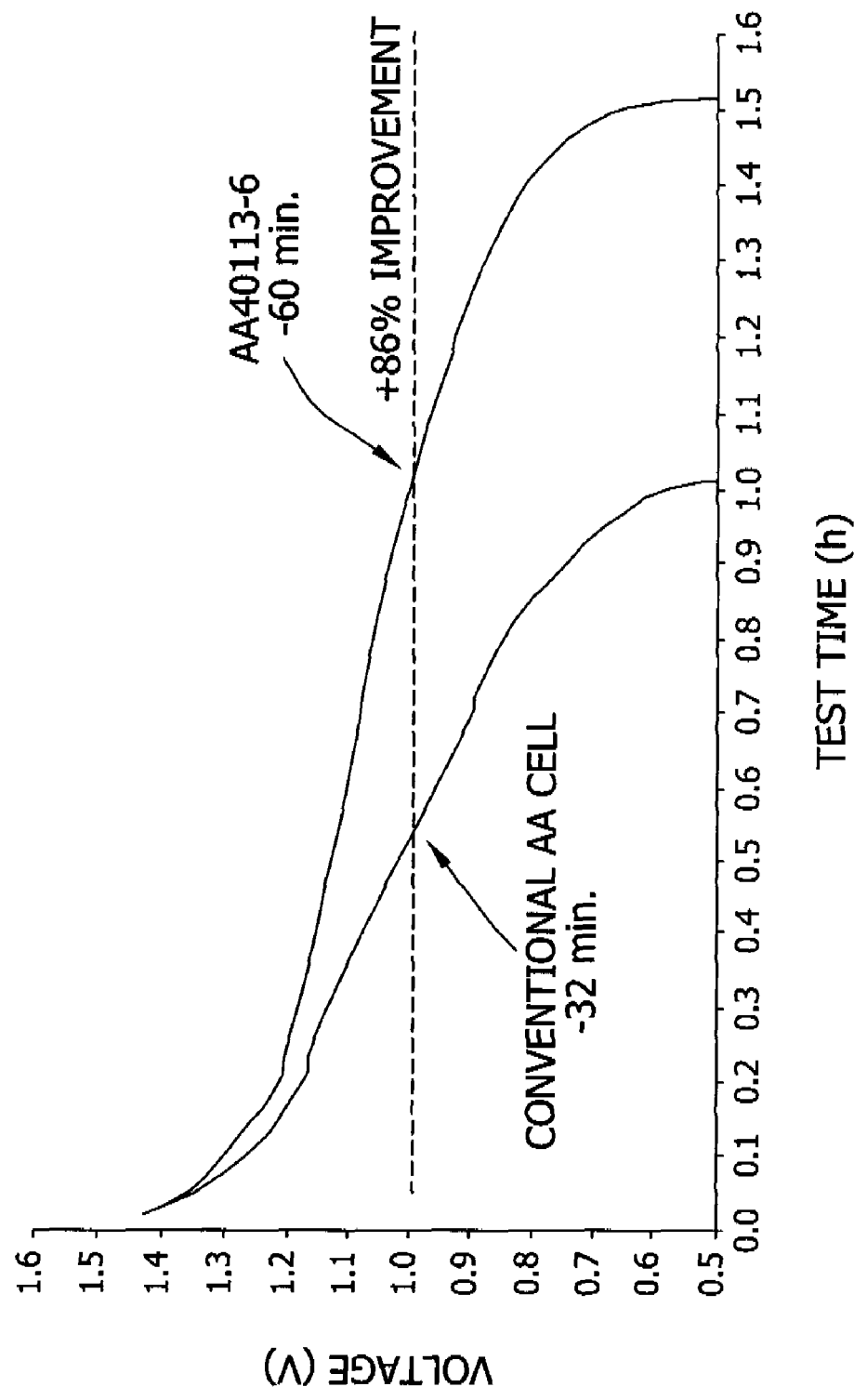
FIG. 28 is a graph plotting the voltage profile of a size AA cell using a separator constructed as detailed elsewhere herein, as compared to a size AA cell including a traditional non-woven fabric separator.

As explained in reference to FIG. 28, preferential water transport is believed to minimize concentration gradients between the anode and cathode in certain electrochemical systems and thereby reduce concentration polarization and maintain a higher cell operating voltage. While not being limited to specific discharge rates, this property is particularly beneficial during high rate discharges where concentration polarization tends to play a bigger role.

In accordance with one aspect of this invention, therefore, the electrochemical cell comprises film separators, the film having a water osmosis rate greater than at least about $1\times10^{-6}$ moles/cm/hr as determined using the Osmotic Transport Test described herein. Further, the films possess the ability to transport water at a rate greater than at least about $1\times10^{-5}$ moles/cm/hr, and at least about $5\times10^{-5}$ moles/cm/hr.

(iv) Ionic Resistance

The ionic resistance of the separator is an important characteristic that influences the discharge performance of the battery. Generally, the lower the resistance, the better the performance; however, this is preferably balanced against the need to provide adequate protection against internal shorting. The ionic resistance of a separator material is a function of the material characteristics according to the following equation:

$$R=\rho(1/A)$$

"R" is the resistance in ohms

"ρ" is the resistivity of the material with units of ohm-cm (derived from (ohm*cm$^2$/cm)

"l" is the thickness of the material with units of cm

"A"=cross-sectional area of the material perpendicular to the axis of flow, cm$^2$ The resistivity of a material is a fundamental characteristic of the material. The resistance "R" of a film in a particular electrolyte can be directly measured in a special fixture where a fixed gap is provided between two identical, planar, solid graphite electrodes. The exposed cross-sectional area for all measurements is fixed at 1 cm$^2$, hence the measured resistance is only a function of the material, its thickness, and the electrolyte being used. The gap between the electrodes is initially filled with a known electrolyte (e.g. 32% KOH in water) and the resistance of the electrolyte alone (background) is first measured across the gap by an AC impedance technique using a Solartron Model SI 1255 Frequency Response Analyzer known to one skilled in the art. A single high frequency (10 kHz), 10 mV sinusoidal signal is applied to determine the ohmic resistance of the gap between the two electrodes. The temperature is maintained at 22° C.±3° C. This initial measurement provides the background resistance between the two electrodes. Next, the separator material in question (e.g. PVA film) is placed in the holder and positioned directly between the two electrodes. The entire apparatus is filled with electrolyte above the level of the film and electrodes, air bubbles are removed, and the film is allowed to soak for at least 24 hours prior to measurement, so as to eliminate/minimize the effect of differences in the rate of absorption of electrolyte by different films. It is also possible to pre-soak the sample film in the electrolyte prior to fixture assembly. With the separator in place, the impedance measurement is again performed to determine the resistance between the two electrodes to provide a second resistance measurement. The difference between the second and the first measurement provides a measure of the resistance of the separator material. This is believed to be representative of the separator resistance in an actual battery after it has equilibrated with the electrolyte in the system. The method is used to screen various potential separator films and film combinations, with or without a non-woven material backing.

Table 5 shows the resistivity of various materials evaluated in such a fixture using 32-0 KOH electrolyte. The non-woven, being extremely open and porous, has very low resistivity, but in a practical battery, a minimum of 3, preferably 4 wraps of the material are necessary. To determine the actual resistance of a particular separator material in a battery, one would need to know the thickness and the total surface area.

TABLE 5

| Material | Resistivity (ohm-cm) |
| --- | --- |
| Viskase Cellophane | 23.6 |
| F3T23 non-woven | 3.8 |
| M2000 PVA film | 37.7 |
| M1000 PVA film | 38.9 |
| M 1030 PVA film | 23.3 |
| PVA-ZnS (1 mg/cm$^2$) | 37.4 |
| PVA-Cloisite Na$^+$, 4% d/d | 42.8 |
| Laminated PVA/PVA-ZnS/PVA (1.0/0.6/1.0 mil) | 31.5 |

Suitably, the separator materials used in the present disclosure have an ionic resistivity of less than about 100 ohm-cm. More suitably, the separator materials have an ionic resistivity of less than about 50 ohm-cm, even more suitably, less than about 40 ohm-cm, even more suitably, less than about 25 ohm-cm, even more suitably, less than about 10 ohm-cm, and even more suitably less than about 5 ohm-cm.

E. Separator Configuration and Seam and Bottom Sealing

Difficulty number 4 described above (involving ion permeability through the separator side and/or end seam(s)) may be addressed, for example, by the following methods and corresponding apparatus.

(i) Sealing Methods

A sealed separator, while applicable to all battery systems, finds particular applicability to a system such as that described herein, where soluble species from one electrode can migrate to the other electrode, thereby degrading performance or shelf life. These are generally referred to as anode-fouling soluble species. In such cases, separator material alone can be insufficient because soluble species can migrate around a seam or end of the separator, unless a substantially impervious seal is provided.

As described above, it is desirable that fluid communication between the cathode and the anode via routes around the separator is minimized or eliminated by sealing the separator such that the anode is in substantial fluid isolation from the cathode except via a route through the separator. The method of sealing the separator material can be achieved by known methods, including adhesive sealing, heat sealing, ultrasonic sealing, and the like. The separator so formed can take the shape of a tube having a closed end. For water-soluble separator materials, including polyvinyl alcohol, softening the materials with a limited amount of water and then sealing with heat or pressure or both can form the seal. This arrangement is desirable as the fused separator seal typically limits the likelihood of an undesired channel for direct fluid communication between the cathode and the anode.

In a button or prismatic flat cell, a good seal is generally attainable to effectively limit anode-fouling soluble species from seeping around the separator, since the separator is pressed tightly against a flat surface (e.g., the disc or prismatic shaped electrode) by an opposing member such as an insulating grommet. In cylindrical cells however, a good seal is not easily achieved, since for ease, speed and cost of manufacture, the separator is normally inserted as a convolute, spiral wound tube or cross-placed into the cavity and the seam is difficult to seal.

A cylindrical separator can be provided having an outer periphery and a first and second end. The end of the separator to be disposed proximal the positive terminal end of the cell can be seamless, either during fabrication of the separator (i.e., via extrusion, melt blowing, and the like) or can be sealed by chemical or physical means to effectively limit the migration of anode-fouling soluble species. Chemical sealing methods include the use of an adhesive with or without a chemical bond involved. Physical sealing methods include heat (welding), vibration (e.g. ultrasonic bonding), and application of pressure or combinations thereof. Various combinations of chemical and/or physical sealing methods may also be applied depending on the material of choice—for example, to bond a PVA film to itself, use of heat, water and/or pressure can be used to produce an effective seal/joint.

Among the chemical sealing methods, one method of forming such a seal involves using a cross-linkable polymer and a cross-linking agent to provide at least a seam seal and a bottom seal and desirably also a top seal (after introduction of the gelled anode into the separator cavity).

A seam-sealed and bottom sealed separator configuration can be produced externally and then inserted into a cell, or can be produced in situ after insertion of a spirally wound, convolute or cross-placed separator tube into a cell cavity.

Cross-linking locks a polymer in place and produces a seal that is intact throughout the life of the battery. Simple coagulation of the polymer or precipitation in a high pH environment typically produces a gelatinous mass that can move or be displaced by expansion or contraction during operation or physical or mechanical shock in normal handling or transportation, thereby compromising the seal. Adhesive polymers without cross-linking may also be used, it being desired, of course, that the seal produced is stable in the battery electrolyte over the life of the battery and it does not permit more transport of anode-fouling species at the seam or bottom seal, than the separator material itself.

With the proper choice of materials, both cross-linking and coagulation can be effective. Two suitable separator materials are presented as examples of ex-situ seals. One material is cellophane and the other is a hybrid separator, which comprises a non-woven fabric coated with PVA, which is cross-linked using a cross-linking agent. Sufficient loading of PVA is necessary (>5 g/m$^2$) to make the non-woven paper substantially impermeable to air, with Gurley air permeability >500 sec. Low air permeability ensures that in a battery, when the polymer swells upon absorbing electrolyte, there would be substantially no paths for the transport of the anode-fouling soluble species through the material. To make a seam seal, a layer of viscous PVA solution (e.g., 2-10% by weight in water) is applied near the seam, the two surfaces brought together, followed by application of a thin layer of a cross-linking agent such as sodium borate or others known in the art. The seal area cross-links immediately, while also bonding the two surfaces together. A simple test of 5 days soak in concentrated KOH electrolyte shows that the seam is intact and cannot be physically torn apart, suggesting good operational characteristics in a battery. The efficacy of the seal in effectively limiting anode-fouling soluble species may be tested using the Exclusion Test described herein. Other suitable cross-linkable polymers suitable or use as the adhesive include but are not limited to polyethylene glycol, polyvinyl-butyral, and polyvinylpyrrolidone.

To produce a bottom seal, one end of a wound separator tube with at least some overlap between layers (and with a mandrel inside) is folded to form a cup over a disk shaped piece of the same or other separator placed on the end face of the mandrel followed by a drop of the cross-linkable polymer (e.g. PVA). Upon addition of sufficient cross-linking agent, a cross-linked, adherent composite folded bottom is created, which effectively limits the migration of the anode-fouling soluble species. The tubular shaped separator can then be utilized to produce a battery in the traditional manner.

While an ex-situ seal as described above is very effective, it may not be the most desirable from a battery design and performance perspective, because there is often a gap that exists between the sealed tube and the cathode cavity. This space can create a poor wetted interface between the anode and the cathode, leading to poor battery performance, particularly after prolonged shelf storage. One solution to this problem is to use a separator that swells significantly upon electrolyte absorption, thereby filling the space that existed between the dry tube and the cathode. A pleated tubular shaped separator that can expand after insertion can also be used. Another solution to the problem is to produce such a seal in-situ after insertion of a spiral wound tube (for example), as described below for the case of a cross-linkable, polymer-coated, non-woven separator. The particular advantage of an in-situ aspect is that when an unsealed spirally wound tube or cross-placed separator is inserted into a cavity, it has the opportunity to expand into the volume available and reduce the gap between itself and the cathode material to produce a good interface. This can be further aided in the case of a wound tube in the process of removing the insertion mandrel, by a slight counter-directional twist or a controlled jet of gas to allow or cause the separator to expand into the cavity since the seam is not yet sealed.

Hence, in a desired embodiment, to obtain an in-situ seal, a non-woven separator may be coated with sufficient loading of a mixture of a cross-linkable polymer (e.g., PVA) and a cross-linking agent (e.g. a borate derivative) to render it substantially impervious (Gurley air permeability >500 sec). The cross-linking agent is selected such that it will not immediately cross-link the PVA (i.e., remain dormant until activated appropriately). An example of such a borate derivative cross-linking agent is boric acid. In this particular example, cross-linking will occur when the pH increases above 7 in the battery after (KOH) electrolyte contacts the separator, thereby activating the cross-linking agent. The substantially dry PVA/boric acid coated separator is wound around a mandrel (as in present day alkaline cell manufacturing) with at least some overlap between layers. One end is folded to form a cup shaped bottom, and the tube is inserted into a cathode cavity. A bottom disk comprising the same or other separator material coated with a cross-linkable polymer and cross-linking agent, as above, is next inserted into the tube so as to rest inside the folded bottom of the wound separator tube. When a pre-shot of electrolyte is introduced into the separator tube, or Zn gel containing electrolyte is added, it will cause cross-linking of the PVA in the presence of the boric acid, simultaneously also forming a seal or bond between adjacent layers of the separator, the bottom disk and tube, as well as the seam in the overlap region.

Another method of achieving the same objective is to start with a non-woven paper, which has a sufficient amount of cross-linkable polymer, e.g. PVA (but without cross-linking agent) coated on it to render it substantially impervious (Gurley air permeability >500 sec). A folded bottom is created and it is inserted into a cathode cavity as described above, followed by insertion of a bottom cup coated or impregnated with PVA. Cross-linking agent (e.g. sodium borate) is next applied to the inserted separator tube, thereby simultaneously cross-linking and sealing the adjacent layers of the separator tube, the bottom to the bottom cup and the seal region at the overlap. It has been found that this process of cross-linking becomes more efficient if the separator is pre-wet or sprayed with water prior to application of the cross-linker. It should be appreciated that the correct process steps and conditions should be optimized based on the nature of the cross-linkable polymer and the cross-linker.

Other polymers and/or cross-linking agents can be used to achieve the same end result. By way of a non-limiting example, carboxylic groups can be introduced into PVA and cross-linked with glutaraldehyde to improve film properties, as can regenerated cellulose coated or laminated on PVA or modified PVA. PVA can be copolymerized with acrylic acid to significantly lower ionic resistance. Acetylized PVA films can be modified with polyacrylic acid. Acrylic- or methacrylic acid-grafted PVA can also be used. Similarly, grafted methacrylic acid on a polyethylene or polypropylene membrane is also suitable as a separator.

In another aspect, a combination of the ex-situ and in-situ processes can also be used. For example, the PVA can first be applied to the wound separator seam and bottom of an appropriate separator material followed by insertion into the cell cavity. The requisite amount of sodium borate (or other) cross-linking agent may next be applied into the tube, to cause the assembly to cross-link and seal in place.

An additional aspect of this invention is the optional incorporation of conductivity and structure-enhancing fillers or additives, as noted elsewhere herein (e.g., clay additives, like Laponite®, fumed silica, Bentonite, etc., or metal sulfides) into the separator during the polymer coating process. Since higher loadings of PVA than in conventional cells is required to make the non-woven layer impervious, this can increase the electrical resistivity of the separator. Incorporation of appropriate fillers will tend to enhance the conductivity to more acceptable levels and improve battery discharge characteristics.

A second general method of producing a sealed separator is physical, using a heat-sealable polymeric material, such as PVA, polyethylene, polypropylene, nylon, and the like. The seal is formed by providing a layer of the polymeric material, in the form of a continuous film, or porous fibrous film, and inserting the layer into the area to be sealed (e.g., the outer periphery of a separator to be installed into a size AA cell). The separator then can form a seal under controlled heating with or without application of pressure. The heat sealable polymeric layer can also be applied to one surface of a separator layer (that may or may not be heat sealable), and subsequently wound into a cylinder, such that the overlapping region will comprise a layer of the sealable polymeric material interfacing with another separator layer. The heat sealable polymeric material will thus seal against the other separator layer under a controlled heating condition. The polymeric material may further be positioned adjacent the outer periphery or the inner periphery cylindrical separator prior to forming the separator into a cylinder. Alternatively, the polymeric material can be applied to the interface of two overlapping ends (that would not otherwise bond with each other) of a cylindrical separator. The polymeric seal would thus bond the two ends together under a controlled heating condition, and form a seal. A suitably shaped polymeric layer can also be laminated or coated onto either side of a separator to be installed into a button cell, such that the polymeric material seals the outer periphery of the separator during a controlled heating condition.

The use of ultrasonic vibration to fuse the material to itself or another material has been found effective in producing a good seal in (for example) PVA films.

A third method for forming a seal is to apply hot wax, or epoxy resin, or other glue type sealant to the seams. An important aspect is that the materials used here (wax or epoxy) be resistant to the highly alkaline environment of the battery and maintain their sealing characteristics.

Alternatively, seamless separator tubes using a variety of polymer processing methods such as extrusion, injection molding, or blow moulding/blown films can be employed. Likewise, seamless tubes can be prepared by, e.g., completely coating a seamed material such as a fibrous material with a suitable separator forming polymer such as regenerated cellulose such that the seam is not present in the separator, but rather in the underlying material. It should be appreciated that the separator structures described herein may include any number of layers of the materials described above to more effectively limit the migration of the anode-fouling soluble species.

A still further alternative is to combine heat sealing and polymer cross-linking by coating or laminating a cross-linkable polymer with cross-linking agent onto a separator such as cellophane. The separator can be placed into position using convention placement methods. Introduction of electrolyte alone or in the anode will cross-link the polymer to form a sealed separator.

It should be further appreciated that the positive and negative ends of the separator should also be desirably sealed in a manner sufficient to effectively limit the migration of anode-fouling soluble species to the anode. Cylindrical cells typically include an annular grommet disposed proximal the negative cell terminal end that is compressed either axially or radially against the cathode and separator to prevent anode spillover. The negative end of the separator can abut and be sealed against the grommet by dispensing a polymer to the periphery of the separator at the negative end, and sealing the polymer against the grommet under controlled heating conditions. A chemical bond including cross-linking may also be used to create a seal. The negative end of the separator can also be mechanically sealed using a grommet or the like with an appropriately designed separator lock. Alternatively, a physical seal can be applied to the upper end of the zinc anode to effectively limit the migration of anode-fouling soluble species to the anode. The negative end can also be sealed by using a disk shaped cap coated with a cross-linkable polymer which will seal against the seam and bottom-sealed cylindrical separator tube when the polymer is cross-linked. Alternatively, the top surface and edge of the cathode may be covered by appropriate cross-linkable polymers or polymer gels to effectively limit migration of anode-fouling soluble species. Alternatively, the top surface of the anode may be covered by appropriate cross-linkable polymers or polymer gels to effectively limit migration of anode-fouling soluble species from the cathode.

Figure 25:
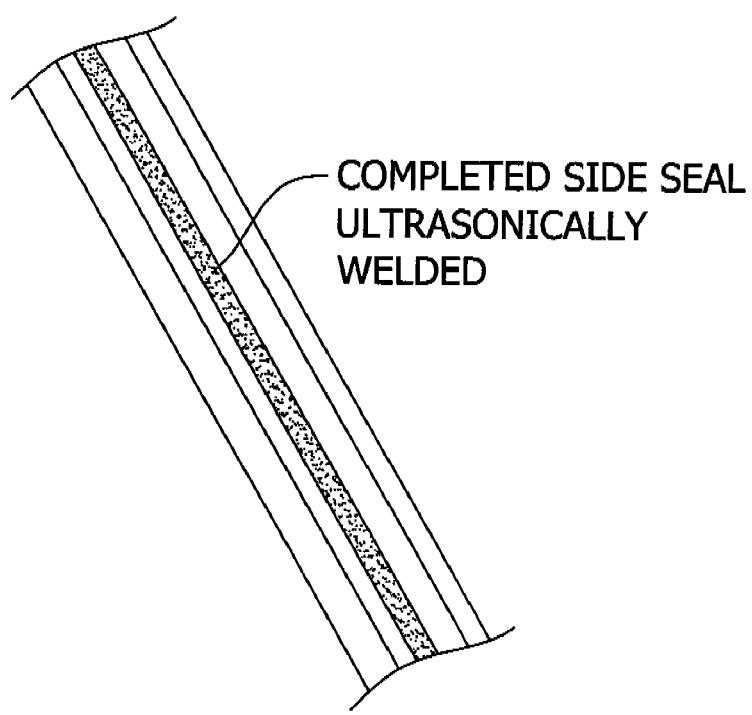
FIG. 25 is an illustration of a fully welded side seam of PVA film using an ultrasonic welding technique.

In a fourth method, a side seal can be fabricated using a mandrel and shoe set-up and ultrasonically fusing the material to form a side (seam) seal. A cut piece of PVA film is wrapped around the mandrel and held captive by the shoe. Sufficient film over-wrap is maintained for processing purposes, and a seal overlap of approximately 3 mm is targeted. The mandrel/shoe set-up is placed onto a speed-programmable slide, which is in turn mounted to a spring-loaded plate. The slide and plate are then placed under an ultrasonic welding horn, operating desirably between 20 kHz and 40 kHz. The force that the plate exerts between the horn and the PVA film on the mandrel (desirably 3-10 $lb_f$, alternatively 4-7 $lb_f$, or alternatively 5-6 $lb_f$) is adjustable by using springs with different spring constants. The quality of the welded seam is dependent upon the speed of the slide, the pressure of the film against the horn, the amplitude of the welder, and the moisture content/temperature of the film during the welding process. Moisture content at 21° C. is desirably 1-25%, alternatively 3-10%, and alternatively still 5-7%. When welding is complete, the final tube should be a continuously sealed cylinder substantially devoid of porosity (in excess of that of the base film material) caused by either insufficient or excessive heating derived from ultrasonic welding (see FIG. 25). The excess over-lap may be trimmed away from the cylindrical tube.

Figure 26:
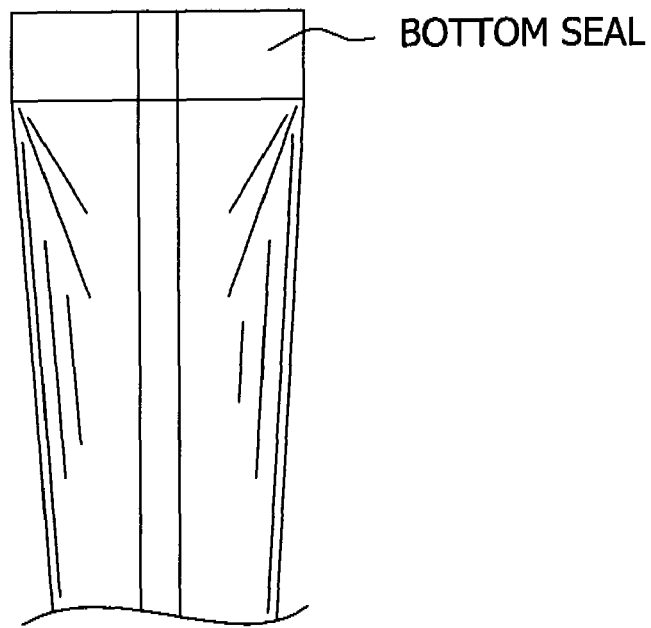
FIG. 26 illustrates a seam sealed cylindrical separator member having a sealed end using an impulse heat-sealing apparatus.
Figure 27:
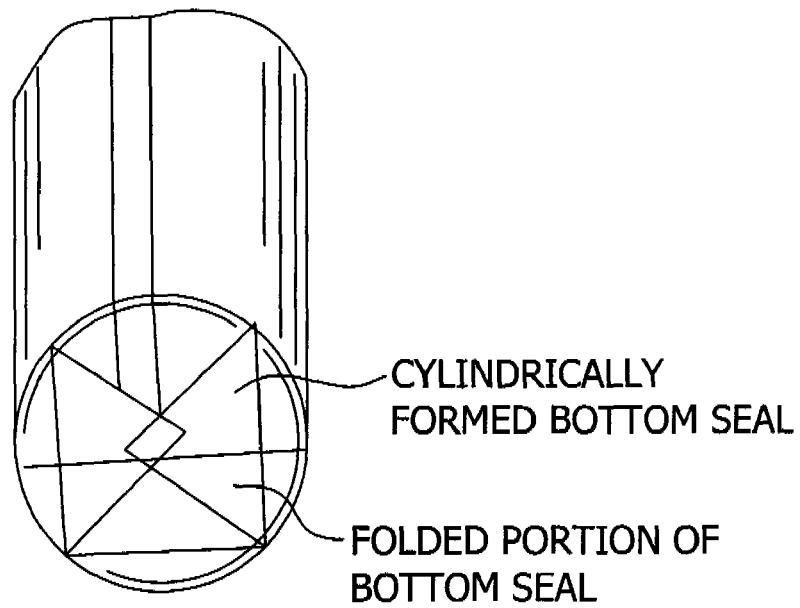
FIG. 27 illustrates the bottom of a seam sealed and bottom sealed PVA separator tube formed into the shape of the bottom of a cell can or container into which it will be inserted.

In order to create a sealed separator tube or bag, at least a portion of an end of the fully side-sealed cylinder should be sealed. Using an impulse heat-sealing apparatus (Fuji FS-315), at least a portion of an end of the cylinder is sealed in a line substantially perpendicular to that of the side seal (see FIG. 26). The sealed end can then be folded and formed into a cylindrical shape via multiple methods such that the internal bag volume is maximized and the tube is given the shape of the bottom of the can into which it is subsequently inserted (see FIG. 27). Any other suitable end sealing method including ultrasonics, adhesive sealing or the like may be employed as described so long as anode-fouling soluble species are effectively limited from migrating to the anode.

It is to be noted that, as further detailed below, an adhesive material may optionally be utilized to bond or seal the separator with the sealing assembly and/or container of the electrochemical cell, to effectively minimize physical and/or chemical transport between the anode and the cathode compartments of the cell (see, e.g., U.S. patent Ser. No. 11/058,665 entitled "Adhesive for Use in an Electrochemical Cell", which was filed on Feb. 15, 2005, the entire contents of which is incorporated herein by reference).

(ii). Adhesives

Figure 38:
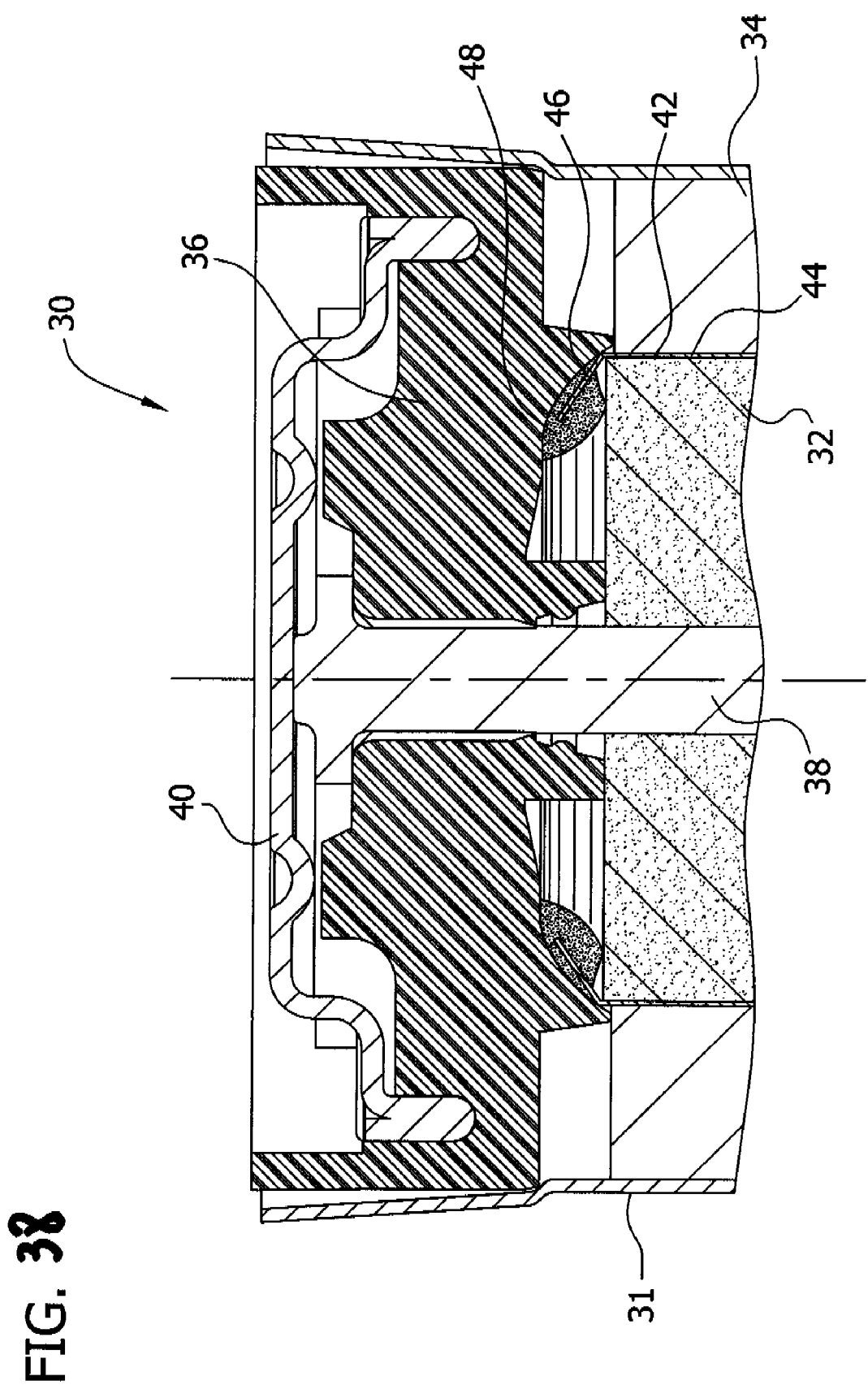
FIG. 38 illustrates a cross section of an electrochemical cell in an open configuration including an adhesive material positioned according to one embodiment of the present invention.

Referring now to FIG. 38, there is shown an electrochemical cell 30 having a container 31, an anode 32, a cathode 34, a sealing assembly 36, a negative current collector 38, negative terminal plate 40, and separator 42. In this embodiment, the separator 42 comprises a first portion 44 located between the anode 32 and the cathode 34, and a second portion 46 which extends longitudinally out of the anode 32 and cathode 34 and under the sealing assembly 36. Encapsulating and being mechanically bonded to the second portion 46 of separator 42 is adhesive material 48, which is also mechanically bonded to sealing assembly 36. By sealing the second portion 46 of the separator 42, this adhesive material 48 substantially minimizes or eliminates physical and chemical transport from the anode 32 to the cathode 34, and vice versa, which can result in fouling and a short circuit in the battery. The adhesive material 48 allows for the use of thin film separator materials (e.g., films or films coupled to a non-woven) which have been traditionally difficult to use effectively in combination with conventional compressed gasket systems due to the insufficient wet strength of the separator which compromises an effective seal that can prevent or minimize cross-transport of anode and cathode particles during handling, use, abuse, etc.

Figure 39:
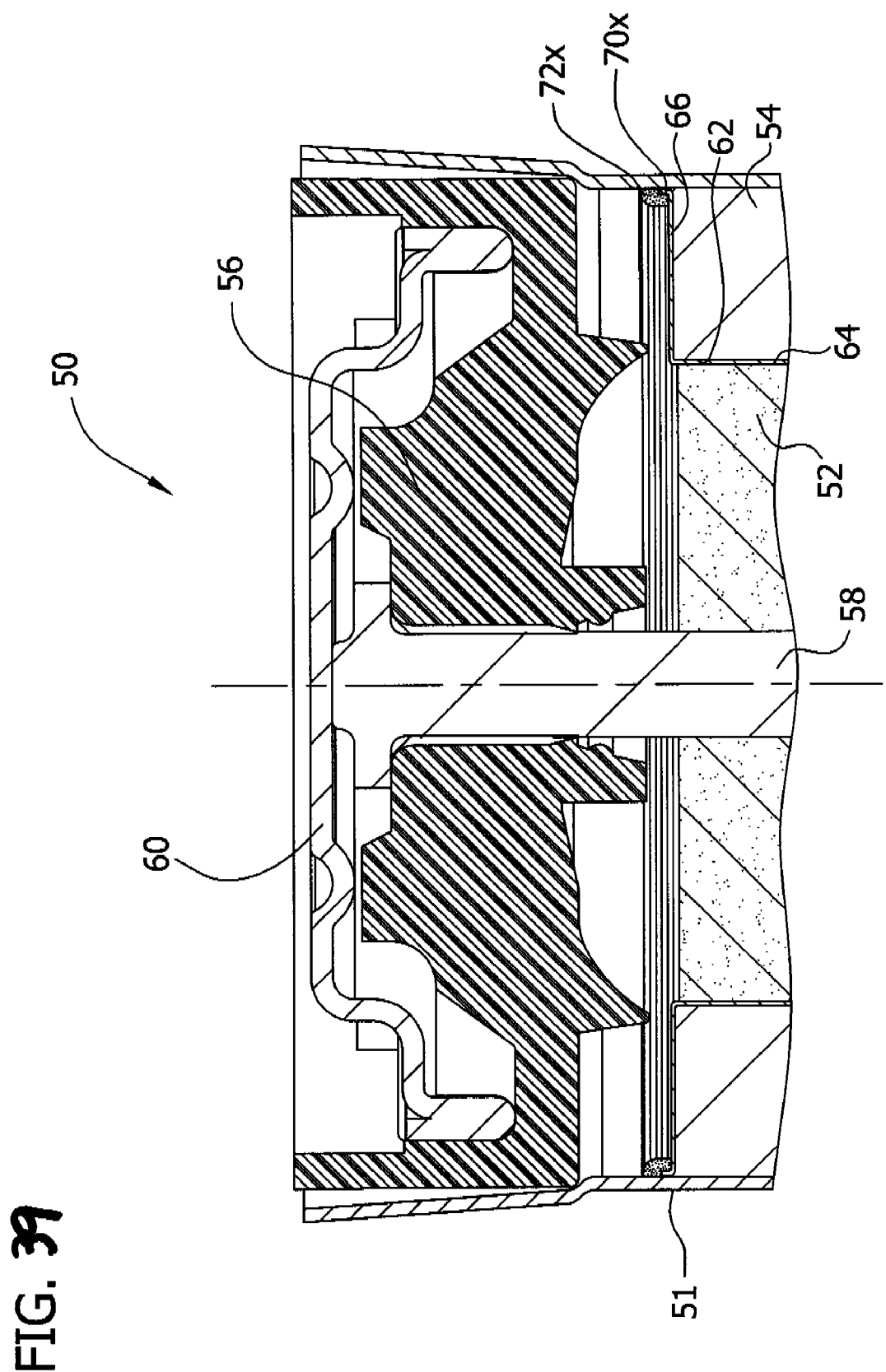
FIG. 39 illustrates a cross section of an electrochemical cell in an open configuration including an adhesive material positioned according to one embodiment of the present invention.

Referring now to FIG. 39, there is shown an electrochemical cell 50 having a container 51, an anode 52, a cathode 54, a sealing assembly 56, a negative current collector 58, negative terminal plate 60, and separator 62. In this embodiment, the separator 62 comprises a first portion 64 located between the anode 52 and the cathode 54, a second portion 66 located between adhesive material 72x and cathode 54, and a third portion 70x which extends longitudinally above cathode 54 and parallel to container 51. Mechanically bonded to the container 51 and to the third portion 70x of separator 62 is adhesive material 72*x*. By sealing the third portion 70*x* of the separator 62, this adhesive material 72*x* substantially minimizes or eliminates physical and chemical transport from the anode 32 to the cathode 34, and vice versa, which can result in fouling and a short circuit in the battery. The adhesive material 72*x* allows for the use of thin film separator materials which have been traditionally difficult to use effectively as noted above.

The adhesive material utilized to bond or seal the separator with the sealing assembly and/or the container as described in the above embodiments is an adhesive material that is substantially chemically inert with respect to highly alkaline environments, such as those encountered with alkaline electrolytes, such as potassium hydroxide or sodium hydroxide. The adhesive material mechanically bonds the separator with the sealing assembly and/or the container, and substantially minimizes or eliminates any physical and/or chemical transport of species harmful to the anode/cathode from transporting over the top of the separator. Materials that have a high exclusion value against the fouling species noted herein would be applicable as an adhesive material if capable of being applied in appropriate locations. As such, materials based on ethyl vinyl acetate are suitable adhesives. Examples of commercially available vinyl acetate/ethylene copolymer emulsion adhesives include, for example, Airflex 323, Airflex 405, Airflex 426, and Airflex 920 carboxylated (Air Products and Chemicals, Inc. Allentown, Pa.). Although not required, it is generally preferable that the adhesive material be substantially or completely cured prior to any contact with the alkaline electrolyte to reduce or eliminate the potential for chemical interaction therebetween. Although any number of commercially available adhesive materials or epoxy materials could be used in accordance with the present invention, some specific adhesives include ethyl vinyl acetate polymers, vinyl acetate/ethylene copolymers, and combinations thereof. Other specific adhesive materials include those sold under the TRA-BOND trade name (TRA-CON, Bedford, Me.), and include, for example, TRA-BOND 2129 and TRA-BOND 2101. Additionally, adhesives that possess high hydrophobicity are suitable adhesives and include for example, fluorinated polymers.

The adhesive materials used to form mechanical bonds with the separator to reduce unwanted physical and chemical transport and short circuits are substantially resistant to chemical attack by water and alkaline electrolytes such as potassium hydroxide, as noted above. Additionally, it is generally desirable that the adhesive material not substantially transmit copper, silver and/or sulfur species into the surrounding environment, as such species can negatively affect the life of the battery through anode fouling. Also, although not required, the adhesive material is desirably allowed to cure for a sufficient period of time to create a strong bond between components prior to use in the battery. Such curing allows the adhesive material to better withstand the highly alkaline environment of the electrochemical cell.

Referring again to FIG. 1, to finally assemble the electrochemical cell 2 illustrated therein, the cathode 16, separator 20 and anode 18 are loaded into the container 8 with the container in its open configuration (as shown in FIG. 1). The sealing assembly 22, negative current collector 24 and negative terminal plate 28 are placed in the open upper end of the container 8 with the sealing assembly 22 seating on the shoulder 23 formed at the junction of the upper and lower extents 27, 29 of the container and the negative terminal plate 28 seated on the shoulder formed in the sealing assembly 22.

The upper extent 27 of the container side wall 12 is then bent inward, thereby bending the outer vertical leg of the outer portion 25 of the sealing assembly 22 over the outer edge of the negative terminal plate 28 to complete the assembly of the cell. As the upper extent 27 of the container side wall 12 is bent inward, the inner diameter of the upper extent 27 of the container side wall 12 becomes substantially equal to the inner diameter of the lower extent 29 of the container side wall 12. The upper extent 27 of the container side wall 12 thus applies a compressive (e.g., inward) force against the outer portion 25 of the sealing assembly 22 as the side wall diameter decreases. A downward compressive force is also applied against the inner portion of the sealing assembly 22. The inner flange is urged downwardly so that the spacing between the inner flange and the cathode 16 is less than the thickness of the separator 20 to thereby pinch (e.g., compress) the second portion of the separator between the anode 18 and the sealing assembly 22. It is contemplated that the spacing between the anode 18 and the inner flange in the closed configuration of the container 8 may be approximately equal to the thickness of the separator 20 (so as to hold the separator therebetween with little or no compression applied to the separator), or slightly greater than the thickness of the separator. In one embodiment of the present invention, the downward compression of the sealing assembly places the sealing assembly in contact with adhesive material.

Figure 40:
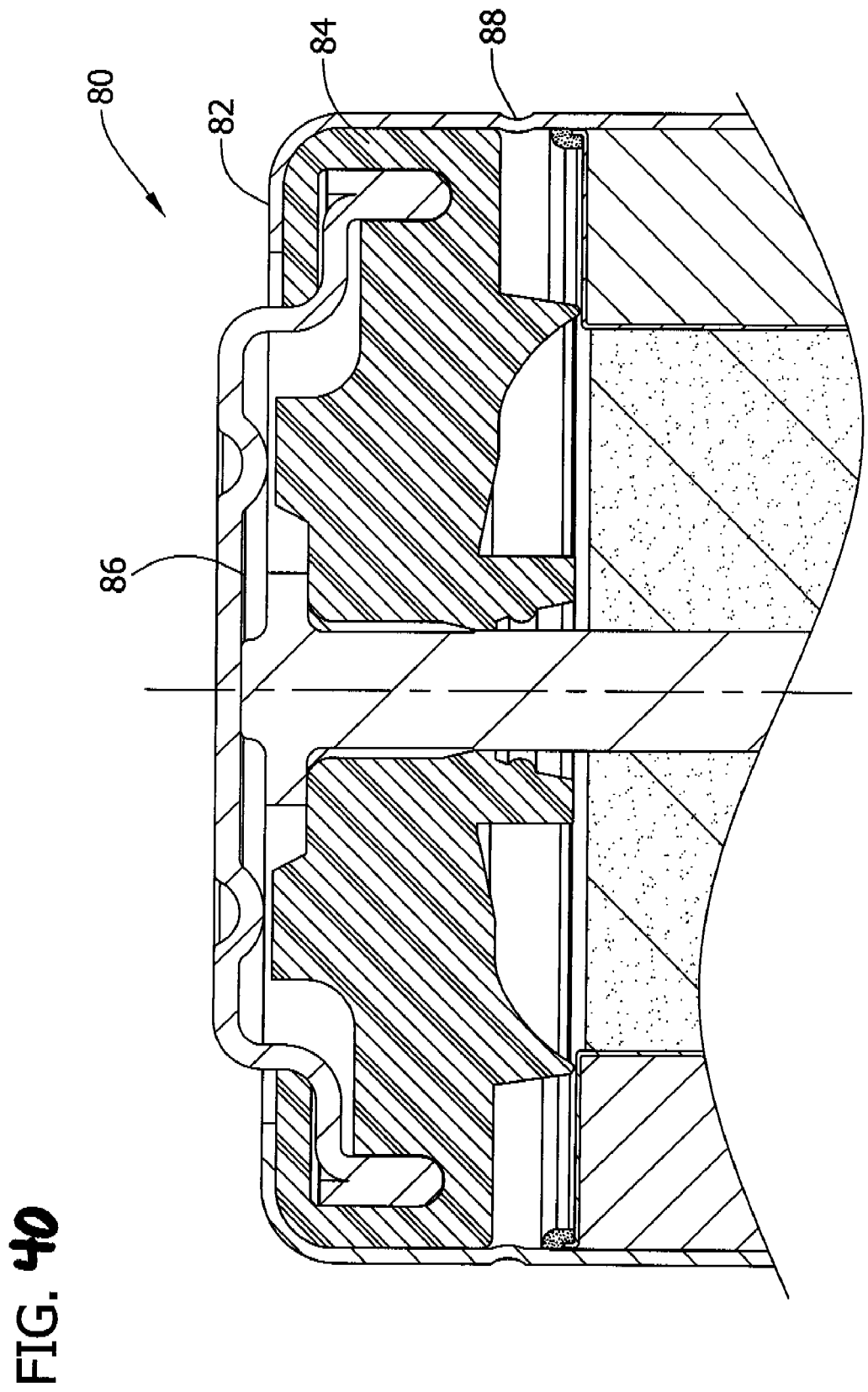
FIG. 40 illustrates a cross section of an electrochemical cell in a closed configuration.

Referring now to FIG. 40, there is shown an electrochemical cell 80 in a closed configuration; that is, the configuration after the cell has been loaded and sealed. As illustrated in FIG. 40, the upper extent portions of the container side wall 82 have been bent inward, thereby bending the outer vertical leg of the outer portion of the sealing assembly 84 over the outer edge of the negative terminal plate 86. Upon closing the container, an annular groove 88 is formed in the container as a result of the shoulder having been initially formed in the open configuration of the container.

(iii) Testing

The creation of a sealed tube substantially free of leaks is desirable to provide a suitably operable cell. A qualitative test is used to determine seal quality in the following manner. A hollow tube with an outer diameter (OD) that is undersized from the PVA bag inner diameter (ID) by about 0.005" is connected to a gas supply (preferably Argon or Nitrogen). A PVA bag, which is significantly taller than the height required for the cylindrical cell, is inserted onto the hollow tube so that the total height of the bag to be installed in the cell is still below the bottom of the hollow tube. An elastomeric O-ring is then placed over the PVA bag in such a manner as to seal the bag against the hollow tube. A gas pressure of 2-3 psig is supplied to the tube, and sufficient time is allowed for the bag to fill with gas and reach an ultimate pressure of 2-3 psig. Once the bag is inflated (without any dimensional deformation to the PVA bag) it is inserted into a bath of Ethanol (95.2%, Fisher Scientific, located in Pittsburgh, Pa.) and the presence of gas bubbling through the ethanol is indicative of a leak in the sealed bag and will render the bag unusable.

Finally, diffusion of anode-fouling soluble species may be effectively limited when a suitable separator is configured as described herein. Simple experiments can be performed to screen various sample materials directly in button cells or other test vehicles and monitor the open circuit voltage (OCV) over time. A decay in OCV is an indicator of a change in the surface of one of the electrodes, most likely the result of migration of an anode-fouling soluble species, since all other components in the cell are known to typically not cause OCV decay. For more quantitative separator material screening and selection as well as to evaluate improvements and/or modifications made to a particular material, an "out-of-cell" test (such as the Exclusion Test described herein) in a specially designed fixture is more desirable. The Exclusion Test was performed as follows to determine suitability of separator materials or to determine the efficacy of a seal.

A glass tube was provided having a first end (Side A) and a second end (Side B) divided by two L-shaped O-ring seal joints with an o-ring size of –112 (Ace Glass, located in Vineland, N.J.). The separator or sealed seam of the separator sample was placed in the center of the tube, between the O-ring seal joints. Side A of the glass tube was filled with 10 mL of 34 wt. % KOH containing a mixture of 0.25 g CuO and 0.25 g of CuS. This ensured that there was a constant supply of soluble copper and sulfur species in the bulk solution substantially close to the equilibrium concentration under those conditions for the duration of the experiment. Side B was filled with 10 mL of 34 wt. % of KOH substantially free of CuO, CuS, or a mixture of CuO and CuS. The use of CuO and CuS particles was selected over the use of a known concentration of the soluble copper and sulfur species in side A because it also more closely mimics the conditions prevailing in a battery containing the solid cathode materials in electrolyte. For silver exclusion experiments, 0.25 g of AgO was utilized in Side A. The difference between the concentrations of the species on side A versus side B provided an Exclusion Value, which is a measure of the ability of the separator to effectively limit migration of anode-fouling soluble species through the separator. When starting with undissolved materials like CuO or CuS powders placed in KOH in side A of the glass tube, the experiment will also indicate the solubility of the soluble species from the undissolved materials. A high concentration of KOH (e.g. 34 wt. %) is desirable, to ensure rapid and significant solubility of the anode-fouling soluble species. The above-described experiment was performed at 60° C. for 5 days.

When an alkaline battery discharges, the cathode reaction consumes water and generates $OH^-$ ions, while the anode consumes $OH^-$ and generates water. It is therefore necessary to have sufficient water available within the pores of the cathode for the immediate needs of the reaction at the cathode. A fresh anode generally has adequate electrolyte to support the anode and cathode discharge reactions since the zinc particles are suspended in a gel. As the reaction progresses, particularly under continuous high drain conditions, concentration gradients in the anode and cathode contribute to cell polarization, resulting in a decreasing voltage. To compensate for the accumulation of $OH^-$ ions in the cathode and of water in the anode, rapid mass transport between the two electrodes is critical in order to decrease the cell polarization and thereby keep the operating voltage from decaying too rapidly. Since the wet separator represents the interface between the two electrodes, it is advantageous under such conditions to use separator materials that have the ability to rapidly and preferentially transport water or $OH^-$ ions such that the concentration gradients do not become too high. Since it is a relatively dry mass, water transport to the cathode to keep the $OH^-$ concentration from becoming too high, is highly desirable. The opposite is true in the anode, where too rapid a dilution of the electrolyte is undesirable since it can cause premature passivation of the zinc anode leading to premature failure.

Transport of a solvent through a membrane from a region of low concentration of a salt to a region of high concentration is termed osmosis. Film separators such as cellophane, polyvinyl alcohol, ethyl vinyl alcohol, etc. show a strong osmotic behavior. The films transport water preferentially over $OH^-$ when there is a concentration gradient across them. This property of such films has been put to use in batteries by using such films as separators, where, during high rate constant current discharge, the separator film is able to selectively and rapidly transport water from the anode compartment to the cathode compartment to reduce the polarization that normally occurs. This keeps the anode electrolyte concentration high and the cathode electrolyte concentration low enough to provide a higher than normal operating voltage. As a result, a high rate device would run longer with a battery using such a separator.

FIG. 28 compares a AA alkaline battery with PVA film separator to a conventional AA alkaline battery using a non-woven separator on a 1 Amp ("A") continuous discharge test, at a temperature of about 20° C. It can be seen that the voltage of the battery with the PVA film separator remains significantly higher than the comparative conventional cell, providing more than 45 minutes, alternatively 50 minutes of discharge to the 1V limit versus only about 32 minutes. This represents >80% improvement in performance. It is to be noted that the best commercially available AA primary alkaline batteries deliver about 40 minutes on the 1 Ampere continuous discharge test.

Another benefit of using such film separators is that the volume occupied by the separator becomes significantly reduced over conventional designs using several layers of non-woven materials. This increased internal volume is available for active materials and electrolyte, further enhancing battery service life particularly at the low and intermediate discharge drains where the amount of active material dictates the service life of the battery. While there are particular benefits to the use of film separators of the type disclosed here, these materials may also be used in combination with a layer or more of a non-woven or micro-porous material which may impart other desirable properties to the system, like for example, rapid electrolyte absorption during high speed manufacture, etc.

Still another potential benefit is that a film such as PVA softens and swells upon absorption of electrolyte, thereby conforming to the surface of the cathode and providing an intimate anode/cathode interface, which is beneficial to high rate performance.

It is to be noted that the use of such films possessing desirable water transport properties is not limited to electrochemical cells where anode fouling soluble species are generated at the cathode. The preferential water transport properties are beneficial to a wide range of electrochemical systems like Fuel Cells and conventional alkaline $Zn/MnO_2$ batteries. When utilizing such films in a conventional alkaline battery such as $Zn/MnO_2$, it is not necessary to completely seal the seam and bottom as is necessary in situations where anode-fouling species are present. Hence in these instances, it is not necessary to configure the separator such that all fluid communication occurs only through the separator material. As long as internal shorting between the anode and cathode can be prevented by other means involving a careful design of the battery, such film materials may be used without a seam seal and a bottom seal and still leverage the preferential water transport properties.

The thicknesses of the films described here typically ranged from about 25 microns (micrometer) to about 40 microns. However, a wider range of thicknesses may be used depending on the characteristics desired and the properties of the films. For example, since PVA is more resistive than cellophane, in a conventional alkaline battery with an $MnO_2$ cathode, it may be desirable to use as thin a layer of PVA as practically possible for high speed manufacture of the film as well as the battery. In some circumstances it may be necessary to combine a film with another material (for example, a non-woven layer) to facilitate handling and cell assembly, etc.

Another option may be to incorporate agents in or on the film, such as Laponite™ that can help to decrease the resistivity of the film, thereby allowing thicker films to be utilized. Agents such as polyacrylic acid or acrylates may be incorporated to modify properties such as water or electrolyte absorption. As such, films ranging in thickness from about 10 microns to about 150 microns may be used.

V. Cell Testing

A. Button Cell Tests

A 357-size button cell is provided including the separator to be tested. The cathode includes 92% active material, 5% graphite, 2.5% electrolyte, and 0.5% polyethylene binder. The anode includes 68% sieved zinc with 31.25% 34-2 electrolyte and 0.75% of a combination of gelling agents and corrosion inhibitors. The cell was stored in an oven at a temperature of 60° C. Cell open circuit voltage (OCV), impedance, and cell expansion was monitored. Cell impedance was measured using a frequency response analyzer (e.g. Model 12 from Schlumberger Inc., Sugar Land, Tex.). Reduction in OCV implies that the potential of one or both electrodes is deteriorating from its thermodynamic value, and indicates that anode-fouling soluble species are migrating through the separator. Increase in cell impedance implies increase in the resistance between the two electrodes, which may also be caused by blocking of the separator or passivation of the zinc anode surface by the diffusing or migrating anode-fouling species. Cell expansion is a sign of internal pressure build-up from gas generation, which is also an expected result if copper ions migrate through the separator and come in contact with the zinc anode. Expansion can be measured by monitoring the external height increase over time, of the assembled cell. Hence monitoring these characteristics is very instructional in understanding and evaluating the efficacy of a particular separator material or its seal quality, or to screen several candidate materials or combinations.

B. Exclusion Test

A more quantitative method involves a direct measure of the concentration of the anode-fouling species on either side of the separator in question. The set up is stored at 60° C. in an oven for 5 days with the top of the glass tube sealed to limit electrolyte evaporation. The electrolyte on both sides is then analyzed for the specific ion concentrations as described herein.

When specific ion concentration on side B is less than the concentration on side A, the separator or seal is deemed effective in limiting the migration of anode-fouling soluble species. The results in Table 5 indicate the results of the exclusion test, as described in more detail elsewhere herein.

Soluble Cu species were analyzed in KOH using standard inductively coupled plasma (ICP) analytical techniques utilizing a Thermo Iris Intrepid II (radial unit) supplied by Thermo Electron Corporation (Waltham, Me.). Typically, samples were prepared using 1 gram of electrolyte sample diluted to 50 milliliters with 10% nitric acid solution prior to analysis. Calibration curves consisted of three solutions: blank, 0.5 ppm, and 1 ppm where all solutions were 10% nitric acid. Copper is calibrated using a 1000 ppm Spex standard. Measurements for copper were made using the average of four wavelengths (223.0, 224.7, 324.7, 327.3). A Scandium internal standard was used in each sample and standard (20 ppm) measured.

Soluble sulfur species were analyzed in KOH using standard inductively coupled plasma (ICP) analytical techniques utilizing a Thermo Iris Intrepid II (radial unit) supplied by Thermo Electron Corporation (Waltham, Me.). Typically, samples were prepared using 1 gram of electrolyte sample diluted to 50 milliliters with 10% nitric acid solution. Normally an additional 5:50 or 10:50 dilution was made, which was measured by volume to provide suitable results in this technique. Calibration curves consisted of three solutions: blank, 0.5 ppm, and 1 ppm where all solutions were 10% nitric acid. Sulfur was calibrated using standards prepared from Spex $SO_4$ ($K_2SO_4$ starting source) standard. Measurements for sulfur were made using the average of two wavelengths (180.7, 182.0). A Scandium internal standard was used in each sample and standard (20 ppm) measured.

VI. Gasket for Use with Separator

Figure 41:
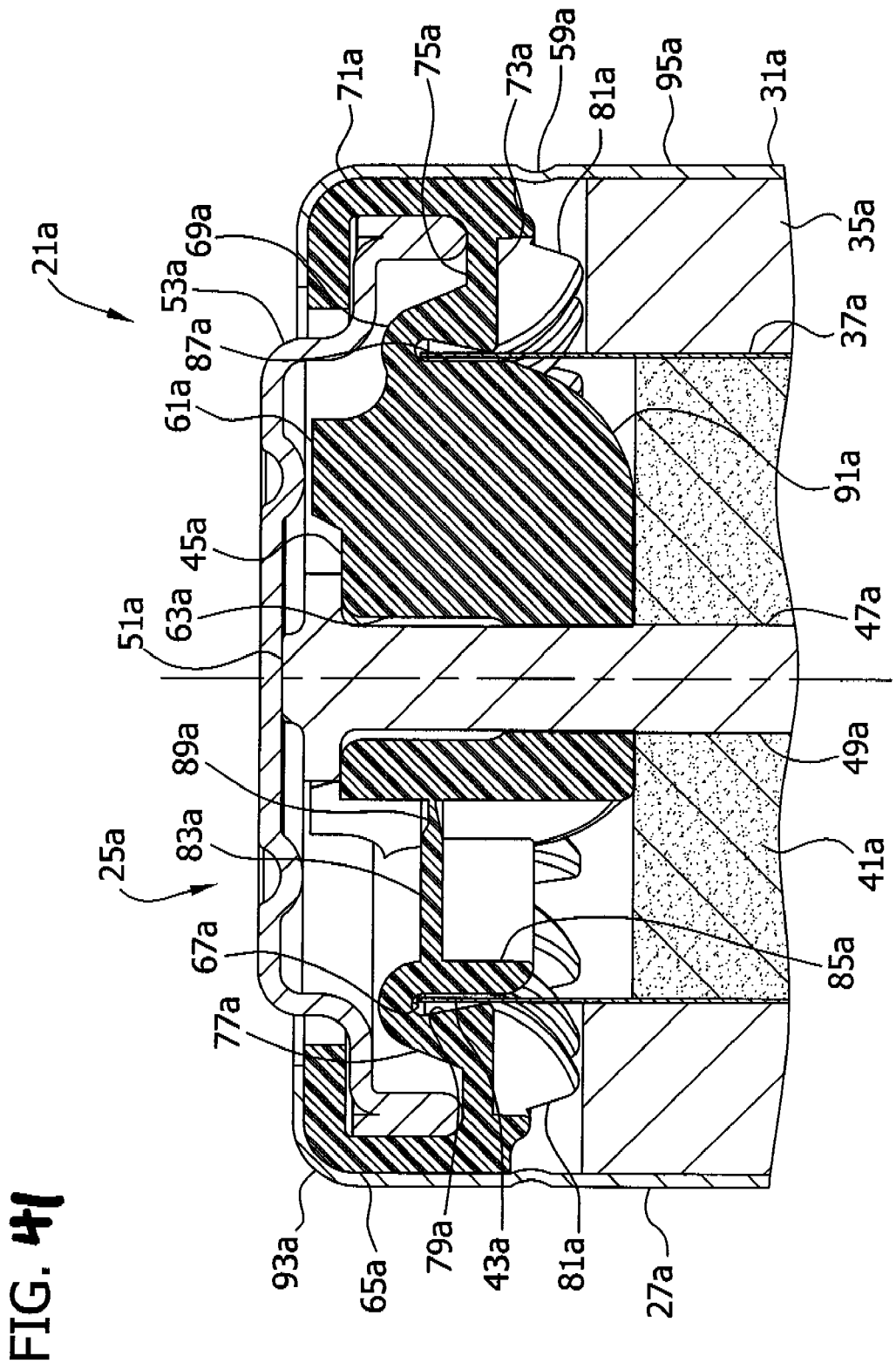
FIG. 41 illustrates an enlarged view of a portion of the electrochemical cell of FIG. 1 with the container illustrated in a closed configuration.
Figure 42:
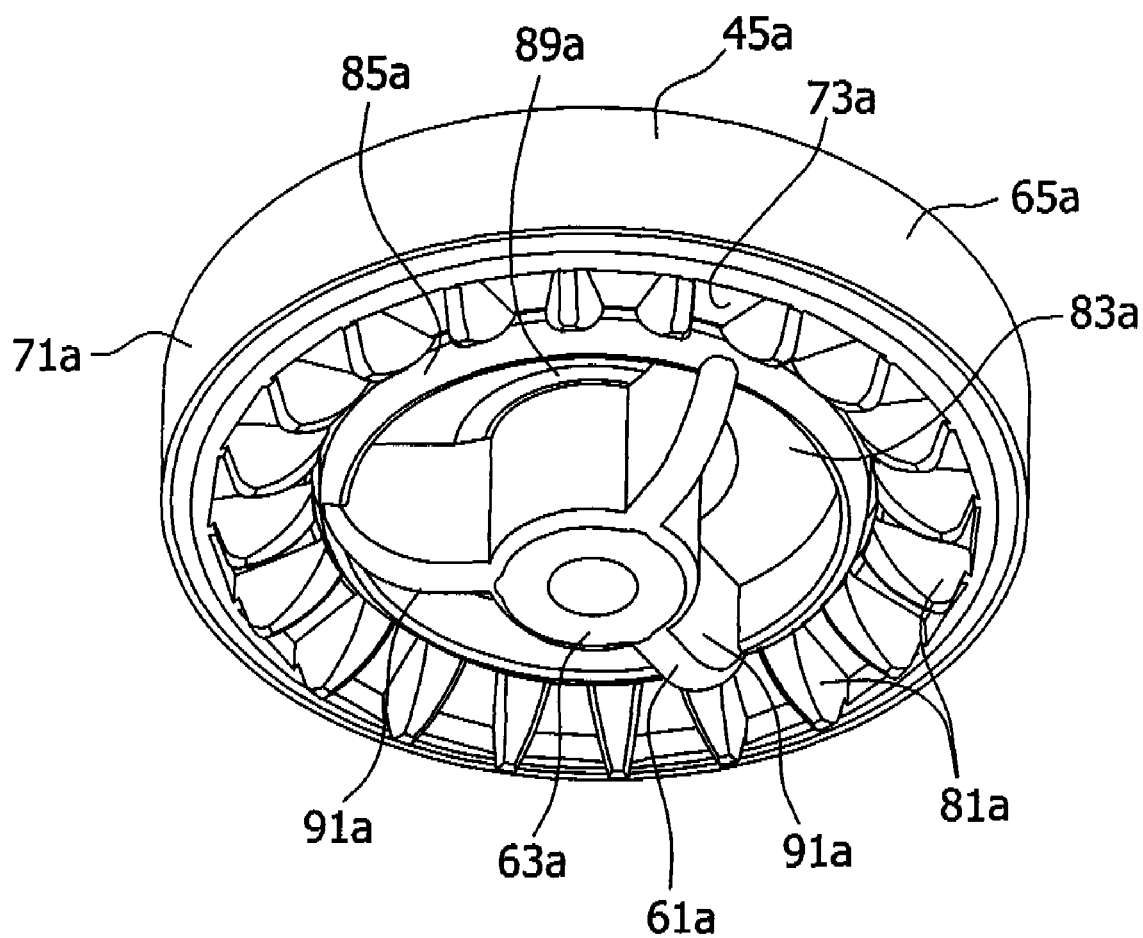
FIG. 42 illustrates a perspective view of the sealing assembly of the electrochemical cell of FIG. 2A.

With reference to FIGS. 41 and 42, the electrochemical cell of the present invention can additionally comprise a gasket (also referred to as a seal or sealing assembly) constructed to broadly define an apparatus for substantially sealing the terminal end 43a of the separator 37a to inhibit contamination between the anode and the cathode. The gasket 45a is generally disk-shaped and comprises an annular radially inner portion 61a (broadly, a first sealing member of the sealing assembly) including a central hub 63a through which the negative current collector 47a extends, an annular radially outer portion 65a (broadly, a second sealing member of the sealing assembly) spaced from the inner portion to define a slot 67a therebetween, and an annular web 69a extending radially between and generally hingedly connecting the inner and outer portions at the slot to permit folding of the gasket generally at the web for purposes that will become apparent.

While not shown in the drawings, a washer may be located between the negative terminal plate and the gasket to facilitate sealing contact of the gasket with the inner surface of the metal container side wall. The washer may be suitably made of an electrically conductive material such as galvanized carbon steel.

As illustrated, the gasket 45a (and hence, broadly, the sealing assembly of the illustrated embodiment) is of a single-piece construction. For example, the gasket 45a may be molded of nylon 6,6 which has been found to be inert to the electrolyte (e.g., potassium hydroxide) contained in the metal container 27a, and yet also sufficiently deformable upon compression to function as a seal against the side wall 31a of the container. It is contemplated that the gasket 45a may alternatively be formed of other suitable materials, including without limitation polyolefin, polysulfone, polypropylene, filled polypropylene (e.g., talc-filled polypropylene), sulfonated polyethylene, polystyrene, impact-modified polystyrene, glass filled nylon, ethylene-tetrafluoroethylene copolymer, high density polypropylene and other plastic materials. One particular example of a suitable glass filled nylon material for use in forming the gasket 45a is disclosed in co-assigned U.S. Published Application No. 2004/0145344 filed Oct. 27, 2003, the disclosure of which is incorporated herein by reference to the extent that it is consistent.

The outer portion 65a of the gasket 45a is generally L-shaped in cross section with a radially outer vertical leg 71a of the "L" facing the interior of the container side wall 31a upon assembly of the cell 21a. A horizontal leg 73a of the "L" forms an annular shoulder 75a on which negative terminal plate 53a is seated. The outer portion 65a of the gasket 45a also has a radially inner vertical leg 77a extending vertically (e.g., longitudinally) up from the annular shoulder 75a to define an outer face 79a of the slot 67a formed in the gasket. As best seen in FIG. 42, a plurality of guide members 81a are integrally formed with and depend from the outer portion 65a of the gasket 45a in spaced relationship with each other about the gasket. The guide members 81a are configured to taper up and in toward the outer face 79a of the slot 67a formed in the gasket 45a, generally at the entry of the slot formed in the gasket, to facilitate guidance of the terminal end 43a of the separator 37a into the slot upon initial assembly of the cell 21a as will be described.

The inner portion 61a of the gasket 45a comprises the central hub 63a (for receiving the current collector therethrough), a generally annular horizontal leg 83a extending radially out from the central hub, and an annular vertical leg 85a secured to the radially outer end of the horizontal leg and defining an inner face 87a of the slot 67a in opposed relationship with the outer face 79a defined by the outer portion 65a of the gasket. It is possible for chemical reactions taking place in the container 27a of the cell 21a to produce a gas as a product of the reactions. Gas production can cause an increase in pressure within the metal container 27a to the point where the upper extent 93a of the container sidewall 31a is urged open and the gasket 45a may spontaneously disassemble from the container. To avoid this undesirable result, the horizontal leg 83a of the inner portion 61a of the gasket includes an annular vent panel 89a, e.g., adjacent the central hub 63a. The vent panel 89a is suitably a region of thinner material. Should pressure rise to an undesirable level within the container 27a, the vent panel 89a will break allowing the gas to escape past the gasket 45a. Holes (not shown) are formed in the negative terminal plate 53a to allow passage of the gas out of the metal container 27a. It is contemplated that other suitable venting arrangements well known to those of ordinary skill in the art may be used without departing from the scope of the present invention.

As seen best in FIG. 42, the inner portion 61a of the gasket 45a further comprises a plurality of guide members 91a formed integrally with the inner portion and extending radially from the central hub 63a to the vertical leg 85a of the inner portion of the gasket. The guide members 91a are suitably configured to taper up and out toward the inner face 87a of the slot 67a formed in the gasket 45a, generally at the entry of the slot, to further facilitate guidance of the terminal end 43a of the separator 37a into the slot upon assembly of the cell 21a. While the inner portion 61a of the gasket 45a is shown in FIGS. 2A, 2B, 41, and 42 as having three such guide members 91a, it is contemplated that there may be more or less than three guide members. The annular web 69a connecting the inner and outer portions 61a, 65a of the gasket 45a is disposed generally at the upper end of the slot 67a formed between the inner and outer portions and is generally arcuate. However, it is contemplated that the web 69a may be generally straight or otherwise shaped other than arcuate and remain within the scope of this invention.

Figure 2B:
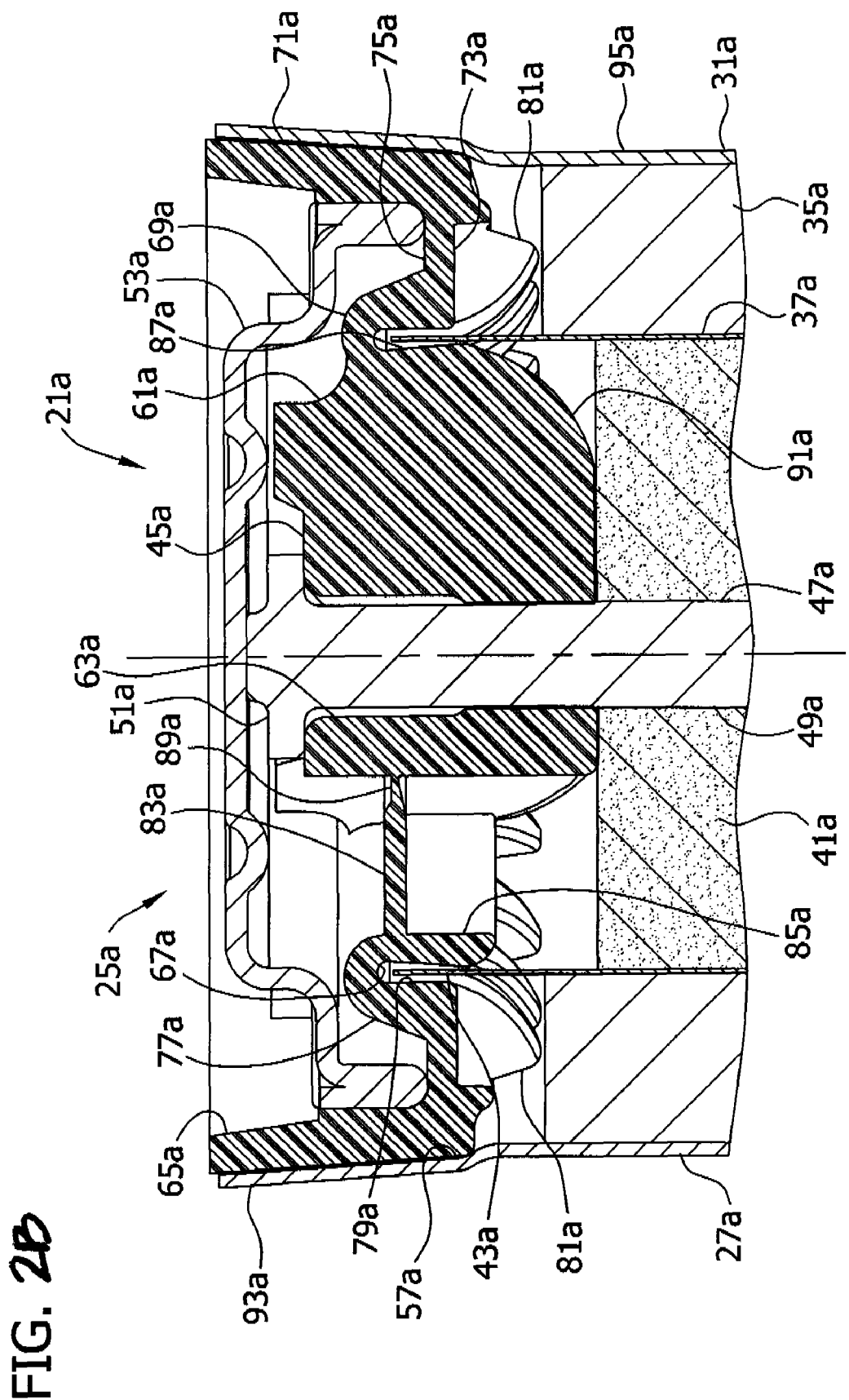
FIG. 2B shows an enlarged view of a portion of the electrochemical cell of FIG. 2A.

FIGS. 2A and 2B particularly illustrate the cell 21a during initial assembly, with the container 27a in what is referred to herein as an open configuration of the container in which the container sidewall flares outward toward its upper end to define a shoulder 57a for longitudinally locating the gasket 45a upon insertion of the gasket into the container. An upper extent 93a of the container side wall 31a extends above the shoulder 57a and has an inner diameter slightly greater than the inner diameter of a lower extent 95a of the container side wall extending below the shoulder to the end wall 29a of the container 27a. The inner diameter of the lower extent 95a of the container side wall 31a suitably corresponds to the inner diameter of the upper and lower extents 93a, 95a of the container side wall of the fully assembled cell 21a as illustrated in FIG. 41 in what is referred to herein as a closed configuration of the container. Upon closing the container 27a, an annular groove 59a (FIG. 41) is formed in the container as a result of the shoulder 57a having been initially formed in the open configuration of the container. It is contemplated that the annular groove 59a may be formed in the container by other suitable processes, or the groove may be omitted from the closed container, without departing from the scope of the invention.

As shown in FIGS. 2A and 2B, the gasket 45a is sized radially to have an outer diameter that is at least greater than the inner diameter of the lower extent 95a of the container side wall 31a, and is more suitably approximately equal to the inner diameter of the upper extent 93a of the container in its open configuration. In a particularly suitable embodiment, the difference between the outer diameter of the gasket 45a and the inner diameter of the lower extent 95a of the container sidewall 31a (i.e., the inner diameter of the container sidewall once the cell 21a is fully assembled in the closed configuration of the container 27a) is greater than the width of the slot 67a in the open configuration of the container. However, it is contemplated that the difference between the outer diameter of the gasket 45a and the inner diameter of the lower extent 95a of the container side wall 31a may be equal to or even slightly less than the width of the slot 67a in the open configuration of the container 27a depending on the desired size of the slot following closure of the container to complete assembly of the cell 21a.

To assemble the electrochemical cell 21a illustrated in FIGS. 2A, 2B and 41, the cathode 35a, separator 37a and anode 41a are loaded into the container 27a with the container in its open configuration as shown in FIG. 2A. The gasket 45a, negative current collector 47a and terminal plate 53a are placed in the open upper end of the container 27a with the gasket seating on the gasket seat formed at the junction of the upper and lower extents 93a, 95a of the container and the terminal plate seated on the shoulder 75a formed in the gasket. As the gasket 45a is inserted into the container 27a, the terminal end 43a of the separator 37a contacts the tapered guide members 91a, 81a of the inner and/or outer portions 61a, 63a of the gasket such that the guide members generally direct the separator into the slot formed between the inner and outer gasket portions. The gasket 45a may suitably be rotated through a rotation angle of up to about 120 degrees as it is being placed in the container to further facilitate guidance of the terminal end 43a of the separator 37a along the tapered guide members 91a, 81a and into the slot 67a.

The upper extent 93a of the container side wall 31a is then bent inward to the closed configuration of the container, thereby bending the outer vertical leg 71a of the outer portion 65a of the gasket 45a over the outer edge of the negative terminal plate 53a to complete the assembly of the cell as shown in FIG. 41. As the upper extent 93a of the container side wall 31a is bent inward, the inner diameter of the upper extent of the container becomes substantially equal to the inner diameter of the lower extent 95a of the container side wall. The upper extent 93a of the container side wall 31a thus applies a compressive (e.g., radially inward) force against the outer portion 65a of the gasket 45a as the side wall diameter decreases. As a result, the gasket 45a generally folds inward at the web 69a connecting the inner and outer portions 61a, 63a of the gasket to bring the inner and outer faces 87a, 79a of the slot 67a closer together.

In the illustrated embodiment, the inner and outer faces 87a, 79a of the slot 67a are sufficiently urged toward each other to pinch the terminal end 43a of the separator 37a therebetween, i.e., with the inner face of the slot in sealing relationship with the inner face of the separator terminal end and the outer face of the slot in sealing relationship with the outer face of the separator terminal end, to thereby seal the terminal end of the separator against contamination between the anode 41a and cathode 35a materials of the cell 21a. However, it is contemplated that the inner and outer faces 87a, 79a of the slot 67a may be spaced from each other a distance substantially equal to the thickness of the terminal end 43a of the separator 37a (e.g., in general contact with the separator but with little or no pinching of the separator) in the closed configuration of the container 27a, or they may be spaced slightly from each other a distance slightly greater than the thickness of the terminal end of the separator in the closed configuration of the container, and still be in sufficiently sealing relationship with the opposite faces of the terminal end of the separator to seal the separator against contamination between the cathode and the anode materials of the cell 21a.

Thus, it will be understood that the terms "seal" and "sealing" as used in this embodiment as well as in the other embodiments described herein in reference to sealing of the terminal end of the separator is intended to refer to a seal sufficient to inhibit at least particulate material against passing over the terminal end of the separator from the inner face to the outer face thereof, and may further inhibit liquid against passing over the terminal end of the separator, and still further may inhibit gas against passing over the terminal end of the separator.

While the inner and outer portions 61a, 65a (broadly the first and second sealing members) of the gasket 45a (broadly, the sealing assembly) of the illustrated embodiment are hingedly connected by the annular web 69a of the gasket, it is contemplated that the inner and outer portions of the gasket may be formed separate from each other and otherwise free from connection. In such an embodiment, the outer portion 65a would be spaced from the inner portion 61a in the open configuration of the container 27a to define the slot 67a in which the terminal end 43a of the separator 37a is received. Upon closing the container, the outer portion 65a would be moved radially in toward the inner portion 61a to substantially narrower the slot 67a for sealing the terminal end of the separator. It is also understood that while the sealing assembly in accordance with the embodiment shown in FIGS. 2A, 2B, 41, and 42 is defined by the gasket 45a that is also used to seal the negative end of the cell 21a, the sealing assembly may be instead be defined by one or more components other than the gasket, such as a separate component or components (not shown) disposed between the gasket and the anode 41a and/or cathode 35a.

Figure 43:
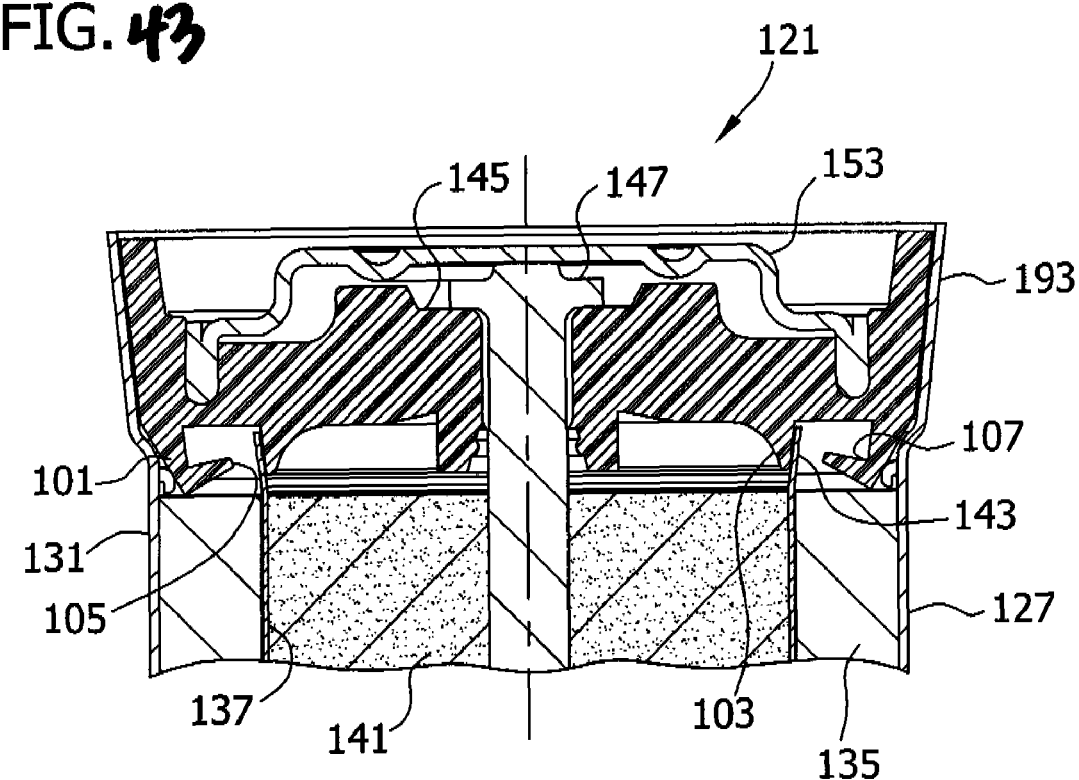
FIG. 43 illustrates a fragmented cross-section of an electrochemical cell having a sealing assembly according to a second embodiment of the present invention, with a container of the cell illustrated in an open configuration.
Figure 44:
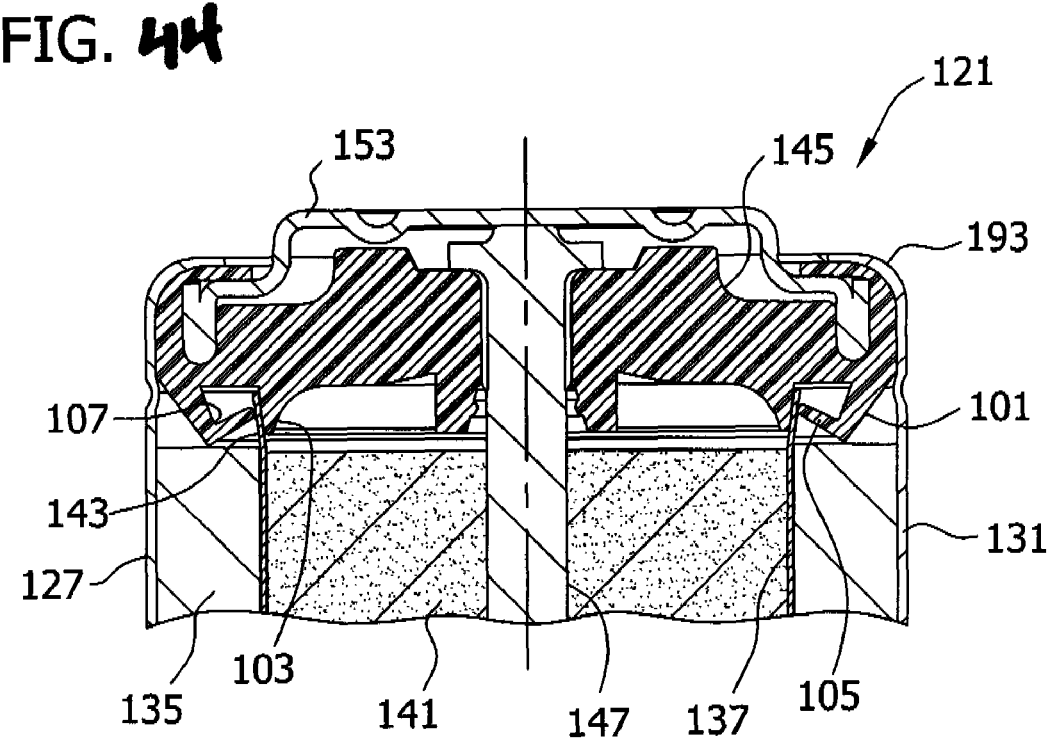
FIG. 44 illustrates a view similar to FIG. 43 with the container in a closed configuration.

Referring now to FIGS. 43 and 44, in a second embodiment an electrochemical cell 121 generally comprises a container 127, a cathode 135, an anode 141, a separator 137, a negative current collector 147 and a negative terminal plate 153 substantially similar to the embodiment of FIGS. 2A and 41 and described previously. A gasket 145 is also disposed in the container 127 for sealing against the container side wall 131 at the open end of the container. The gasket 145 is generally disk-shaped and has an annular outer flange 101 (broadly, a first sealing member of a sealing assembly according to this second embodiment of the present invention) depending from the gasket suitably radially outward of the terminal end 143 of the separator 137, and an annular inner flange 103 (broadly defining a second sealing member of the sealing assembly of this second embodiment) depending from the gasket suitably radially inward of the terminal end of the separator. In the illustrated embodiment of FIGS. 43 and 44, the annular outer flange 101 is disposed generally at the outermost radial extent of the gasket 145. However, the outer flange 101 may be disposed radially inward of the outermost extent of the gasket 145 and remain within the scope of this invention, as long as the outer flange, and more suitably a free end 105 of the outer flange, is located for positioning radially outward of the terminal end 143 of the separator 137 upon insertion of the gasket into the container 127.

In one embodiment, the gasket 145 (and hence broadly the sealing assembly) is suitably of single-piece construction, such as by being molded from any of the materials from which the gasket 45a of the embodiment of FIGS. 2A, 2B, 41, and 42 may be molded. The inner and outer flanges 103, 101 may initially depend straight from the gasket 145, with the outer flange being substantially longer than the inner flange. Before the gasket 145 is inserted into the container 127, such as after initial molding of the gasket, a portion of the outer flange 101 is folded along a fold line 107 to extend in toward the inner flange 103 to reduce the spacing between the inner and outer flanges (but still providing sufficient spacing therebetween for receiving the terminal end 143 of the separator 137 between the inner and outer flanges) as shown in FIG. 43 with the container in its open configuration. As an example, the fold line 107 along which the outer flange 101 is folded corresponds approximately to the bottom of the inner flange 103. However, it is understood that the fold line 107 may be disposed anywhere along the length of the outer flange 101, depending on the length of the outer flange and the desired spacing between the inner and outer flanges 103, 101 after folding of the outer flange. It is also contemplated that the folded configuration of the outer flange 101 may be set upon initial molding of the gasket 127 without departing from the scope of this invention.

Upon closing the upper extent 193 of the container side wall 131 to the closed configuration of the container 127, the outer flange 101 (e.g., the portion connected to the gasket) is urged down against the cathode, such as the fold line 107 of the outer flange, causing the outer flange to bend radially inward generally at the end of the flange fixed to the gasket. It is contemplated that the groove formed in the side wall of the container may also urge the outer flange 101 radially inward. Accordingly, the folded portion of the outer flange 101 (e.g., the free end 105 thereof) is displaced radially further toward the inner flange 103 so that the spacing between the outer flange and the inner flange is less than the thickness of the separator 137 to thereby pinch the terminal end 143 of the separator between the flanges for sealing the terminal end of the separator. It is contemplated that the spacing between the outer flange 101 and the inner flange 103 in the closed configuration of the container 127 may be approximately equal to the thickness of the separator 137 (so as to hold the separator therebetween with little or no pinching of the separator), or slightly greater than the thickness of the separator, and still sufficiently seal the terminal end of the separator within the scope of this invention.

It is also contemplated that the outer flange 101 need not be bent at its fixed connection with the gasket 145 to remain within the scope of this invention. Also, instead of the outer flange 101 being folded inward, or in addition thereto, the inner flange 103 may be folded and/or bent radially outward toward the outer flange without departing from the scope of this invention. It is further contemplated that the outer flange 101 need not be folded to extend the free end 105 of the flange radially inward. For example, in the cell 221 illustrated in FIGS. 45 and 46, a gasket 245 is constructed similar to the gasket 145 of FIGS. 43 and 44, with an annular outer flange 201 (broadly, a first sealing member of a sealing assembly according to a third embodiment of the present invention) depending from the gasket and an annular inner flange 103 (broadly, a second sealing member of the sealing assembly of this third embodiment) depending from the gasket in radially spaced relationship with the inner flange to receive the terminal end 243 of the separator 237 between the flanges. Following initial molding of the gasket 245, the outer flange 201 is bent generally inward at the connection with the gasket and then folded back outward midway along its length so that the outer flange has a generally V-shape upon insertion of the gasket into the container.

Figure 45:
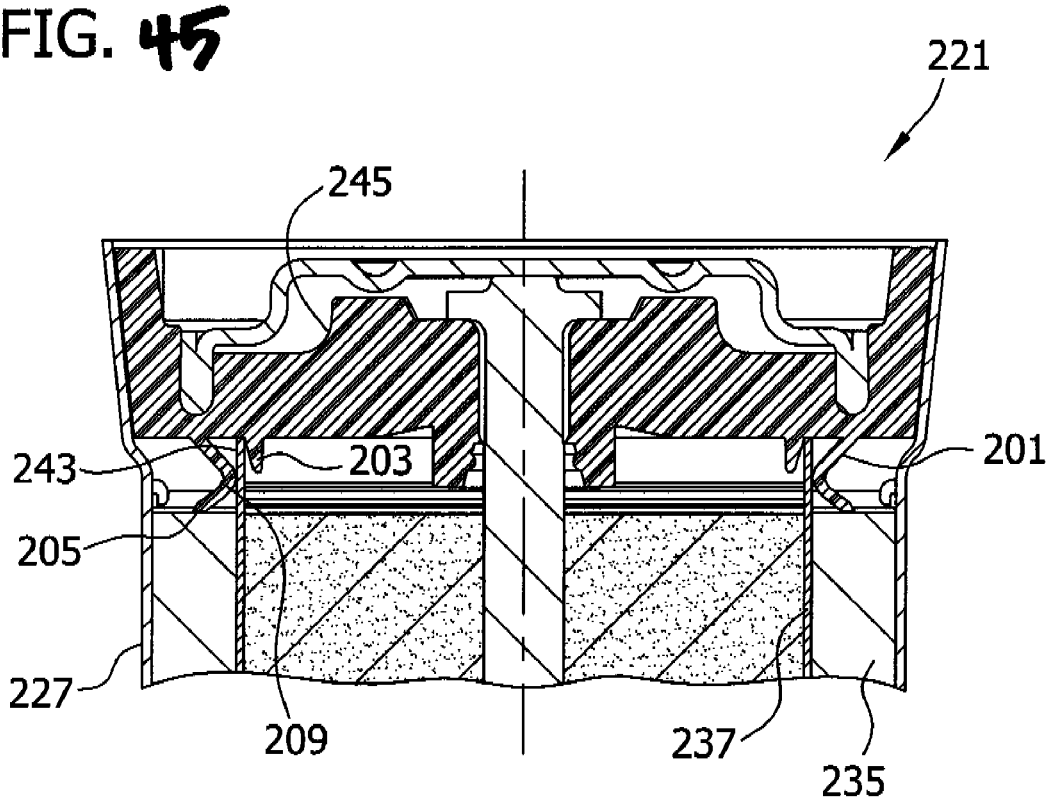
FIG. 45 illustrates a fragmented cross-section of an electrochemical cell having a sealing assembly according to a third embodiment of the present invention, with a container of the cell illustrated in an open configuration.
Figure 46:
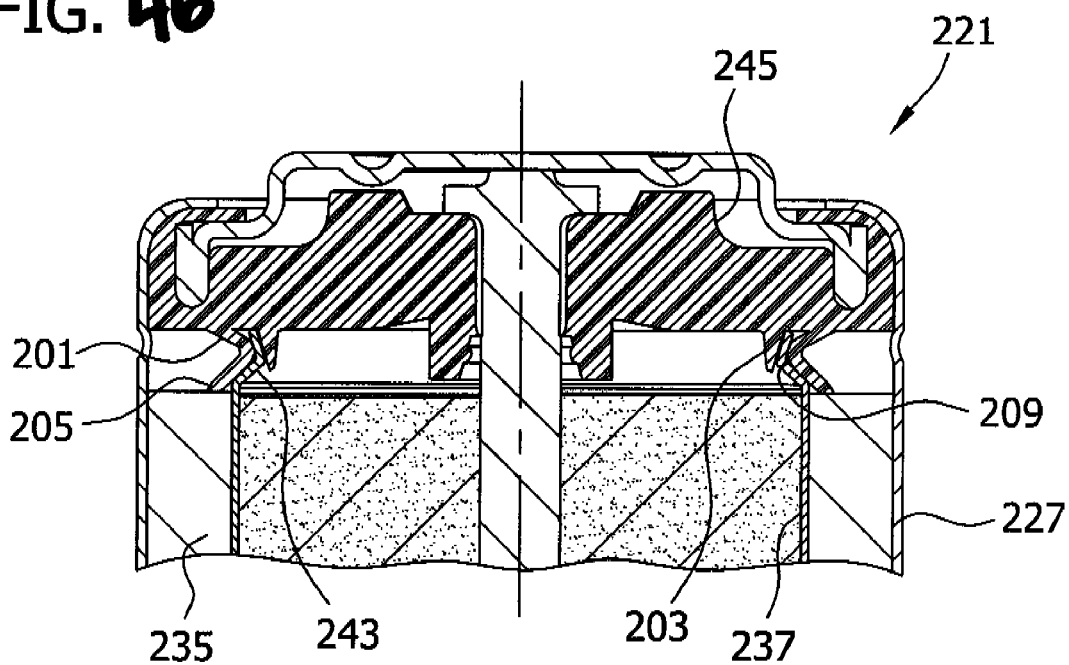
FIG. 46 illustrates a view similar to FIG. 45 with the container in a closed configuration.

As shown in FIG. 45 in the open configuration of the container 227, when the gasket 245 is first inserted into the container the terminal end 243 of the separator 237 is received between the inner flange 203 and an elbow 209 formed by the V-shaped outer flange 201. The free end 205 of the outer flange 201 is disposed above, and may even be in contact with, the cathode 235. Upon closing the container 227 to the closed configuration shown in FIG. 46, the gasket 245 is urged down toward the anode 241 and cathode 235, causing the outer flange 201 to generally collapse (e.g., further fold) between the gasket and the cathode. The elbow 209 formed by the V-shaped outer flange 201 accordingly moves radially in toward the inner flange 203 to pinch the terminal end 243 of the separator 237 between the inner flange and the elbow of the outer flange to thereby substantially seal the terminal end of the separator. It is contemplated that the spacing between the inner flange 203 and the elbow 209 of the outer flange 201 in the closed configuration of the container 227 may instead be approximately equal to the thickness of the separator 237 (so as to hold the separator therebetween with little or no pinching of the separator), or slightly greater than the thickness of the separator, and still sufficiently seal the terminal end 243 of the separator within the scope of this invention.

It is also understood that the terminal end 243 of the separator 237 may be sealed between the elbow 209 of the outer flange 201 and another portion of the gasket 245. For example, the inner flange 203 of the gasket 245 may be omitted and instead the gasket may have a sufficient thickness at an inner portion (not shown) thereof such that the gasket extends down within the container 227 in opposed relationship with the elbow 209 of the outer flange 201.

Figure 47:
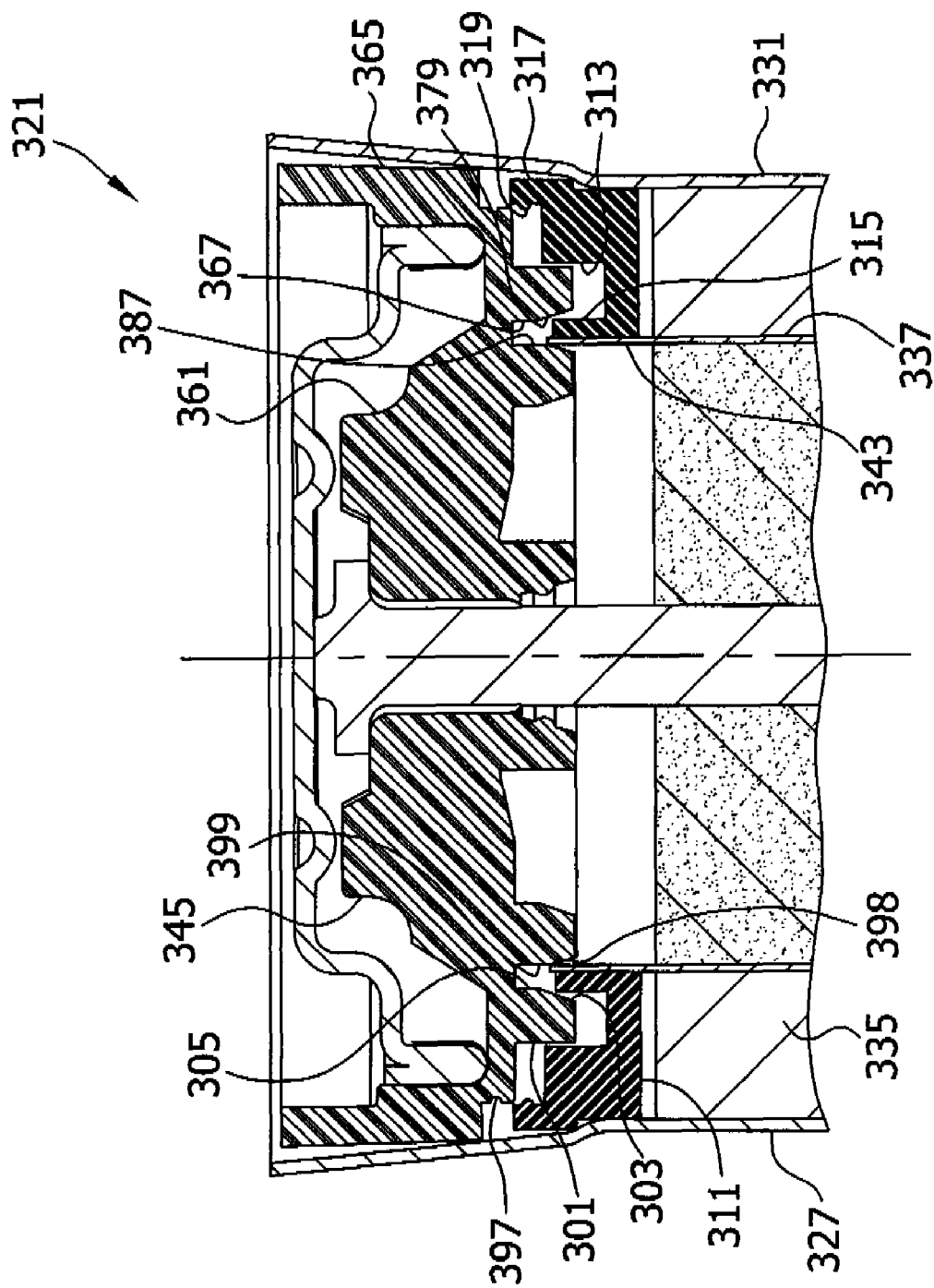
FIG. 47 illustrates a fragmented cross-section of an electrochemical cell having a sealing assembly according to a fourth embodiment of the present invention, with a container of the cell illustrated in an open configuration.
Figure 48:
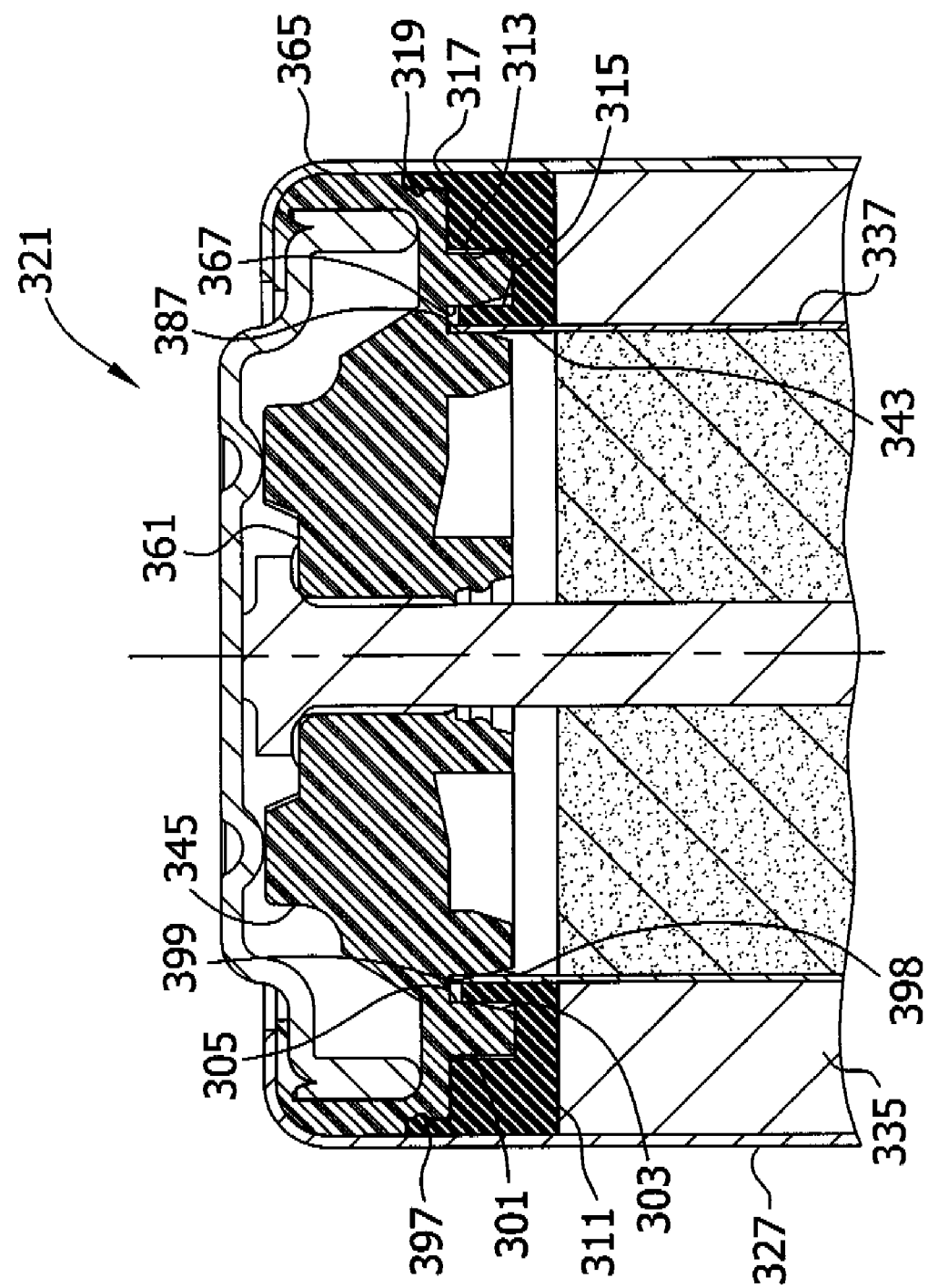
FIG. 48 illustrates a view similar to FIG. 47 with the container in a closed configuration.

In a fourth embodiment, shown in FIGS. 47 and 48, a sealing assembly for sealing the terminal end 343 of the separator 337 is of a two-piece construction and generally comprises a gasket 345 (broadly, a first sealing member of the sealing assembly) and a gasket seat 311 (broadly, a second sealing member of the sealing assembly) formed separate from the gasket. The gasket seat 311 and gasket 345 may each be formed from any of the materials from which the gasket 45a of the embodiment of FIGS. 2A, 2B, 41, and 42 may be formed. The gasket seat 311 and gasket 345 may be formed from the same material as each other, or they may be formed from different materials.

The gasket seat 311 of the illustrated embodiment is annular and is sized in cross-section to seat within the container 327 over the cathode 335, e.g., radially between the sidewall 331 of the container and the terminal end 343 of the separator 337 as shown in FIG. 47 in the open configuration of the container. The gasket seat 311 has an annular channel 313 formed therein to define a radially inner vertical leg 315 of the gasket seat extending vertically in generally opposed relationship with the terminal end 343 of the separator 337. A radially outer vertical leg 317 of the gasket seat 311 extends vertically up from the gasket seat at the radially outermost extent thereof and has an annular rib 319 extending radially inward of the outer vertical leg for positively locating the gasket 345 on the gasket seat as will be described.

The gasket 345 has a slot 367 formed therein for receiving at least the terminal end 343 of the separator 337, and more suitably for together receiving the terminal end of the separator and the inner vertical leg 315 of the gasket seat 311. An inner face 387 of the slot 367 is defined by an annular inner portion 361 of the gasket 345 while an outer face 379 of the slot is defined by an annular outer portion 365 of the gasket. The outer portion 365 of the gasket 345 includes an annular groove 397 sized for receiving the annular rib 319 extending inward from the outer vertical leg 317 of the gasket seat 311, and a depending flange 301 sized for seating within the channel 313 formed in the gasket seat. The outer face 379 of the slot 367 is defined by the depending flange 301 of the outer portion 365 of the gasket 345 and has a lower surface 303 configured to taper upward and in to a vertical upper surface 305 of the slot inner face. As shown in the illustrated embodiment of FIG. 47, the depending flange 301 of the gasket outer portion 365 is radially located on the gasket 345 such that the tapered lower surface 303 is aligned above the inner vertical leg 315 of the gasket seat 311 upon initial placement of the gasket in the container 327, for reasons which will become apparent.

The inner face 387 of the slot 367 defined by the gasket inner portion 361 also has a tapered lower surface 398 and tapers upward and out to a vertical upper surface 399 in opposed relationship with the vertical upper surface 305 of the inner face 387 of the gasket outer portion 365. The radial spacing between the vertical upper surfaces 305, 399 of the inner and outer faces 387, 379 of the slot 367 define a slot width that is suitably narrower than the combined thickness of the terminal end 343 of the separator 337 and the inner vertical leg 315 of the gasket seat 311. The slot width increases at the tapered lower surfaces 303, 398 of the inner and outer faces 387, 379 of the slot 367 to a width greater than the combined thickness of the terminal end 343 of the separator 337 and the inner vertical leg 315 of the gasket seat 311.

In the open configuration of the container shown in FIG. 47, the cathode 335, separator 337 and anode 341 are placed in the container 327 and the gasket seat 311 is then placed in the container over the cathode. The gasket 345 (with the negative current collector 347 and terminal plate 353) is inserted into the container 327 with the flange 301 depending from the gasket outer portion 365 aligned for receipt in the channel 313 formed in the gasket seat 311. The gasket 345 is urged down onto the gasket seat 311 until the annular rib 319 extending inward from the outer vertical leg 317 of the gasket seat snaps into the annular groove 397 formed in the gasket outer portion 365 to secure the gasket and gasket seat together. As the gasket 345 is urged down onto the gasket seat 311, the terminal end 343 of the separator 337 is guided into the gasket slot 367 by the tapered lower surface 398 of the inner face 387 of the slot 367. The inner vertical leg 315 of the gasket seat 311 contacts the tapered lower surface 303 of the outer face 379 of the slot 367. With the slot 367 narrowing toward the vertical upper surfaces 399, 305 of the inner and outer faces 387, 379 of the slot, the tapered lower surface 303 of the outer face 379 of the slot generally radially pinches the inner vertical leg 315 of the gasket seat 311 and the terminal end 343 of the separator 337 within the narrow portion of the slot between the upper surfaces of the inner and outer faces of the slot to generally seal the terminal end of the separator. The container 327 is then closed as shown in FIG. 48 to complete assembly of the cell 321.

It is understood that the width of the slot 367 between the vertical upper surfaces 399, 305 of the inner and outer faces 387, 379 of the slot may instead be approximately equal to, or even slightly greater than, the combined thickness of the terminal end 343 of the separator 337 and the inner vertical leg 315 of the gasket seat 311 in the closed configuration of the container 327 and still sufficiently seal the terminal end of the separator within the scope of the present invention. It is also understood that the snap-fit components of the gasket 345 and gasket seat 211 may be reversed, e.g., with an annular rib (not shown) extending out from the gasket and an annular groove (not shown) formed in the gasket seat 311, or the snap-fit components may be omitted, without departing from the scope of this invention. Also, the annular rib 319 and corresponding annular groove 397 need not be disposed in the outer vertical leg 317 and corresponding gasket outer portion 365 to remain within the scope of this invention.

It is also contemplated that the separator 337, anode, gasket seat 311 and gasket 345 may instead be assembled together outside of the container and then inserted into the container (e.g., with the terminal end 343 of the separator already sealed), i.e., with the anode-filled separator inserted down into the cathode.

Figure 49:
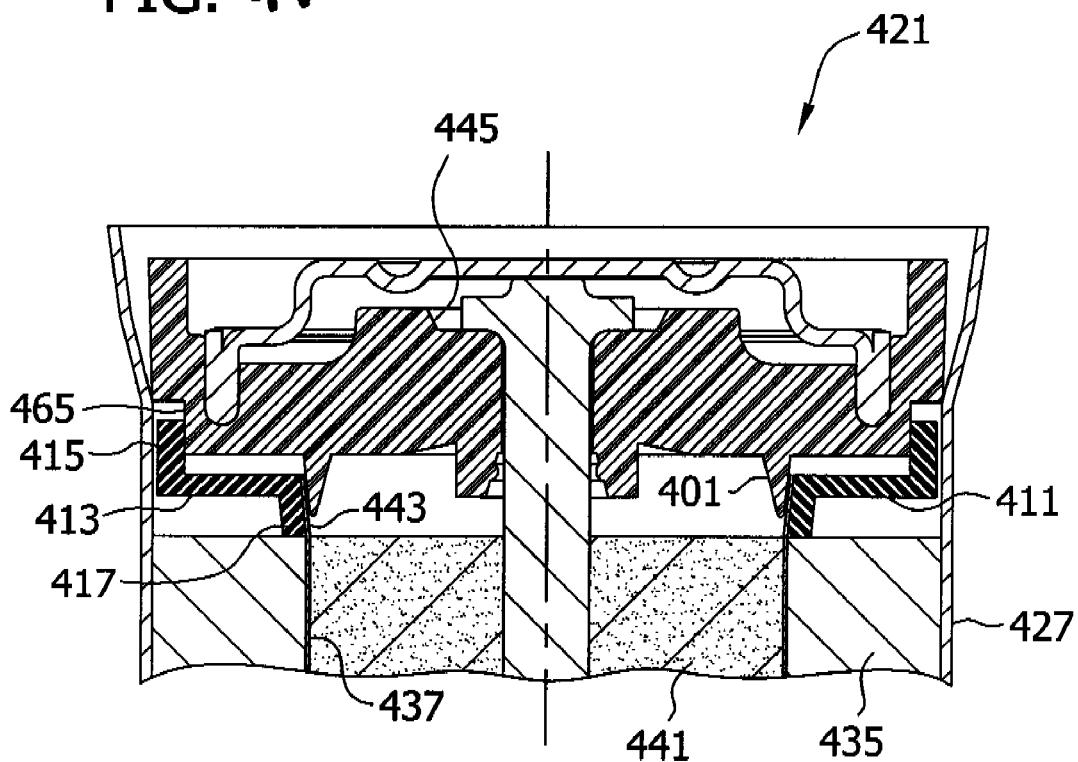
FIG. 49 illustrates a fragmented cross-section of an electrochemical cell having a sealing assembly according to a fifth embodiment of the present invention, with a container of the cell illustrated in an open configuration.
Figure 50:
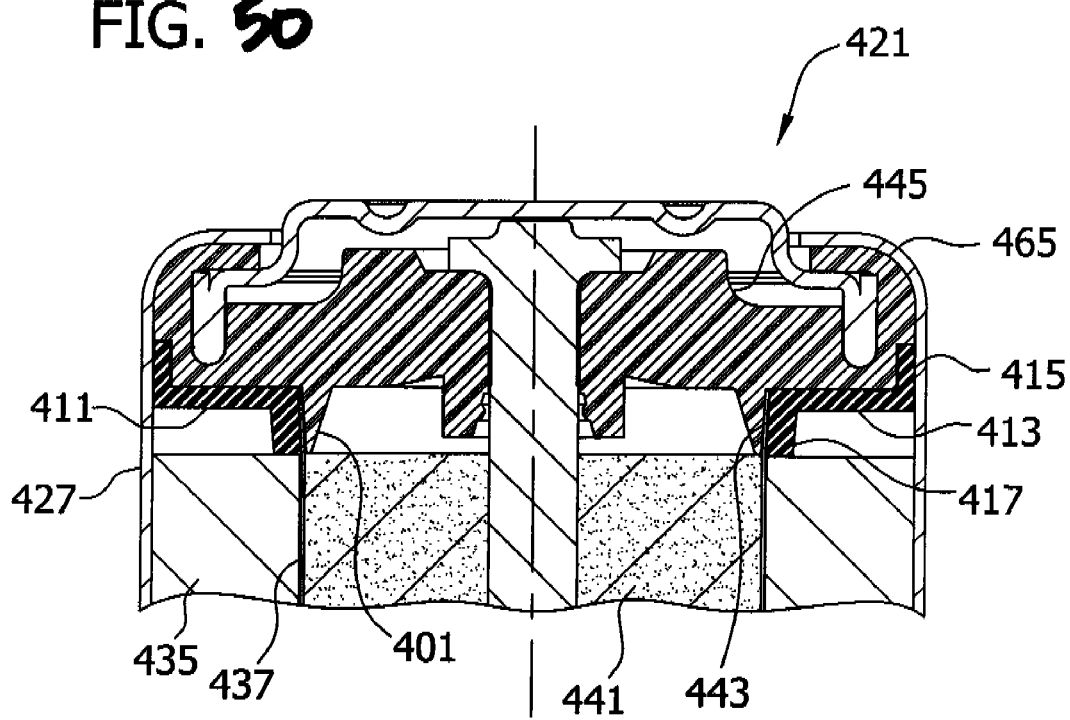
FIG. 50 illustrates a view similar to FIG. 49 with the container in a closed configuration.

FIGS. 49 and 50 illustrate a fifth embodiment of the present invention in which the sealing assembly is also of a two-piece construction. In this embodiment the sealing assembly comprises an annular gasket seat (broadly, a first sealing member of the sealing assembly), generally indicated at 411, and a generally disk-shaped gasket (broadly, a second sealing member of the sealing assembly, generally indicated at 445. The gasket seat 411 and gasket 445 may each be formed from any of the suitable materials from which the gasket 45a of FIGS. 2A, 2B, 41, and 42 may be formed. The gasket seat 411 and gasket 445 may be formed from the same material as each other, or formed from different materials, and remain within the scope of this invention.

The gasket seat 411 of this fifth embodiment is generally Z-shaped in cross-section, having a horizontal segment 413, an outer leg 415 extending up from the horizontal segment and defining the radially outermost extent of the gasket seat, and an inner leg 417 depending from the horizontal segment of the gasket seat. In the illustrated embodiment, the inner leg 417 is slightly angled relative to vertical (e.g., relative to the longitudinal axis of the cell 421) to extend generally inward and down from the horizontal segment 413 of the gasket seat 411. The gasket seat 411 is suitably sized for seating in the container 427 over the cathode 435 with the inner leg 417 in generally opposed relationship with the outer face of the terminal end 443 of the separator 437. The gasket 445 has an annular flange 401 depending generally vertically therefrom at a location corresponding to or slightly inward of the terminal end 443 of the separator 437. An outer portion 465 of the gasket 445 extends generally horizontally relative to the depending flange 401 for seating on the horizontal segment 413 of the gasket seat 411.

To assemble the cell 421, following insertion of the cathode 435, separator 443 and anode 441, the gasket seat 411 is placed in the container 427 with the inner leg 417 of the gasket seat in closely spaced relationship with or even resting on the cathode. The inner leg 417 is suitably in contact with (e.g., abuts against) the terminal end 443 of the separator 437 to support the terminal end of the separator in a generally upright orientation. The gasket 445 is then inserted down into the container 427. In the illustrated embodiment, the flange 401 depending from the gasket 445 is located such that upon insertion of the gasket into the container 427, the flange is disposed generally above a portion of the angled inner leg 417 of the gasket seat 411. As the gasket 445 is urged further into the container 427, the flange 401 depending from the gasket contacts the terminal end 443 of the separator 437 and pinches the terminal end of the separator against the angled inner leg 417 of the gasket seat 411 to substantially seal the terminal end of the separator. The container 427 is then closed in a conventional manner to the closed configuration of the cell 421 as shown in FIG. 50.

It is contemplated that the flange 401 may depend from the gasket 445 at an angle corresponding generally to the angle at which the inner leg 417 depends from the horizontal segment 413 of the gasket seat 411, or that both the flange and the inner leg of the gasket seat may be oriented generally vertically. It is also contemplated that the location of the flange 401 relative to the inner leg 417 of the gasket seat 411 may be such that the terminal end 443 of the separator 437 is retained between the flange and the inner leg of the gasket seat in the closed configuration of the container 427 with little or no pinching of the terminal end of the separator, or the flange may be slightly spaced from the inner leg of the gasket seat in the closed configuration of the container, and still sufficiently seal the terminal end of the separator within the scope of this invention.

It is also contemplated that the separator 437, anode, gasket seat 411 and gasket 445 may instead be assembled together outside of the container 427 and then inserted into the container (e.g., with the terminal end 443 of the separator already sealed), i.e., with the anode-filled separator inserted down into the cathode.

Figure 51:
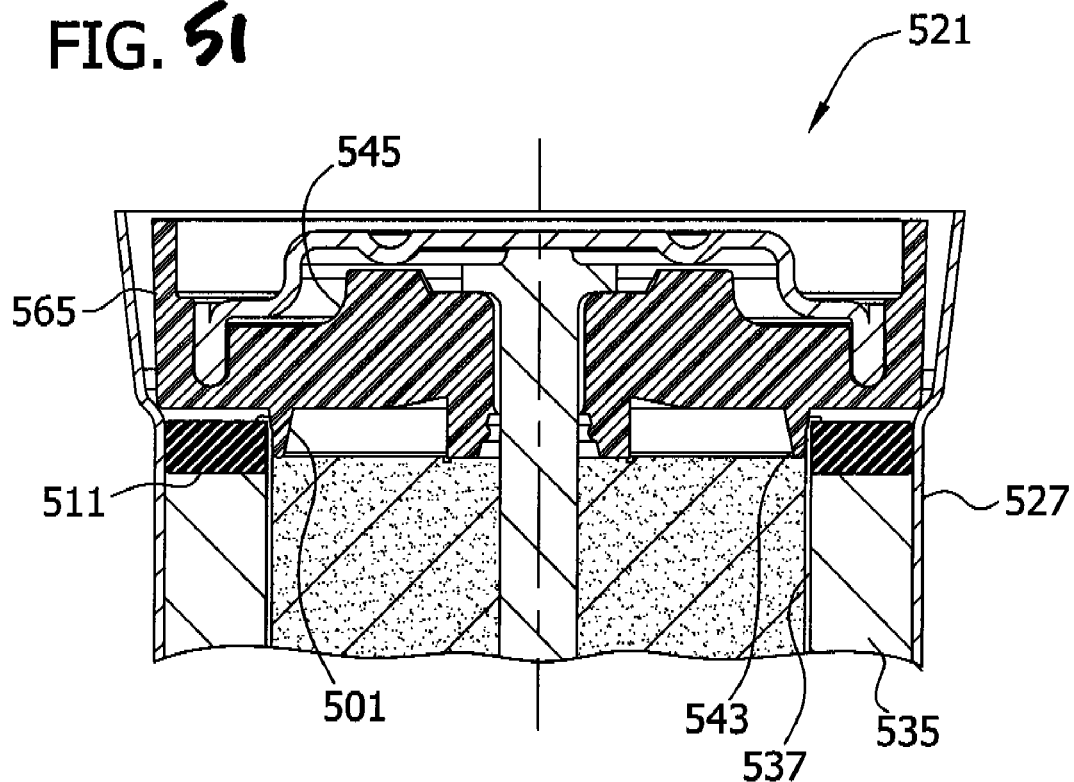
FIG. 51 illustrates a fragmented cross-section of an electrochemical cell having a sealing assembly according to a sixth embodiment of the present invention, with a container of the cell illustrated in an open configuration.
Figure 52:
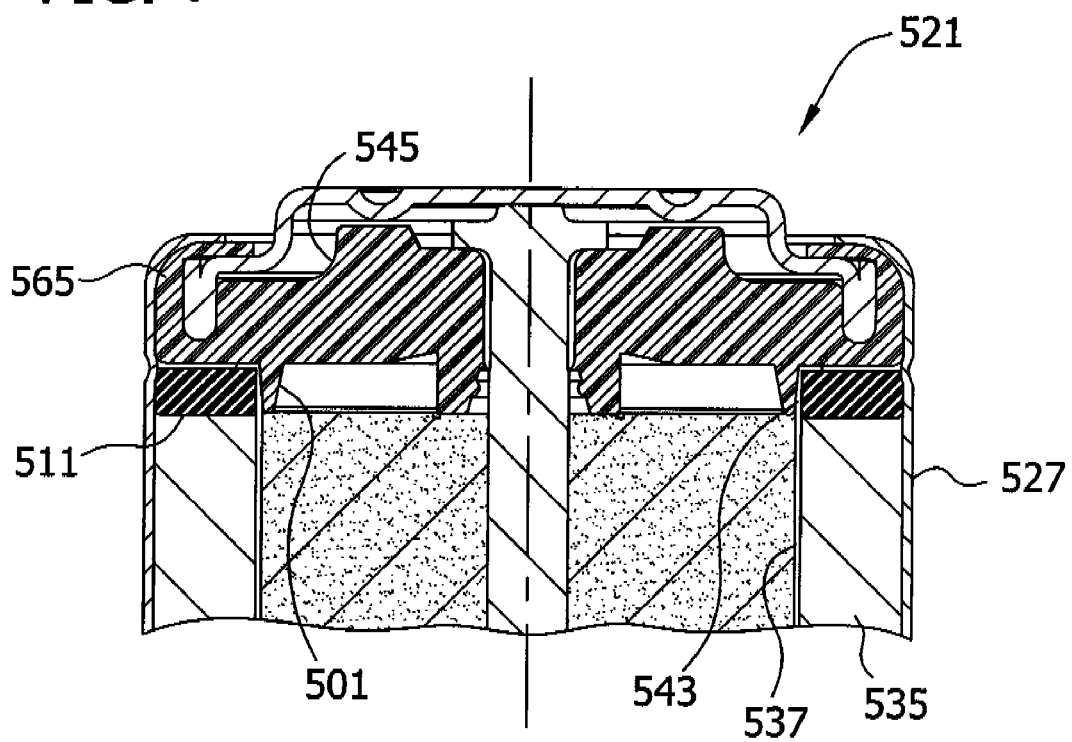
FIG. 52 illustrates a view similar to FIG. 51 with the container in a closed configuration.

FIGS. 51 and 52 illustrate a sixth embodiment of the present invention in which the cell 521 has a sealing assembly that comprises a washer-shaped gasket seat 511 (broadly, a first sealing member of the sealing assembly) constructed of a compressible material, and a gasket 545 (broadly, a second sealing member of the sealing assembly). The gasket seat 511 is sized for seating over the cathode 535, e.g., radially outward of the separator 537, with an inner surface of the gasket seat adjacent to and in opposed relationship with the terminal end 543 of the separator. The compressible gasket seat 511 is suitably constructed of a resilient, compressible material, and more suitably of a material that is more compressible than the material from which the gasket 545 is constructed. One suitable resilient, compressible material from which the gasket seat 511 may be constructed is an ethylene propylene diene monomer (or a terpolymer). Another suitable gasket seat 511 material is a neoprene butyl rubber. The gasket 545 may be constructed of any of the materials described previously from which the gasket 45a of FIGS. 2A, 2B, 41, and 42 may be constructed.

The gasket 545 is also similar to the gasket 445 of the fifth embodiment shown in FIGS. 49 and 50 in that it has a depending flange 501 located for positioning radially inward of the terminal end 543 of the separator 537, and radially outer portion 565 configured for seating on the gasket seat. In the open configuration of the container 527, the gasket seat 511 is placed in the container over the cathode 535, with the terminal end 543 of the separator 537 generally adjacent to and more suitably supported by the inner surface of the gasket seat. The gasket 545 is inserted into the container 527 with the depending flange 501 in opposed relationship with the inner surface of the terminal end 543 of the separator 537 to hold the separator between the flange and the gasket seat 511.

Upon closing the container 527 as shown in FIG. 52, the outer portion 565 of the gasket 545 is urged down against the gasket seat 511 and compresses the gasket seat. Compressing the gasket seat 511 in this manner tends to displace the gasket seat material radially (e.g., it expands outward) such that the width of the gasket seat increases. As a result, the radially inner surface of the gasket seat 511 urges the terminal end 543 of the separator 537 toward the flange 501 depending from the gasket 545 to pinch the terminal end of the separator between the flange and the gasket seat. It is contemplated that the positioning of the flange 501 relative to the radially inner surface of the gasket seat 511 may be such that the terminal end 543 of the separator 537 is retained between the flange and the inner surface of the compressed gasket seat in the closed configuration of the container 527 with little or no pinching of the terminal end of the separator, or the flange may be slightly spaced from the inner surface of the compressed gasket seat in the closed configuration of the container, and still sufficiently seal the terminal end of the separator within the scope of this invention.

It is also contemplated that the separator 537, anode, gasket seat 511 and gasket 545 may instead be assembled together outside of the container 527 and then inserted into the container (e.g., with the terminal end 543 of the separator already sealed), i.e., with the anode-filled separator inserted down into the cathode.

Figure 53:
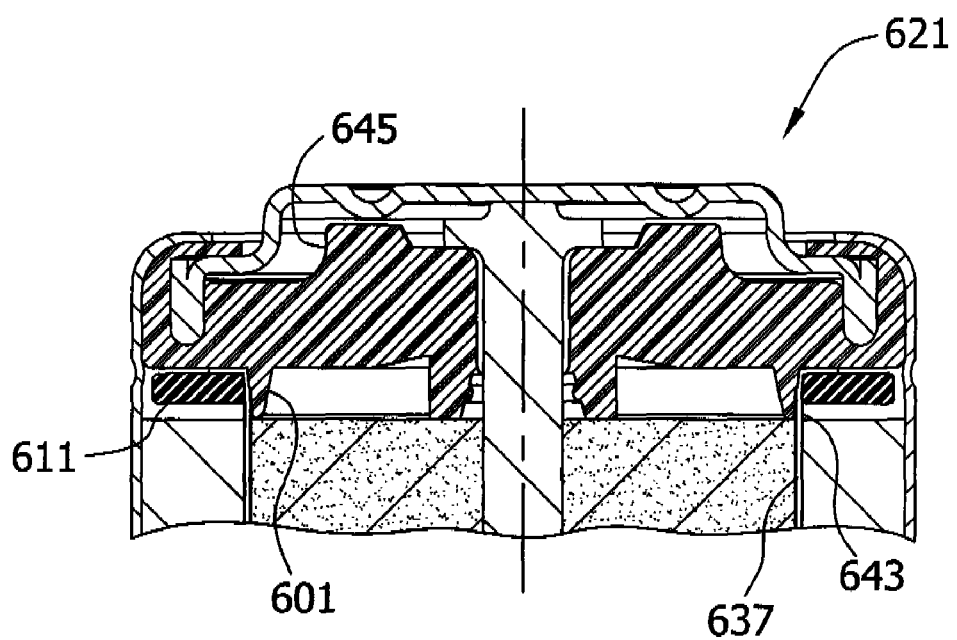
FIG. 53 illustrates a fragmented cross-section of an electrochemical cell having a sealing assembly according to a seventh embodiment of the present invention, with a container of the cell illustrated in a closed configuration.

In a seventh embodiment of the present invention, shown in FIG. 53, the sealing assembly of a cell 621 generally comprises an annular elastomeric member 611 (broadly, a first sealing member of the sealing assembly), and a gasket 645 (broadly, a second sealing member of the sealing assembly). The gasket 645 may be constructed of any of the materials described previously from which the gasket 45*a* of FIGS. 2A, 2B, 41, and 42 may be constructed. The gasket 645 is suitably similar to the gasket 545 of the fifth embodiment shown in FIGS. 49 and 50 in that it has a depending flange 601 located for positioning radially inward of the terminal end 643 of the separator 637.

Figure 54:
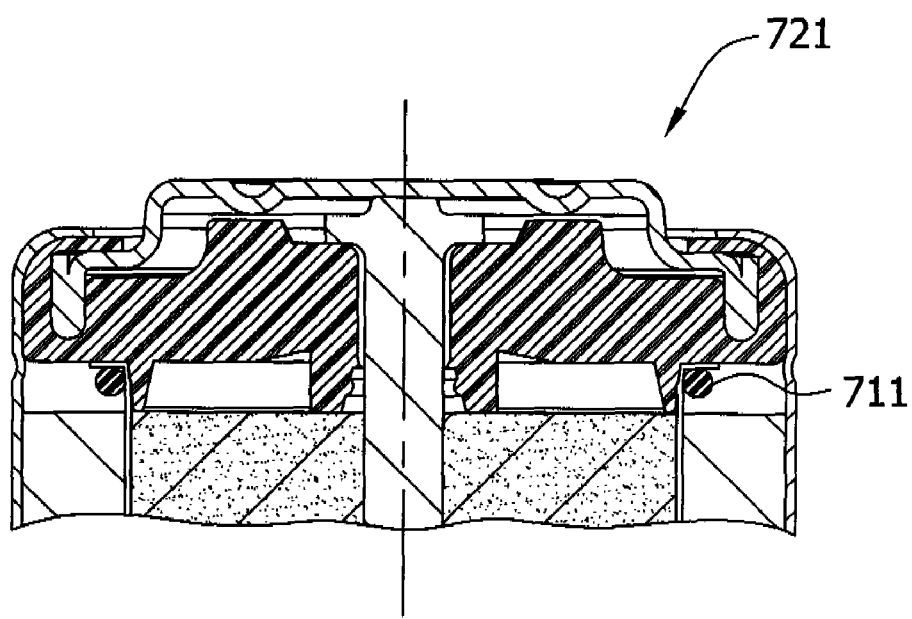
FIG. 54 illustrates a fragmented cross-section of an electrochemical cell having a sealing assembly according to an eighth embodiment of the present invention, with a container of the cell illustrated in a closed configuration.

The elastomeric member 611 is suitably constructed of an elastically stretchable and contractible material and sized for circumscribing the flange 601 depending from the gasket 645. More suitably, the elastomeric member 611 is placed around the flange 601 while in an elastically stretched condition so that upon release of the elastomeric member it elastically contracts radially to pinch the terminal end 643 of the separator 637 between the gasket flange 601 and the elastomeric member. In the illustrated embodiment of FIG. 53, the elastomeric member 611 is generally washer-shaped. As another example, illustrated in FIG. 54 as an eighth embodiment of the present invention, the elastomeric member 711 incorporated in cell 721 is shaped generally as an O-ring.

It is also contemplated that the separator 637, anode, elastomeric member 611 or 711 and gasket 645 may instead be assembled together outside of the container 627 and then inserted into the container (e.g., with the terminal end 643 of the separator already sealed), i.e., with the anode-filled separator inserted down into the cathode.

Figure 55:
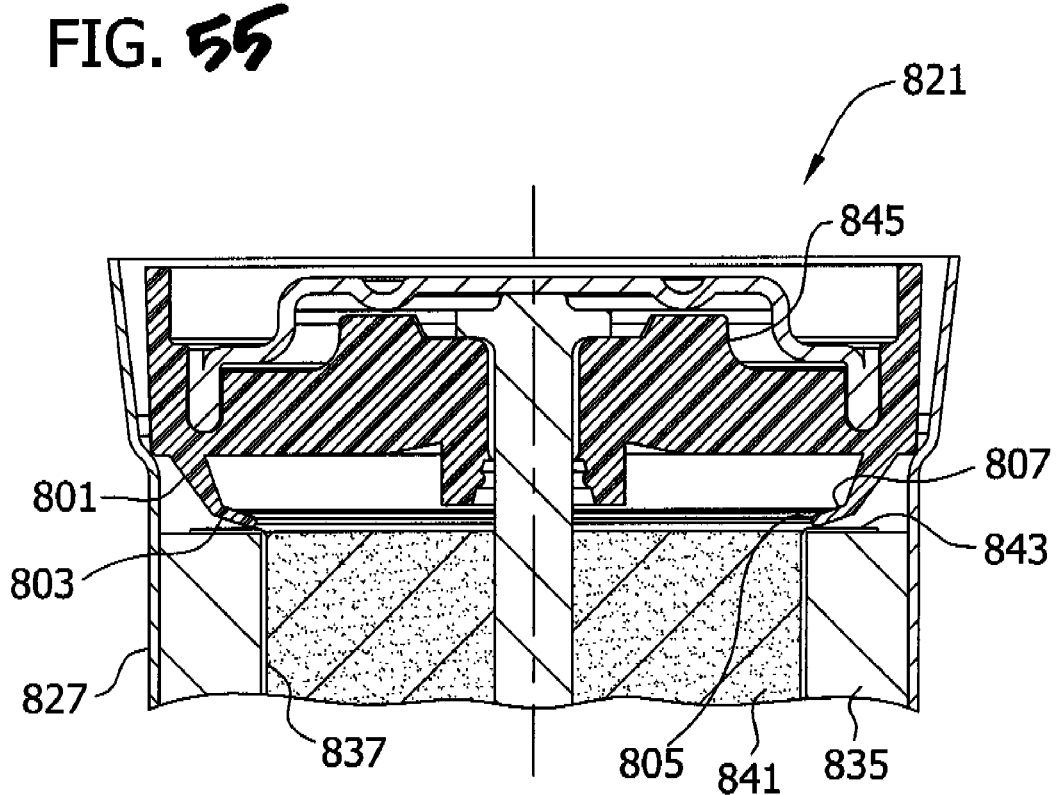
FIG. 55 illustrates a fragmented cross-section of an electrochemical cell having a sealing assembly according to a ninth embodiment of the present invention, with a container of the cell illustrated in an open configuration.
Figure 56:
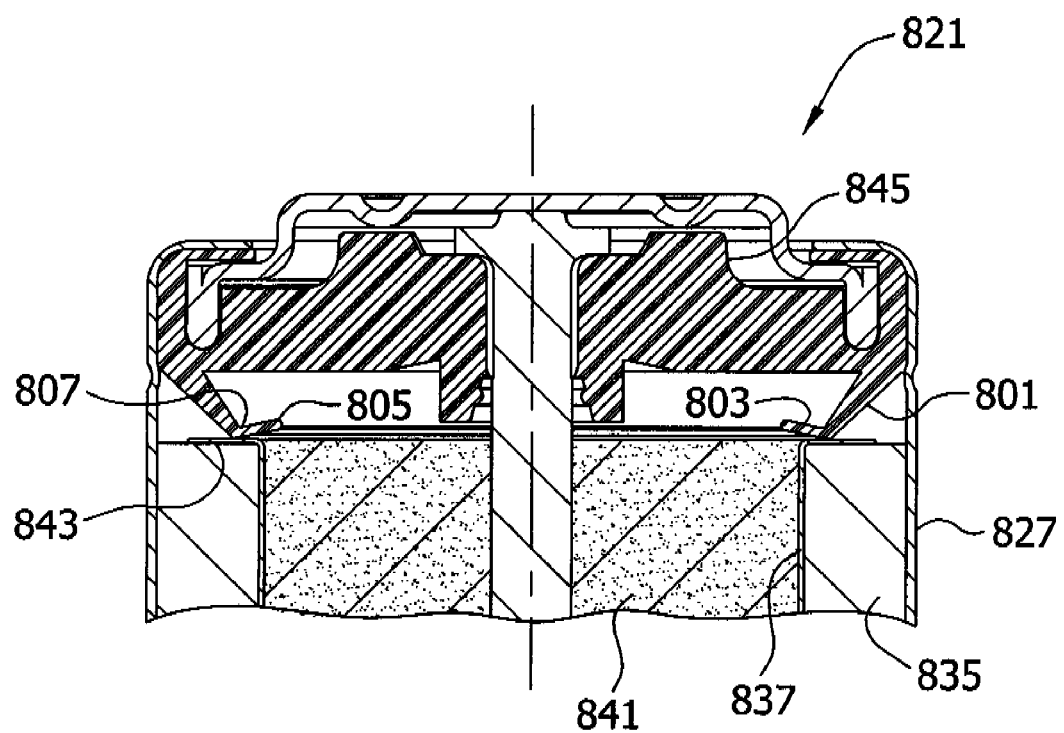
FIG. 56 illustrates a view similar to FIG. 55 with the container in a closed configuration.

Referring now to FIGS. 55 and 56, a cell 821 has a sealing assembly in accordance with a ninth embodiment of the present invention comprises a gasket 845 (broadly, a sealing member) that is generally disk-shaped and has a flange 801 depending therefrom for positioning radially outward of the terminal end 843 of the separator 837, and more suitably depends from the gasket adjacent the outermost radial extent of the gasket. The gasket 845 is suitably of a single-piece construction and may be constructed of any of the materials from which the gasket 45*a* illustrated in FIG. 2A and described previously may be constructed. In one embodiment, the flange 801 is initially formed to depend straight down from the gasket 845. Before the gasket 845 is inserted into the container 827 (e.g., after initial molding of the gasket), a lower portion 803 of the flange 801 depending from the gasket is folded to extend generally radially inward.

In the embodiment shown in FIG. 55, the flange 801 depending from the gasket 845 is also bent slightly radially inward generally at the fixed (e.g., top) end of the flange. In this bent and folded orientation, the free end 805 of the flange extends radially inward beyond the terminal end 843 of the separator 837 in the open configuration of the container 827. It is understood that the fold line 807 along which the flange 801 is folded may be located generally anywhere along the length of the flange, depending on the length of the flange and the radial location from which the flange depends from the gasket relative to the radial location of the terminal end 843 of the separator 837.

Upon closing the container 827, as shown in FIG. 56, the gasket 845 is urged further into the container toward the anode 841 and cathode 835. The bent and folded flange 801 depending from the gasket 845 pinches the terminal end of the separator 837 against the cathode 835 to substantially seal the terminal end 843 of the separator. It is contemplated that instead of the flange 801 being folded inward, the flange may depend from the gasket 845 at a location radially inward of the terminal end 843 of the separator 837 and be bent and/or folded radially outward to pinch the terminal end of the separator against the cathode 835 in the closed configuration of the container 827. It is also contemplated that the flange 801 may be located and configured to instead pinch the terminal end 843 of the separator 837 against the anode 841 for sealing between the flange 801 and the anode and remain within the scope of this invention.

Figure 57:
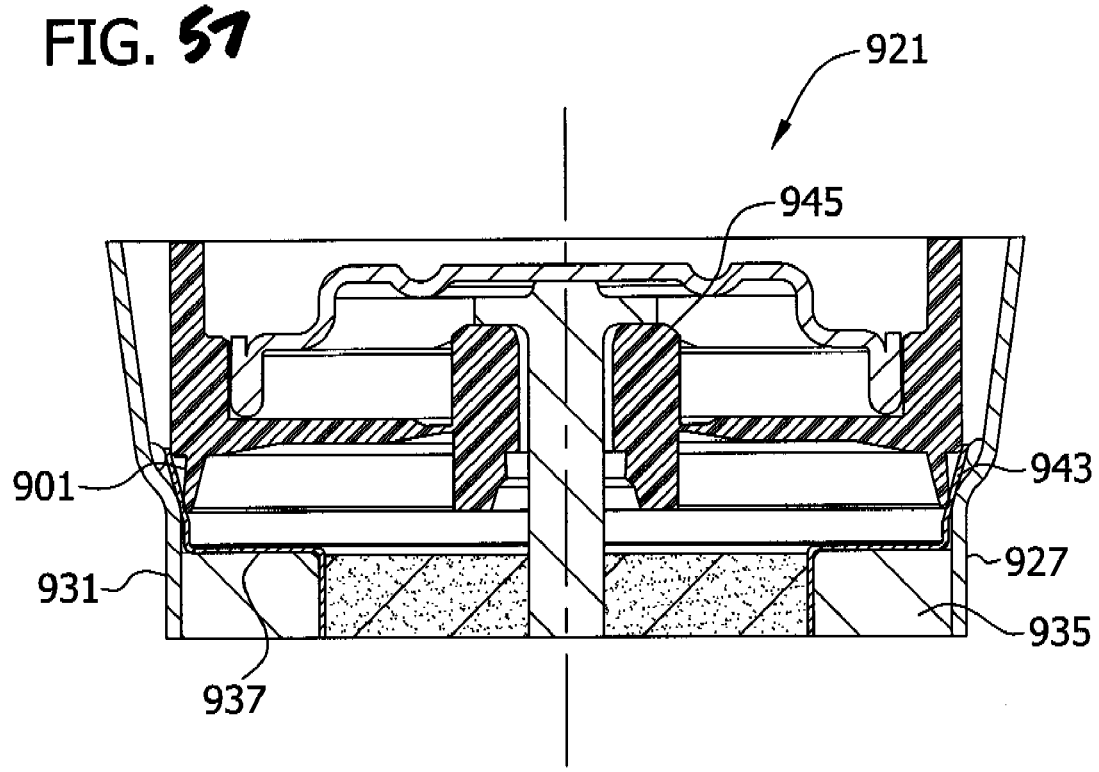
FIG. 57 illustrates a fragmented cross-section of an electrochemical cell having a sealing assembly according to a tenth embodiment of the present invention, with a container of the cell illustrated in an open configuration.
Figure 58:
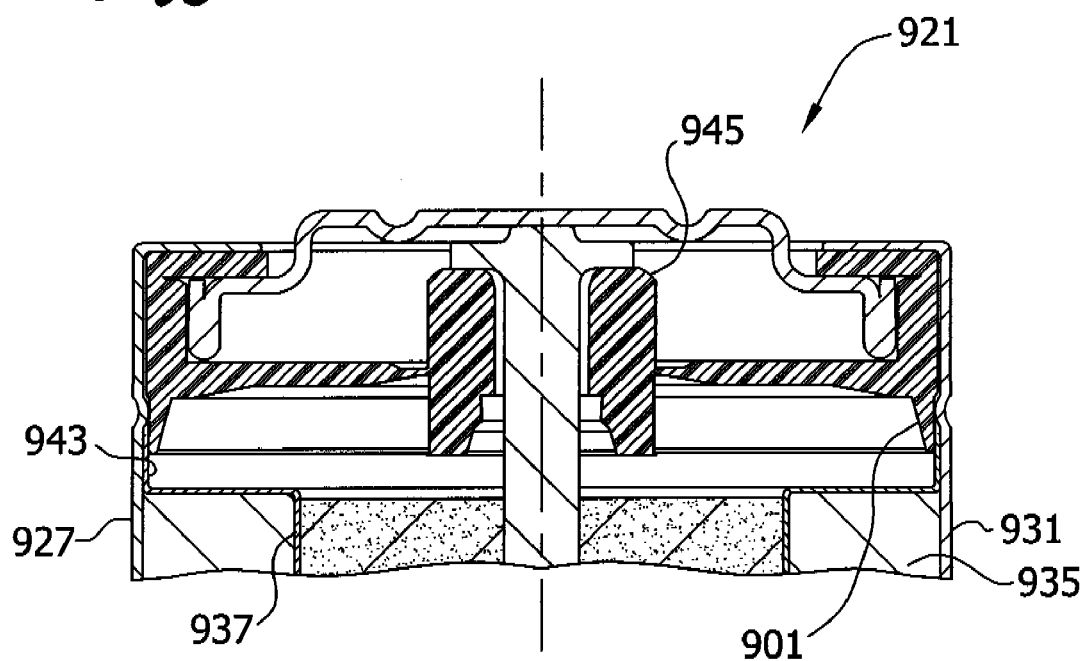
FIG. 58 illustrates a view similar to FIG. 57 with the container in a closed configuration.

FIGS. 57 and 58 illustrate a tenth embodiment of a sealing assembly comprising a generally disk-shaped gasket 945 (broadly, a sealing member) having an annular flange 901 depending therefrom generally adjacent the radially outermost extent of the gasket. In this embodiment, the terminal end 943 of the separator 937 is sufficiently sized in length so that in the open configuration of the container 927 of the cell 921, the terminal end of the separator can be generally folded to extend radially outward over the cathode 935 and then up along the container side wall 931 in opposed relationship with the flange 901 depending from the gasket 945. Upon closing the container 927, the container side wall 931 urges the upward extending portion of the terminal end 943 of the separator 937 inward against the flange 901 to pinch the separator between the container and the gasket flange. It is contemplated that the radial location of the flange 901 relative to the side wall 931 of the container 927 in the open configuration thereof may be such that the terminal end 943 of the separator 937 is retained between the flange and the container sidewall in the closed configuration of the container with little or no pinching of the terminal end of the separator, or the flange may be slightly spaced from the container sidewall in the closed configuration of the container, and still sufficiently seal the terminal end of the separator within the scope of this invention.

Figure 59:
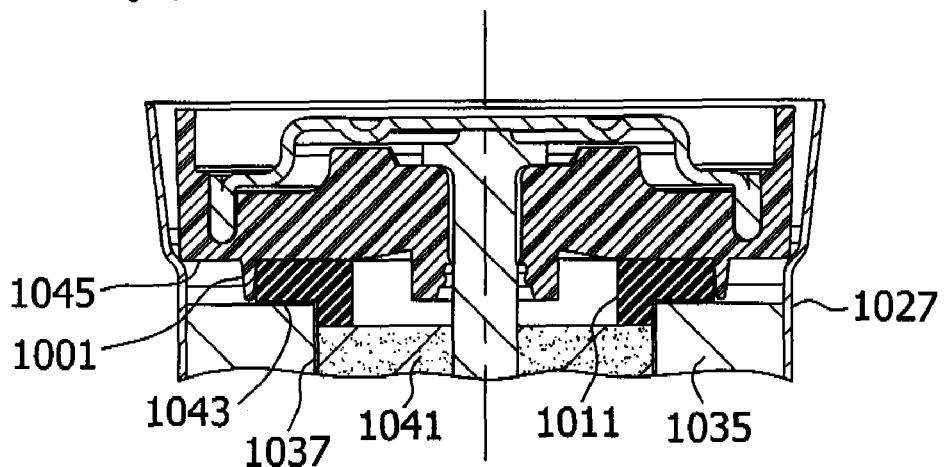
FIG. 59 illustrates a fragmented cross-section of an electrochemical cell having a sealing assembly according to an eleventh embodiment of the present invention, with a container of the cell illustrated in an open configuration.
Figure 60:
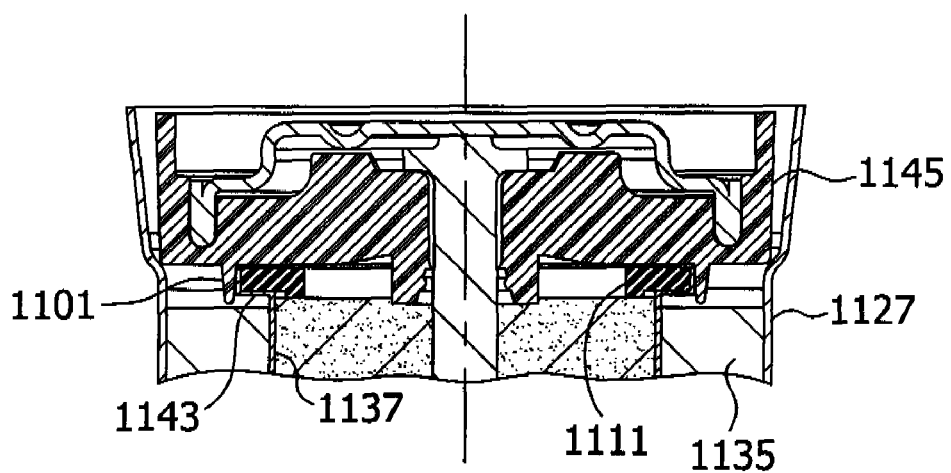
FIG. 60 illustrates a fragmented cross-section of an electrochemical cell having a sealing assembly according to a twelfth embodiment of the present invention, with a container of the cell illustrated in an open configuration.
Figure 61:
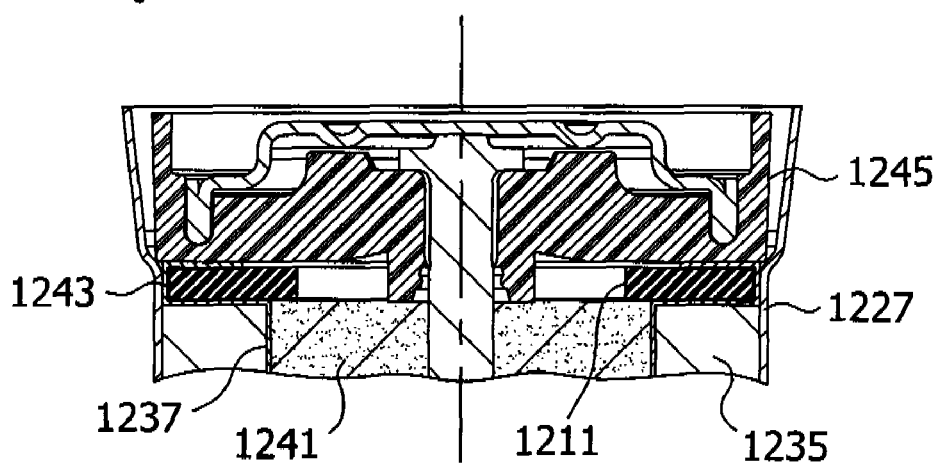
FIG. 61 illustrates a fragmented cross-section of an electrochemical cell having a sealing assembly according to a thirteenth embodiment of the present invention, with a container of the cell illustrated in an open configuration.

FIGS. 59-61 illustrate additional embodiments of the present invention similar to the embodiment of FIGS. 51 and 52 in that the sealing assembly comprises a generally washer-shaped gasket seat (broadly, a first sealing member of the sealing assembly) constructed of a compressible material, and a gasket (broadly, a second sealing member of the sealing assembly). In FIG. 59, the gasket 1045 has a flange 1001 depending therefrom at a location for positioning generally radially outward of the terminal end 1043 of the separator 1037. The gasket seat 1011 (broadly a sealing member of a sealing assembly of the embodiment of FIG. 59) is sized for seating over the anode 1041, the terminal end 1043 of the separator 1037 and a portion of the cathode 1035, with the terminal end of the separator disposed between the gasket seat and the cathode. The gasket 1045 is placed on the gasket seat 1011 in the open configuration of the container 1027 with the depending flange 1001 extending along the outer sidewall of the gasket seat. Upon closing the container 1027 (the closed configuration is not shown), the gasket 1045 urges the gasket seat 1011 toward the anode 1041 and cathode 1035 to pinch the terminal end 1043 of the separator 1037 between the gasket seat and the cathode.

The embodiment of FIG. 60 is similar to the embodiment of FIG. 59, but with the terminal end 1143 of the separator 1137 being sized to fold generally radially out and up between the gasket seat 1111 and the flange 1101 depending from the gasket 1145. The gasket seat 1111 is shown as being spaced above the cathode 1135. Accordingly, upon closing the container 1127, the gasket 1145 urges the compressible gasket seat 1111 against the anode. Compression of the gasket seat causes the gasket seat to expand radially against the flange depending from the gasket to pinch (e.g., compress) the terminal end of the separator between the gasket seat and the flange. It is contemplated that the gasket seat may additionally seat against the cathode to further pinch the terminal end of the separator between the gasket seat and the cathode without departing from the scope of this invention. It is also contemplated that the separator 1137, anode, gasket seat 1111 and gasket 1145 may instead be assembled together outside of the container 1127 and then inserted into the container (e.g., with the terminal end 1143 of the separator already sealed), i.e., with the anode-filled separator being inserted down into the cathode.

In the illustrated embodiment of FIG. 61, the gasket 1245 does not have a depending flange. The gasket seat 1211 is sized to extend radially outward over a portion of the anode 1241 (e.g., radially inward of the cathode 1235 and the portion of the separator 1237 disposed between the anode and cathode), and outward over the cathode to generally adjacent the container sidewall. The terminal end 1243 of the separator 1237 is sufficiently sized for folding radially outward over the cathode 1235 and then up between the container sidewall and the gasket seat 1211. Upon closing the container 1227 (the closed configuration is not shown), the gasket 1245 urges the compressible gasket seat 1211 toward the anode 1241 and cathode 1235. Compression of the gasket seat 1211 causes the gasket seat to expand radially toward the container sidewall to pinch the terminal end 1243 of the separator 1237 between the gasket seat and the container sidewall.

It is contemplated that a sealant (not shown) may be used in any of the embodiments shown in the drawings and described herein to further seal the terminal end of the separator, and more suitably to further seal the terminal end of the separator against liquid leaking over the terminal end of the separator. For example, in the embodiment illustrated in FIGS. 2A, 2B, 41, and 42, a sealant (not shown) may be provided in the slot 67a to further seal the terminal end 43a of the separator 37a within the slot. In other embodiments such as the embodiments illustrated in FIGS. 55-58, the sealant (not shown) may be provided at the terminal end of the separator between the sealing assembly and the cathode (FIGS. 55-56) or between the sealing assembly and the container (FIGS. 57-58) to further seal the terminal end of the separator.

The following Examples describe various embodiments of the present invention. Other embodiments within the scope of the appended claims will be apparent to a skilled artisan considering the specification or practice of the invention as described herein. It is intended that the specification, together with the Examples, be considered exemplary only, with the scope and spirit of the invention being indicated by the claims, which follow the Examples.

EXAMPLES

Example 1

This is an example that illustrates the efficacy of various separators' ability to effectively limit the migration of anode-fouling soluble species. The open circuit voltage (OCV) was compared for a plurality of 357-size cells made with various separators both initially and after 1 day room temperature of storage. The cathode was CuO (commercially available from Aldrich, St. Louis, Mo.), and the cell anode was a conventional alkaline Zn gel anode having conventional zinc and electrolyte concentrations.

In most cases, two layers of separator were used in the cell, one facing the cathode ("cathode side separator"), the other facing the anode ("anode side separator"). The OCV data presented below in Table 6 includes the average of two cells of the given cell type. It should be appreciated that a decrease in OCV indicates increased migration of anode-fouling soluble copper species into the anode.

TABLE 6

| Category | Cathode Side Separator Type | Anode Side Separator | OCV, V (initial) | OCV, V (after 1 day) |
|---|---|---|---|---|
| Cellophane | 350P00 | FS2213 | 1.115 | 1.098 |
| | SC-216 | F3T23 | 1.116 | 1.095 |
| | SC-216 | SC-216 | 1.299 | 1.163 |
| | SC216 | None | 1.115 | 1.101 |
| | SF-586 | F3T23 | 1.107 | 1.018 |
| | SF-586 | None | 1.250 | 1.169 |
| FAS Micro-porous membranes | A | F3T23 | 1.118 | 1.096 |
| | B | F3T23 | 1.116 | 1.108 |
| | C | F3T23 | 1.116 | 1.107 |
| | D | F3T23 | 1.130 | 1.091 |
| | E | None | 1.268 | 1.138 |
| Micro-porous membranes | F | F3T23 | 1.088 | 0.554 |
| | G | F3T23 | 1.095 | 0.736 |
| | Celgard 3407 | F3T23 | 1.118 | 0.856 |

Note:
350P00: commercially available from UCB Film Inc. UK.
SC-216 and SF-586: commercially available from Viskase Corporation, IL
FAS micro-porous membrane samples provided by Advanced Membrane System, MA.
Sample F is provided by W. L. Gore.& Associates, INC., MD.
Sample G is provided by Aporous, MA
Celgard 3407: commercially available from Hoechst Celanese Corporation, NC.
FS2213: commercially available from Freudenberg, Germany
F3T23: commercially available from Kuraray Co. LTD., Osaka, Japan As shown in Table 6, based on the deterioration in OCV, it is seen that the cellophane and the $TiO_2$ filled HMWPE (high molecular weight polyethylene) membranes outperform the microporous-type membranes (e.g. Celgard 3407 PE, B10ab Nylon and Excellerator Alkaline PTFE, etc), indicating that they are more effective in limiting migration of anode-fouling copper species.

Example 2

This is an example that illustrates the ability of various separators to effectively limit the migration of anode-fouling species. As explained elsewhere, Side A of the glass tube fixture was filled with 34% KOH having a known concentration of copper ions and electrolyte free of copper ions was added to compartment B. The concentration of complex copper ions on side B was measured after 1 week at room temperature.

Referring now to Table 7, the Exclusion Test was performed on various separators to determine the Exclusion Value of soluble copper, silver, and sulfur species after storage at a temperature of 60° C. Side A of the glass fixture was filled with 34% KOH solution with 0.25 g of CuO (copper oxide) and 0.25 g of CuS powder which produce the soluble copper and sulfur species concentrations shown in columns 2 and 4. For silver exclusion determination, 0.25 g of AgO was used in side A of the AgO was used in side A of the fixture to produce silver concentrations shown in column 6. The summary results are displayed below in Table 7.

TABLE 7

Exclusion Test results for soluble copper, silver, and sulfur species after 54 days at 60° C.

| Separator Film (1-ply unless noted) | Side A Copper ion (ppm) | Side B Copper ion (ppm) | Side A Sulfur (ppm) | Side B Sulfur (ppm) | Side A Silver (ppm) | Side B Silver (ppm) | Exclusion Value of Cu (%) | Exclusion Value of S (%) | Exclusion Value of Ag (%) |
|---|---|---|---|---|---|---|---|---|---|
| SC-216 (Viskase) | 166 | 47 | 358 | 192 | 31 | <1 | 72 | 46 | >97 |
| SC-216, 2-ply (Viskase) | 129 | 22 | 410 | 100 | — | — | 83 | 76 | — |
| SF-586 1-ply | 157 | 58 | — | — | — | — | 63.0 | — | — |
| Hybrid #33 | 123 | 86 | 277 | 174 | — | — | 30 | 37 | — |
| Hybrid #33/SC216/Hyb #33 | 115 | 34 | 313 | 156 | — | — | 70 | 50 | — |
| In-house PVA (film #3)* | 115 | 22 | 362 | 38 | — | — | 81 | 90 | — |
| Monosol PVA M1030 | 136 | 69 | 321 | 162 | — | — | 49 | 50 | — |
| Monosol PVA M1000 | 133 | 18 | 377 | 83 | 32 | <1 | 87 | 78 | >97 |
| Monosol PVA M2000 | 136 | 23 | 348 | 61 | 33 | <1 | 83 | 83 | >97 |

Conditions: 10 mL 34% KOH each side of film, Copper from 0.25 g CuO, Sulfur from 0.25 g CuS, Silver from 0.25 g AgO, 5 days at 60° C. storage
PVA film cast from 10.6% PVA solution (Celvol 350)

The results of Table 7 above illustrate that multiple layers of a separator are more effective than a single layer of the same separator material in limiting the migration of soluble copper and sulfur species at 60° C. The results also indicate suitability of PVA films in excluding soluble copper, silver, and sulfur species.

Example 3

Figure 29:
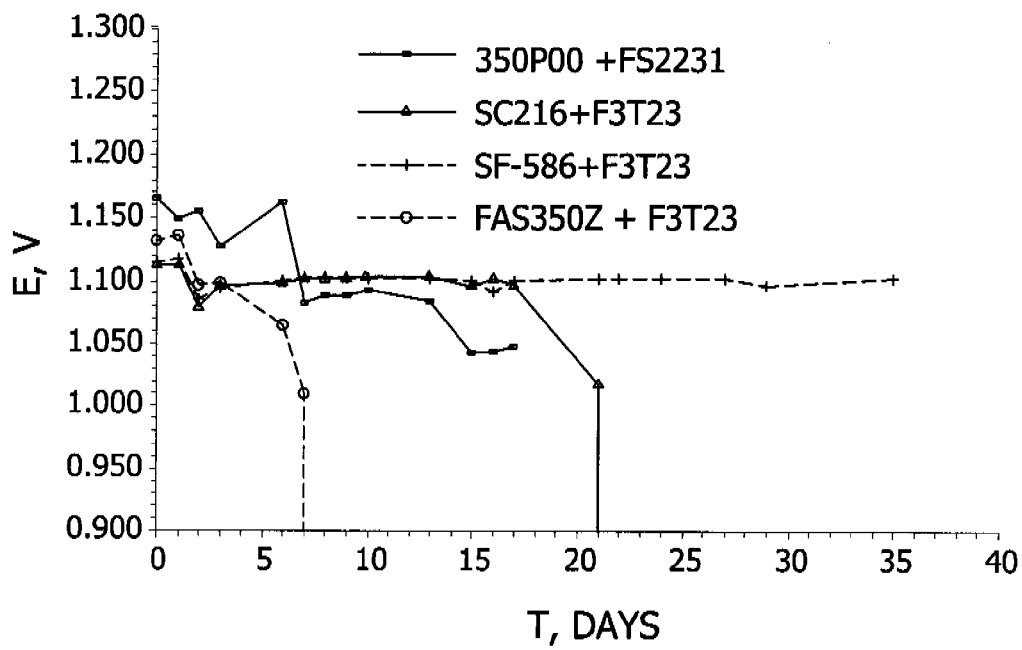
FIG. 29 is a graph plotting the open circuit voltage for a plurality of cells having CuO cathodes and varying separators.

This is an example that illustrates the utility of effectively limiting the migration of anode-fouling soluble species in stored 357 size button cells. Referring now to FIG. 29, four cells having CuO cathodes were stored for five days at room temperature, followed by 60 degrees C. until the cells failed (as determined by OCV, impedance and expansion as discussed previously). The OCV was continuously measured for each cell from the first day of storage. FIG. 29 shows that cellophane separators are better than FAS 350Z separator for cells containing CuO cathodes. Also, thicker cellophane separators (SF-586, 3 mil thick) outperform the thinner separator (350P00, and SC216 both are 1 mil thick) confirming results from the Exclusion Test experiments.

Example 4

Figure 30:
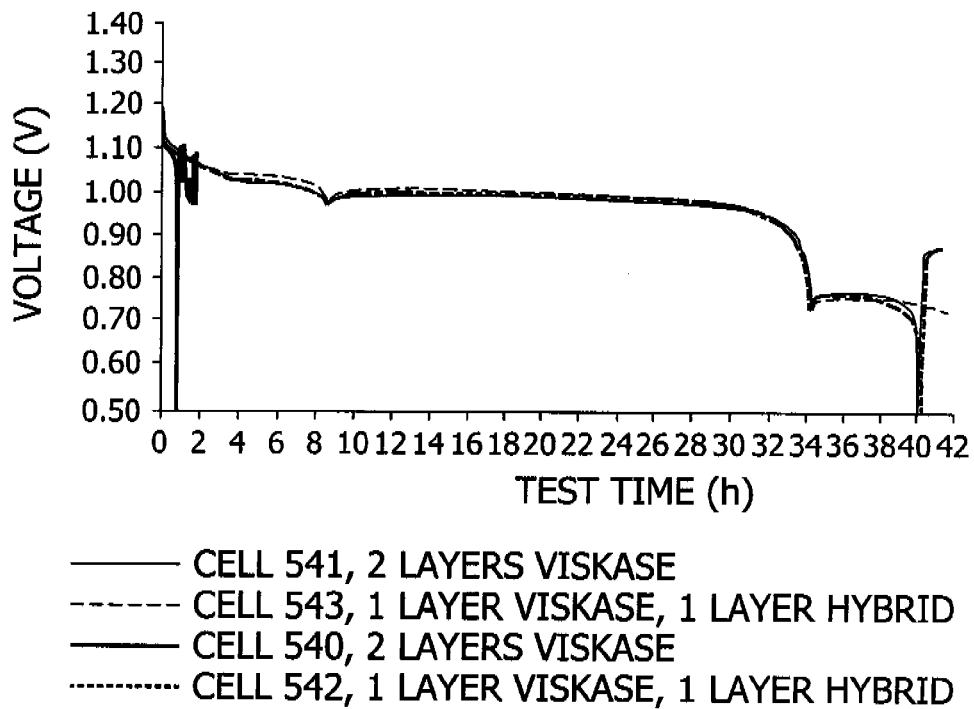
FIG. 30 is a graph plotting the discharge profile of cells having CuO/CuS cathodes and various separators and combinations.

This is an example that illustrates the utility of a cell made from materials of the herein described invention. Referring now to FIG. 30, two pairs of cells were provided. Each pair of cells included 1) one cell whose separator contained a layer Viskase Cellophane (SC-216) in combination with a layer of a hybrid separator comprising cross-linked PVA on a F3T23 nonwoven fabric; and 2) a second cell whose separator comprised two layers of Viskase Cellophane. The first pair of cells (cells 541 and 543) were discharged at 5 mA immediately after cell fabrication. The second pair of cells (cells 540 and 542) were discharged at 5 mA after 17 hours.

FIG. 30 shows that the cell built with 2 layers of Viskase Cellophane separator (SC-216) discharges to full capacity if it is discharged immediately, but has a very short capacity if it is discharged after 17 hrs rest. The cell built with 1 layer of Viskase cellophane separator and 1 layer of hybrid (cross linked PVA coating on F3T23) separator discharged to full capacity even after 17 hr rest. One skilled in the art will readily appreciate that although a separator material may demonstrate an adequate Exclusion Value, the seal in a battery such as a button cell may affect its ability to effectively limit the migration of anode-fouling soluble species.

Example 4 thus shows that a combination of cellophane and hybrid separator is more effective in limiting the migration of soluble copper and sulfur species than 2 layers of SC 216 cellophane.

It should be appreciated that the hybrid separator layer used above was fabricated by cross-linking a 2% PVA in water solution with a 5% sodium borate solution on the surface of a F3T23 non-woven separator. The PVA loading in the hybrid separator was approximately 10 g/m², and it had an air permeability in the dry state of 1800 Gurley seconds. The hybrid layer was placed on the anode gel side of the separator structure. The air permeability was determined using a Gurley Precision Instrument Tester described above.

Example 5

Figure 31:
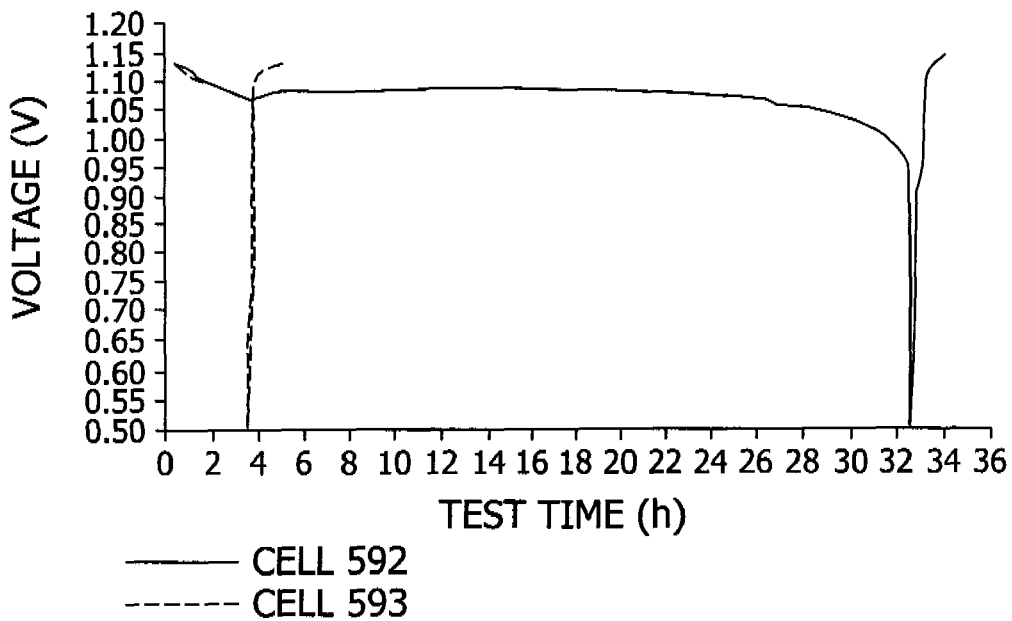
FIG. 31 is a graph plotting the discharge profile of a pair of cells having CuO/CuS cathodes and varying separators.

This is an example that illustrates the utility of a cell made using separators and cathode materials of various aspects of the present invention. Referring now to FIG. 31, a pair of electrochemical cells was provided having a cathode that included CuO and CuS. The cells were discharged after 17 hours of rest. The first cell (cell 592) had a separator comprising a layer of Viskase Cellophane disposed between two layers of hybrid separator. The hybrid layers therefore faced outwardly, that is towards the anode, and towards the cathode. FIG. 31 shows, similar to FIG. 30, that for mixtures of CuO and CuS, a combination of cellophane separator and hybrid separator (cross linked PVA coating on F3T23) is more effective than 2 layers of cellophane alone.

Example 6

Figure 32:
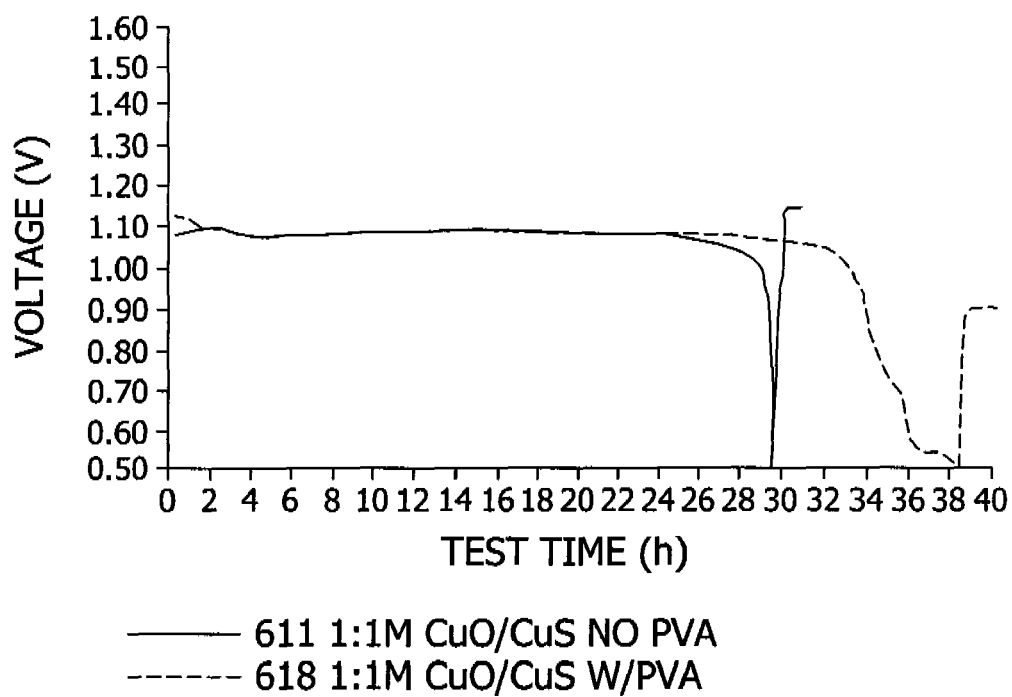
FIG. 32 is a graph plotting the discharge profile of a pair of cells having CuO/CuS cathodes to illustrate the effect of including PVA in the cathode.

This is an example that illustrates the utility of a cell made to represent an aspect of the present invention. Referring to FIG. 32, a pair of cells was discharged at 5 mA after 5 days. Each cell contained a cathode comprising CuO and CuS with 2 layers of hybrid separator (cross linked PVA coated on F3T23). One of the cells contained PVA binder in the cathode, while the other cell did not. FIG. 32 shows that with a cathode comprising a CuO/CuS mixture, 2 layers of hybrid separator are effective in limiting migration of anode-fouling soluble copper and sulfur species even after 5 days, thereby allowing the cell to discharge to full capacity. Furthermore, adding 0.2 wt % PVA to the cathode is shown to extend cell discharge capacity by enabling better utilization of the cathode capacity.

Example 7

Figure 33:
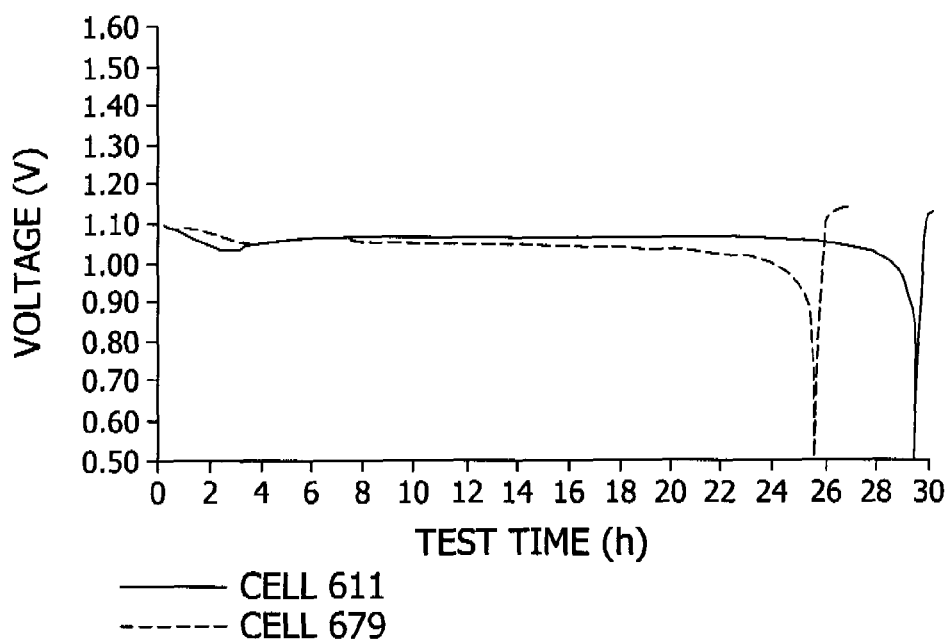
FIG. 33 is a graph plotting the discharge profile of a pair of cells having CuO/CuS cathodes and varying separators.

This is an example that illustrates the utility of the separator and cathode materials described herein. Referring now to FIG. 33, a pair of size 357 button cells were provided. The cathodes were made with a 1-to-1 molar ratio of CuO and CuS mixture. The first cell (cell 611) had a separator comprising a pair of hybrid layers (cross linked PVA coated onto F3T23). The other cell (cell 679) had one layer of EVA emulsion coated onto F3R23 (commercially available from Kuraray). The first cell was discharged at 5 mA after 5 days. The second cell was discharged at 5 mA after 4 days. FIG. 33 shows that the cross-linked PVA coated onto F3T23 outperformed the EVA-coated F3R23, even after an additional day before testing. It also shows that the EVA-coated F3R23 separator does not show the performance deficiency previously noted with 2 layers of SC 216 cellophane (Example 6).

Example 8

Figure 34:
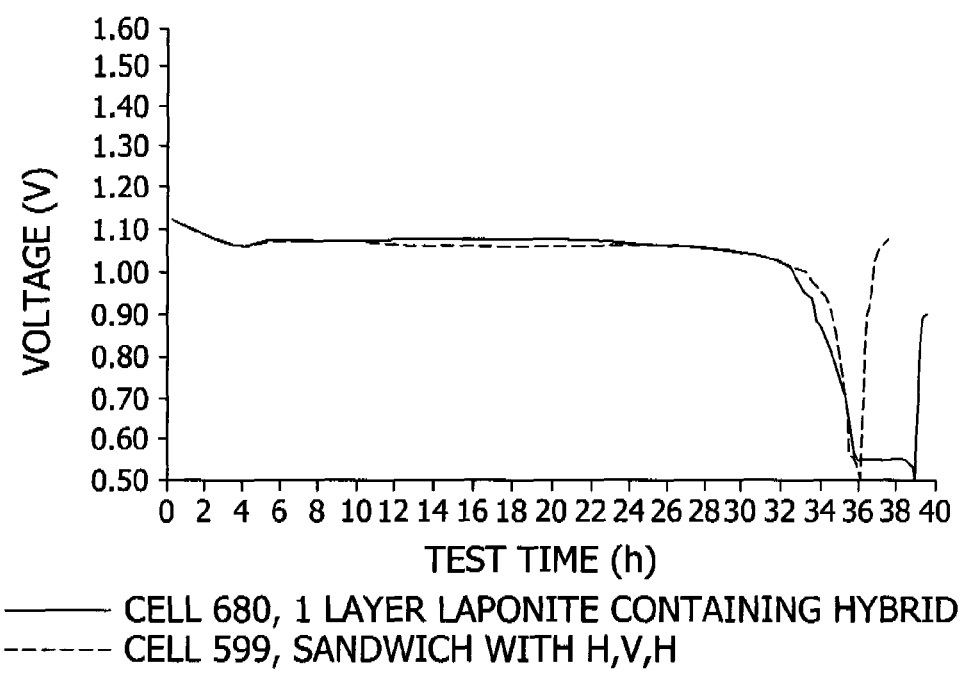
FIG. 34 is a graph plotting the discharge profile of a pair of cells having CuO/CuS cathodes and varying separators.

This is an example that illustrates the effectiveness of limiting the migration of anode-fouling species in a cell made according to various aspects of the present invention. Referring now to FIG. 34, a pair of cells was provided, each having a cathode containing a 1-to-1 molar mixture of CuO and CuS. The first cell (cell 680) had one layer of hybrid separator impregnated with Laponite. The second cell (cell 599) had a layer of Viskase cellophane sandwiched between two layers of hybrid (cross-linked PVA coated onto F3T23). The first cell was discharged at 5 mA after four days. The second cell was discharged at 5 mA after one day. FIG. 34 shows that both separators were effective in limiting the migration of soluble sulfur and copper species into the anode.

Example 9

This example illustrates the effect of using an additive such as ZnO in the cathode to reduce the ability of the copper and sulfur species to foul the anode. Two 357 size button cells were constructed in a similar manner with the exception that the cathode of one button cell contained 2% ZnO blended with the cathode. The cathode mix was produced from a 1:1M ratio of jet-milled CuO and as received CuS dry blended with KS4 graphite and ZnO additive such that the cathode composition was 95% actives, 3% graphite and 2% ZnO. The cathode composition for the cell without the ZnO additive was 95% actives and 5% KS4 graphite. The anode consisted of a 68% sieved bismuth, indium, and lead in a zinc (BIP) anode and the separator was a single ply of M 2000 PVA film. Both cells were discharged after a 7 day period of ambient storage. Both cells were exposed to an intermittent test regime involving a 12.5 mA current for 1 hour followed by open circuit rest, repeated 4 times per day. The results, shown in the Table 8 below demonstrate that the cell with 2% ZnO delivered 240 mA/g discharge capacity as compared to only 100 mAh/gm for the control cell with no ZnO. The results demonstrate the beneficial aspects of added ZnO on battery shelf life.

TABLE 8

| Cathode | Cell Discharge Capacity to 0.7 V, mAh/gm |
| --- | --- |
| 95% 1:1 M CuO/CuS + 5% KS4 | 100 |
| 95% 1:1 M CuO/CuS, 3% KS4, 2% ZnO | 240 |

Example 10

Figure 35:
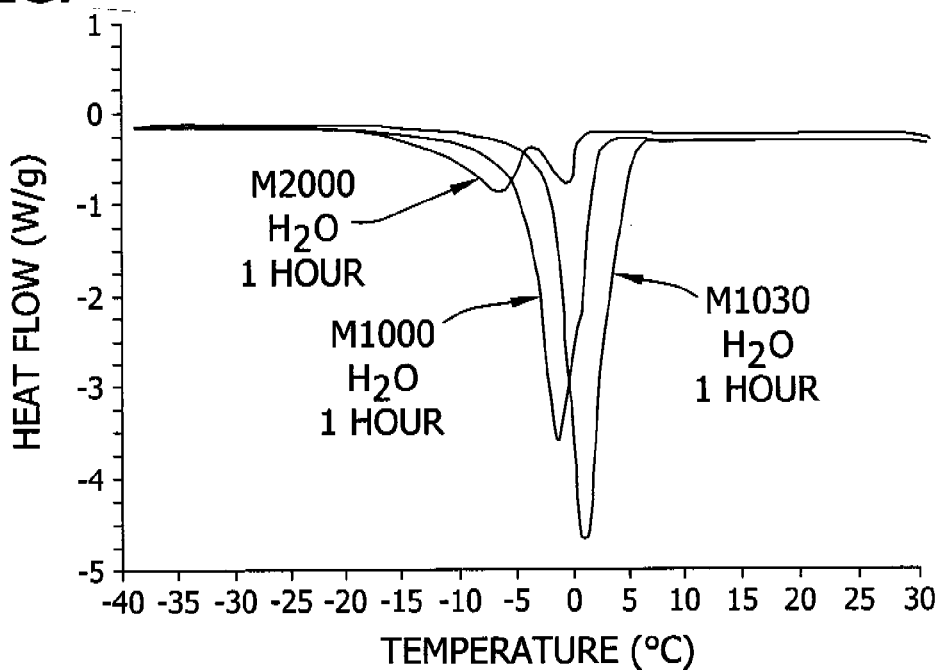
FIG. 35 is a graph comparing initial water uptake of various separator materials.

Referring to FIG. 35, this example illustrates the method used to identify the relative amounts of free and bound water in a separator sample. Samples of separator material having a diameter of 0.11" were prepared and preconditioned in dry atmospheric conditions (<1% relative humidity) for 24 hours. The samples were then soaked in deionized water for one hour, removed under an atmosphere of <1% relative humidity, and blotted with a Kimwipe. Also in an atmosphere of <1% relative humidity a sample pan was tared and the prepared sample was then inserted into the sample pan. The prepared sample was then weighed and the weight recorded. The sample lid was then crimped onto the pan. The sample container was immediately immersed in liquid nitrogen to freeze any water present in the sample. A differential scanning calorimeter (available from TA Instruments of New Castle, Del., Model Q100) was used to evaluate the sample. The system was programmed to ramp at 2° C. per minute and scan the temperature range from −80° C. to 50° C. The amount of bound water was determined by evaluating the heat flow curves generated and by determining the proportion of the curve that lies below −1° C. and the portion that lies above −1° C. When the melting curve for a material indicated a greater than 50% of the energy (J/g) of melting to be below −1° C. then the material was determined to have more bound water than free water within the separator. Having more bound water than free water is an indication that a material is suitable to provide the attributes required for a separator to effectively limit the migration of anode-fouling soluble species.

Example 11

Figure 36:
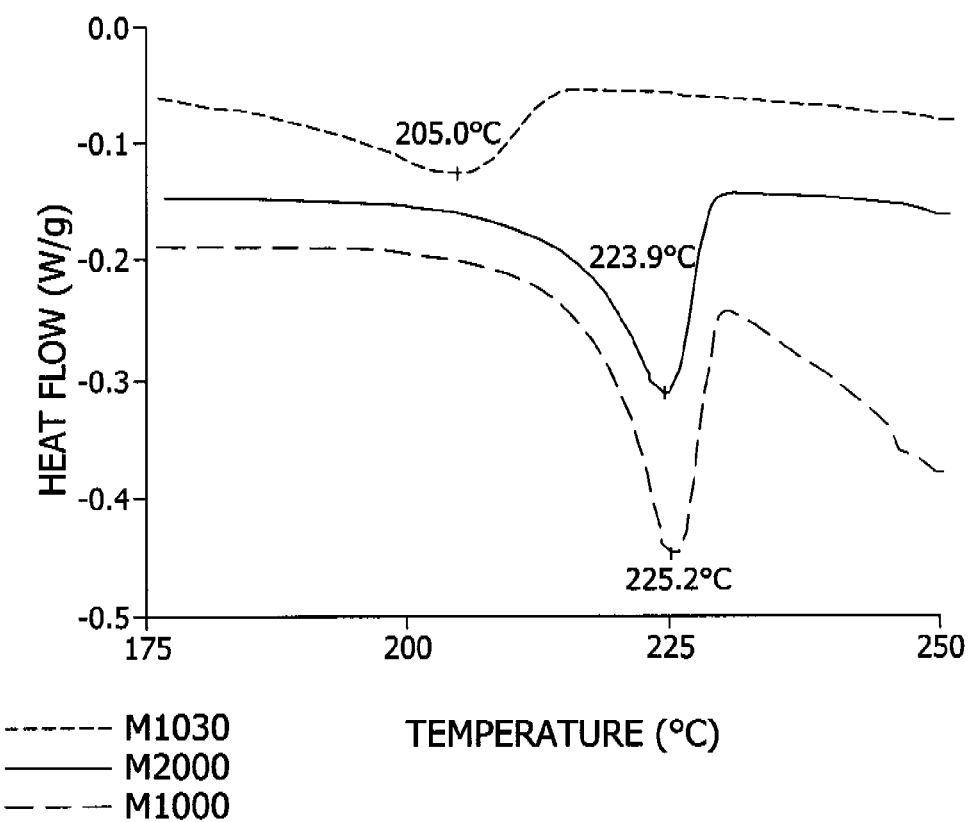
FIG. 36 is a graph illustrating the melting curves, and corresponding melting points, of various separator materials.

This is an example that illustrates the method used to identify the relative melting points of PVA separator samples. Samples of separator material having a diameter of 0.11" were prepared and preconditioned in 50% relative humidity atmospheric conditions for 24 hours. Also in an atmosphere of 50% relative humidity a sample pan was tared and the prepared sample was then inserted into the sample pan. The prepared sample was then weighed and the weight recorded. The sample lid was then crimped onto the pan. The sample container was inserted into a differential scanning calorimeter (available from TA Instruments of New Castle, Del., Model Q100) which was used to evaluate the sample. The system was programmed to ramp at 5° C. per minute and to scan the temperature range from 30° C. to 300° C. The melting point of the material was determined by the first significant peak in the heat flow curve (W/g) as will be understood by one skilled in the art (See FIG. 36). When the melting curve for a material indicated a melting point greater than 215° C., the PVA material was determined to be a suitable material for use in effectively limiting the migration of anode-fouling species as described herein.

Example 12

This is an example that illustrates the method used to identify the relative pH value of the electrolyte retained in a separator. Samples of separator materials were preconditioned in dry atmospheric conditions (<1% RH) for a minimum of 24 hours. Samples were weighed to the nearest 0.0001 g. Monosol M2000, M1000, and M1030 PVA film were soaked in 10 ml of 34-0 KOH for 24 hours at 23° C. After soaking, the films were dipped in methanol to remove surface KOH and water and rinsed with methylene chloride to remove residual solvent. The samples with absorbed KOH were then allowed to evaporate the residual methylene chloride by standing at 23° C. for 5 minutes and the weights were recorded to 0.0001 g. The film was then digested in 25 mL of deionized water at 70° C. until dissolved. The pH was recorded along with the temperature of the solution during measurement. The pH at 23° C. of retained electrolyte within each film was calculated using solution pH and temperature data using standard chemical calculation methods. Control samples were run using duplicates of the materials being tested but exposing them to only pH 7 deionized water solution. Variation from pH 7 was compensated (added or subtracted) from the corresponding sample to yield the normalized pH of the electrolyte retained within the sample separator. Table 9 shows that in separators that demonstrate adequate Exclusion Values, the pH values of the retained electrolyte in these separators are lower than the pH values in the bulk electrolyte.

TABLE 9

| Separator | pH Value of Retained Electrolyte | pH Value Difference vs. Bulk Electrolyte |
|---|---|---|
| M1000 | 13.7 | 1.8 |
| M2000 | 13.7 | 1.8 |

Standard 34-0 bulk electrolyte had a pH value of 15.5

Example 13

In this Example, the bonding ability of various commercially available adhesive materials were analyzed to determine the effect of curing time on the resulting bonding strength Three commercially available adhesive materials were prepared as directed: Loctite® 401 (available from Henkel Technologies, Rocky Hill, Conn.), TRA-BOND 2129 and TRA-BOND 2101 (both available from TRA-CON, Bedford, Me.). Each adhesive material was applied on a sample sealing assembly at the area between the position of the separator and the negative current collector. A pre-cut, 1 cm height, PVA tube separator was inserted into the adhesive on the sealing assembly. After 1 hour of curing, the sealing assembly-separator was immersed in a solution of 7% potassium hydroxide electrolyte solution, and placed in a 60° C. oven for 4 days.

After 4 days, the bond strength was evaluated, and the results are displayed in Table 10, below.

TABLE 10

| Adhesive | Trial 1 | Trial 2 | Trial 3 |
|---|---|---|---|
| Loctite ® 401 | No Bond | No Bond | No Bond |
| TRA-BOND 2129 | Acceptable Bonding | Acceptable Bonding | No Bond |
| TRA-BOND 2101 | Acceptable Bonding | Acceptable Bonding | No Bond |

Comparative Example 13

In this Example, TRA-BOND 2129 and TRA-BOND 2101 were prepared and tested as adhesives according to the process described in the above Example, however, in this Comparative Example, following insertion of the separator into the adhesive on the sample sealing assembly, the sealing assembly-separator was placed in a 60° C. oven overnight to fully cure.

After this overnight incubation, the sealing assembly-separator was immersed into a solution of 7% potassium hydroxide electrolyte solution, and placed in a 60° C. oven for 7 days.

After 7 days, the bond strength was evaluated, and the results are displayed in Table 11, below.

TABLE 11

| Adhesive | Trial 1 | Trial 2 | Trial 3 |
|---|---|---|---|
| TRA-BOND 2129 | Good Bonding | Good Bonding | Good Bonding |
| TRA-BOND 2101 | Good Bonding | Good Bonding | Good Bonding |

As illustrated by the above Examples, the TRA-BOND adhesive applications appear to be able to withstand a highly alkaline environment such as those of alkaline electrolyte solutions found in electrochemical seals. It also appears that the TRA-BOND adhesives require a more complete curing prior to being exposed to an alkaline solution.

Example 14

This example describes the preparation of a tri-layer composite film containing zinc sulfide in the middle layer, and its use in a modified AA cell to determine efficacy in minimizing Cu ion migration into the anode.

To prepare a 7.0% PVA solution, 2790 grams of de-ionized water were heated in a 5000-milliliter three neck Round Bottom Flask while being stirred with a stirring rod. When the temperature reached about 60° C., and with the water continuously agitated, 210 grams of polyvinyl alcohol resin (commercially available as Celvol 125 from Celanese Corporation, Dallas, Tex.) was slowly added to the flask. A thermometer was set at a depth of about 1 inch below the surface. With the condenser running, the polyvinyl alcohol solution was allowed to reach about 95° C., and was held at that temperature for about 4 hours. While continuing to stir the solution, the solution was allowed to cool to room temperature, and transferred to a clean plastic container where it was allowed to stand for at least 24 hours.

To 100 grams of the 7.0% polyvinyl alcohol solution was added to a mixing container, together with 21 grams zinc sulfide powder (Aldrich Chemicals). A propeller mixer was immersed into the solution to blend the polyvinyl alcohol and zinc sulfide for 5 minutes at a speed setting of 4. The suspension was then stored for 1 hour at 60° C., and then subjected to a vacuum to remove trapped air bubbles. The suspension was preferably used the same day, to avoid settling out of the zinc sulfide particles.

The suspension containing zinc sulfide incorporated in polyvinyl alcohol was then cast on a Mylar carrier film using a reverse roll coater set to a speed of 9 inches/minute and a blade gap of 0.010 inches. The film was dried in a two-zone dryer with temperatures set to 35° C. for zone #1 and 100° C. for zone #2. The film was kept on the Mylar carrier and stored in a 50% relative humidity environment until needed for use. Before use, the zinc sulfide-containing layer was peeled away from the carrier film.

A tri-layer, un-laminated composite separator was then produced by sandwiching the zinc sulfide-containing layer between two layers of 1.5 mil M2000 PVA films (obtained from Monosol LLC, Portage, Ind.) and formed into a cylindrical tube with an ultrasonic seam seal and a bottom seal as described herein. The three separator layers were laminated to each other, and the tri-layer system is termed "1.5 mil M2000/0.6 mil ZnS (1.0 mg/cm$^2$)/1.5 mil M2000." The amount of zinc sulfide used will directly affect the time during which any soluble copper from the cathode can being captured before it reaches the anode. In this example, a zinc sulfide loading of 1.0 milligrams/centimeter$^2$ was used, and the thickness of the middle layer was 0.6 mil.

To determine effectiveness of the separator system including the layer incorporating zinc sulfide particles, a modified AA cell configuration was used. Instead of using the conventional 4 hollow cylindrical tablets, only 2 (two) tablets were used here, but with a full length separator tube to eliminate any possibility of the migration of anode fouling species over the top of the separator tube. The active portion of the cathode in this example comprised of 90 wt % EMD and 10% of a copper-manganese mixed oxide as described herein above, and designated as XMD1. The electrochemically active components of this cathode comprised 90.35 wt % of the above-noted mixture of the EMD and the copper-manganese mixed oxide, 6.4% KS-4 graphite, and the balance was the polymeric binder, polyethylene powder.

Several identical cells (i.e., 32) were fabricated and sealed using a method where the cathode tablets were inserted and consolidated into the can and electrolyte incorporated into the cavity prior to separator tube insertion. Although the can was only filled with cathode tablets to half its height, the tri-layer separator tube extended all the way to the top of the can. Extending the height of the separator well beyond the cathode height ensures that the soluble copper will not creep over the top of the separator and into the anode cavity. The independent layers of film inherently trap minute volumes of air between the individual layers, which can compromise the interface between the anode and the cathode. To eliminate this situation, the separator tube was wetted with electrolyte (29% KOH, 2% ZnO) from both the inside (anode cavity) and outside (cathode area) so that electrolyte permeating through the film displaced the trapped air. The excess electrolyte was removed once the separator was nearly fully wetted. The procedure called for identical amounts of electrolyte and soak times for all the cells produced. The zinc anode gel containing 72% zinc particles in 30% KOH/2% ZnO was next filled into the separator cavity to just above the cathode tablet height and argon gas was used to purge excess oxygen from the large void volume within the cell. The cell was then closed in the conventional manner and stored in a 45° C. oven for up to 16 weeks. At regular intervals one of the cells was removed, carefully dissected, and the zinc anode carefully removed for quantitative determination of copper.

For comparison, several similar cells were assembled and stored in exactly the same manner, except that the separator did not contain the middle layer incorporated with zinc oxide.

The cells were then analyzed to determine the efficacy in minimizing copper ion migration into the anode. To analyze the copper ion migration, the entire anode material was thoroughly mixed and a 1 gram portion was accurately weighed and digested in 15 milliliters of Aqua Regia (3:1 hydrochloric and nitric acid) and water at a temperature of ~230° C. for <10 minutes. The resultant solution was filtered using Whatman 1 filter papers to remove any undigested gelling agent and diluted to 50 milliliters. A second 10/1 dilution was made (resulting in 1.5% acid solution) prior to analysis with an Ultima 2 ICP commercially available from Horiba Jobin Yvon, Inc. (Edison, N.J.). Standard solutions were mixed using a matrix match solution prepared in the analytical lab.

Figure 62:
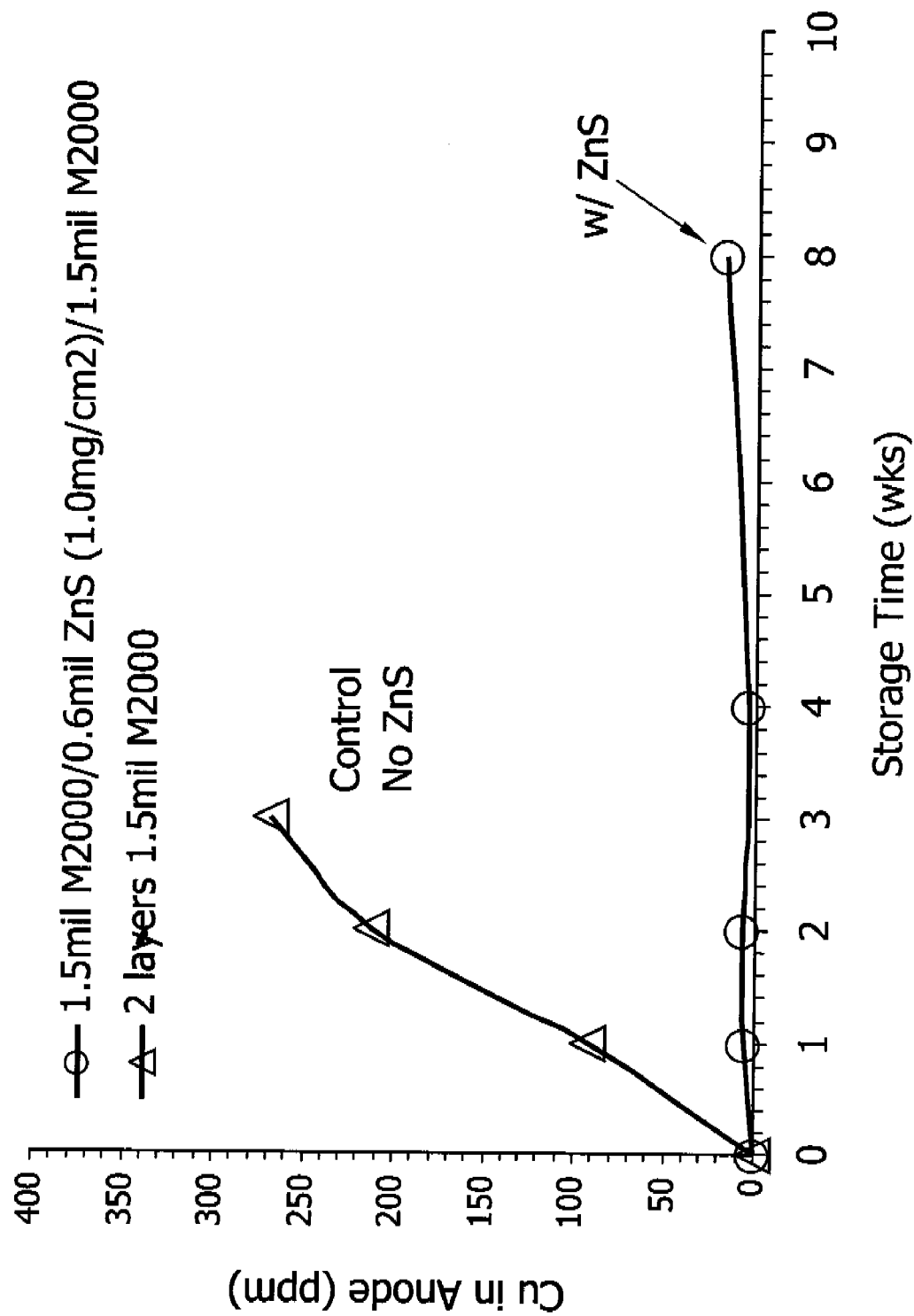
FIG. 62 is a graph plotting copper migration into the anode over time.

FIG. 62 shows the results of the copper analysis as a function of time. As shown in FIG. 62, the cells with the separator system containing the zinc sulfide had less than 20 ppm of copper after 8 weeks at 45° C. in contrast with the control samples that showed over 250 ppm copper in just 3 weeks under the same conditions.

Example 15

This example describes the preparation of a polyvinyl alcohol film separator containing a nano-clay additive, and its use in a fixture to determine efficacy in minimizing copper ion migration into the anode.

The fixture produced in this Example is a special test fixture. The fixture is essentially a square "coin cell" that has an anode and cathode compartment to house the zinc gel anode and a cathode tablet. The anode and cathode are separated by a polyvinyl alcohol film separator. The cathode compartment consists of a cavity machined out of a block of nickel into which 2.94 grams of a typical cathode mixture (comprising 90% EMD, 10% XMD as the active materials, together with KS4 graphite conducting agent and a polymerizing binder noted elsewhere herein) was pressed. Adequate electrolyte (0.73 grams of 29-2 electrolyte) was then injected onto the cathode and allowed to be absorbed.

To produce the separator for use in the cell, Cloisite Na$^+$, a hydrophilic clay, was obtained from Southern Clay Products, (Gonzales, Tex.). Per the recommendations of the manufacturer, the clay was first dispersed in water in a glass beaker to make a dilute 0.50% solution using a Ross Emulsifier mixer at a speed setting of 6.5 for 20 minutes. This was followed by placing the solution in an ultrasonic bath for 15 minutes. While not optimized, this process was expected to substantially exfoliate the clay to produce the nano-sized platelets discussed elsewhere. This clay/water solution was used as the base to dissolve the polyvinyl alcohol resin. The clay/water solution was mixed with the polyvinyl alcohol resin (Celvol 125 from Celanese Corporation (Dallas, Tex.) to produce 10% (by weight solids) polyvinyl alcohol and heated to 95° C. and held there for at least 4 hours to fully dissolve the polyvinyl alcohol. The polyvinyl alcohol/clay solution was then allowed to cool to room temperature. After cooling, the polyvinyl alcohol/clay solution was blended in a high shear Ross Emulsifier for 15 minutes at a speed setting of 6.5. The emulsified solution was again placed in an ultrasonic bath for 15 minutes. These last two steps were done to ensure that the Cloisite particles were well dispersed throughout the polyvinyl alcohol/clay solution. The solution was then kept at room temperature until ready to cast into a film. Thin films were then cast from this polyvinyl alcohol solution using the apparatus and procedure described previously.

Various ratios of the Cloisite solution and polyvinyl alcohol were used to obtain various loadings (4%, 7% and 20% by weight) of Cloisite in the final dry film. Films were cast using a slurry coater with the following conditions: solution temperature of 60° C., Mylar carrier film speed of 6 inch/min, oven temperatures of 35° C. and 75° C. respectively, and a blade gap of 30 mils. Two coating passes were used to produce films that were 1.5 mils thick in the dry state, so as to compare the results to the behavior of M2000 PVA film obtained from Monosol LLC (Portage, Ind.). Bubble-free sections of the dried film were used in the open circuit monitoring experiments described below.

The anode compartment was machined out of a block of clear acrylic, and contained a brass current collector feed-through to allow monitoring of the zinc anode voltage. After filling the cavity with an anode gel (e.g. 72% BIP (i.e., bismuth/indium/lead), zinc in 30-2 electrolyte, and other conventional additives (i.e., surfactants and gelling agents)), the separator film, as produced above, was pre-wetted with electrolyte and placed over the anode, ensuring no air bubbles between the separator film and the anode. The previously wetted cathode half of the fixture was next inverted and placed over the separator film and the entire fixture carefully assembled with 'O' Ring seals to ensure a leak-free assembly. Four screws kept the assembly tightly clamped together. The entire fixture was then inverted such that the anode was on top and resting on the separator film to ensure a good interface against the cathode surface.

In order to accelerate the experiment, all experiments were performed at 45° C. by placing the entire fixture in an oven whose temperature was controlled at 45° C.+/−2° C.

Specifically, shorting of a cell, which is a result of excessive migration of anode fouling soluble species, is indicated by a reduction in the OCV of a cell. As such, to analyze the ability of the separator films produced herein to limit the migration of the anode fouling soluble species, the OCV of the cell was monitored. The voltage of the cell was monitored by connecting a high impedance voltmeter between the anode current collector (brass feed-through) and the cathode block of nickel which also served as cathode current collector.

Figure 63:
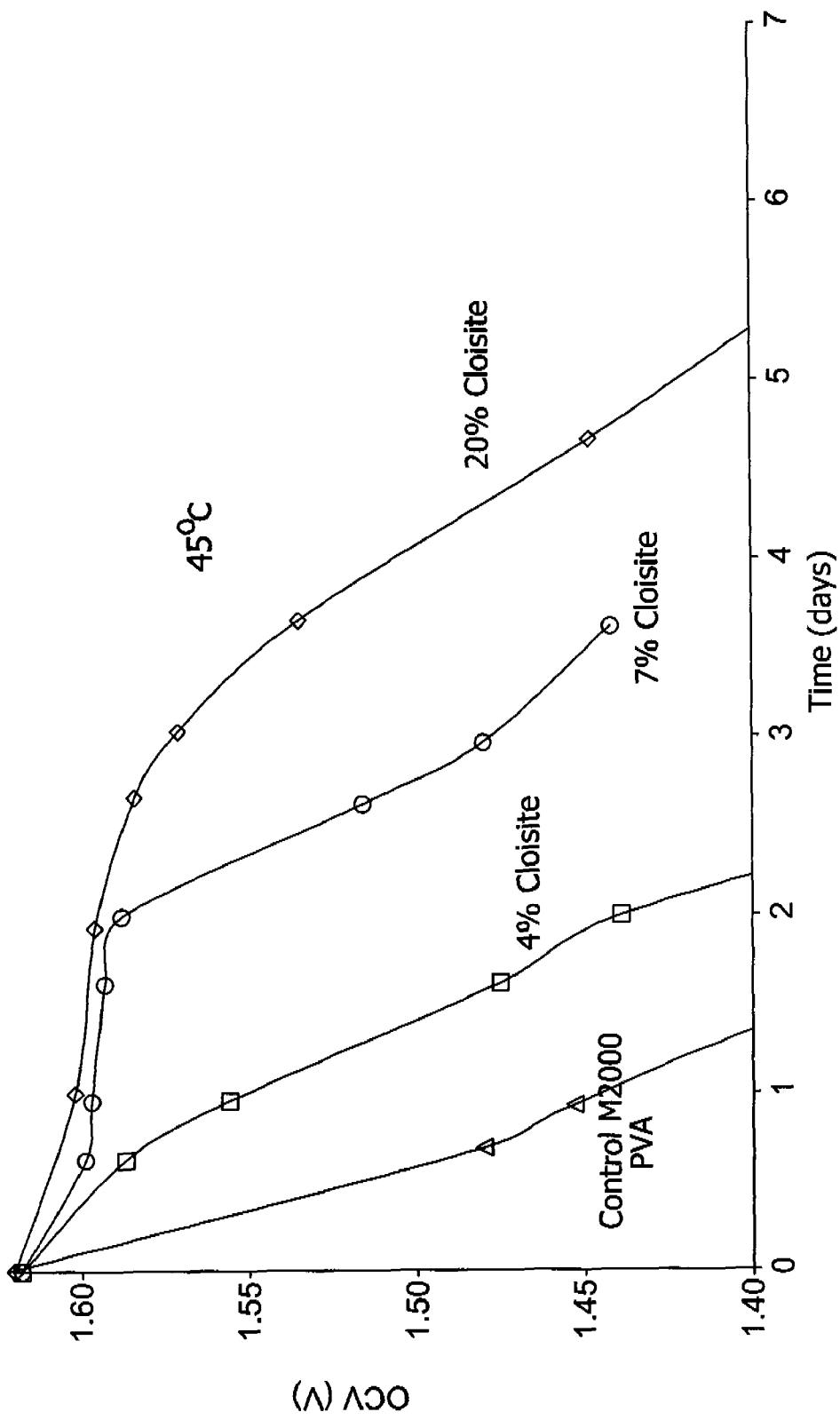
FIG. 63 is a graph plotting shorting resistance of PVA/Cloisite NA$^+$ Composite Films over time.

FIG. 63 illustrates the results of the open circuit voltage monitoring of the cells made herein versus a single layer of control film of M2000 PVA. The results indicate that while the open circuit voltage of the control film rapidly deteriorates indicating shorting through the film, samples with the clay additive show significant improvement in resistance to shorting (i.e., 2× to 10× improvement depending on clay content). These results indicate that as expected, the clay additive clearly inhibits the migration of copper through the separator and/or dendrite shorting.

Example 16-18

Synthesis of Copper-Manganese Mixed Oxides

The copper-manganese mixed oxides of the present invention were prepared using redox-precipitation processes in the presence of citric acid as a chelating agent, such as those further detailed below.

In one approach, an aqueous solution made by dissolving $CuSO_4.5H_2O$, $MnSO_4.H_2O$ and citric acid ($C_6H_8O_7$) was slowly evaporated at 85±5° C. while stirring, leading to a residue of copper-manganese citrate-sulfate. The resulting residue was dried at 60±5° C. for 15 hours to form the precursor. The dried precursor was heat treated at higher temperature (e.g., 250° C.) to form a calcined precursor. The calcined precursor was then mixed with a solution of $K_2S_2O_8$ in the presence of dissolved oxygen ($O_2$) to form a slurry, following which an alkaline solution was added drop-wise to the slurry to form a copper-manganese mixed oxide which was filtered, washed, dried and thermally treated at about 250° C. for testing as a cathode.

In another approach, an aqueous solution made by dissolving $CuSO_4.5H_2O$, $MnSO_4.H_2O$ and citric acid ($C_6H_8O_7$) was slowly evaporated at 85±5° C. while stirring, leading to a residue of copper-manganese citrate-sulfate. The resulting residue was dried at 60±5° C. for 15 hours to form the precursor. The dried precursor was dissolved in an oxidizing solution of potassium persulfate solution ($K_2S_2O_8$) in the presence of dissolved oxygen ($O_2$). The copper manganese mixed oxide was obtained by drop wise addition of an alkaline solution to the precursor-potassium persulfate solution at room temperature. The precipitate formed was recovered by filtration, then washed with deionized water and dried in air at 60±5° C. for 15 hours. Subsequently, and prior to use as active cathode material, the resulting intermediate (i.e., a dried precipitate) may be heated in air at elevated temperature for different periods of time (for example, about 250 or about 400° C. for 2 hours).

In another approach, $CuSO_4.5H_2O$, $MnSO_4.H_2O$ and citric acid ($C_6H_8O_7$) were mixed and ground using mortar and pestle. A small amount of water was added to this ground mixture to form a paste that was then heat treated at about 250° C. in air for 3 hours. The resulting precursor was ground and then mixed with an alkaline solution (e.g., a KOH solution) to form a copper and manganese mixed oxide, which after thermal treatment may be used as a cathode active materials. (See Example 18, below.)

Example 16

Figure 68:
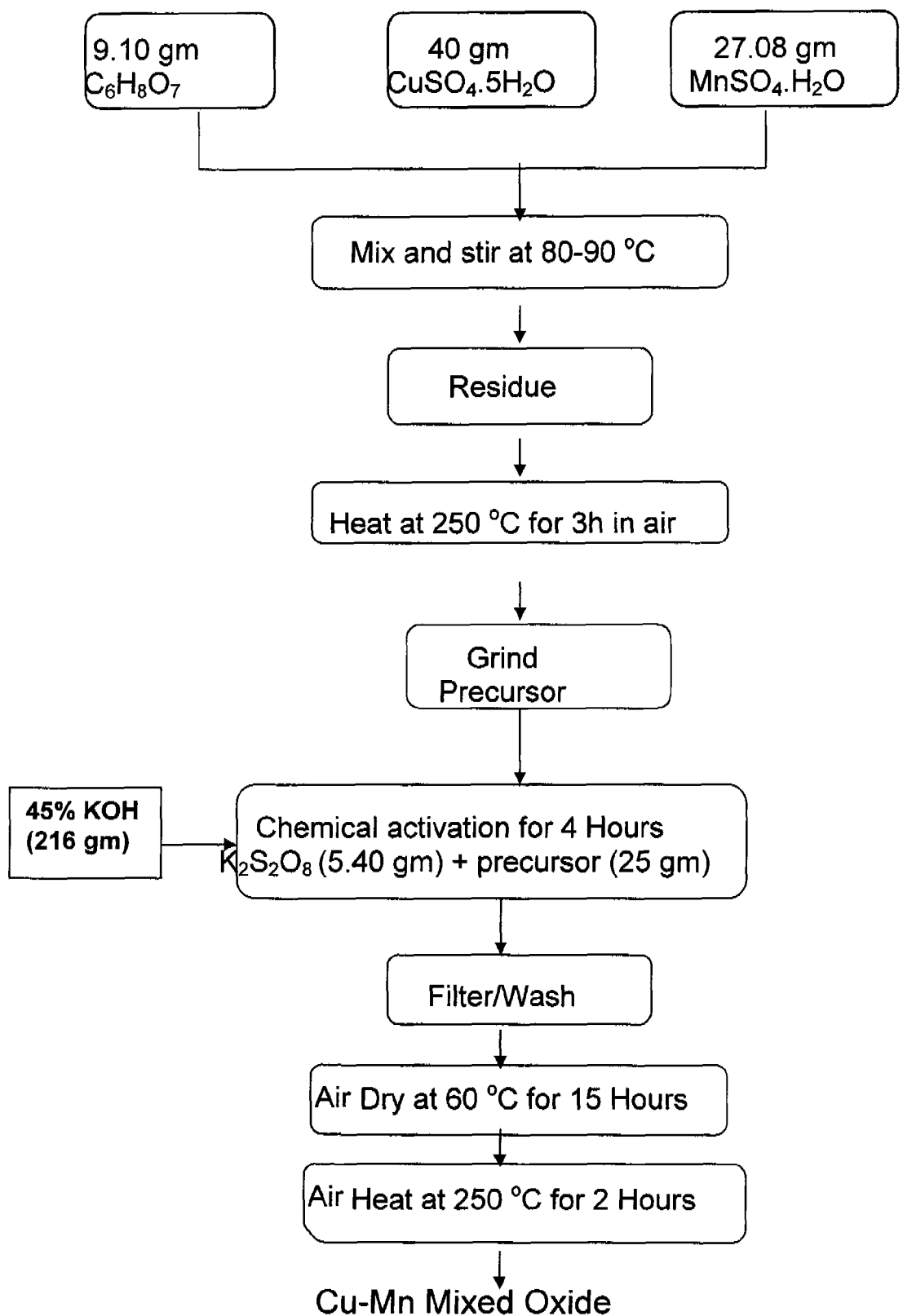
FIG. 68 is a flow chart for preparation Method A, as detailed in Example 16.

The starting materials—$CuSO_4.5H_2O$ and $MnSO_4.H_2O$—were purchased from Alfa Aesar. Citric acid was purchased from Sigma-Aldrich. In the Example, 40 gm $CuSO_4.5H_2O$, 27.08 gm $MnSO_4.H_2O$ and 9.11 gm $C_6H_8O_7$ were dissolved in 100 gm of water to prepare a solution mixture. The resulting solution was agitated with a magnetic stirrer at 85±5° C., until evaporation led to the formation of a residue of copper-manganese citrate-sulfate, which was then heat treated in air at 250±5° C. for 3 hours to form a calcinated precursor. A solution comprising 5.40 gm of $K_2S_2O_8$ in 390 gm of water was prepared and 25 gm of calcinated precursor was added to it to form a slurry. Finally, 216 gm of 45% KOH was added drop-wise to the resulting slurry during 1 hour while stirring. After KOH addition, stirring was continued for 5 hours to form the copper-manganese mixed oxide. Prior to use as an active cathode material, the washed and dried (60±5° C. for 15 hours) material was heated at elevated temperature, for example at about 250 or 400° C. for 2 hours. A flow chart of a more general preparation process is illustrated in FIG. 68.

Example 17

Figure 69:
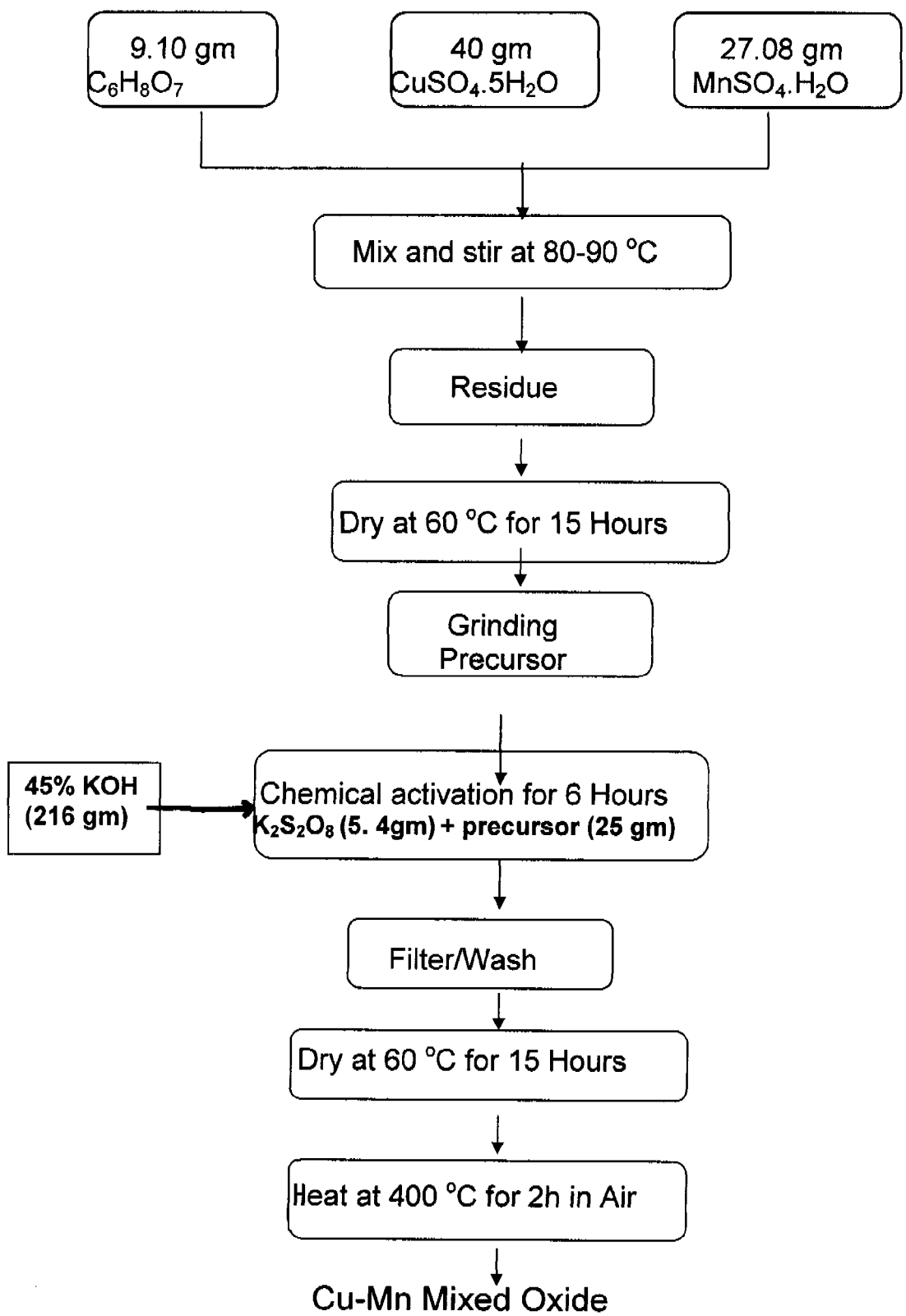
FIG. 69 is a flow chart for preparation Method B, as detailed in Example 17.

The starting materials—$CuSO_4.5H_2O$ and $MnSO_4.H_2O$—were purchased from Alfa Aesar. Citric acid was purchased from Sigma-Aldrich. In this Example, 40 gm $CuSO_4.5H_2O$, 27.08 gm $MnSO_4.H_2O$ and 9.11 gm $C_6H_8O_7$ were dissolved in 100 gm of water to prepare a solution mixture. The resulting solution was agitated with a magnetic stirrer at 85±5° C., until evaporation led to the formation of a residue of Cu/Mn citrate-sulfate, which was then dried in air at 60±5° C. for 15 hours to form the precursor. The dried precursor (25 gm) was dissolved in a solution comprising 5.40 gm of $K_2S_2O_8$ and in 390 gm of water. Finally, 216 gm of 45% KOH solution was added drop-wise to the precursor solution during 1 hour while stirring. After KOH addition, stirring was continued for 5 hours to form a copper and manganese mixed oxide precipitate. Prior to use as an active cathode material, the washed and dried (60±5° C. for 15 hours) precipitate was heated in air at elevated temperature, for example at about 250 or 400° C. for 2 hours. A flow chart of a more general preparation process is illustrated in FIG. 69.

Example 18

The starting materials, $CuSO_4.5H_2O$ and $MnSO_4.H_2O$, were purchased from Alfa Aesar. Citric acid was purchased from Sigma-Aldrich. In this Example, 78 gm $CuSO_4.5H_2O$, 21.10 gm $MnSO_4.H_2O$ and 5 gm $C_6H_8O_7$ were mixed and ground using a mortar and pestle to form a homogenous mixture. To this mixture, 10 gm of distilled water was slowly added and thoroughly mixed to form a paste, which was then heat treated at 250° C. in air for 3 hours to form a calcined precursor. 100 gm of a solution of potassium hydroxide (KOH 29%) was placed in a beaker and 25 gm of calcined precursor was added to it while stirring. After precursor addition was complete, stirring of the resulting slurry was continued for 4 hours to form the copper and manganese mixed oxide. Prior to use as an active cathode material, the washed, filtered and dried (60±5° C. for 15 hours) material was heated at elevated temperature, for example at about 250° C. in air for about 2 hours.

Example 19

Figure 70:
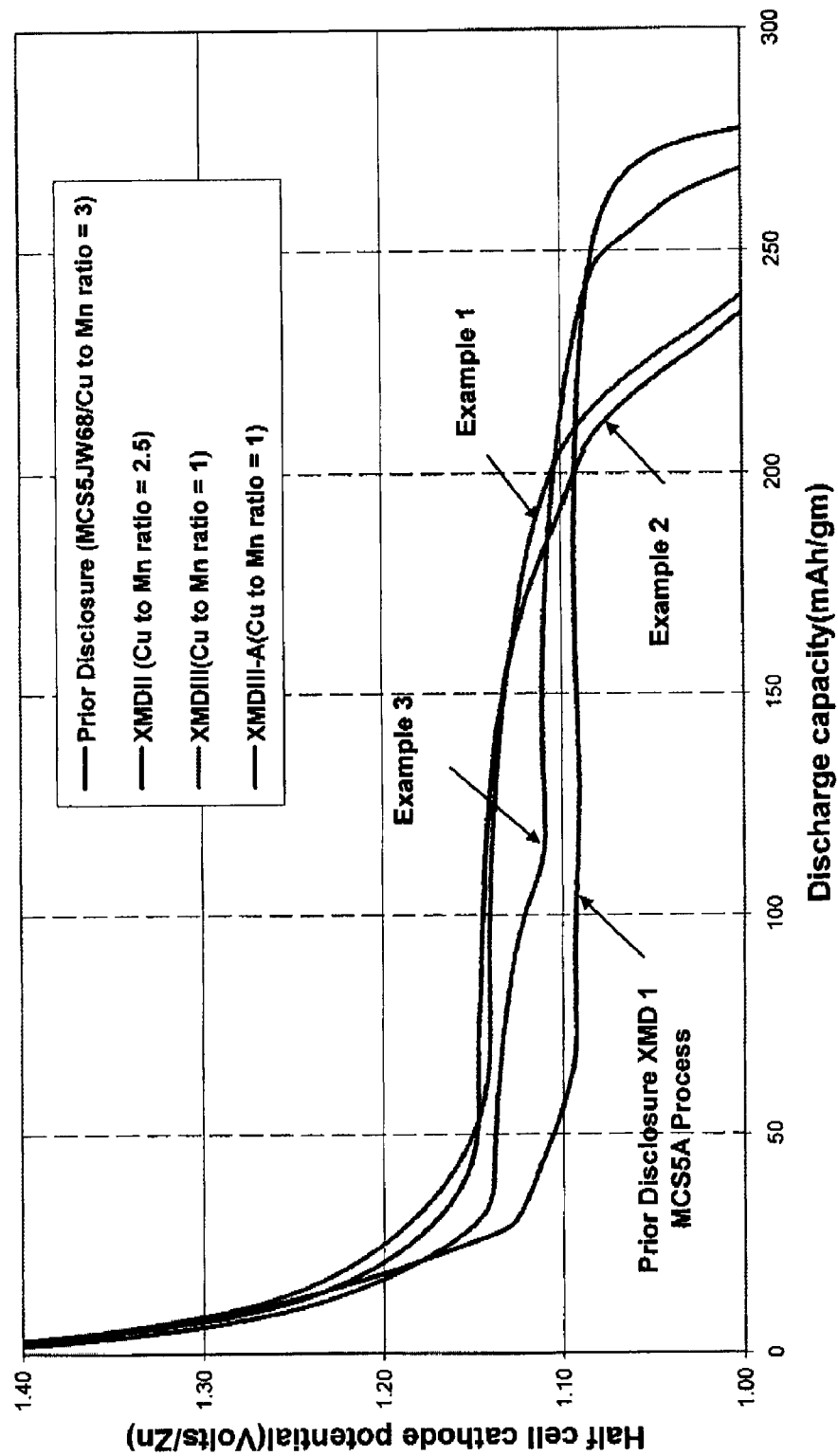
FIG. 70 is a graph illustrating constant current (5 mA) half-cell discharge profiles of copper-manganese mixed oxides from different synthesis processes obtained in 29% KOH solution.

As described in previous applications (see, e.g., U.S. patent application Ser. No. 11/058,665, filed Feb. 15, 2005 and No. 11/354,729, filed Feb. 15, 2006, both of which are incorporated herein by reference), and elsewhere herein, the mixed oxide active material may be tested in a ½-cell fixture against a Zn wire reference electrode. The electrode for this test typically contains 20% graphite, which serves as conductive aid as well as binder. The ½-cell discharge is performed under constant current conditions at different currents—such as 1 mA, 5 mA or 30 mA. FIG. 70 compares the discharge results of the materials from Examples 16, 17 and 18, identified as XMD III, XMD IIIA and XMDII, with a lower voltage material disclosed in the above-noted U.S. patent applications. The results are plotted as voltage vs. capacity in mAh/gm of the mixed oxide active material. It is clear that the materials obtained from the syntheses described in this application are superior to previous materials disclosed, in that the capacity above 1.1V is significantly higher. Materials with such voltage characteristics are particularly suitable for use in batteries that will need to operate high current or high power devices.

Figure 71:
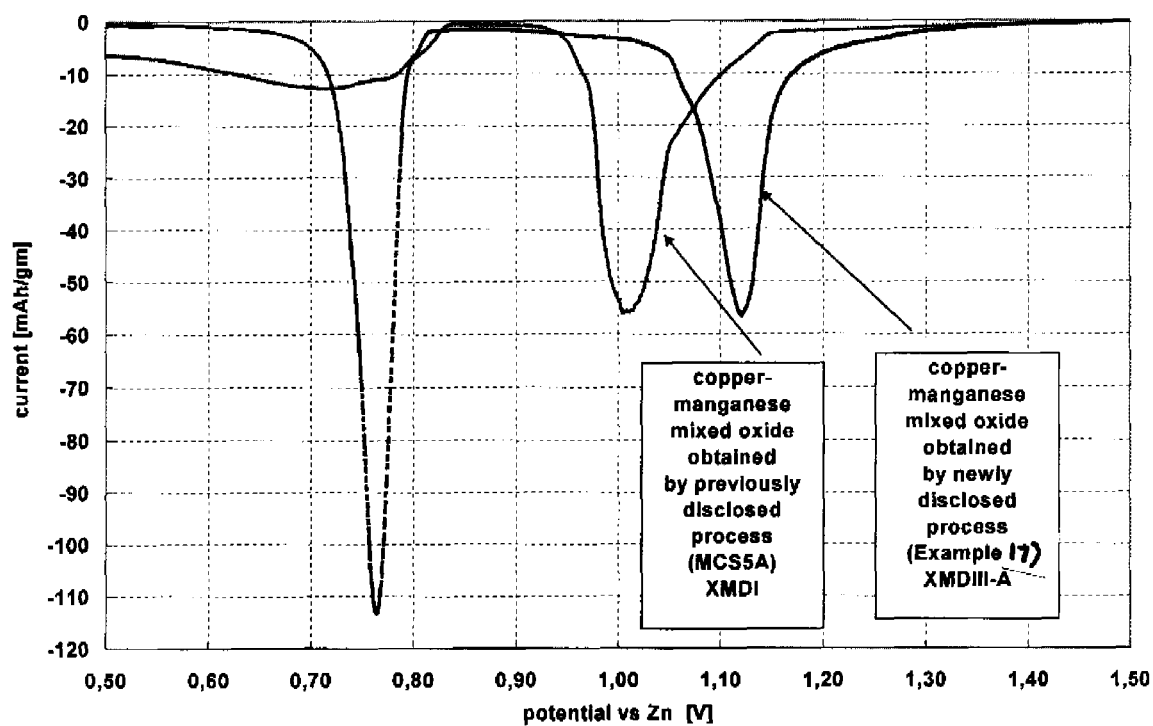
FIG. 71 is a graph illustrating linear sweep voltammetry (0.005 mV/s) profiles of copper-manganese mixed oxides from different synthesis processes obtained in 29% KOH solution.

The improved capacity at high voltages (e.g. to 1.1 V) of the copper-manganese mixed oxides from the synthesis described in this application can also be seen in slow scan linear sweep voltammetry experiments (shown as FIG. 71), and as illustrated in Table 12 (below). The electrodes in this experiment were composed of 80% of the dried intermediate and 20% of graphite which serves as conductive agent and binder. The measurements were performed in 29% KOH solution. The potential was measured against a Zn-wire electrode and controlled by a commercially available potentiostat (PAR 273A). Starting from the open circuit potential, the potential was varied at a rate of $0.005$ $mVs^{-1}$ towards lower values. The result is plotted as current (A/gm) versus cathode potential vs. Zn (V). As one skilled in the art would recognize, peaks with negative current in voltammograms correspond to reduction processes and the charge associated with such processes can be obtained by the area under the curve. The comparison of the copper-manganese mixed oxide obtained by the newly disclosed process (see, e.g., Example 17) with that obtained by the previously disclosed process (MCS5A) clearly shows that the peak associated with the main high-voltage reduction is located at significantly higher potential for the first. The peak maxima are at about 1.18 V (see, e.g., Example 17) and about 1.00 V (MCS5A), respectively. Furthermore, the reduction peak of the copper-manganese mixed oxide obtained by the newly disclosed process (see, e.g., Example 17) is better defined, i.e., lacks the high-voltage shoulder in the potential range of about 1.15 to 1.05 V which is typical of samples obtained by the previously disclosed process (MCS5A). As one skilled in the art recognizes, more symmetrical peaks, and in particular the absence of shoulders, suggests a more homogeneous reduction process. While not intending to be bound by any particular theory, this may indicate that the copper-manganese mixed oxide obtained by the newly disclosed process is more homogeneous.

TABLE 12

| Synthesis ID | Process | Capacity @ 5 mA to 1.0 V mAh/gm | Capacity @ 5 mA to 1.1 V mAh/gm |
|---|---|---|---|
| Example 1 | Cu—Mn citrate-sulfate first heated at 250° C. in air, then activated by persulfate/KOH, followed by final heating in air ~1:1 Cu:Mn precursor | 240 | 206 |
| Example 2 | Cu—Mn citrate-sulfate activated by persulfate/KOH, followed by final heating in air ~1:1 Cu:Mn precursor | 235 | 192 |
| Example 3 | Cu—Mn citrate-sulfate paste, first heated to 250° C. in air, then activated in KOH, followed by final heating in air ~2.5:1 Cu:Mn precursor | 268 | 213 |
| MCS5A (Prior Disclosure) | Low temperature solid state synthesis, followed by $KMnO_4$ oxidation step ~3:1 Cu:Mn precursor | 280 | 56 |

When introducing elements of the present invention or the various versions, embodiment(s) or aspects thereof, the articles "a", "an", "the" and "said" are intended to mean that there are one or more of the elements. The terms "comprising", "including" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

In view of the above, it will be seen that the several advantages of the invention are achieved and other advantageous results attained. As various changes could be made in the above processes and composites without departing from the scope of the invention, it is intended that all matter contained in the above description and shown in the accompanying drawings shall be interpreted as illustrative and not in a limiting sense.

What is claimed is:

1. A copper-manganese mixed oxide cathode active material having the formula $Mn_xCu_yO_z \cdot nH_2O$, wherein the oxidation state of Cu is between about +1 and about +3, the oxidation state of Mn is between about +2 and about +7, x is equal to about 3-y, y is less than about 3, z is calculated or experimentally determined based on the values of x and y, as well as the oxidation states of Mn and Cu, $nH_2O$ is the structural water molecules present in the mixed oxide cathode material, and n has a value between about 0.1 and about 10, wherein the discharge capacity of the mixed oxide cathode material at 1.1 V vs. a zinc wire reference electrode in a half-cell discharge test at 5 mA is at least about 50 mAh/gm.

2. The cathode material of claim 1 wherein Cu has an oxidation state between about +1 and about +2.

3. The cathode material of claim 1, wherein Mn has an oxidation state between about +2 and about +4.

4. The cathode material of claim 1, wherein y is between about 0.01 and 2.99.

5. The cathode material of claim 1, wherein x is between about 0.01 and 2.99.

6. The cathode material of claim 1, wherein z is between about 2.25 and about 7.5.

7. The cathode material of claim 1, wherein the copper-manganese mixed oxide has a defect spinel-type structure.

8. The cathode material of claim 1, wherein z is between about 2.25 and less than 4.0.

9. The cathode material of claim 1, wherein z is between greater than 4.0 and about 7.5.

10. The cathode material of claim 1, wherein Cu has an oxidation state between about +1 and about +3 and Mn has an oxidation state between about +2 and about +4.

11. The cathode material of claim 1, wherein Cu has an oxidation state of about +2 and Mn has an oxidation state between about +3 and about +4.

12. The cathode material of claim 1, wherein Cu has an oxidation state of about +2 and Mn has an oxidation state of about +4.

13. The cathode material of claim 1, wherein said material has the formula:

$$Cu_{1.5}Mn_{1.5}O_z \cdot nH_2O$$

wherein y, x, z and n are as defined in claim 1.

14. A primary electrochemical cell comprising:
an anode;
a cathode comprising a copper-manganese mixed oxide cathode active material having the formula $Mn_xCu_yO_z \cdot nH_2O$, wherein the oxidation state of Cu is between about +1 and about +3, the oxidation state of Mn is between about +2 and about +7, x is equal to about 3-y, y is less than about 3, z is calculated or experimentally determined based on the values of x and y, as well as the oxidation states of Mn and Cu, $nH_2O$ is the structural water molecules present in the mixed oxide cathode material, and n has a value between about 0.1 and about 10;
a separator disposed between the anode and the cathode; and,
an electrolyte which is in fluid communication with the anode, the cathode, and the separator.

15. The electrochemical cell of claim 14, wherein said separator comprises about 1 to less than 3 wraps of a free-standing polymer film, said film having a dry thickness of less than about 250 microns.

16. The electrochemical cell of claim 15, wherein said separator has a resistivity of less than about 100 ohm-cm.

17. The electrochemical cell of claim 14, wherein said separator comprises particles of a clay additive.

18. The electrochemical cell of claim 14, wherein said separator comprises a metal sulfide additive.

19. The electrochemical cell of claim 14, wherein the discharge capacity at 1.1 V vs. a zinc wire reference electrode in a half-cell discharge test at 5 mA is at least about 50 mAh/gm.

20. The electrochemical cell of claim 14, wherein Cu has an oxidation state between about +1 and about +2.

21. The electrochemical cell of claim 14, wherein Mn has an oxidation state between about +2 and about +4.

22. The electrochemical cell of claim 14, wherein y is between about 0.01 and 2.99.

23. The electrochemical cell of claim 14, wherein x is between about 0.01 and 2.99.

24. The electrochemical cell of claim 14, wherein z is between about 2.25 and about 7.5.

25. The electrochemical cell of claim 14, wherein the copper-manganese mixed oxide has a defect spinel-type structure.

26. The electrochemical cell of claim 14, wherein z is between about 2.25 and less than 4.0.

27. The electrochemical cell of claim 14, wherein Cu has an oxidation state between about +1 and about +3 and Mn has an oxidation state between about +2 and about +4.

28. The electrochemical cell of claim 14, wherein Cu has an oxidation state of about +2 and Mn has an oxidation state between about +3 and about +4.

29. The electrochemical cell of claim 14, wherein Cu has an oxidation state of about +2 and Mn has an oxidation state of about +4.

30. The electrochemical cell of claim 14, wherein said material has the formula:

$$Cu_{1.5}Mn_{1.5}O_z \cdot nH_2O$$

wherein y, x, z and n are as defined in claim 14.

* * * * *

UNITED STATES PATENT AND TRADEMARK OFFICE
CERTIFICATE OF CORRECTION

PATENT NO. : 7,807,296 B2
APPLICATION NO. : 11/843930
DATED : October 5, 2010
INVENTOR(S) : Vu et al.

It is certified that error appears in the above-identified patent and that said Letters Patent is hereby corrected as shown below:

On the Title page, at (75) Inventors, delete "Akshaya Kumar" and insert therefor -- Akshaya Kumar Padhi --.

On the Title Page, at (73) Assignee, delete "Roval, Inc." and insert therefor -- Rovcal, Inc. --.

On the Title page, at (57) Abstract, delete "$Mn_xCu_yO_z.nH_2O$" and insert therefor -- $Mn_xCu_yO_z \bullet nH_2O$ --.

Column 1, line 41, delete "$Mn_xCu_yO_z.nH_2O$" and insert therefor -- $Mn_xCu_yO_z \bullet nH_2O$ --.

Column 4, line 18, delete "$Mn_xCu_yO_z.nH_2O$" and insert therefor -- $Mn_xCu_yO_z \bullet nH_2O$ --.

Column 5, line 52, delete "$MnO_{2+}CuO$" and insert therefor -- "MnO2+CuO --.

Column 8, line 63, delete "$Mn_xCu_yO_z.nH_2O$" and insert therefor -- $Mn_xCu_yO_z \bullet nH_2O$ --.

Column 26, line 30, delete "$Mn_xCu_yO_z.nH_2O$" and insert therefor -- $Mn_xCu_yO_z \bullet nH_2O$ --.

Column 26, line 35, delete "$Mn_xCu_yO_z.nH_2O$" and insert therefor -- $Mn_xCu_yO_z \bullet nH_2O$ --.

Column 27, line 8, delete "$Cu_{1.5}Mn_{1.5}O_z.nH_2O$ and insert therefor -- $Cu_{1.5}Mn_{1.5}O_z \bullet nH_2O$ --.

Column 27, line 29, delete "$Mn_xCu_yO_z.nH_2O$" and insert therefor -- $Mn_xCu_yO_z \bullet nH_2O$ --.

Column 31, line 55, delete "$CuSO_4.5H_2O$" and insert therefor -- $CuSO_4 \bullet 5H_2O$ --.

Column 31, line 56, delete "$MnSO_4.H_2O$" and insert therefor -- $MnSO_4 \bullet H_2O$ --.

Signed and Sealed this
Twenty-ninth Day of March, 2011

David J. Kappos
*Director of the United States Patent and Trademark Office*

Column 32, line 13, delete "$CuSO_4.5H_2O$ and $MnSO_4.H_2O$" and insert therefor -- $CuSO_4 \bullet 5H_2O$ and $MnSO_4 \bullet H_2O$ --.

Column 32, line 22, delete "$Cu(NO_3)_2.3H_2O$" and insert therefor -- $Cu(NO_3)_2 \bullet 3H_2O$ --.

Column 33, line 16, delete "$Mn_xCu_yO_z.nH_2O$" and insert therefor -- $Mn_xCu_yO_z \bullet nH_2O$ --.

Column 34, line 21, delete "$Mn_xCu_yO_{4+\delta}.nH_2O$" and insert therefor -- $Mn_xCu_yO_{4+\delta} \bullet nH_2O$ --.

Column 34, line 27, delete "$Mn_xCu_yO_{4+\delta}.nH_2O$" and insert therefor -- $Mn_xCu_yO_{4+\delta} \bullet nH_2O$ --.

Column 92, line 10, delete "$CuSO_4.5H_2O$, $MnSO_4.H_2O$" and insert therefor -- $CuSO_4 \bullet 5H_2O$, $MnSO_4 \bullet H_2O$ --.

Column 92, line 23, delete "$CuSO_4.5H_2O$, $MnSO_4.H_2O$" and insert therefor -- $CuSO_4 \bullet 5H_2O$, $MnSO_4 \bullet H_2O$ --.

Column 92, line 39, delete "$CuSO_4.5H_2O$, $MnSO_4.H_2O$" and insert therefor -- $CuSO_4 \bullet 5H_2O$, $MnSO_4 \bullet H_2O$ --.

Column 92, line 51, delete "$CuSO_4.5H_2O$ and $MnSO_4.H_2O$" and insert therefor -- $CuSO_4 \bullet 5H_2O$ and $MnSO_4 \bullet H_2O$ --.

Column 92, line 53, delete "$CuSO_4.5H_2O$" and insert therefor -- $CuSO_4 \bullet 5H_2O$ --.

Column 92, line 54, delete "$MnSO_4.H_2O$" and insert therefor -- $MnSO_4 \bullet H_2O$ --.

Column 93, line 6, delete "$CuSO_4.5H_2O$ and $MnSO_4.H_2O$" and insert therefor -- $CuSO_4 \bullet 5H_2O$ and $MnSO_4 \bullet H_2O$ --.

Column 93, line 8, delete "$CuSO_4.5H_2O$" and insert therefor -- $CuSO_4 \bullet 5H_2O$ --.

Column 93, line 9, delete "$MnSO_4.H_2O$" and insert therefor -- $MnSO_4 \bullet H_2O$ --.

Column 93, line 28, delete "$CuSO_4.5H_2O$ and $MnSO_4.H_2O$" and insert therefor -- $CuSO_4 \bullet 5H_2O$ and $MnSO_4 \bullet H_2O$ --.

Column 93, line 30, delete "$CuSO_4.5H_2O$" and insert therefor -- $CuSO_4 \bullet 5H_2O$ --.

Column 93, line 31, delete "$MnSO_4.H_2O$" and insert therefor -- $MnSO_4 \bullet H_2O$ --.

In Claim 1, column 95, line 13, delete "$Mn_xCu_yO_z.nH_2O$" and insert therefor -- $Mn_xCu_yO_z \bullet nH_2O$ --.

CERTIFICATE OF CORRECTION (continued)
U.S. Pat. No. 7,807,296 B2

In Claim 13, column 95, line 51, delete "$Cu_{1.5}Mn_{1.5}O_z.nH_2O$ and insert therefor -- $Cu_{1.5}Mn_{1.5}O_z \bullet nH_2O$ --.

In Claim 14, column 96, line 1, delete "$Mn_xCu_yO_z.nH_2O$" and insert therefor -- $Mn_xCu_yO_z \bullet nH_2O$ --.

In Claim 30, column 96, line 54, delete "$Cu_{1.5}Mn_{1.5}O_z.nH_2O$ and insert therefor -- $Cu_{1.5}Mn_{1.5}O_z \bullet nH_2O$ --.

UNITED STATES PATENT AND TRADEMARK OFFICE
CERTIFICATE OF CORRECTION

| | | |
|---|---|---|
| PATENT NO. | : 7,807,296 B2 | |
| APPLICATION NO. | : 11/843930 | |
| DATED | : October 5, 2010 | |
| INVENTOR(S) | : Vu et al. | |

It is certified that error appears in the above-identified patent and that said Letters Patent is hereby corrected as shown below:

On the Title page, at (75) Inventors, delete "Akshaya Kumar" and insert therefor -- Akshaya Kumar Padhi --.

On the Title Page, at (73) Assignee, delete "Roval, Inc." and insert therefor -- Rovcal, Inc. --.

On the Title page, at (57) Abstract, delete "$Mn_xCu_yO_z.nH_2O$" and insert therefor -- $Mn_xCu_yO_z \bullet nH_2O$ --.

Column 1, line 41, delete "$Mn_xCu_yO_z.nH_2O$" and insert therefor -- $Mn_xCu_yO_z \bullet nH_2O$ --.

Column 4, line 18, delete "$Mn_xCu_yO_z.nH_2O$" and insert therefor -- $Mn_xCu_yO_z \bullet nH_2O$ --.

Column 5, line 52, delete "$MnO_{2+}CuO$" and insert therefor -- "$MnO_2+CuO$ --.

Column 8, line 63, delete "$Mn_xCu_yO_z.nH_2O$" and insert therefor -- $Mn_xCu_yO_z \bullet nH_2O$ --.

Column 26, line 30, delete "$Mn_xCu_yO_z.nH_2O$" and insert therefor -- $Mn_xCu_yO_z \bullet nH_2O$ --.

Column 26, line 35, delete "$Mn_xCu_yO_z.nH_2O$" and insert therefor -- $Mn_xCu_yO_z \bullet nH_2O$ --.

Column 27, line 8, delete "$Cu_{1.5}Mn_{1.5}O_z.nH_2O$ and insert therefor -- $Cu_{1.5}Mn_{1.5}O_z \bullet nH_2O$ --.

Column 27, line 29, delete "$Mn_xCu_yO_z.nH_2O$" and insert therefor -- $Mn_xCu_yO_z \bullet nH_2O$ --.

Column 31, line 55, delete "$CuSO_4.5H_2O$" and insert therefor -- $CuSO_4 \bullet 5H_2O$ --.

This certificate supersedes the Certificate of Correction issued March 29, 2011.

Signed and Sealed this
Tenth Day of May, 2011

David J. Kappos
*Director of the United States Patent and Trademark Office*

CERTIFICATE OF CORRECTION (continued)
U.S. Pat. No. 7,807,296 B2

Column 31, line 56, delete "$MnSO_4.H_2O$" and insert therefor -- $MnSO_4 \cdot H_2O$ --.

Column 32, line 13, delete "$CuSO_4.5H_2O$ and $MnSO_4.H_2O$" and insert therefor -- $CuSO_4 \cdot 5H_2O$ and $MnSO_4 \cdot H_2O$ --.

Column 32, line 22, delete "$Cu(NO_3)_2.3H_2O$" and insert therefor -- $Cu(NO_3)_2 \cdot 3H_2O$ --.

Column 33, line 16, delete "$Mn_xCu_yO_z.nH_2O$" and insert therefor -- $Mn_xCu_yO_z \cdot nH_2O$ --.

Column 34, line 21, delete "$Mn_xCu_yO_{4+\delta}.nH_2O$" and insert therefor -- $Mn_xCu_yO_{4+\delta} \cdot nH_2O$ --.

Column 34, line 27, delete "$Mn_xCu_yO_{4+\delta}.nH_2O$" and insert therefor -- $Mn_xCu_yO_{4+\delta} \cdot nH_2O$ --.

Column 92, line 10, delete "$CuSO_4.5H_2O$, $MnSO_4.H_2O$" and insert therefor -- $CuSO_4 \cdot 5H_2O$, $MnSO_4 \cdot H_2O$ --.

Column 92, line 23, delete "$CuSO_4.5H_2O$, $MnSO_4.H_2O$" and insert therefor -- $CuSO_4 \cdot 5H_2O$, $MnSO_4 \cdot H_2O$ --.

Column 92, line 39, delete "$CuSO_4.5H_2O$, $MnSO_4.H_2O$" and insert therefor -- $CuSO_4 \cdot 5H_2O$, $MnSO_4 \cdot H_2O$ --.

Column 92, line 51, delete "$CuSO_4.5H_2O$ and $MnSO_4.H_2O$" and insert therefor -- $CuSO_4 \cdot 5H_2O$ and $MnSO_4 \cdot H_2O$ --.

Column 92, line 53, delete "$CuSO_4.5H_2O$" and insert therefor -- $CuSO_4 \cdot 5H_2O$ --.

Column 92, line 54, delete "$MnSO_4.H_2O$" and insert therefor -- $MnSO_4 \cdot H_2O$ --.

Column 93, line 6, delete "$CuSO_4.5H_2O$ and $MnSO_4.H_2O$" and insert therefor -- $CuSO_4 \cdot 5H_2O$ and $MnSO_4 \cdot H_2O$ --.

Column 93, line 8, delete "$CuSO_4.5H_2O$" and insert therefor -- $CuSO_4 \cdot 5H_2O$ --.

Column 93, line 9, delete "$MnSO_4.H_2O$" and insert therefor -- $MnSO_4 \cdot H_2O$ --.

Column 93, line 28, delete "$CuSO_4.5H_2O$ and $MnSO_4.H_2O$" and insert therefor -- $CuSO_4 \cdot 5H_2O$ and $MnSO_4 \cdot H_2O$ --.

Column 93, line 30, delete "$CuSO_4.5H_2O$" and insert therefor -- $CuSO_4 \cdot 5H_2O$ --.

Column 93, line 31, delete "$MnSO_4.H_2O$" and insert therefor -- $MnSO_4 \cdot H_2O$ --.

In Claim 1, column 95, line 13, delete "$Mn_xCu_yO_z.nH_2O$" and insert therefor -- $Mn_xCu_yO_z \cdot nH_2O$ --.

CERTIFICATE OF CORRECTION (continued)
U.S. Pat. No. 7,807,296 B2

In Claim 13, column 95, line 51, delete "$Cu_{1.5}Mn_{1.5}O_z.nH_2O$ and insert therefor -- $Cu_{1.5}Mn_{1.5}O_z \bullet nH_2O$ --.

In Claim 14, column 96, line 1, delete "$Mn_xCu_yO_z.nH_2O$" and insert therefor -- $Mn_xCu_yO_z \bullet nH_2O$ --.

In Claim 30, column 96, line 54, delete "$Cu_{1.5}Mn_{1.5}O_z.nH_2O$ and insert therefor -- $Cu_{1.5}Mn_{1.5}O_z \bullet nH_2O$ --.